United States Patent
Reese et al.

(10) Patent No.: US 12,326,857 B1
(45) Date of Patent: *Jun. 10, 2025

(54) SYSTEMS AND METHODS FOR GRAPHICAL SYMMETRY BREAKING

(71) Applicant: SAS Institute Inc., Cary, NC (US)

(72) Inventors: Brandon Michael Reese, Raleigh, NC (US); Steven Harenberg, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/976,654

(22) Filed: Dec. 11, 2024

Related U.S. Application Data

(63) Continuation of application No. 18/808,240, filed on Aug. 19, 2024.

(60) Provisional application No. 63/631,591, filed on Apr. 9, 2024, provisional application No. 63/564,421, filed on Mar. 12, 2024.

(51) Int. Cl.
| | |
|---|---|
| *G06F 16/00* | (2019.01) |
| *G06F 16/22* | (2019.01) |
| *G06F 16/2452* | (2019.01) |
| *G06F 16/248* | (2019.01) |

(52) U.S. Cl.
CPC ...... *G06F 16/2452* (2019.01); *G06F 16/2246* (2019.01); *G06F 16/248* (2019.01)

(58) Field of Classification Search
CPC . G06F 16/2452; G06F 16/2246; G06F 16/248
USPC .................................................. 707/600–899
See application file for complete search history.

(56) References Cited

U.S. PATENT DOCUMENTS

| | | | |
|---|---|---|---|
| 9,053,210 B2 * | 6/2015 | Elnikety | G06F 16/9024 |
| 11,132,364 B1 | 9/2021 | Galati et al. | |
| 11,775,547 B2 * | 10/2023 | Reynolds | G06F 16/21 |
| | | | 707/770 |
| 12,124,448 B2 | 10/2024 | Kapp | |
| 2016/0335371 A1 | 11/2016 | Rao | |
| 2017/0169133 A1 * | 6/2017 | Kim | G06F 16/9024 |

(Continued)

OTHER PUBLICATIONS

Notice of Allowance in U.S. Appl. No. 18/808,240 dated Feb. 12, 2025, 8 pages.

(Continued)

*Primary Examiner* — Michelle N Owyang
(74) *Attorney, Agent, or Firm* — Bell & Manning, LLC

(57) ABSTRACT

A system and method include breaking symmetry in a query graph by converting the query graph into a transformed query graph by generating a symmetry breaking expression that includes detecting one or more orbits in the transformed query graph, selecting an orbit from the one or more orbits having more than one node, generating an automorphism breaking sub-expression for the selected orbit, assigning a node of the selected orbit a unique node attribute, recalculating the one or more orbits in the transformed query graph, repeating the process until each node is in its own orbit, and combining each of the automorphism breaking sub-expressions to obtain the symmetry breaking expression. Using the symmetry breaking expression, the system and method include finding one or more subgraphs of a main graph that match the symmetry breaking expression of the query graph.

30 Claims, 57 Drawing Sheets

(56) References Cited

U.S. PATENT DOCUMENTS

| | | | |
|---|---|---|---|
| 2018/0181676 | A1 | 6/2018 | Khandelwal |
| 2019/0278760 | A1 | 9/2019 | Smart et al. |
| 2021/0149851 | A1 | 5/2021 | Belezko et al. |
| 2022/0092069 | A1 | 3/2022 | Hartsing |
| 2022/0405455 | A1 | 12/2022 | Ghose et al. |
| 2023/0273947 | A1* | 8/2023 | Weitzner ............ G06F 16/2455 707/718 |

OTHER PUBLICATIONS

Li, Xiaodong, et al. "M-cypher: A gql framework supporting motifs." Proceedings of the 29th ACM International Conference on Information & Knowledge Management. 2020.

"Neo4j Graph Data Science Offers 65+ Ready-to-Use Graph Algorithms." Neo4j, Inc. 2023.

"How to import Wikidata into NEO4J"—Neo4j Labs. https://neo4j.com/labs/neosemantics/how-to-guide/ Accessed Mar. 12, 2024.

"ISMAGS Algorithm." NetworkX 3.2.1 documentation. NetworkX Developers. https://networkx.org/documentation/stable/reference/algorithms/isomorphism.ismags.html. Accessed Mar. 12, 2024.

Houbraken M, Demeyer S, Michoel T, Audenaert P, Colle D, et al. (2014) The Index-Based Subgraph Matching Algorithm with General Symmetries (ISMAGS): Exploiting Symmetry for Faster Subgraph Enumeration. PLoS ONE 9 (5): e97896. doi:10.1371/journal.pone.0097896.

"Molecular symmetry." Wikipedia. https://en.wikipedia.org/wiki/Molecular_symmetry. Accessed Mar. 12, 2024.

"Tutorial." NetworkX 3.2.1 documentation. NetworkX Developers. https://networkx.org/documentation/stable/tutorial.html. Accessed Mar. 12, 2024.

"How to query symmetric graph and return non duplicate rows." Feb. 2020. Neo4j Online Community. https://community.neo4j.com/t/how-to-query-symmetric-graph-and-return-non-duplicate-rows/14474.

Galati, Matthew, Steve Harenberg, and Rob Pratt. SAS Institute Inc. "Introducing Pattern Matching for Graph Queries in SAS® Viya® 3.4." https://github.com/sascommunities/sas-global-forum-2019/blob/master/3353-2019-Galati/paper/SGF2019.pdf.

The Non-Final Office Action issued Dec. 2, 2024 for U.S. Appl. No. 18/808,240; pp. 1-20.

Non-Final Office Action in U.S. Appl. No. 18/976,960 dated Mar. 28, 2025, 34 pages.

Non-Final Office Action in U.S. Appl. No. 18/976,766 dated Mar. 27, 2025, 34 pages.

Non-Final Office Action in U.S. Appl. No. 18/977,112 dated Apr. 11, 2025, 36 pages.

Notice of Allowance in U.S. Appl. No. 18/976,766 dated Apr. 9, 2025, 8 pages.

Notice of Allowance in U.S. Appl. No. 18/976,960 dated Apr. 15, 2025, 8 pages.

Notice of Allowance in U.S. Appl. No. 18/977,112 dated Apr. 30, 2025, 7 pages.

* cited by examiner

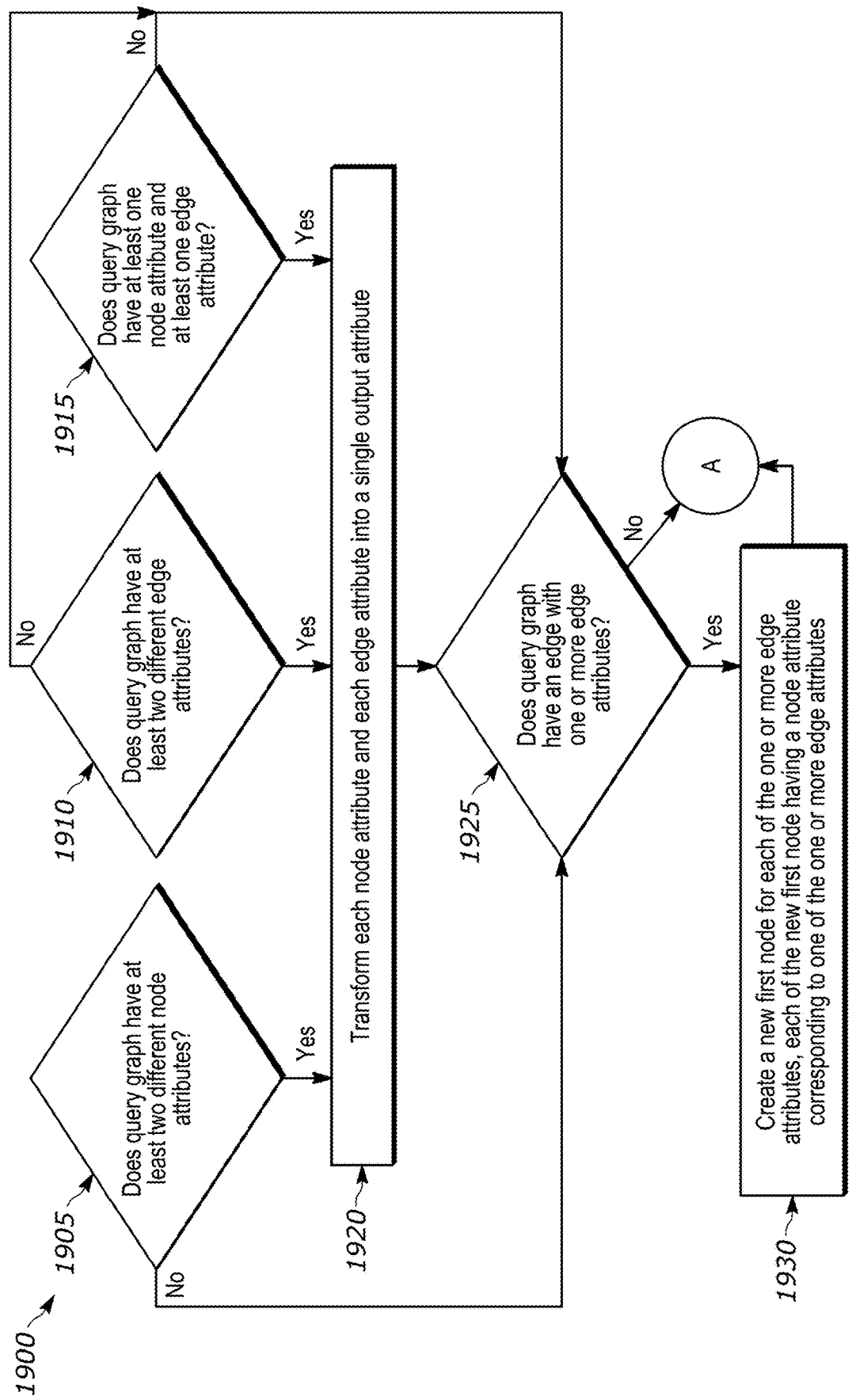

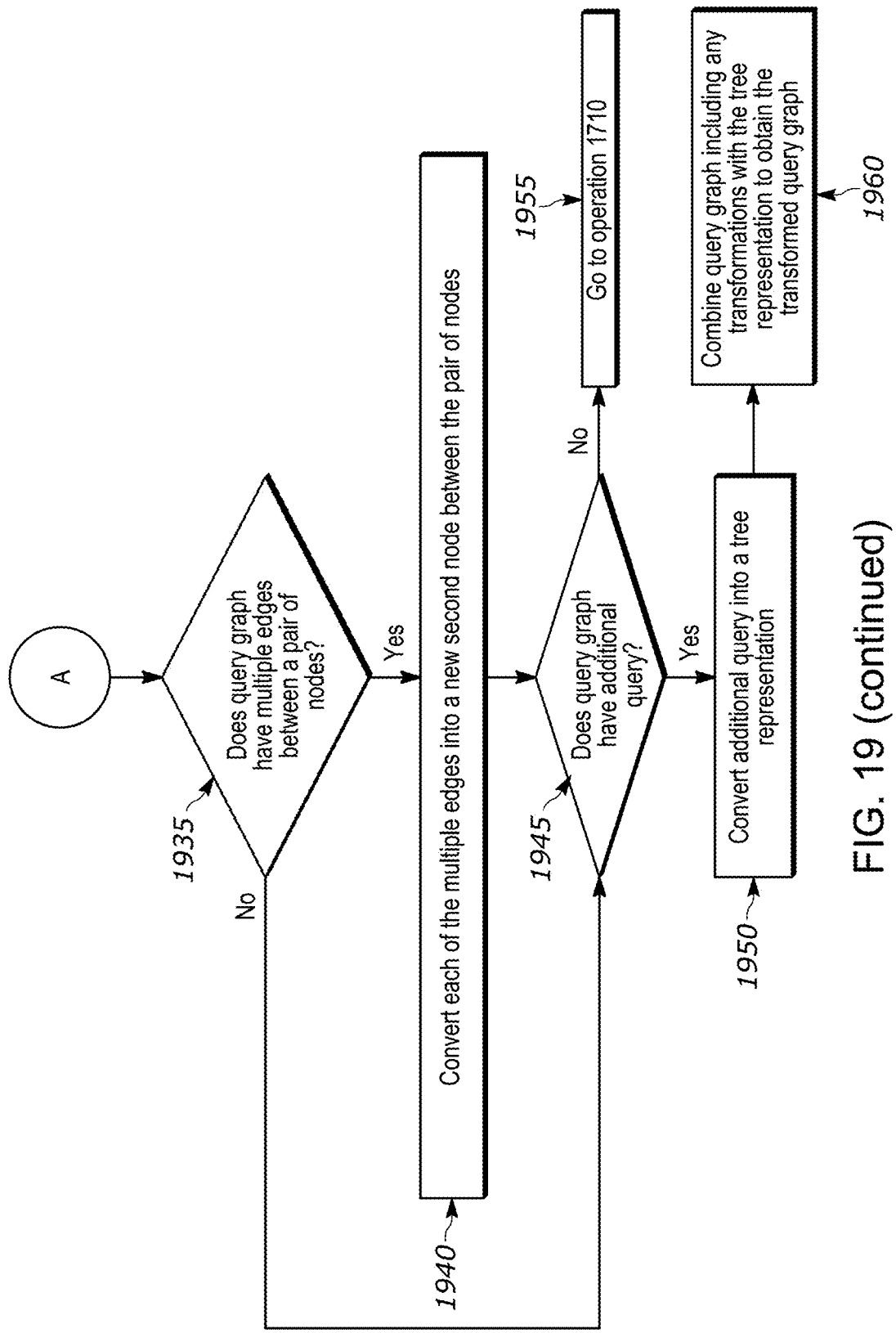

SYSTEMS AND METHODS FOR GRAPHICAL SYMMETRY BREAKING

CROSS-REFERENCE TO RELATED APPLICATIONS

This application is a continuation of U.S. application Ser. No. 18/808,240, filed on Aug. 19, 2024, which in turn claims priority from U.S. Provisional Application No. 63/564,421 filed on Mar. 12, 2024, and U.S. Provisional Application No. 63/631,591 filed on Apr. 9, 2024, the entireties of which are incorporated by reference herein.

BACKGROUND

A graph is a non-linear data structure that contains a plurality of vertices connected by one or more edges. Graphs are used in a variety of applications such as fraud and crime investigation, contact tracing, social networks, data management, mobile networking, supply chain management, transportation, aviation, and navigation, genomics, machine learning, drug discovery, linguistics, epidemiology, etc. Graphs provide a powerful framework for understanding complex systems, visualizing patterns, and making informed decisions. One mechanism by which graphs may be used is through pattern matching. Given a larger main graph and a smaller query graph, pattern matching attempts to find graphlets or sub-graphs from the main graph that match the query graph. A query graph may be said to have symmetry when after nontrivial relabeling, the relabeled query graph is equivalent to the original query graph. Breaking symmetry to remove unnecessary duplicates in query graphs is desirable to reduce computation time, number of computational resources, as well the number of computations performed. However, current symmetry breaking mechanisms are limited in their ability to detect and break symmetry effectively and accurately in query graphs.

SUMMARY

In accordance with at least some aspects of the present disclosure, a non-transitory computer-readable medium having computer-readable instructions stored thereon is disclosed. The computer-readable instructions when executed by a processor cause the processor to receive a main graph and a query graph, wherein the query graph contains symmetry, and wherein the query graph comprises an additional query, break the symmetry in the query graph by converting the query graph into a transformed query graph by responsive to determining that the query graph comprises (a) at least two different node attributes, or (b) at least two different edge attributes, or (c) at least one node attribute and at least one edge attribute, transforming each node attribute and each edge attribute into a single output attribute to obtain a first transformed query graph, responsive to determining that the first transformed query graph comprises an edge having the at least one edge attribute, creating a first new node for the edge to obtain a second transformed query graph, wherein the first new node comprises the single output attribute as a new node attribute, responsive to determining that the second transformed query graph comprises a pair of nodes having at least two edges therebetween, converting each of the at least two edges into a second new node between the pair of nodes to obtain a third transformed query graph, converting the additional query into a tree representation, combining the third transformed query graph with the tree representation to obtain the transformed query graph, generating a symmetry breaking expression from the transformed query graph by (A) detecting one or more orbits in the transformed query graph, wherein each orbit comprises one or more nodes of the transformed query graph, (B) selecting an orbit from the one or more orbits having more than one node, (C) generating an automorphism breaking sub-expression for the selected orbit, (D) assigning a node of the selected orbit a unique node attribute, (E) recalculating the one or more orbits in the transformed query graph, (F) repeating (B)-(E) until each orbit in the transformed query graph has a single node, and (G) combining each of the automorphism breaking sub-expressions generated in (C) to obtain the symmetry breaking expression, and translating the symmetry breaking expression to refer to one or more nodes and one or more edges in the query graph to obtain a translated symmetry breaking expression of the query graph, and find one or more subgraphs of the main graph that match the translated symmetry breaking expression of the query graph, wherein the one or more subgraphs do not contain symmetry.

In accordance with at least some other aspects of the present disclosure, a system is disclosed. The system includes a memory having computer-readable instructions stored thereon and a processor that executes the computer-readable instructions to receive a main graph and a query graph, wherein the query graph contains symmetry, and wherein the query graph comprises an additional query, break the symmetry in the query graph by converting the query graph into a transformed query graph by responsive to determining that the query graph comprises (a) at least two different node attributes, or (b) at least two different edge attributes, or (c) at least one node attribute and at least one edge attribute, transforming each node attribute and each edge attribute into a single output attribute to obtain a first transformed query graph, responsive to determining that the first transformed query graph comprises an edge having the at least one edge attribute, creating a first new node for the edge to obtain a second transformed query graph, wherein the first new node comprises the single output attribute as a new node attribute, responsive to determining that the second transformed query graph comprises a pair of nodes having at least two edges therebetween, converting each of the at least two edges into a second new node between the pair of nodes to obtain a third transformed query graph, converting the additional query into a tree representation, combining the third transformed query graph with the tree representation to obtain the transformed query graph, generating a symmetry breaking expression from the transformed query graph by (A) detecting one or more orbits in the transformed query graph, wherein each orbit comprises one or more nodes of the transformed query graph, (B) selecting an orbit from the one or more orbits having more than one node, (C) generating an automorphism breaking sub-expression for the selected orbit, (D) assigning a node of the selected orbit a unique node attribute, (E) recalculating the one or more orbits in the transformed query graph, (F) repeating (B)-(E) until each orbit in the transformed query graph has a single node, and (G) combining each of the automorphism breaking sub-expressions generated in (C) to obtain the symmetry breaking expression, and translating the symmetry breaking expression to refer to one or more nodes and one or more edges in the query graph to obtain a translated symmetry breaking expression of the query graph, and find one or more subgraphs of the main graph that match the translated symmetry breaking expression of the query graph, wherein the one or more subgraphs do not contain symmetry.

In accordance with at least some other aspects of the present disclosure, a method is disclosed. The method includes receiving, by a processor executing computer-readable instructions stored thereon, a main graph and a query graph, wherein the query graph contains symmetry, and wherein the query graph comprises an additional query, breaking, by the processor, the symmetry in the query graph by converting, by the processor, the query graph into a transformed query graph by responsive to determining that the query graph comprises (a) at least two different node attributes, or (b) at least two different edge attributes, or (c) at least one node attribute and at least one edge attribute, transforming, by the processor, each node attribute and each edge attribute into a single output attribute to obtain a first transformed query graph, responsive to determining that the first transformed query graph comprises an edge having the at least one edge attribute, creating, by the processor, a first new node for the edge to obtain a second transformed query graph, wherein the first new node comprises the single output attribute as a new node attribute, responsive to determining that the second transformed query graph comprises a pair of nodes having at least two edges therebetween, converting, by the processor, each of the at least two edges into a second new node between the pair of nodes to obtain a third transformed query graph, converting, by the processor, the additional query into a tree representation, combining, by the processor, the third transformed query graph with the tree representation to obtain the transformed query graph, generating, by the processor, a symmetry breaking expression from the transformed query graph by (A) detecting, by the processor, one or more orbits in the transformed query graph, wherein each orbit comprises one or more nodes of the transformed query graph, (B) selecting, by the processor, an orbit from the one or more orbits having more than one node, (C) generating, by the processor, an automorphism breaking sub-expression for the selected orbit, (D) assigning, by the processor, a node of the selected orbit a unique node attribute, (E) recalculating, by the processor, the one or more orbits in the transformed query graph, (F) repeating, by the processor, (B)-(E) until each orbit in the transformed query graph has a single node, and (G) combining, by the processor, each of the automorphism breaking sub-expressions generated in (C) to obtain the symmetry breaking expression, and translating, by the processor, the symmetry breaking expression to refer to one or more nodes and one or more edges in the query graph to obtain a translated symmetry breaking expression of the query graph, and finding, by the processor, one or more subgraphs of the main graph that match the translated symmetry breaking expression of the query graph, wherein the one or more subgraphs do not contain symmetry.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIG. 19 illustrates a flowchart showing another example process used during the process of FIG. 17 for transforming a query graph into a graph representation having a single attribute type, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
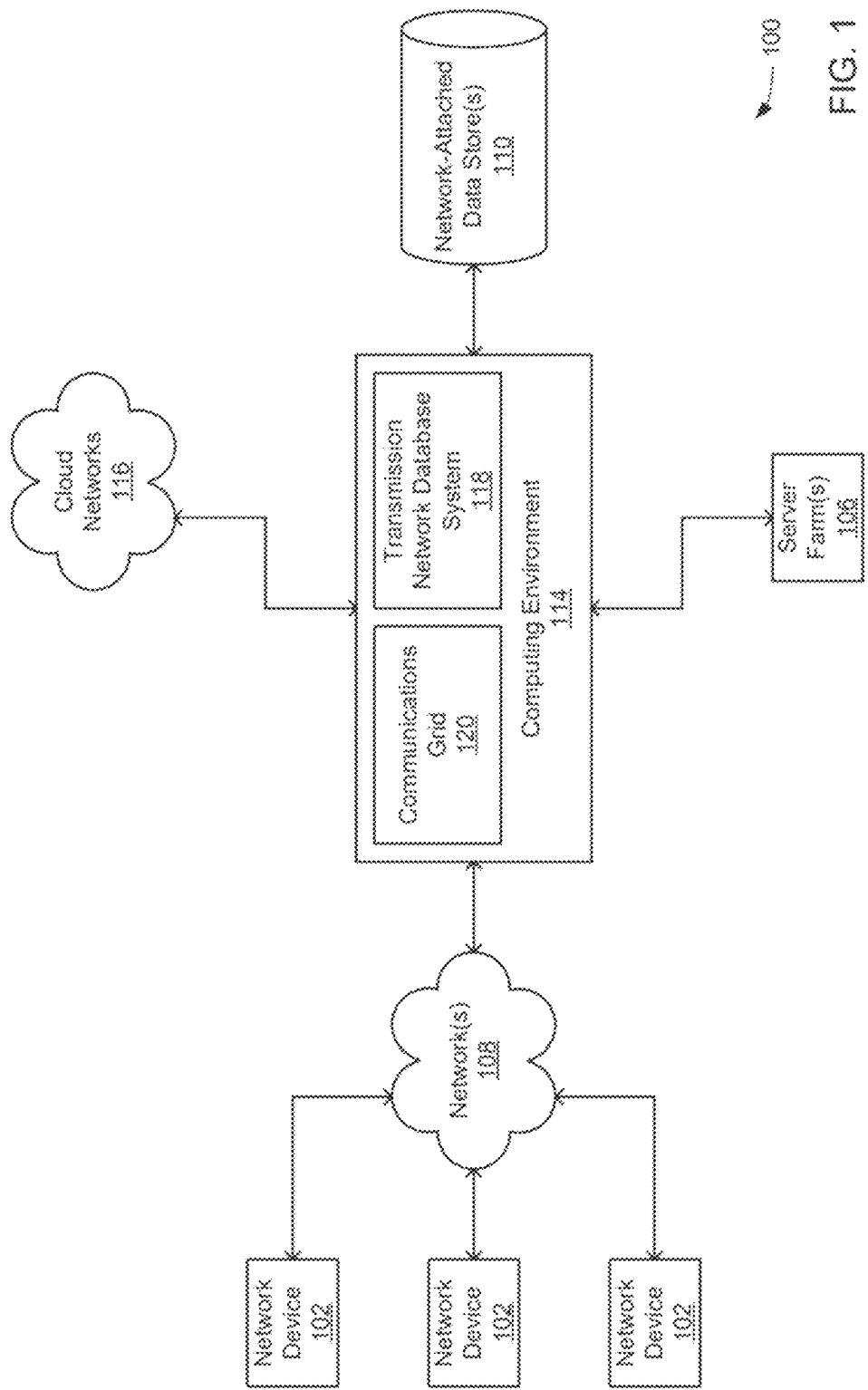
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
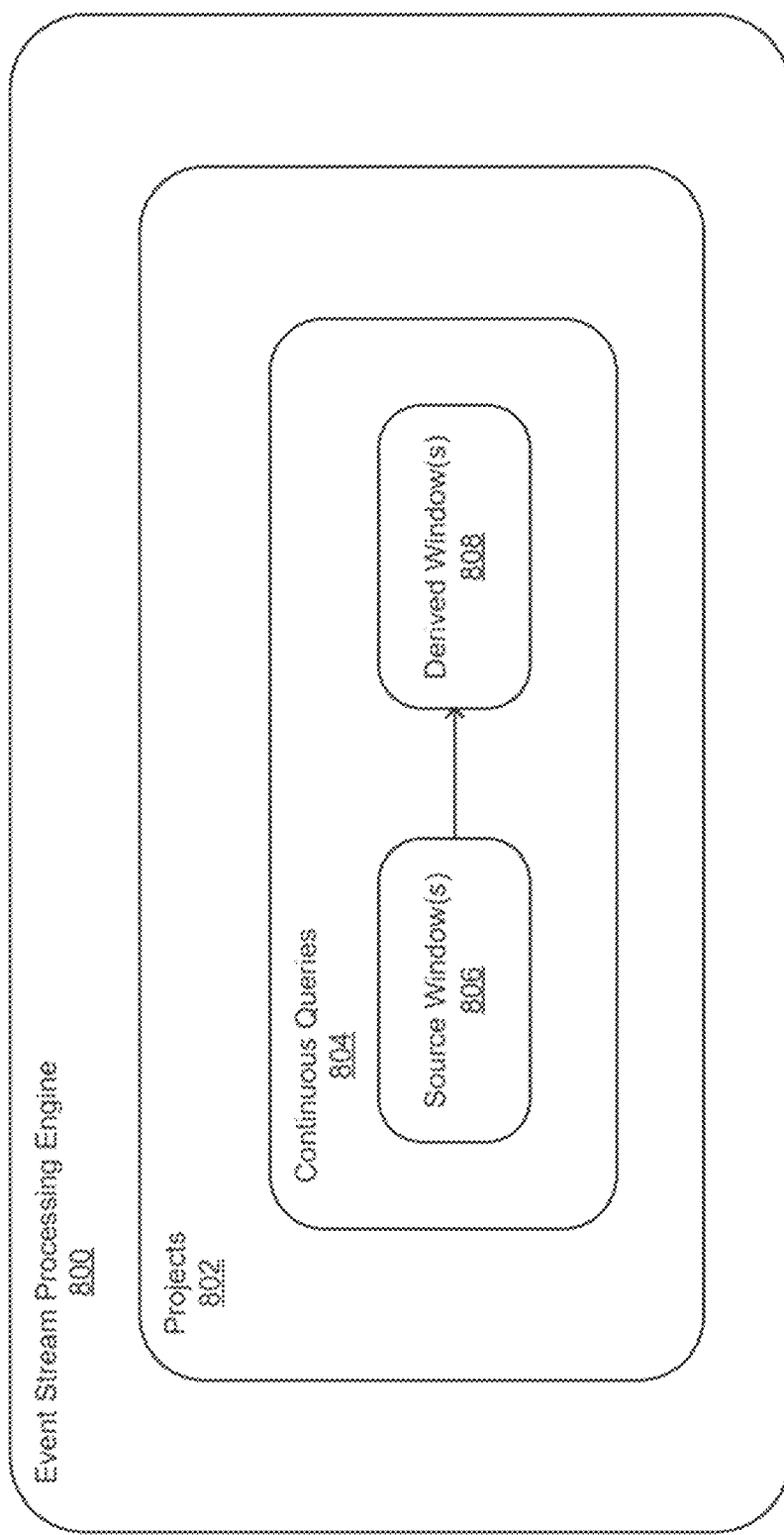
FIG. 8 illustrates a block diagram including components of an Event Stream Processing Engine (ESPE), according to embodiments of the present technology.
Figure 9:
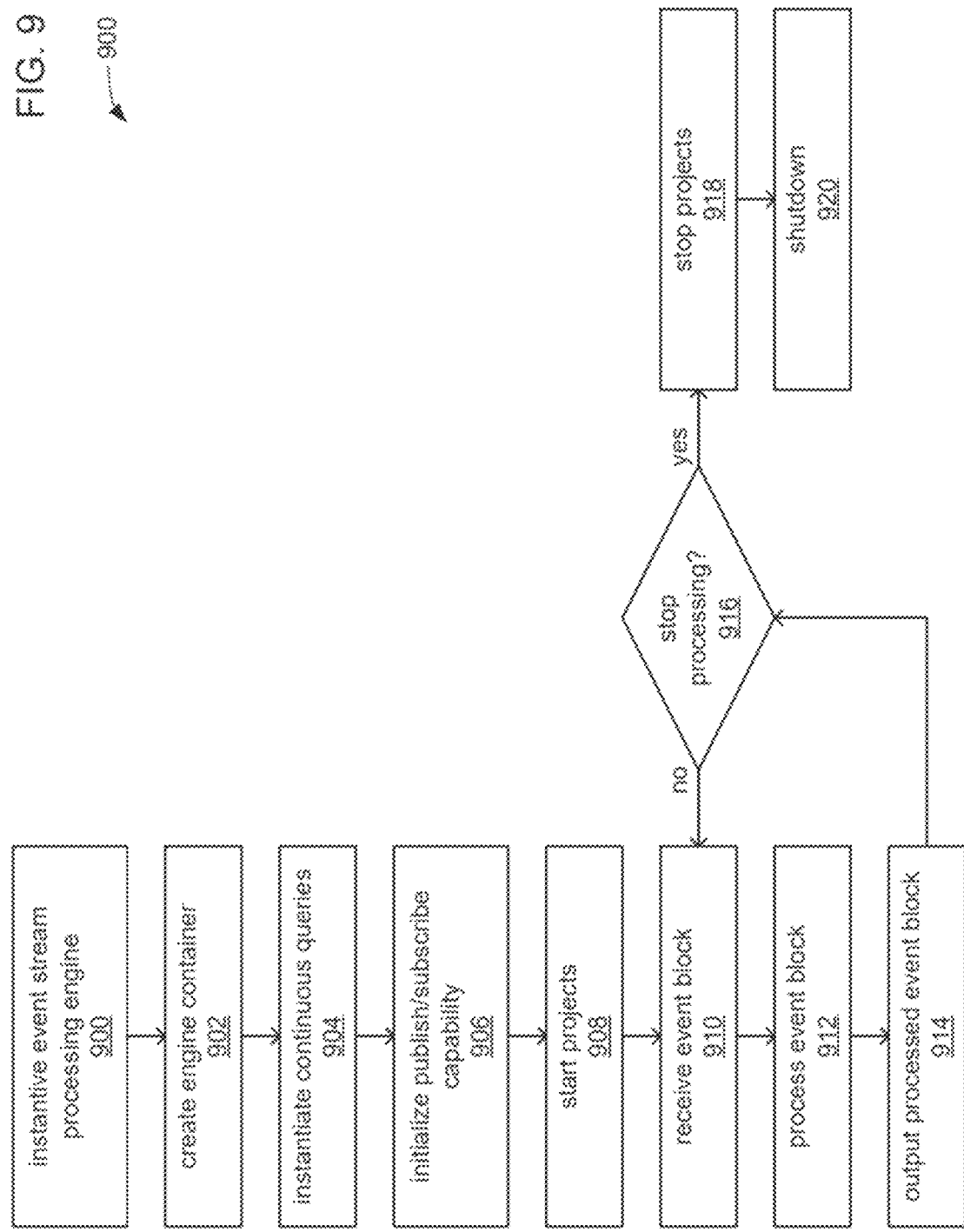
FIG. 9 illustrates a flow chart showing an example process including operations performed by an event stream processing engine, according to some embodiments of the present technology.
Figure 10:
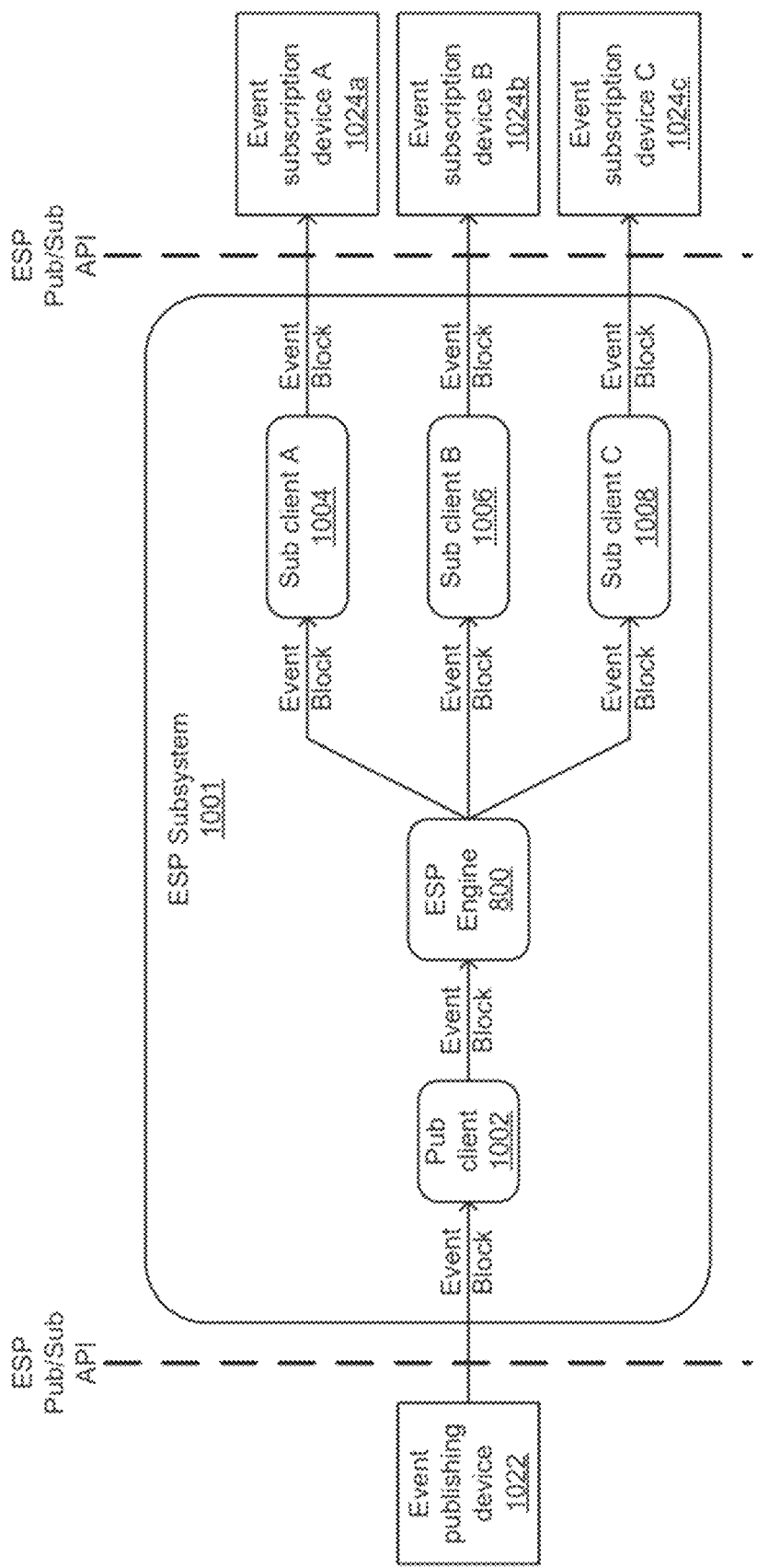
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables).

For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
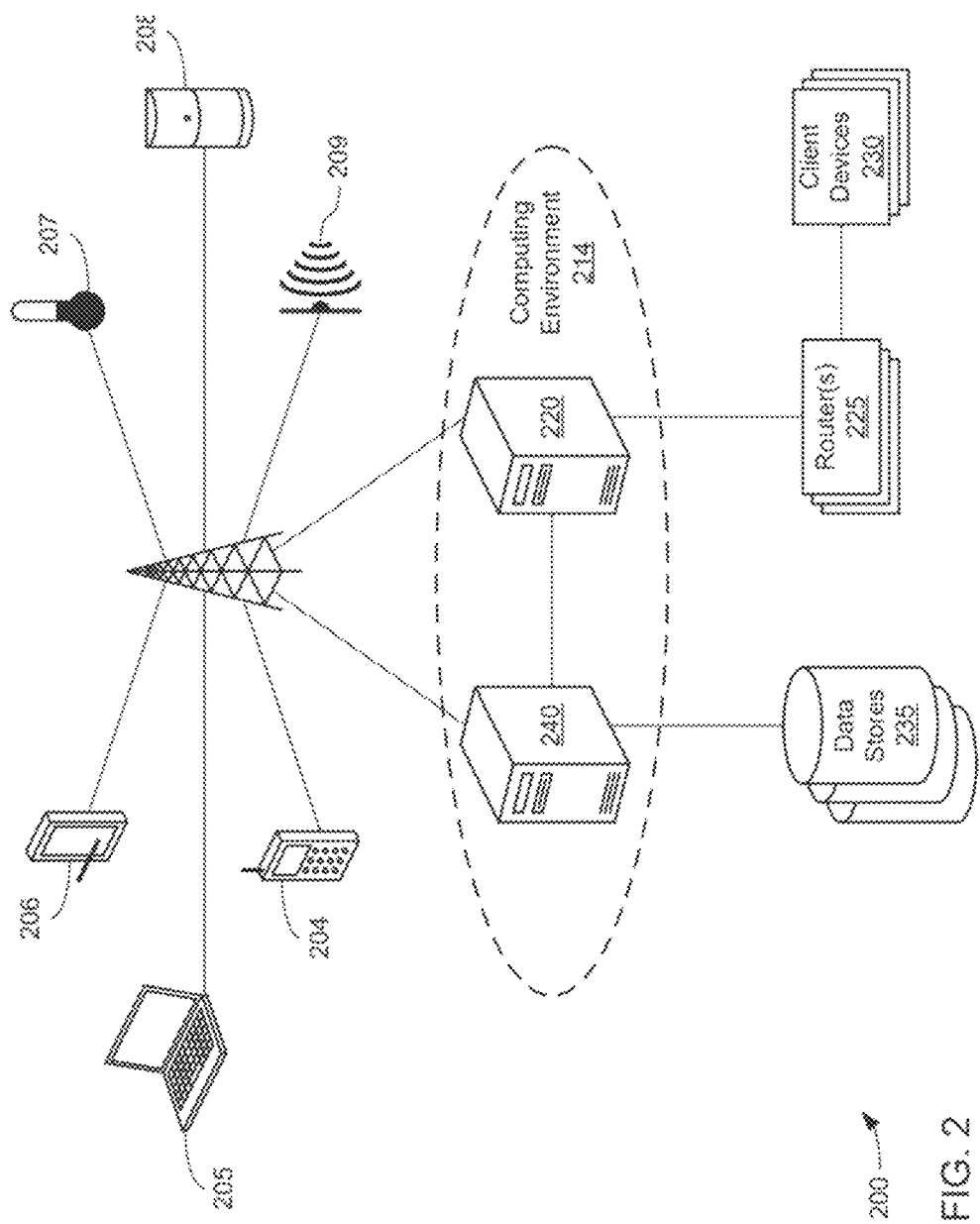
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
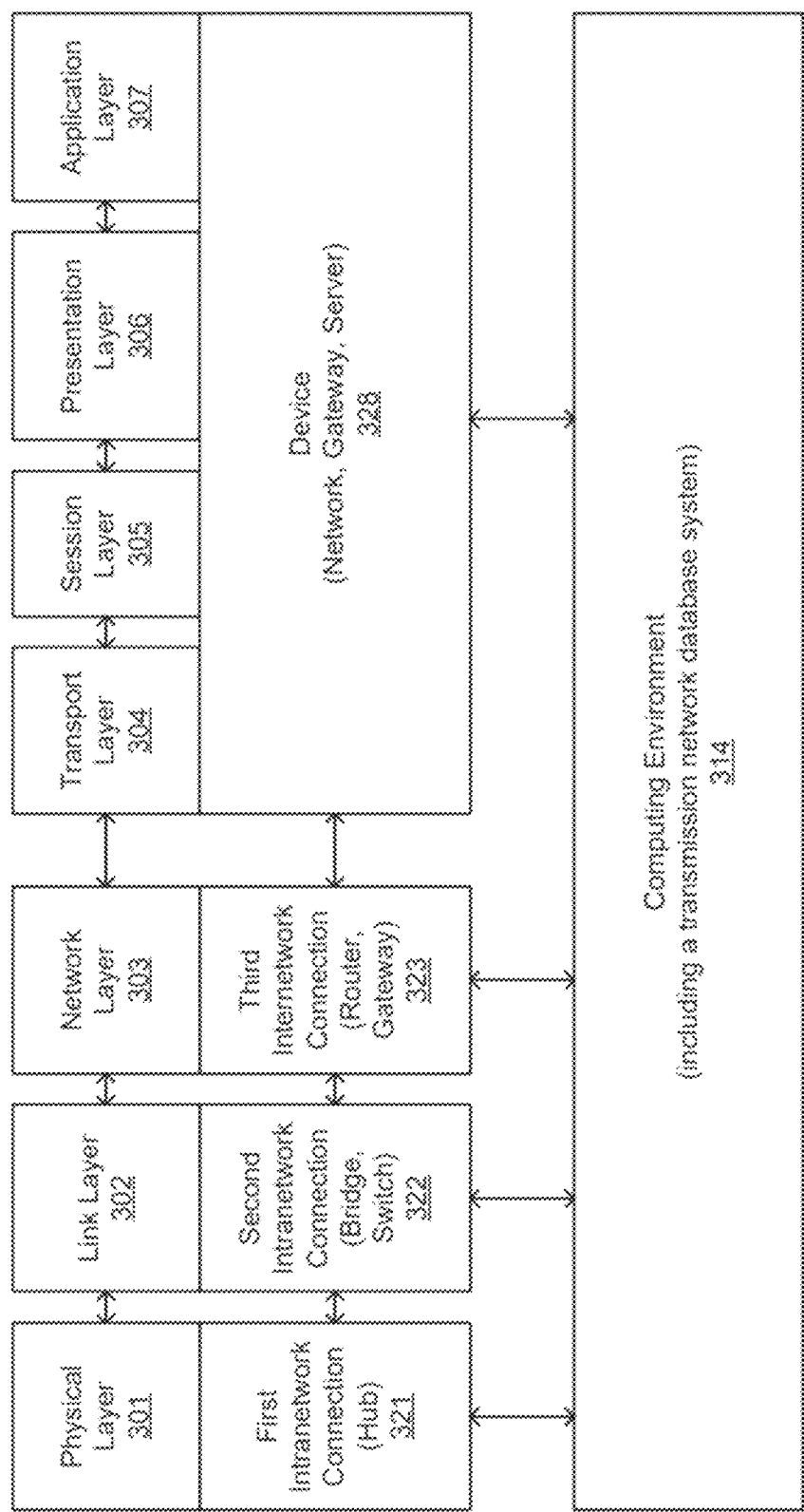
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
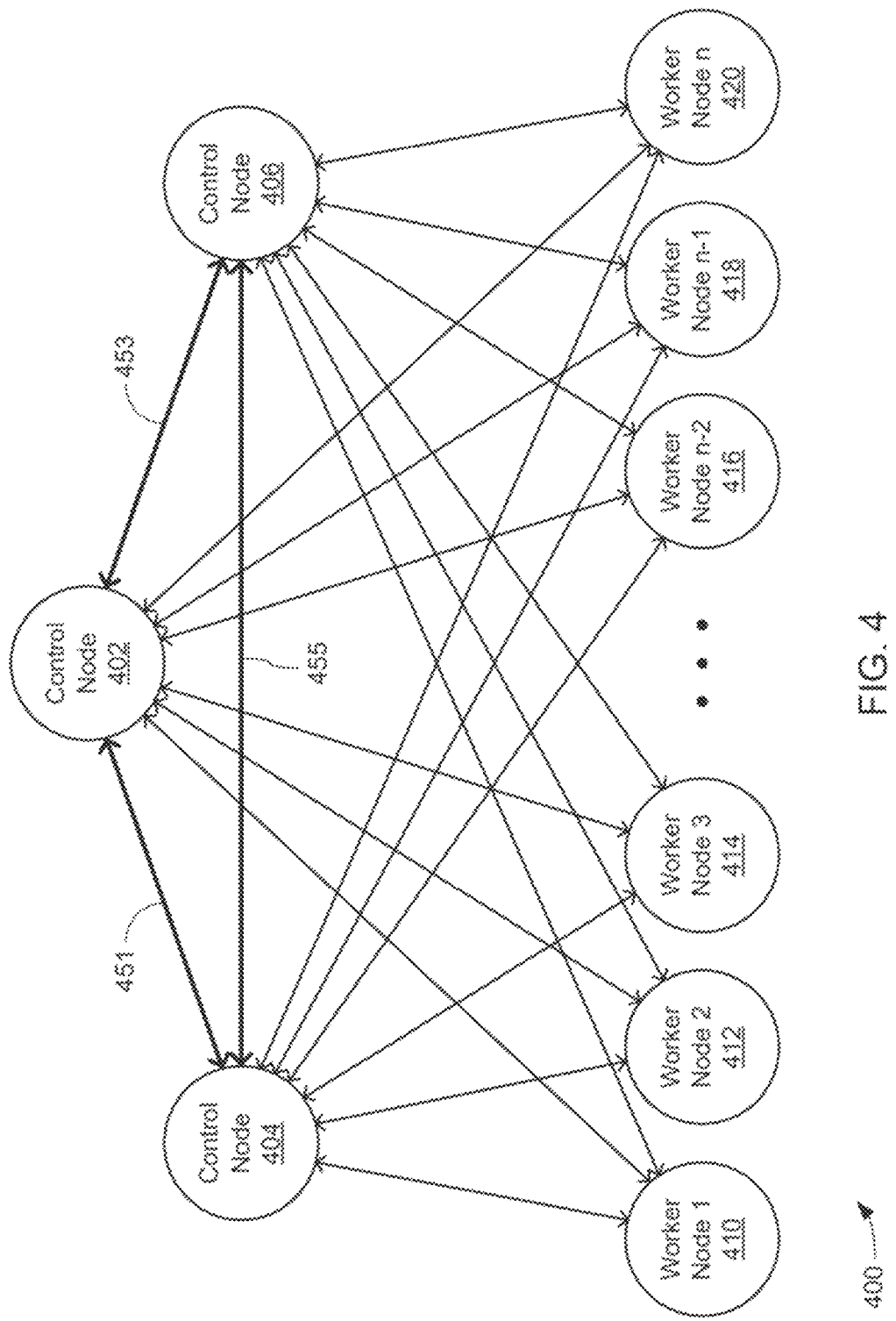
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
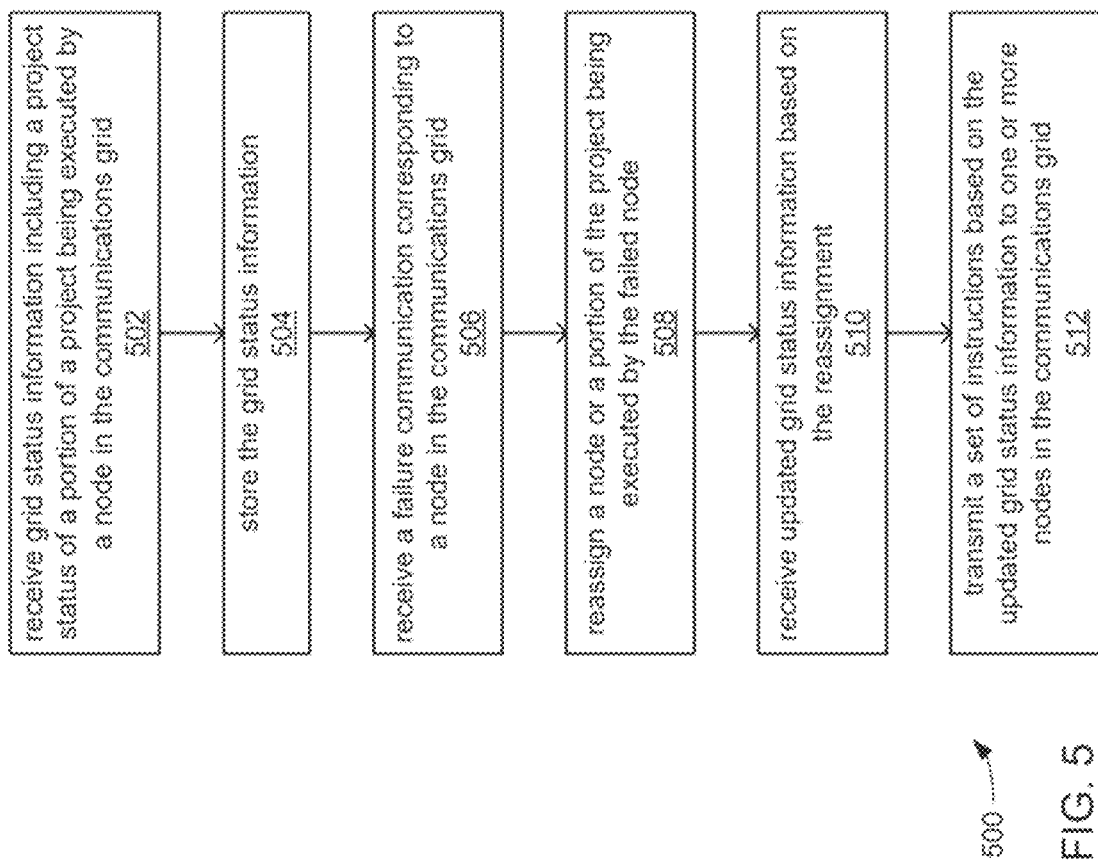
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
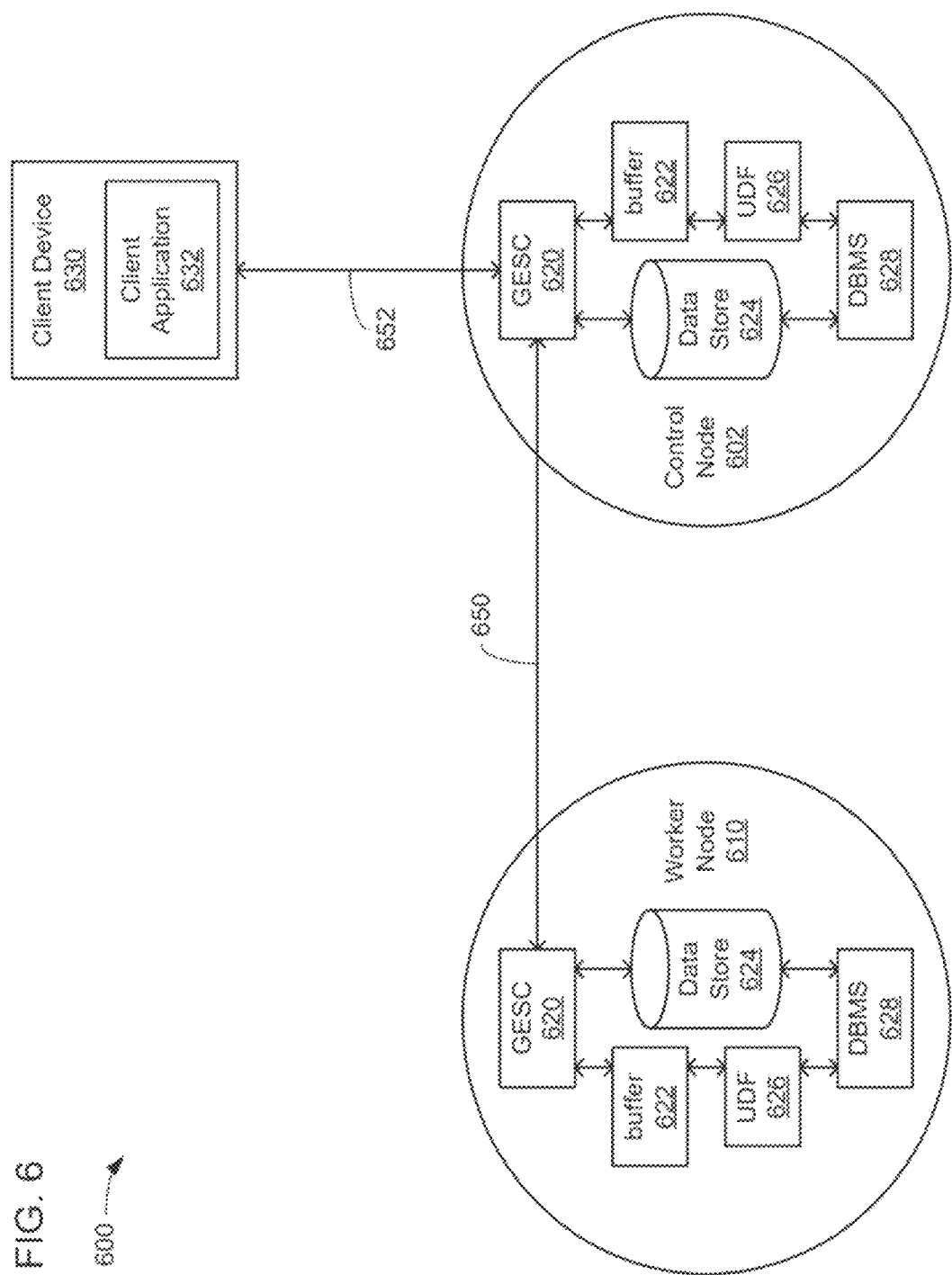
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
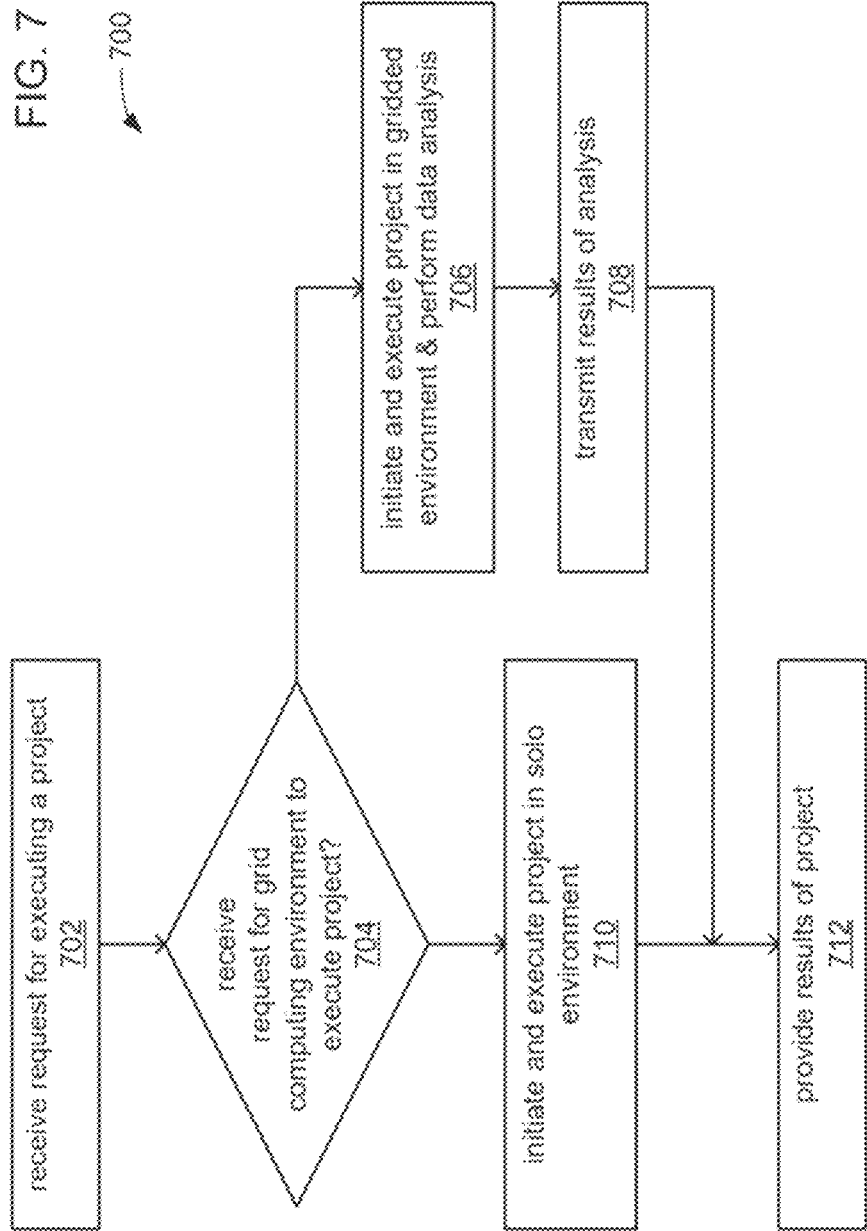
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
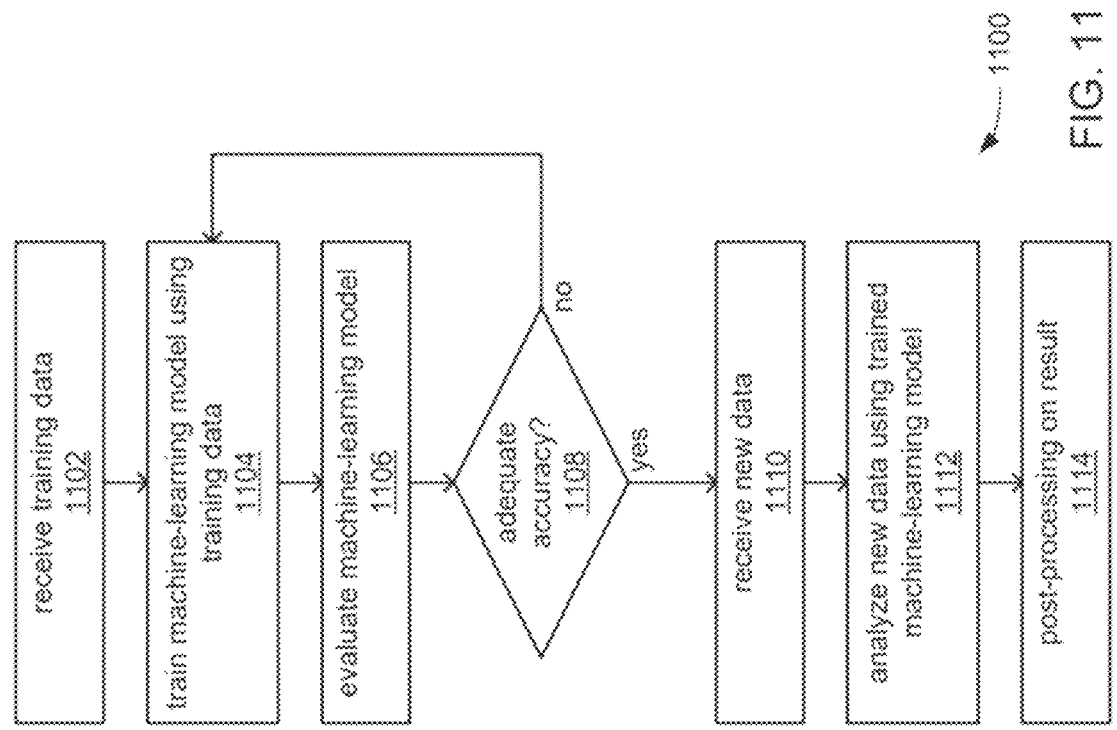
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
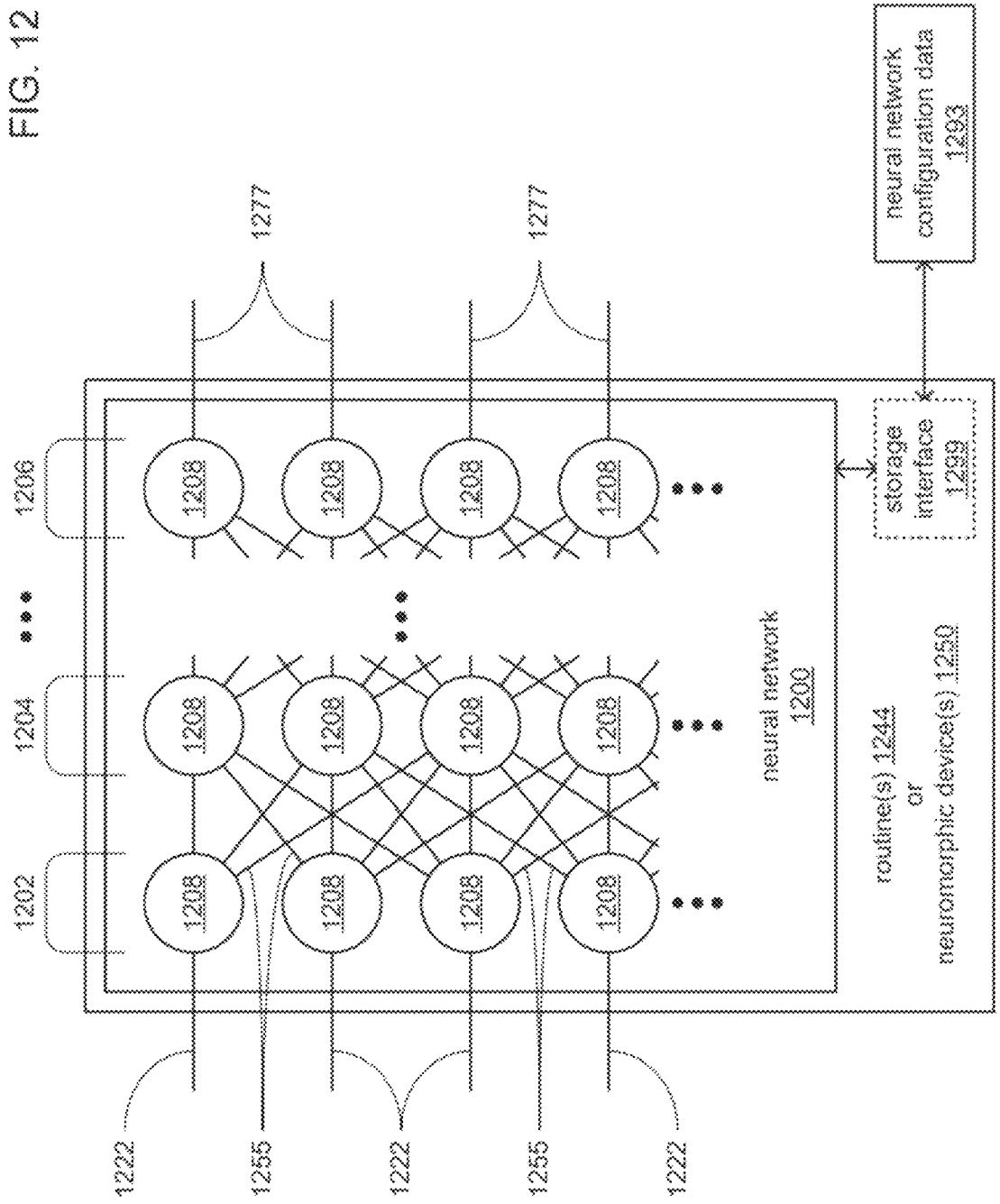
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
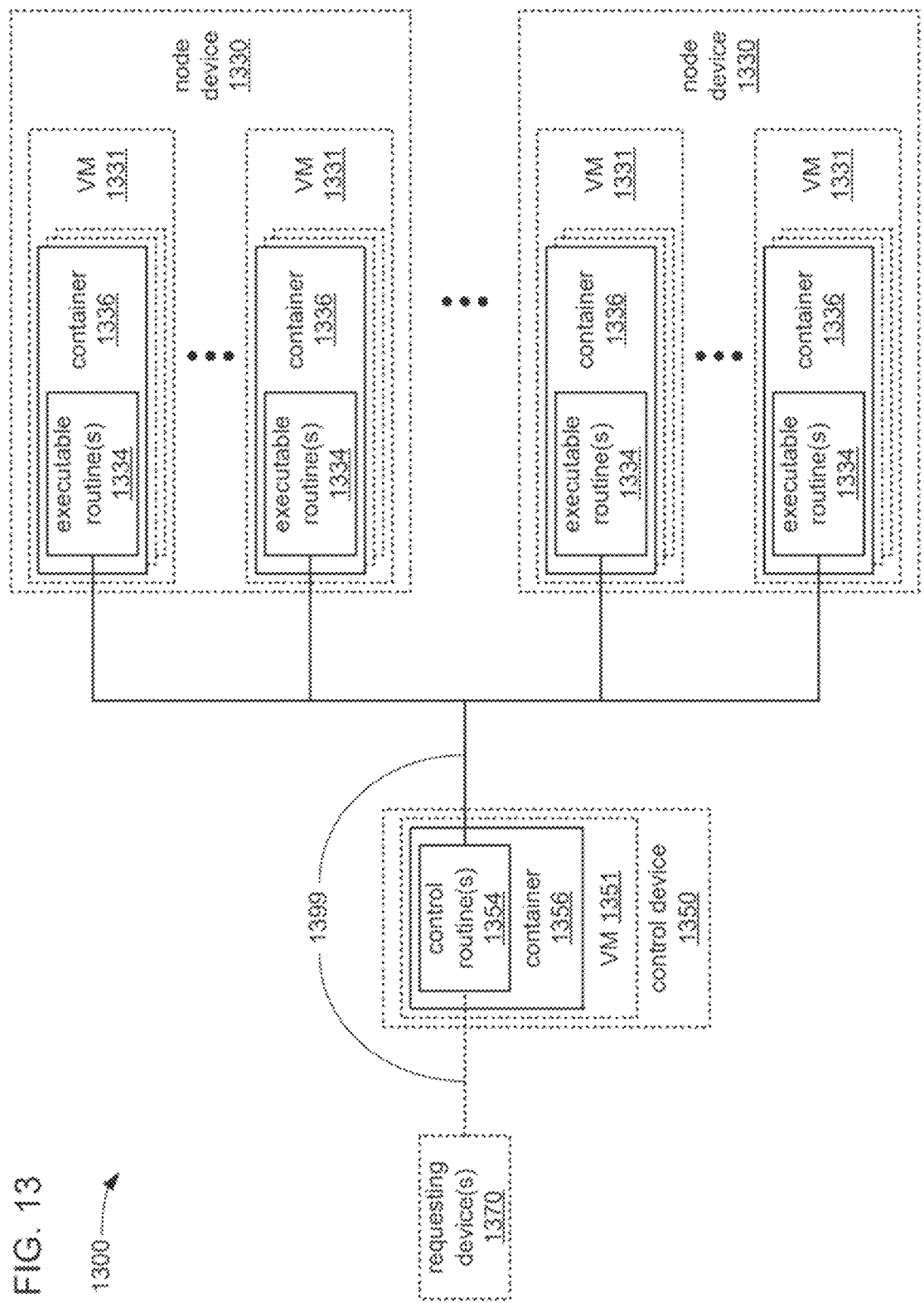
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to breaking symmetry in graphs. A graph includes nodes that are connected by edges. Graphs are used in a wide range of applications such as fraud and crime investigation (e.g., fraud ring detection, data breach detection, fake identity detection, gang and organized crime, etc.), contact tracing (e.g., tracking potential exposures, identifying "super-spreaders," identifying priority vaccine candidates, etc.), social networks (e.g., "you may know . . . " recommendations, detection of social groups, etc.), data management (e.g., finding inconsistent records, entity resolution, etc.), and mobile networking (e.g., cell tower handoffs, load balancing, peer-to-peer networks, etc.). Graphs find wide use in other applications as well. In some cases, graphs may be used to find patterns. For example, given a main graph, a query graph may be computed to identify potential solutions to a problem. The solution space may be represented by the main graph. By findings subgraphs of the main graph that match the query graph, the potential suitable solutions to the problems may be found.

Graphs in real-world examples are highly complex. They may have millions or billions of nodes and millions or billions of edges. Query graphs in real-world examples may also have millions or billions of nodes and edges. Finding the subgraphs from the main graph that match the query graph may produce millions of potential solutions, only some of which may be suitable. For example, if the query graph has symmetry, several duplicate subgraphs may be generated. These duplicate subgraphs may be undesirable and consume unnecessary computing resources and time. Thus, of the millions of potential solutions, only a couple hundred solutions may be relevant. The other supplicate solutions may be discarded. Thus, symmetry breaking in query graphs is highly desirable.

One mechanism in which symmetry in the query graph may be detected and broken may involve postprocessing the resulting subgraphs to remove duplicates. This strategy may involve manually (or using a computer) analyzing each generated subgraph to identify duplicates and then discarding the duplicates. In real-world examples, even if only hundreds of potential subgraphs are generated, post processing those subgraphs to remove duplicates may take a long time (e.g., multiple days or weeks). In the process, some non-duplicate results may be accidentally deleted as well. Thus, this brute force approach is not accurate (e.g., error-prone), highly inefficient and slow, and still requires expending extensive computing resources (e.g., large servers, supercomputers, etc.) and time to generate the subgraphs. Given the downsides of this approach, this mechanism is incapable of detecting and breaking symmetry in query graphs with high accuracy. This mechanism can also not be used for any graphs beyond very simple graphs (e.g., a few nodes and edges).

Another mechanism to detect and break symmetry in the query graph may include manually defining logic that breaks the symmetry in the query graph and adding that logic to the query graph as a filter logic. This mechanism is unsuitable for a vast majority of real-world cases as well. For all but the simplest queries, manually writing logic for breaking symmetry is difficult. It would require a highly trained graph-theory expert to study the query graph, detect that the query graph has symmetry (e.g., manually or using an automorphism detecting tool), and then write code for breaking that symmetry. Writing code may entail making a best guess of how symmetry may be broken, testing the written code to check if symmetry was broken, tweaking the best guess code with another best guess code, retesting, and repeating the process until symmetry is broken in the query graph. Any time the query graph is tweaked, a new logic for breaking symmetry needs to be defined. This manual process is also error-prone, leading to undetected errors and false negatives. This mechanism is also very slow (and may require multiple days to write the logic depending on the size of the query graph). Thus, this process also lacks accuracy and is highly inefficient.

Therefore, current mechanisms of detecting and breaking symmetry in query graphs are inadequate. Further, the conventional techniques are incapable of handling all types of graphs. For example, the conventional techniques are unable to handle self-loops, directed edges, node attributes, edge attributes, multiple edges, filter logic, etc. Thus, the conventional techniques work best for very simple topology-based (e.g., no attributes) graphs only. Accordingly, the current approaches to break symmetry in query graphs have technical problems such as inability to handle all types of graphs and attributes, requiring significant computing resources, being too slow to break symmetry, and often inaccurate.

The present disclosure provides technical solutions to these technical problems above. For example, the present disclosure provides an automatic, highly accurate (e.g., 100% accurate or close), and efficient mechanism for detecting and breaking symmetry in query graphs. The proposed approach also does not require extensive computing resources, may be executed on commodity hardware (e.g., personal laptops, desktops, etc.), and may be executed in real-time (or substantial real-time) because the proposed approach may be executed very fast (e.g., an order of seconds).

The proposed approach leverages automatically generated symmetry breaking logic to detect and break symmetry. The proposed approach may be used for all types of graphs including multigraphs, all types of attributes (e.g., edge, node, multiple edges, filter logic), self-loops, directed edges, exact, inexact, or user-defined matching conditions, etc. Thus, the present disclosure provides practical applications (e.g., technical improvements) that are rooted in technology by performing pattern matching processes that are highly accurate (e.g., 100% accurate or close), while consuming significantly fewer computing resources (e.g., commodity hardware as opposed to large servers and supercomputers), and producing results much faster (e.g., order of seconds compared to days of the conventional techniques).

The proposed approach first converts a query graph into a transformed query graph. This transformation process identifies and accounts for various types of attributes that may be found in the query graph. Using the transformed query graph, a symmetry breaking expression is generated automatically. That symmetry breaking expression is then used to find subgraphs from the main graph that match the symmetry breaking expression. The resulting subgraphs do not include undesirable duplicates. The proposed approach cannot be practically performed in the human mind. Nor, as discussed above, can it be practically performed using pen and paper. As mentioned above, real-world applications have query graphs with millions and billions of nodes and edges. Thus, query graphs may be said to have an exponential complexity. As illustrated with very simple examples in FIGS. 37-40, even simple query graphs may require significant computing resources and time to break symmetry using conventional techniques.

A human mind is incapable of automatically and in real-time (or substantial real-time) breaking symmetry in such query graphs in a matter of seconds, while producing accurate (e.g., 100% accurate or close) results as the proposed approach is able to do. In other words, breaking symmetry in query graphs of real-world applications cannot be performed practically in the human mind or by using pen and paper. In particular, the concepts of the present disclosure are not directed to any observations, evaluations, judgments, or opinions that a human mind can practically perform. A human mind is not equipped to automatically, accurately (e.g., 100% accurate or close), and in real-time (or substantial real-time) break symmetry in a query graph by converting the query graph into a transformed query graph and generating a symmetry breaking expression from the transformed query graph such that subgraphs matching the query graph found from a main graph do not have unnecessary duplicates. Further, unlike the conventional mechanisms, the present disclosure is easily and efficiently able to handle node attributes, edge attributes, filter logic, self-loops, and both directed and non-directed query graphs to automatically, accurately (e.g., 100% accurate or close), and in real-time (or substantial real-time) break symmetry the query graph.

Further, the present disclosure does not recite a mathematical concept, but is rather based on or involves mathematical concepts. In other words, the present disclosure is not directed to mathematical relationships, any specific mathematical formulas or equations, or any particular mathematical calculations. Rather, the present disclosure is directed to systems and methods that use graphical representations in a non-conventional manner for solving queries or tasks by breaking symmetry in query graphs and identifying accurate solutions or patterns from a main graph, such that the solutions do not include unnecessary duplicates.

Thus, the present disclosure provides technical solutions and practical applications to technical problems. In particular, the present disclosure improves the functioning of a computer by consuming fewer computing resources and by automatically breaking symmetry faster (e.g., in real-time or substantial real-time) than the conventional approaches. The present disclosure is directed to providing a particular solution (e.g., for breaking symmetry) to a particular problem (e.g., breaking symmetry in query graphs) to achieve a desired outcome (e.g., finding subgraphs in which unnecessary duplicates are not present). The present disclosure provides a specific mechanism of automating breaking of symmetry in query graphs that previously could not be automated.

Figure 14:
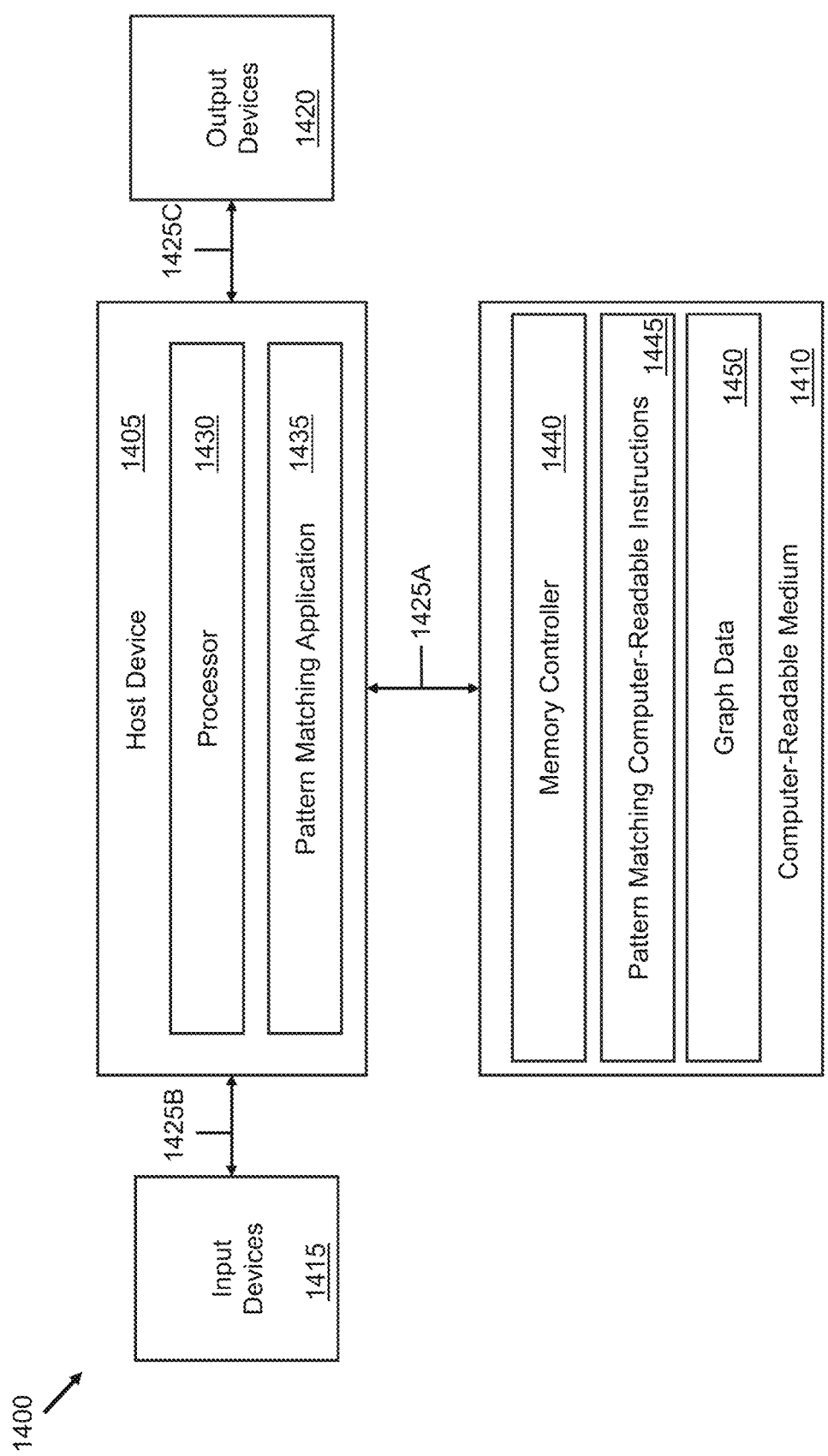
FIG. 14 illustrates a block diagram of an example pattern matching system, according to embodiments of the present technology.

Turning now to FIG. 14, a block diagram of an example pattern matching system 1400 is shown, in accordance with some embodiments of the present disclosure. The pattern matching system 1400 may be part of, or otherwise associated with, the computing environment 114. The pattern matching system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The pattern matching system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the pattern matching system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the pattern matching system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a pattern matching application 1435. The pattern matching application 1435 may be used to find patterns of a query graph in a main graph.

The pattern matching application 1435 may be executed by the processor 1430. The instructions to execute the pattern matching application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the pattern matching system 1400 and operatively associated with the computer-readable medium 1410. The memory controller 1440 may be configured as a logical block or circuitry that receives instructions from the host device 1405 and performs operations in accordance with those instructions. For example, to execute the pattern matching application 1435, the host device 1405 may send a request to the memory controller 1440. The memory controller 1440 may read the instructions associated with the pattern matching application 1435. For example, the memory controller 1440 may read pattern matching computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store graph data 1450. The graph data 1450 may include data associated with one or more main graphs, one or more query graphs, and any additional queries or filter logic associated with the one or more query graphs.

It is to be understood that only some components of the pattern matching system 1400 are shown and described in FIG. 14. However, the pattern matching system 1400 may include other components such as various batteries and power sources, networking interfaces, routers, switches, external memory systems, controllers, etc. Generally speaking, the pattern matching system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
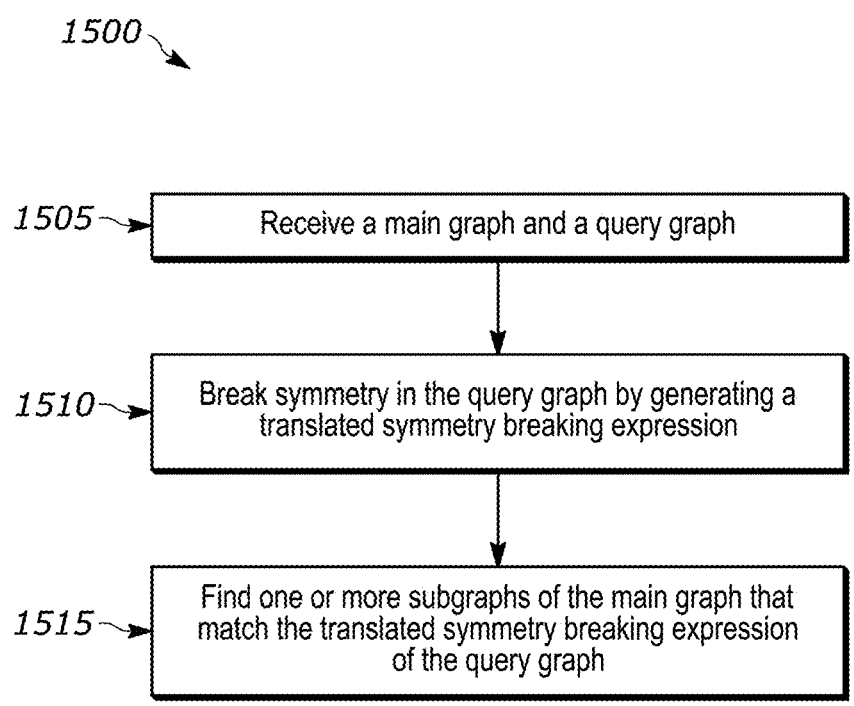
FIG. 15 illustrates a flowchart showing an example process for performing pattern matching in the pattern matching system of FIG. 14, according to embodiments of the present technology.

Referring to FIG. 15, an example flowchart outlining operations of a process 1500 is shown, in accordance with some embodiments of the present disclosure. The process 1500 may be used to perform pattern matching by the pattern matching application 1435. In particular, the process 1500 may be used to find one or more subgraphs of a main graph that match a query graph. The process 1500 may be executed by one or more processors (e.g., the processor 1430) associated with the pattern matching application 1435. The process 1500 may include other or additional operations depending upon the particular embodiment.

At operation 1505, the processor receives a main graph G and a query graph Q. In particular, the processor may receive the graph data 1450 associated with the main graph and the query graph. In some embodiments, the processor may receive identification of nodes of the main graph and the query graph and how those nodes are connected to each other. For example, in some embodiments, the processor may receive metadata that identifies the features of the main graph and the query graph. For example, in some embodiments, the processor may receive a nodes and edges table as part of the metadata. In some embodiments, the processor may receive a single nodes and edges table that includes information for both the main graph and the query graph. In other embodiments, the processor may receive separate nodes and edges tables for the main graph and the query graph. In some embodiments, the processor may receive a single nodes and edges table for both the nodes and the edges, while in some embodiments, the processor may receive a node table for the nodes and an edge table for the edges. Each of the nodes and edges table may include a plurality of rows and a plurality of columns. Each of the plurality of rows may correspond to one node in the graph (whether main or query) or an edge of the graph. Each column may correspond to a node attribute or an edge attribute. In some embodiments, for each row associated with an edge, a column may also identify the nodes between which that edge is provided. In some embodiments, the processor may receive the information related to the main graph and the query graph in other ways.

Figure 16A:
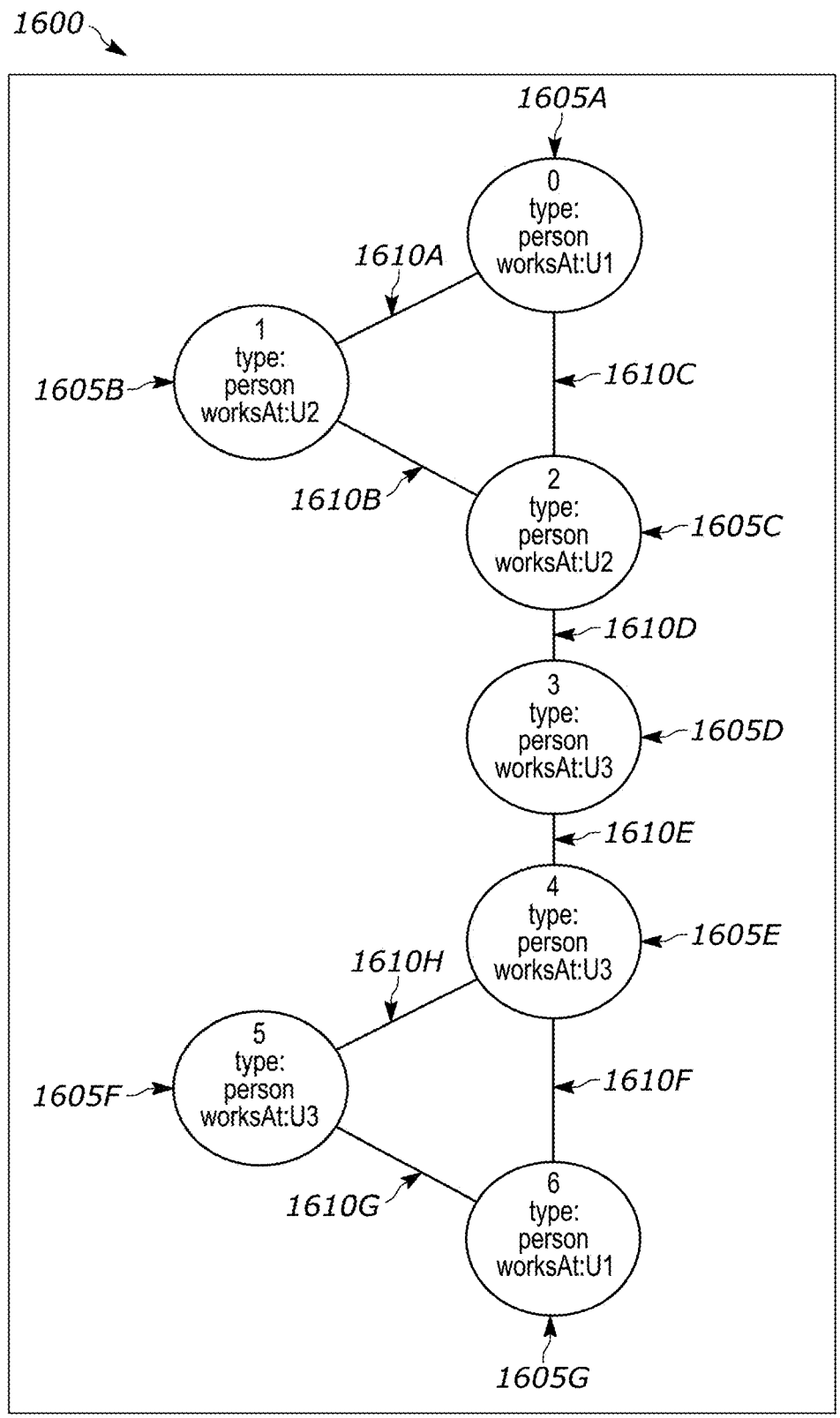
FIG. 16A illustrates an example main graph, according to embodiments of the present technology.
Figure 16B:
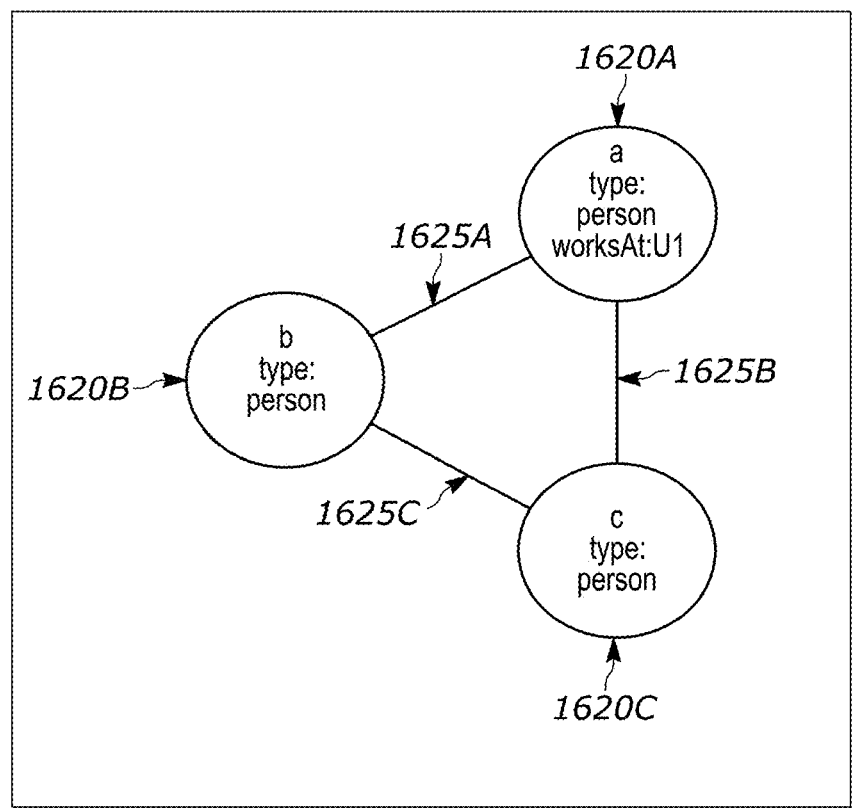
FIG. 16B illustrates an example query graph, according to embodiments of the present technology.

Upon receiving the information related to the main graph and the query graph, the processor may convert the information into a graphical format of the main graph and the query graph. An example of a main graph is shown in FIG. 16A and an example of a query graph is shown in FIG. 16B. In some embodiments, instead of receiving the query graph, the processor may receive the query written in natural language. The processor may convert the natural language query into a query graph. In some embodiments, the processor may receive additional or other information associated with the main graph and the query graph. For example, in some embodiments, the processor may receive an additional query (e.g., filter logic) that may be associated with the query graph.

Referring to FIG. 16A in conjunction with FIG. 15, an example main graph 1600 includes a plurality of nodes (also referred to as vertices) and a plurality of edges. For example, the main graph 1600 includes nodes 1605A-1605G and edges 1610A-1610H. It is to be understood that the main graph 1600 is a highly simplified example to explain and illustrate the operations herein. None of the examples used herein are intended to limit the disclosure in any way. Generally speaking, in real-world applications, the main graph 1600 may include millions or billions of nodes and millions or billions of edges. In some embodiments, each of the nodes 1605A-1605G may represent an entity (e.g., person, location, product, object, name, etc.) while each of the edges 1610A-1610H may represent a relationship or dependency between the nodes that are connected by that edge. Although the main graph 1600 shows seven nodes and eight edges, in other embodiments, the main graph may include any number of nodes and any number of edges.

The main graph 1600 shows an example in which each of the nodes 1605A-1605G represents a person who works at a particular university, and each of the edges 1610A-1610H represents coauthor relationship between the people. For example, the node 1605A (Node 0) represents a person who works at university U1, the node 1605B (Node 1) represents a person who works at university U2, the node 1605C (Node 2) represents a person who works at university U2, the node 1605D (Node 3) represents a person who works at university U3, the node 1605E (Node 4) represents a person who works at university U3, the node 1605F (Node 5) represents a person who works at university U3, and the node 1605G (Node 6) represents a person who works at university U1. Each person who works at a particular university represented by one of the nodes 1605A-1605G may be considered a node attribute. For example, the person who works at university U1 may be a node attribute, the person who works at university U2 may be another node attribute, and the person who works at university U3 may be another node attribute.

Thus, the main graph 1600 may be said to include three node attributes. In other embodiments, one or more nodes of the main graph 1600 may include additional or other node attributes. A node attribute may refer to one or more properties or characteristics associated with the entity (e.g., persons, places, objects, etc.) representing the nodes of a graph. Each of the nodes 1605A-1605G may also have a label associated therewith. For example, the node 1605A may have a label 0 (e.g., Node 0), the node 1605B may have a label 1 (e.g., Node 1), and so on. Although numeric labels are shown, in other embodiments, non-numeric labels (e.g., alphabetical, alphanumerical, color, etc.) may be used.

The edge 1610A indicates that the person of the node 1605A and the person of the node 1605B are coauthors, the edge 1610B indicates that the person of the node 1605B and the person of the node 1605C are coauthors, the edge 1610C indicates that the person of the node 1605A and the person of the node 1605C are coauthors, the edge 1610D indicates that the person of the node 1605C and the person of the node 1605D are coauthors, the edge 1610E indicates that the person of the node 1605D and the person of the node 1605E are coauthors, the edge 1610F indicates that the person of the node 1605E and the person of the node 1605G are coauthors, the edge 1610G indicates that the person of the node 1605F and the person of the node 1605G are coauthors, and the edge 1610H indicates that the person of the node 1605F and the person of the node 1605E are coauthors. Although not shown, each of the edges 1610A-1610H may include zero or more edge attributes. Further, although not shown, the main graph 1600 may include multiple edges between a pair of nodes (and each of the multiple edges may include zero or more edge attributes). For example, if an edge attribute is a year of co-authorship, a first edge may exist between the node 1605A and 1605B to show co-authorship in Year 1 and a second edge may exist between those nodes to show co-authorship in Year 2. An edge attribute may refer to a property or characteristic associated with the edge connecting a pair of nodes. In some embodiments, an edge attribute may be indicated by an arrow (e.g., the edge may have a direction). In other embodiments, the edge attribute may take other forms.

The main graph 1600 may be a property graph. Thus, each of the nodes 1605A-1605G and each of the edges 1610A-1610H may include one or more attributes. As discussed above, these attributes may be node attributes and/or edge attributes. In some embodiments, multiple edges may also be considered an attribute. The attributes may be numeric (e.g., weight, distance, amount, atomic number, etc.), categorical or string (e.g., transaction type, person, place, thing, etc.), and/or other types of arbitrary attributes (e.g., single bond or double bond in molecules, color, whether an atom carries a charge, etc.). Although not shown, the main graph 1600 may include directed edges and/or self-loops. The main graph 1600 may also include multiple edges between two nodes. In some embodiments, the main graph 1600 may be a directed acyclic graph (DAG). In other embodiments, the main graph 1600 may be other types of graphs.

Referring to FIG. 16B in conjunction with FIG. 15, an example query graph 1615 is shown, in accordance with some embodiments of the present disclosure. The query graph 1615 may be smaller than or same as the main graph 1600. Like the main graph 1600, the query graph 1615 may also be a property graph. The query graph 1615 is designed to identify groups of three coauthors in the main graph 1600 such that one of them works at university U1 and the other two coauthors work together at another university (e.g., university U2 or U3). Thus, the query graph includes three nodes: a node 1620A (Node a) for a person who works at university U1, a node 1620B (Node b) for a person who works at a university other than U1, and a node 1620C (Node c) for a person who also works at a university other than U1. The three nodes 1620A-1620C are connected by edges 1625A-1625C.

Although the query graph 1615 includes three nodes and three edges, in other embodiments the query graph may include another number of nodes and another number of edges. Further, although not shown, the query graph 1615 may include self-loops, multiple edges between pairs of nodes, and/or directed edges. In some embodiments, the query graph 1615 may be a DAG or another type of graph. The query graph 1615 may also include node attributes and/or edge attributes. For example, the query graph 1615 includes two node attributes: person who works at university U1 of the node 1620A and person who works at university other than U1 (for the nodes 1620B, 1620C). In some embodiments, the number of edges between a pair of nodes in the query graph 1615 may be different than the number of edges between the pair of nodes in the main graph 1600. Thus, the main graph 1600 and the query graph 1615 may have different multiplicity. In some embodiments, the main graph 1600 may have a bigger multiplicity (e.g., a greater number of edges between a pair of nodes) than the query graph 1615.

Although the query graph 1615 does not show any edge attributes, in other embodiments, the query graph may include one or more edge attributes. Additionally, each of the nodes 1620A-1620C of the query graph 1615 may have a label. For example, the node 1620A may have a label a (e.g., Node a), the node 1620B may have a label b (e.g., Node b), and the node 1620C may have a label c (e.g., Node c). In other embodiments, other types of labels may be used. Further, in some embodiments, the query graph 1615 and the main graph 1600 may have the same format of labels (e.g., both numeric, both alphabetical, etc.). In other embodiments and as shown, the query graph 1615 and the main graph 1600 may have different format of labels. Further, it is to be understood that the query graph 1615 is only an example (e.g., a highly simplified example) and is not intended to limit the disclosure in any way.

In some embodiments, the query graph 1615 may be associated with an additional query, also referred to herein as filter logic. The additional query may be used to filter out matches that do not satisfy the additional query. Thus, appropriate matches from the main graph 1600 would be ones that satisfy both the query graph 1615 and the additional query. An example of an additional query may be:

$$a.\text{worksAt}! = c.\text{worksAt} \text{ AND } b.\text{worksAt} = c.\text{worksAt} \text{ AND } a.\text{worksAt}! = b.\text{worksAt} \quad \text{Equation 1}$$

The above additional query states that the university at which the person of Node a works is not the same as the university at which the person of Node c works at and the university at which the person of Node b works is the same as the university at which the person of Node c works at and the university at which the person of Node a works is not the same as the university at which the person of Node b works. In other words, the additional query indicates that the university at which the person of Node a works is different from the universities at which the persons of Nodes c and b work at. The additional query also indicates that the people of Nodes b and c work at the same university.

It is to be understood that Equation 1 is only an example and not intended to limit the scope of the disclosure in any way. In some embodiments, the additional query may assume other formats and include other operands, operators (including for example arithmetic operators, Boolean operators, etc.), constants, and/or variables. In some embodiments, the additional query may also be considered an attribute. Further, in some embodiments, multiple additional queries may be provided for the query graph 1615.

Returning back to FIG. 15, at operation 1510, the processor breaks the symmetry in the query graph 1615 by generating a translated symmetry breaking expression. The query graph 1615 includes symmetry. In other words, the query graph 1615 exhibits automorphism, that is, the nodes of the query graph may be relabeled and yet maintain the edge-node connectivity of the query graph. For example, the nodes of the query graph 1615 may be reflected or rotated or otherwise transformed about an axis to essentially generate the same query graph. Generally speaking, an automorphism of a query graph G=(V, E) is a permutation σ of the vertex set V and edge set E, such that the pair of vertices (u, v) form an edge if and only if the pair (σ(u), σ(v)) also form an edge. Symmetry in the query graph 1615 may result in undesirable duplicate matches. For example, because of symmetry in the query graph 1615, the following four matches (e.g., subgraphs of the main graph 1600 that match the query graph 1615 and Equation 1) may be output:

Match 1: {'a': 0, 'b': 1, 'c': 2}
Match 2: {'a': 0, 'b': 2, 'c': 1}
Match 3: {'a': 6, 'b': 4, 'c': 5}
Match 4: {'a': 6, 'b': 5, 'c': 4}

Match 1 indicates that Node a of the query graph 1615 is mapped to Node 0 of the main graph 1600, Node b of the query graph is mapped to Node 1 of the main graph, and Node c of the query graph is mapped to Node 2 of the main graph. Match 2 indicates that Node a of the query graph 1615 is mapped to Node 0 of the main graph 1600, Node b of the query graph is mapped to Node 2 of the main graph, and Node c of the query graph is mapped to Node 1 of the main graph. Match 3 indicates that Node a of the query graph 1615 is mapped to Node 6 of the main graph 1600, Node b of the query graph is mapped to Node 4 of the main graph, and Node c of the query graph is mapped to Node 5 of the main graph. Match 4 indicates that Node a of the query graph 1615 is mapped to Node 6 of the main graph 1600, Node b of the query graph is mapped to Node 5 of the main graph, and Node c of the query graph is mapped to Node 4 of the main graph.

As seen from the four matches, Match 1 and Match 2 are duplicates and Match 3 and Match 4 are duplicates. Thus, only one of Match 1 or Match 2 may be desirable. Similarly, only one of Match 3 or Match 4 may be desirable. The undesirable pair of matches may be discarded. However, unnecessary computational resources and time are expended in generating those undesirable matches.

However, after breaking symmetry in the query graph 1615, only Match 1 and Match 3 are found. Thus, Match 2 and Match 4 need not be generated. As discussed in greater detail below, symmetry in the query graph 1615 may be broken by generating a translated symmetry breaking expression for the query graph. The translated symmetry breaking expression considers any additional query associated with the query graph 1615. Thus, the translated symmetry breaking expression is representative of both the query graph 1615 and the additional query (e.g., Equation 1). The translated symmetry breaking expression is then used at operation 1515. In particular, at the operation 1515, the processor finds one or more subgraphs (e.g., the Match 1 and Match 3 above) from the main graph 1600 that satisfy or match the translated symmetry breaking expression of the query graph 1615. Thus, the output of the process 1500 after breaking symmetry may be the Match 1 and Match 3 for the query graph 1615. The one or more subgraphs may represent the solution to the query represented by the query graph of the operation 1505. In some embodiments, the processor may convert each of the one or more subgraphs back into the same format in which the query was initially received (e.g., tabular form) to generate a final output. In some embodiments, the processor may convert each of the one or more subgraphs into a natural language form or other suitable format to generate the final output. The processor may output the final output to the user. In some embodiments, the processor may also output the one or more subgraphs. Thus, the process 1500 may be used to represent problems in graphical form and generate solutions to queries using the graphical form.

Figure 17:
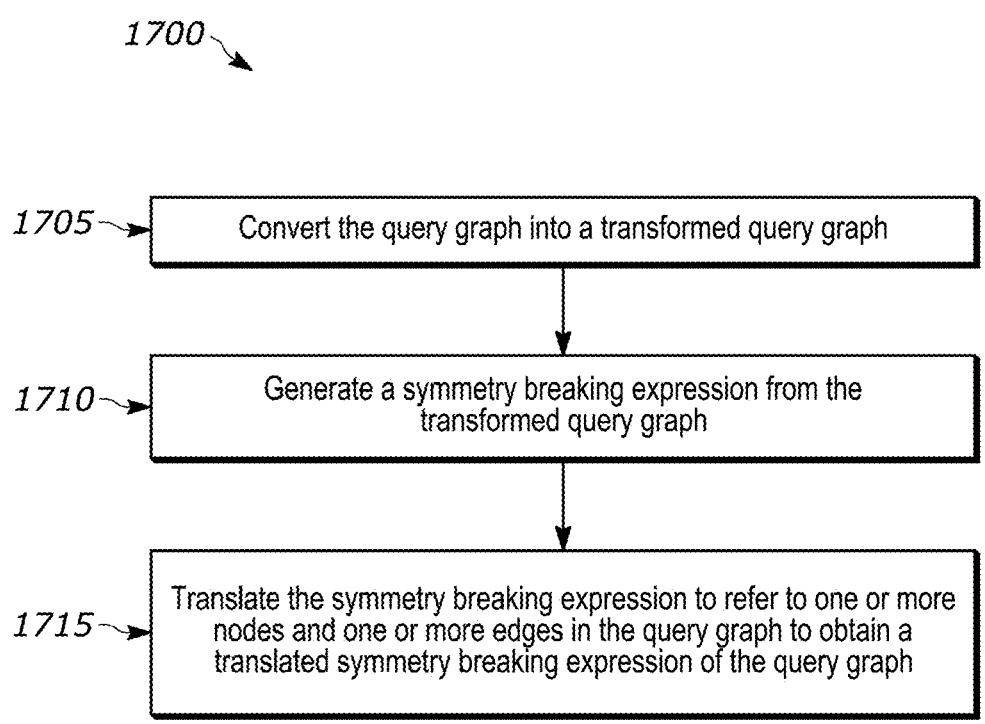
FIG. 17 illustrates a flowchart showing an example process for breaking symmetry performed during the pattern matching of FIG. 15, according to embodiments of the present technology.

Turning now to FIG. 17, an example flowchart outlining operations of a process 1700 is shown, in accordance with some embodiments of the present disclosure. The process 1700 may be used to break symmetry by the pattern matching application 1435. In particular, the process 1700 may be used to generate the translated symmetry breaking expression of the operation 1510. The process 1700 may be executed by one or more processors (e.g., the processor 1430) associated with the pattern matching application 1435. The process 1700 may include other or additional operations depending upon the particular embodiment.

Breaking symmetry in the query graph 1615 may entail three steps: (1) transforming the query graph such that all attributes (e.g., node attributes, edge attributes, multiple edges, and additional query) of the query graph are represented in graphical form; (2) generating a symmetry breaking expression for the graphical form; and (3) translating the symmetry breaking expression to the original query graph (e.g., the query graph 1615). Thus, to break symmetry in the query graph 1615, at operation 1705, the processor converts the query graph into a transformed query graph. In particular, when the query graph 1615 includes node attributes, edge attributes, and/or multiple edges, the processor converts those different instances of the node attributes, edge attributes, and/or multiple edges into a query graph having a single output attribute (e.g., a uniform or universal attribute). If the query graph 1615 includes an additional query (e.g., Equation 1), the processor also converts the additional query into graph representation and combines the graph representation with the query graph having the single output attribute to obtain the transformed query graph. If the query graph 1615 does not include any node attributes, edge attributes, multiple edges (e.g., the query graph only has topology), and additional queries, the operation 1705 may be skipped and the process 1700 may proceed directly to operation 1710. If the query graph 1615 includes at least one of node attributes, edge attributes, multiple edges, or additional queries, the operation 1705 may be executed.

At operation 1710, the processor generates a symmetry breaking expression from the transformed query graph of the operation 1705. Alternatively, if the query graph 1615 has no node attributes, edge attributes, multiple edges, and additional queries, the processor generates the symmetry breaking expression directly from the query graph 1615. In some embodiments, the processor may generate the symmetry breaking expression by detecting automorphisms in the transformed query graph of the operation 1705 (or the original query graph if the operation 1705 is skipped) and generating sub-expressions for each detected automorphism. The process may combine the sub-expressions from all the detected automorphisms to generate the symmetry breaking expression.

At operation 1715, the processor translates the symmetry breaking expression of the operation 1710 to refer to one or more nodes and one or more edges in the original query graph (e.g., the query graph 1615) to obtain a translated symmetry breaking expression of the query graph. In particular, during the operation 1705, if performed, additional nodes may be added to generate the transformed query graph that may not exist in the original query graph (e.g., the query graph 1615). The operation 1710 modifies the symmetry breaking expression of the operation 1710 to only refer to the nodes and edges that are present in the original query graph (e.g., the query graph 1615). In some embodiments, the operation 1715 may not be needed. For example, if the operation 1705 is not performed, the query graph may not have any extra nodes or edges that need to be translated. In those instances, the operation 1715 may be skipped. Each operation of the process 1700 is described in greater detail below.

Figure 18:
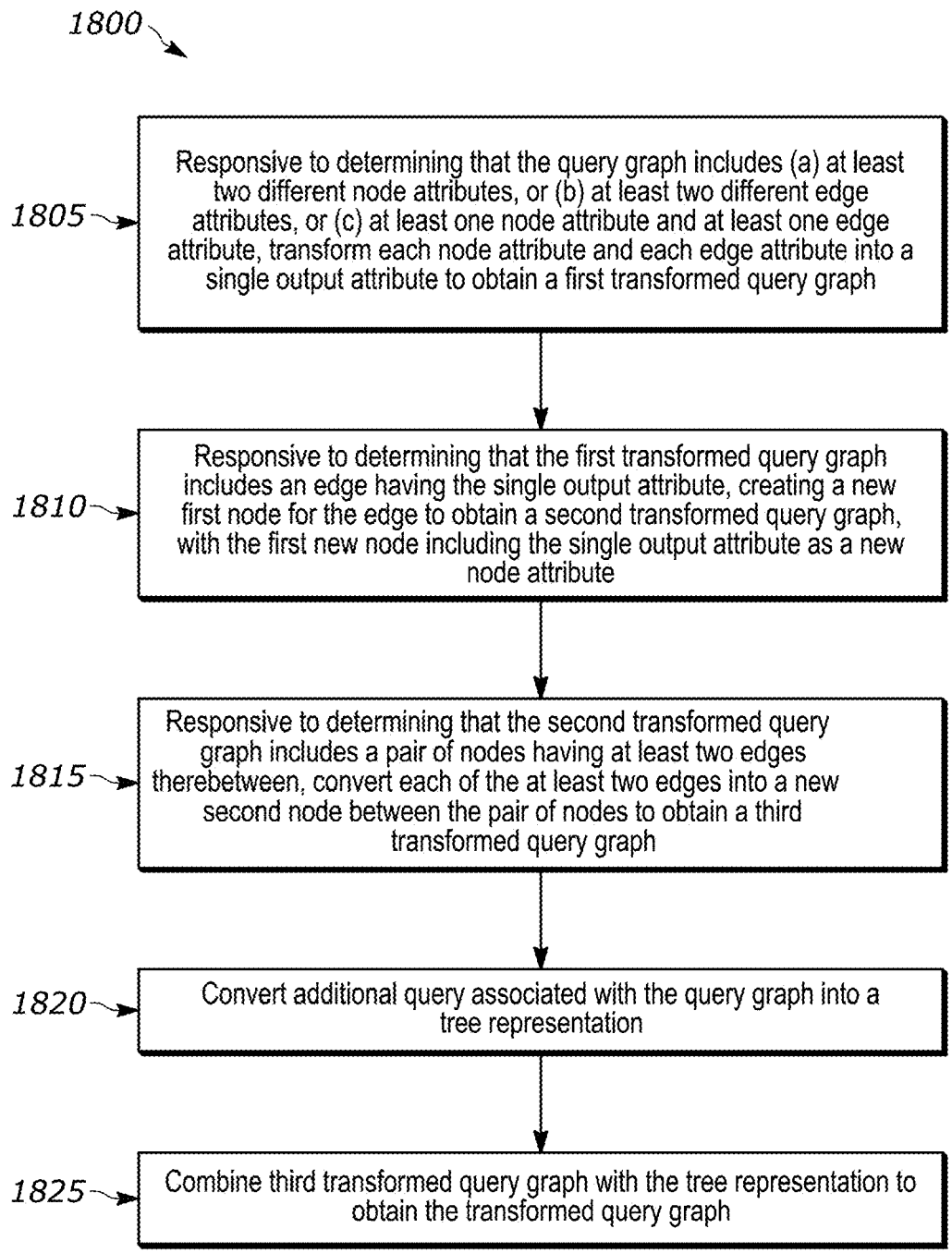
FIG. 18 illustrates a flowchart showing an example process used during the process of FIG. 17 for transforming a query graph into a graph representation having a single attribute type, according to embodiments of the present technology.

Referring to FIG. 18, an example flowchart outlining operations of a process 1800 is shown, in accordance with some embodiments of the present disclosure. The process 1800 may be used to convert the query graph 1615 into a transformed query graph by the pattern matching application 1435. In particular, the process 1800 describes the operation 1705 in greater detail. The process 1800 may be executed by one or more processors (e.g., the processor 1430) associated with the pattern matching application 1435. The process 1800 may include other or additional operations depending upon the particular embodiment.

The process 1800 may include four groups of transformations. The four group of transformations may include (1) converting node and/or edge attributes into a single output attribute; (2) converting edge attributes into node attributes by subdivisional; (3) converting multiple edges into node attributes by subdivision; and (4) converting additional queries into graphical form and combining with the query graph. Depending on the attributes of the query graph 1615, one or more of the four groups of transformations may be performed. The process 1800 may be used when all four groups of transformations may be performed. FIG. 19 describes a process where not all four groups of transformations may be needed.

At operation 1805, the processor determines that the query graph 1615 includes (a) at least two different node attributes, or (b) at least two different edge attributes, or (c) at least one node attribute and at least one edge attribute. In some embodiments, as discussed above, when the processor receives the main graph and the query graph at the operation 1505, the processor receives metadata associated with each of the main graph and the query graph. Node attributes and/or edge attributes may be specified by the user as part of the metadata. In some embodiments, the metadata may be in the form of a table (e.g., a nodes and edges table). In some embodiments, the table may include one or more rows and one or more columns. In some embodiments, each row of the table may correspond to one node or edge of the main graph or the query graph. For each node or edge, any node attributes and edge attributes may be specified in one or more associated columns. In some embodiments, each column may be associated with one attribute (whether node or edge attribute). In such embodiments, the processor may determine the number of node attributes for a particular node by counting the number of columns associated with the row in the table for that node that specifies the node attributes.

Similarly, the processor may determine the number of edge attributes by counting the number of columns that specify edge attributes for a particular node. In some embodiments, the same table may be used for both the main graph and the query graph. In other embodiments, separate tables may be used for the main graph and the query graph, with each graph having a row for each node or edge and a column for each edge attribute and a column for each node attribute. In some embodiments, separate tables may be provided for node attributes and edge attributes. In other embodiments, the metadata may include other types of information, as well as the node attributes and the edge attributes may be provided to the processor in other ways.

Responsive to determining that the query graph 1615 includes (a) at least two different node attributes, or (b) at least two different edge attributes, or (c) at least one node attribute and at least one edge attribute, the processor transforms the node attributes of each node and edge attributes of each edge into a different value of a single output attribute to obtain a first transformed query graph. The operation 1805 is described in greater detail in FIGS. 20-21E below.

At operation 1810, the processor determines that the first transformed query graph includes one or more edges having the single output attribute. In particular, after the operation 1805, any edge attributes in the query graph 1615 are converted into the single output attribute. Thus, if the query graph 1615 has edge attributes, the first transformed query graph may include one or more values of the single output attribute in place of the original edge attributes. Responsive to determining that the first transformed query graph includes one or more edges having the one or more values of the single output attribute, the processor converts each of the one or more values of the single output attribute into a new first node having the single output attribute to obtain a second transformed query graph. The value of the single output attribute becomes the node attribute for the new first node. For example, if Edge 1 between Node 1 and Node 2 has Output Attribute Value 1 and Edge 2 between Node 2 and Node 3 has Output Attribute Value 2, the processor creates two new nodes-Node A for Output Attribute Value 1 and Node B for Output Attribute Value 2. The Node A is created between Nodes 1 and 2 and has a node attribute "Output Attribute Value 1" and Node B is created between Nodes 2 and 3 and has a node attribute "Output Attribute Value 2". Thus, during the operation 1810, the edge attributes of each edge are converted into a new node. Therefore, the second transformed query graph may include one or more nodes that did not exist in the original query graph (e.g., the query graph 1615). The operation 1810 is described in more detail in FIGS. 22-23B.

At operation 1815, the processor determines if the second transformed query graph of the operation 1810 includes one or more pairs of nodes having at least two edges therebetween. In other words, the processor determines if any pair of nodes have multiple edges therebetween. Responsive to determining that second transformed graph includes multiple edges, the processor converts each of the at least two edges into a new second node between the pair of nodes to obtain a third transformed query graph. In other words, if Node 1 and Node 2 have Edge 1 and Edge 2 therebetween, each of the Edge 1 and Edge 2 gets converted into a new node, such that two new nodes are added to the second transformed query graph to obtain a third transformed query graph. The two new nodes may be added between Node 1 and Node 2. Any edge attributes of Edge 1 and Edge 2 may also be converted into new nodes with node attributes corresponding to the edge attributes, as discussed at the operation 1810. Additional details of the operation 1815 are described in FIGS. 24-25B.

At operation 1820, the processor converts the additional query (e.g., Equation 1) associated with the query graph 1615 into a tree representation. The operation 1820 is described in more detail in FIGS. 26-30C. At operation 1825, the processor combines the third transformed query graph of the operation 1815 with the tree representation of the operation 1820 to obtain the transformed query graph of the operation 1705. An example of the operation 1825 is discussed in more detail in FIGS. 31A and 31B.

It is to be understood that the operations 1805, 1810, 1815, and 1820 may be performed in any order or even performed simultaneously.

Referring to FIG. 19, an example flowchart outlining operations of a process 1900 is shown, in accordance with some embodiments of the present disclosure. The process 1900 may be used to convert the query graph 1615 into a transformed query graph by the pattern matching application 1435. In particular, the process 1900 describes the operation 1705 in greater detail. The process 1900 may be executed by one or more processors (e.g., the processor 1430) associated with the pattern matching application 1435. The process 1900 may include other or additional operations depending upon the particular embodiment. The process 1900 may be used when only zero or more of the four groups of transformations may be needed depending on the attributes of the query graph 1615. For example, if the query graph 1615 has no edge attributes, then the operation 1810 may not be needed. Likewise, if the query graph 1615 has no additional query, then the operations 1820 and 1825 may not be needed. If the query graph 1615 has no multiple edges, then the operation 1815 may not be needed. If the query graph 1615 has no node attributes, then the operation 1805 may not be needed.

Thus, at operations 1905, 1910, and 1915, the processor determines if the query graph 1615 has at least two different node attributes, at least two different edge attributes, or at least one node attribute and at least one edge attribute, respectively. If the processor determines at the operation 1905 that the query graph 1615 has at least two different node attributes, the process 1900 proceeds to operation 1920. If the processor determines at the operation 1910 that the query graph 1615 has at least two different edge attributes, the process 1900 proceeds to the operation 1920. If the processor determines at the operation 1915 that the query graph 1615 has at least one node attribute and at least one edge attribute, the process 1900 proceeds to the operation 1920. If the processor determines that the query graph 1615 does not have any edge attributes and does not have any node attributes, then the operation 1920 may be skipped and the process 1900 proceeds to operation 1925.

At the operation 1920, the processor transforms each of the node attributes and each of the edge attributes into a different value of a single output attribute, as discussed above at the operation 1805. At the operation 1925, the processor determines if the query graph 1615 (or the query graph resulting from the operation 1920 if the operation 1920 is performed) has any edge attributes (or edge attributes that have been converted into different values of the single output attribute). If the processor determines that the query graph (or the query graph resulting from the operation 1920) has one or more edge attributes, the process 1900 proceeds to operation 1930. Otherwise, the process 1900 proceeds to operation 1935. At the operation 1930, the processor converts each of the edge attributes into a node attribute, as discussed above at the operation 1810.

The operation 1935 is reached either from the operation 1930 after converting the edge attributes into node attributes or from the operation 1925 if the processor determines that the query graph 1615 (or the query graph resulting from the operation 1920) has no edge attributes. At the operation 1935, the processor determines if the query graph 1615 (or the query graph resulting from the operations 1920 or 1930) has more than one edge (e.g., multiple edges) between a pair of nodes. If the processor finds multiple edges between any pair of nodes, the process 1900 proceeds to operation 1940. Otherwise, the process 1900 proceeds to operation 1945. At the operation 1940, the processor converts each multiple edge into a new node, as discussed above at the operation 1815. The process 1900 then proceeds to the operation 1945.

At the operation 1945, the processor determines if the query graph 1615 is associated with an additional query (e.g., Equation 1). If so, the process 1900 proceeds to operation 1950 where the additional query is converted into a tree representation, as discussed above with respect to the operation 1820. If the processor determines at the operation 1945 that the query graph 1615 does not have any additional query associated therewith, the process 1900 proceeds to operation 1955 which continues processing at the operation 1710 to generate a symmetry breaking expression. At operation 1960, the processor combines the tree representation of the operation 1950 with the resulting query graph from the operations 1920 or 1930 or 1940—depending on which operation is used (or if none of the operations 1920, 1930, or 1940 are performed, then the query graph 1615), as discussed at the operation 1825.

It is to be understood that the checks of the operations 1905, 1910, 1915, 1925, 1935, and 1945 may be performed in any order or even simultaneously. Thus, in some embodiments, depending on whether the query graph 1615 has any node or edge attributes or multiple edges or additional query, only some or none of the operations of the process 1900 may be executed.

Figure 20:
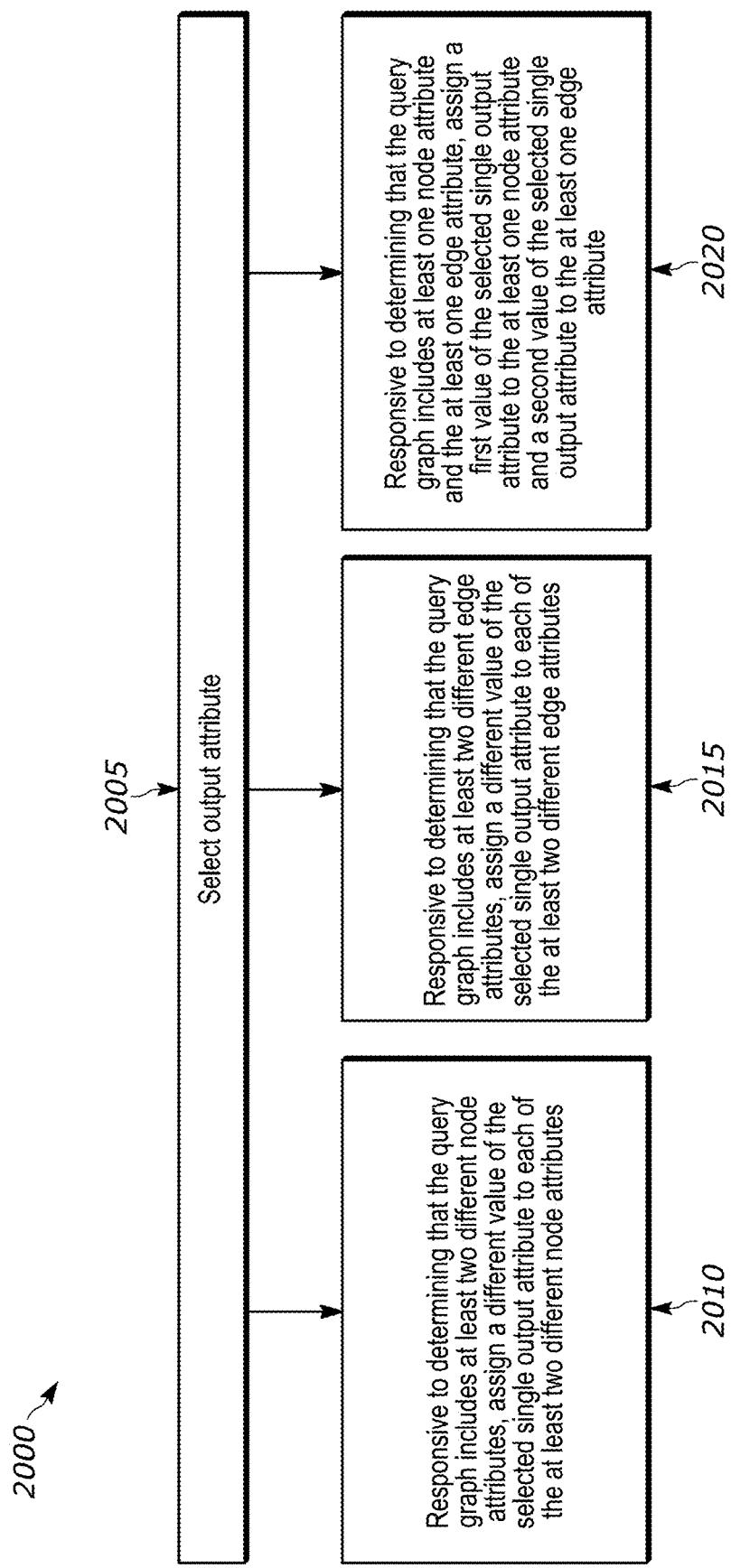
FIG. 20 illustrates a flowchart showing an example process for converting different attribute types in a query graph into a single output attribute in the processes of FIGS. 18 and 19, according to embodiments of the present technology.

Turning now to FIG. 20, an example flowchart outlining operations of a process 2000 is shown, in accordance with some embodiments of the present disclosure. The process 2000 describes the operations 1805 in greater detail. The process 2000 may be executed by one or more processors (e.g., the processor 1430) associated with the pattern matching application 1435. Thus, the process 2000 may be executed responsive to the processor determining that the query graph 1615 includes one or more node attributes and/or one or more edge attributes. The process 2000 may include other or additional operations depending upon the particular embodiment.

At operation 2005, the processor selects an output attribute. In some embodiments, the output attribute may be different from any node or edge attributes that are present in the query graph 1615. In some embodiments, the output attribute may be an integer attribute. In other embodiments, the output attribute may be a non-integer attribute, an alphabetical attribute, a categorical attribute, a discrete attribute, a color attribute, an alphanumerical attribute, or any arbitrary attribute that is suitable.

At operations 2010, 2015, and 2020, the node attributes of each node and edge attributes of each edge in the query graph 1615 are converted into the output attribute. In particular, if the processor determines that the query graph 1615 includes nodes with at least two different node attributes, at the operation 2010, the processor assigns a different value of the output attribute to each of the at least two different node attributes. If the processor determines that the query graph 1615 includes edges with at least two different edge attributes, at the operation 2015, the processor assigns a different value of the output attribute to each of the at least two different edge attributes. If the processor determines that the query graph 1615 includes at least one node edge attribute and at least one edge attribute, at the operation 2020, the processor assigns a different value of the output attribute to each of the node attributes and each of the edge attributes. The processor may also replace each of the node attributes and each of the edge attributes with the assigned value of the single output attribute in the query graph 1615.

In some embodiments, the same output attribute may be selected at the operation 2005 for both node attributes and edge attributes. In some embodiments, even if the same output attribute is selected for both node and edge attributes, in some embodiments, same values of the output attribute may be used for the node and edge attributes. For example, in some embodiments, values (1–N) may be used for node attributes and values (1–N) may be used for edge attributes. In some embodiments, different values may be used for the node attributes and the edge attributes. In some embodiments, a different output attribute may be used for node attributes and edge attributes.

An example pseudocode for the process 2000 may be as follows:

Input: Property Graph G
Output: Property Graph G' with at most one attribute 'color' on edges and nodes
Let G' be a copy of G without the node and edge attributes
for each node n in G
   Let ordered(n.attrs) be a deterministically ordered list of attribute type and value pairs
   Let n' be the node in G' that is equivalent to n in G
   Set n'.color to Hash(ordered(n.attrs))
for each edge e in G
   Let ordered(e.attrs) be a deterministically ordered list of attribute type and value pairs
   Let e' be the edge in G' that is equivalent to e in G
   Set e'.color to Hash(ordered(e.attrs))
Output G'

In the pseudocode above, the "Property Graph G" is the query graph 1615, the "Property Graph G'" is the output query graph (e.g., the first transformed query graph) of the process 2000, and the output attribute that has been selected for both nodes and edge attributes is "color". Each node in the query graph 1615 is n and each equivalent node in the output query graph (e.g., the first transformed query graph) is n'. Each edge in the query graph 1615 is e and each equivalent node in the output query graph (e.g., the first transformed query graph) is e'. Thus, the output query graph (e.g., the first transformed query graph) has the same number of nodes and the same number of edges as the query graph 1615. The node attribute of each node is set to a different value of the output attribute and the edge attribute of each edge is set to a different value of the output attribute. If a node has multiple node attributes, the multiple node attributes are concatenated and assigned a single value of the output attribute. Similarly, if an edge multiple edge attributes, the multiple edge attributes are concatenated and assigned a single value of the output attribute.

Figure 21A:
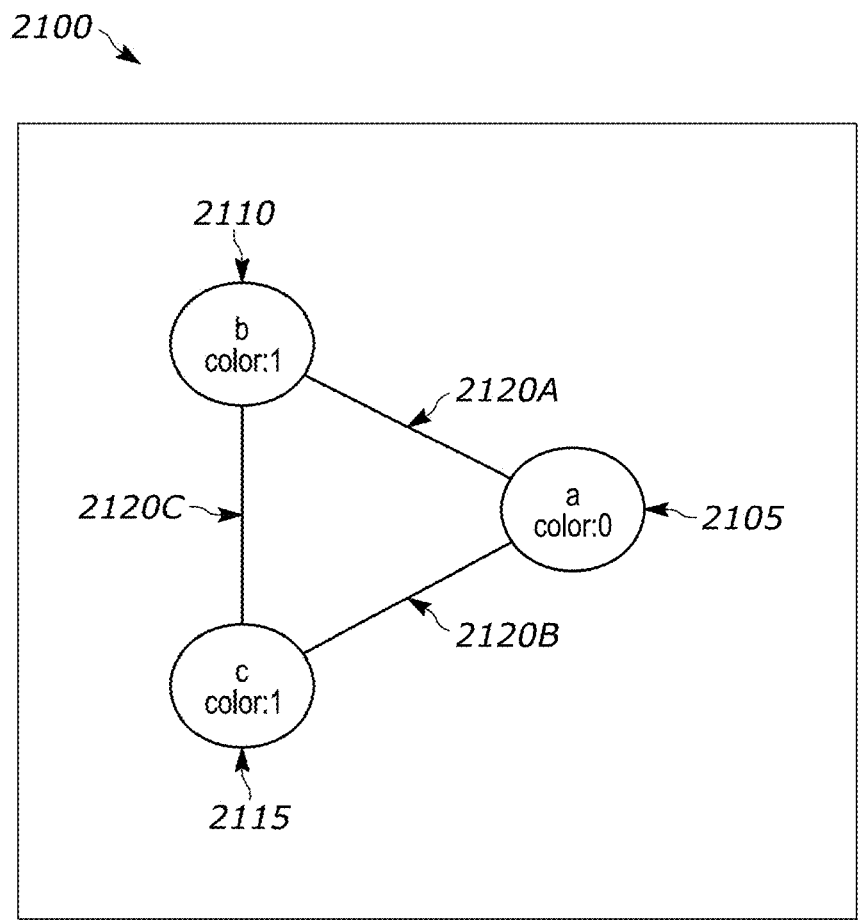
FIG. 21A illustrates an example query graph in which node attributes have been converted into a single output attribute using the process of FIG. 20, according to embodiments of the present technology.
Figure 21B:
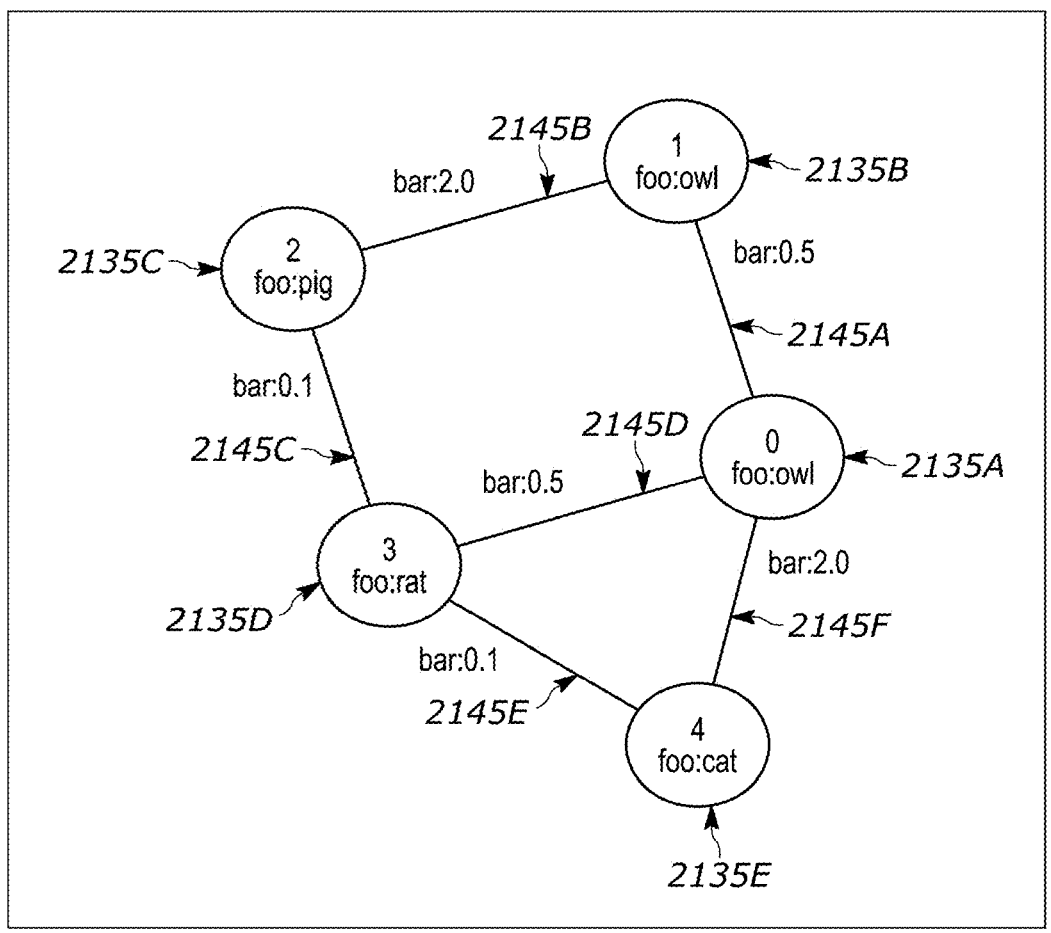
FIGS. 21B and 21C illustrate an example query graph in which edge attributes and node attributes have been converted into a single output attribute using the process of FIG. 20, according to embodiments of the present technology.
Figure 21C:
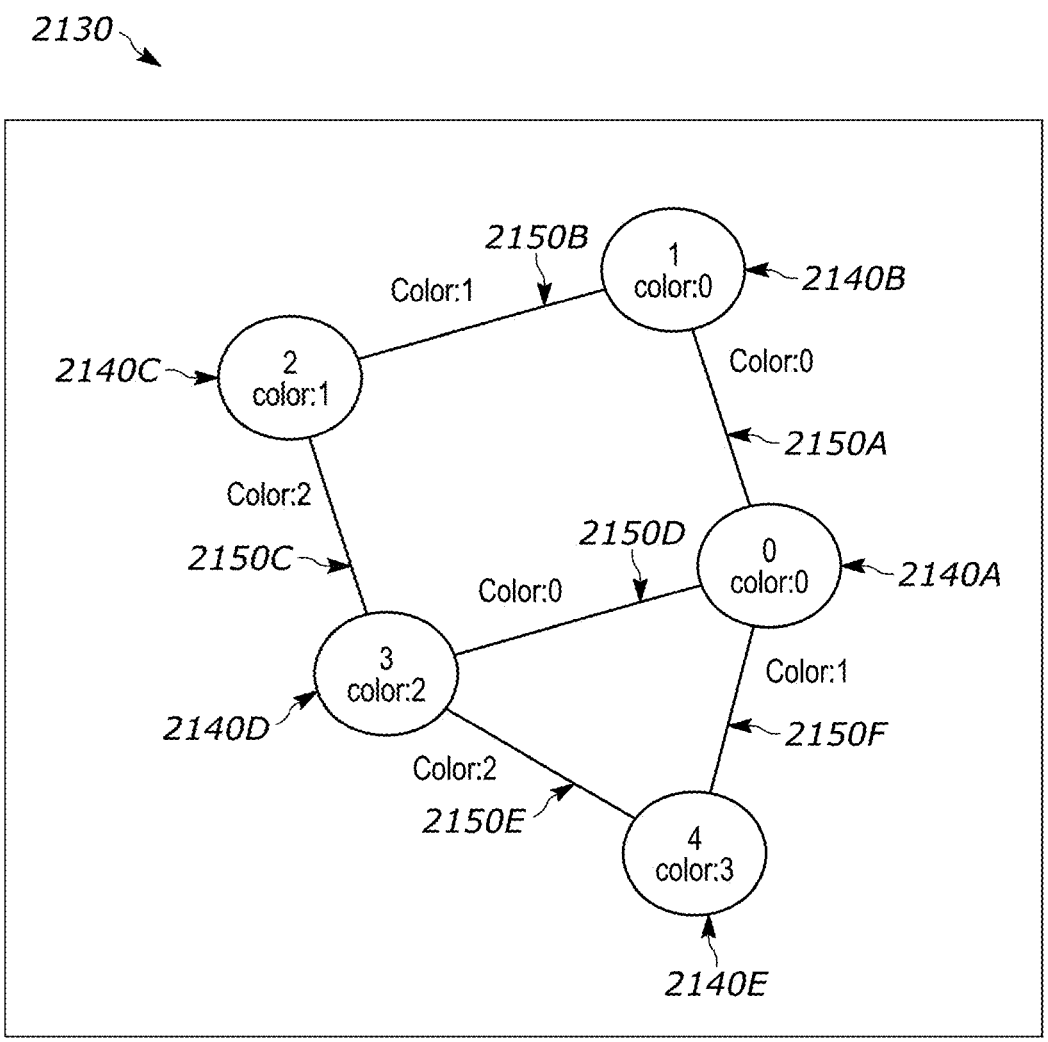
Figure 21D:
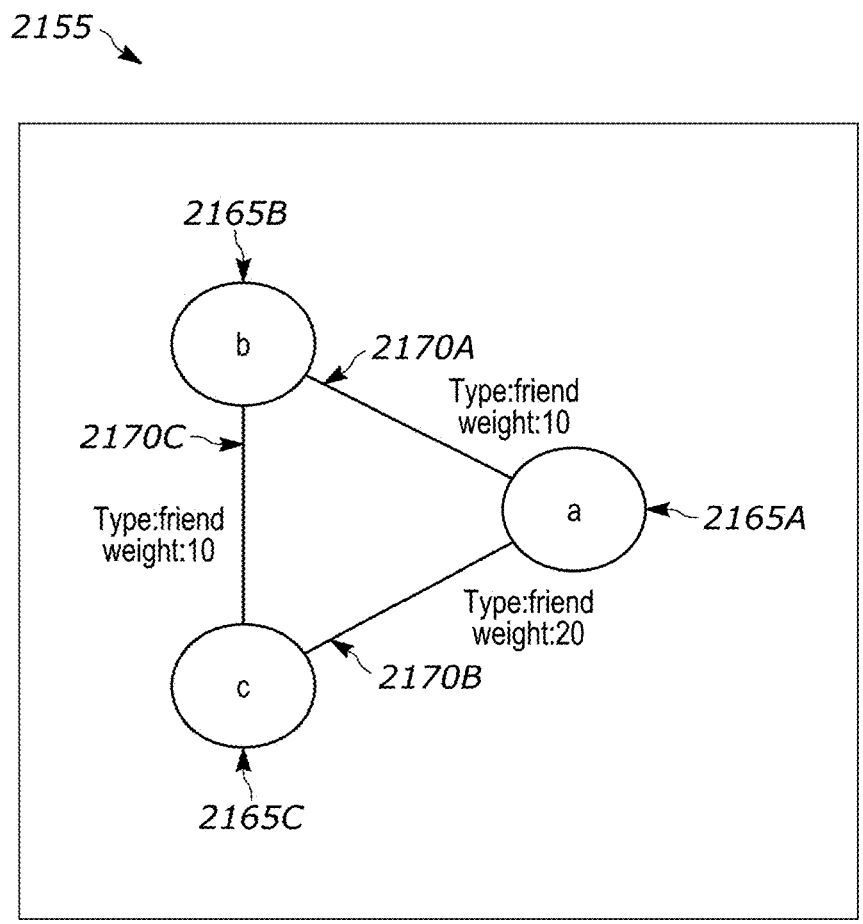
FIGS. 21D and 21E illustrate an example query graph in which edge attributes have been converted into a single output attribute using the process of FIG. 20, according to embodiments of the present technology.
Figure 21E:
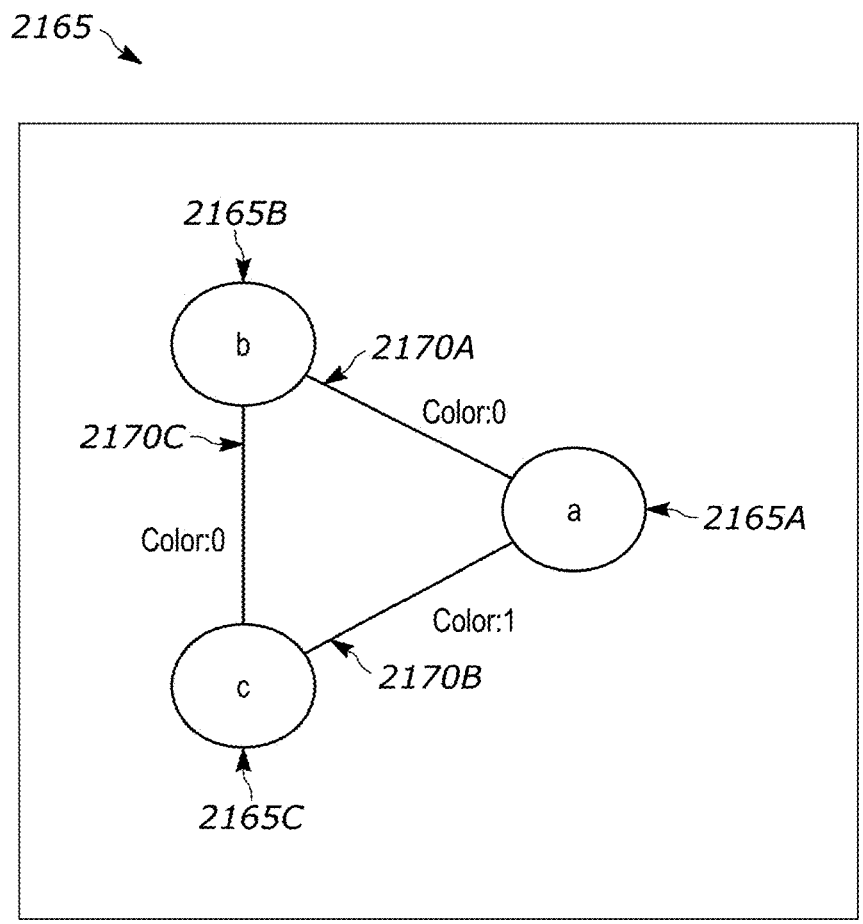

Referring to FIGS. 21A-21E in conjunction with FIG. 20, examples of converting an attribute dictionary (e.g., the node and edge attributes in the query graph 1615) into the single output attribute are shown, in accordance with some embodiments of the present disclosure. These examples are merely for explanation purposes and are not intended to limit the disclosure in any way. FIG. 21A shows an example of converting node attributes into the single output attribute, FIGS. 21B-21C show an example of converting both edge and node attributes into the single output attribute, and FIGS. 21D and 21E show an example of converting edge attributes into the single output attribute. Thus, FIG. 21A corresponds to the operation 2010, FIGS. 21B and 21C correspond to the operation 2020, and FIG. 21D corresponds to the operation 2015. The output attribute selected in FIGS. 21A-21D is "color" although any suitable attribute that is different from the attributes in the query graph 1615 may be used.

Referring specifically to FIG. 21A, the node attributes (e.g., person who works at U1, person who works at university other than U1) in the query graph 1615 are converted into different values of the output attribute "color". After conversion, the query graph 1615 is transformed into a query graph 2100. The query graph 2100 includes nodes 2105, 2110, and 2115. The node 2105 is equivalent to the node 1620A, the node 2110 is equivalent to the node 1620B, and the node 2115 is equivalent to the node 1620C. In some embodiments, the nodes 2105-2115 of the query graph 2100 maintain the same labels (e.g., a, b, c) of the query graph 1615. In other embodiments, the nodes 2105-2115 of the query graph 2100 may be assigned different labels.

The query graph 2100 also includes edge 2120A between the nodes 2105 and 2110, edge 2120B between the nodes 2105 and 2115, and edge 2120C between the nodes 2110 and 2115. The edge 2120A is equivalent to the edge 1625A, the edge 2120B is equivalent to 1625B, and the edge 2120C is equivalent to the edge 1625C. In the query graph 2100, the node attributes of the query graph 1615 are transformed into the output attribute (e.g., color). A different value of the output attribute is assigned to the node attributes of each node of the query graph 1615 and assigned to the equivalent node in the query graph 2100. For example, the node attribute (e.g., person who works at U1) of the node 1620A may be assigned a value 0 of the output attribute color (e.g., color:0) and the node attribute color:0 may be associated with the node 2105. The node attribute (e.g., person who works at university other than U1) of the node 1620B may be assigned a value 1 of the output attribute color (e.g., color:1) and the node attribute color:1 may be assigned to the node 2110. Further, since the nodes 1620B and 1620C have the same node attribute (e.g., person who works at university other than U1), those nodes may be assigned the same value of the output attribute (e.g., color:1). Accordingly, the node 2115 of the query graph 2100 may be assigned the node attribute color:1 also. Thus, each node attribute of the query graph 1615 may be converted into a different value of the output attribute in the query graph 2100. The query graph 2100 may then be used as an input query graph for the next operation.

Referring now to FIGS. 21B and 21C, an example query graph 2125 is shown having both node attributes and edge attributes and an example query graph 2130 is shown in which edge and node attributes of the query graph 2125 are transformed into the single output attribute "color," in accordance with some embodiments of the present disclosure. Both the query graph 2125 and the query graph 2130 include the same nodes, the same edges, and same labels. Only the node attributes and edge attributes are different between the query graph 2125 and the query graph 2130. For example, the query graph 2125 includes nodes 2135A-2135E and the query graph 2130 includes corresponding nodes 2140A-2140E. The query graph 2125 includes edges 2145A-2145F and the query graph 2130 includes corresponding edges 2150A-2150F.

Each of the edges 2145A-2145F of the query graph 2125 includes an edge attribute. For example, the edge 2145A includes an edge attribute bar:0.5, the edge 2145B includes an edge attribute bar:2.0, the edge 2145C includes an edge attribute bar:0.1, the edge 2145D includes an edge attribute bar:0.5, the edge 2145E includes an edge attribute bar:0.1, and the edge 2145F includes an edge attribute bar:2.0. Thus, the query graph includes three different edge attributes: bar:0.1, bar:0.5, and bar:2.0. Similarly, each node of the query graph 2125 includes a node attribute. For example, the node 2135A includes a node attribute foo.owl, the node 2135B includes a node attribute foo.owl, the node 2135C includes a node attribute foo.pig, the node 2135D includes a node attribute foo.rat, the node 2135E includes a node attribute foo.cat. Thus, the query graph 2125 includes four different node attributes: foo,owl, foo.cat, foo.pig, and foo.rat.

To convert the query graph 2125 into the query graph 2130, the processor converts each of the different node attributes and each of the different edge attributes of the query graph 2125 into a different value of the output attribute "color". Each node attribute is assigned a different value of the output attribute, and each edge attribute is assigned a different value of the output attribute, as shown below in Tables 1 and 2:

TABLE 1

| Node Attribute | Assigned Value of Output Attribute |
|---|---|
| foo.owl | color:0 |
| foo.cat | color:3 |
| foo.rat | color:2 |
| foo.pig | color:1 |

TABLE 2

| Edge Attribute | Assigned Value of Output Attribute |
|---|---|
| bar:0.1 | color:2 |
| bar:0.5 | color:0 |
| bar:2.0 | color:1 |

The processor replaces the node attributes of the nodes 2135A-2135E of the query graph 2125 with the assigned values of the output attribute in the nodes 2140A-2140E of the query graph 2130. Thus, the nodes 2140A-2140E of the query graph 2130 have their assigned output attribute values as the node attribute. Similarly, the processor replaces the edge attributes of the edges 2145A-2145G with the assigned values of the output attribute in the edges 2150A-2150G in the query graph 2130. Thus, the edges 2150A-2150G in the query graph 2130 have their assigned output attribute values as the edge attribute.

Referring to FIGS. 21D and 21E, an example query graph 2155 having edge attributes is shown and an example query graph 2160 is shown in which the edge attributes of the query graph 2155 are transformed into the single output attribute "color," in accordance with some embodiments of the present disclosure. Each of the query graphs 2155 and 2160 includes nodes 2165A-2165C. The node 2165A is connected to the node 2165B by edge 2170A, the node 2165A is connected to the node 2165C by edge 2170B, and the node 2165B is connected to the node 2165C by edge 2170C. Each of the edges 2170A-2170C has two edge attributes. For example, the edge 2170A has edge attributes type: friend and weight:10, the edge 2170B has edge attributes type: friend and weight:20, while the edge 2170C has edge attributes type: friend and weight:10. The edge attributes of each of the edges 2170A-2170C may be converted into a single output attribute.

In particular, all of the edge attributes of an edge may be converted into a single edge attribute. The edge attributes of each of the edges 2170A-2170C may be concatenated and assigned an output attribute as indicated in Table 3 below:

TABLE 3

| Edge Attributes | Assigned Value of Output Attribute |
| --- | --- |
| type.friend weight:10 | color:0 |
| type.friend weight:10 | color:0 |
| type.friend weight:20 | color:1 |

Thus, the edge attributes of the edges 2170A-2170C in the query graph 2155 are converted into the single output attribute of the edges 2170A-2170C in the query graph 2165.

Figure 22:
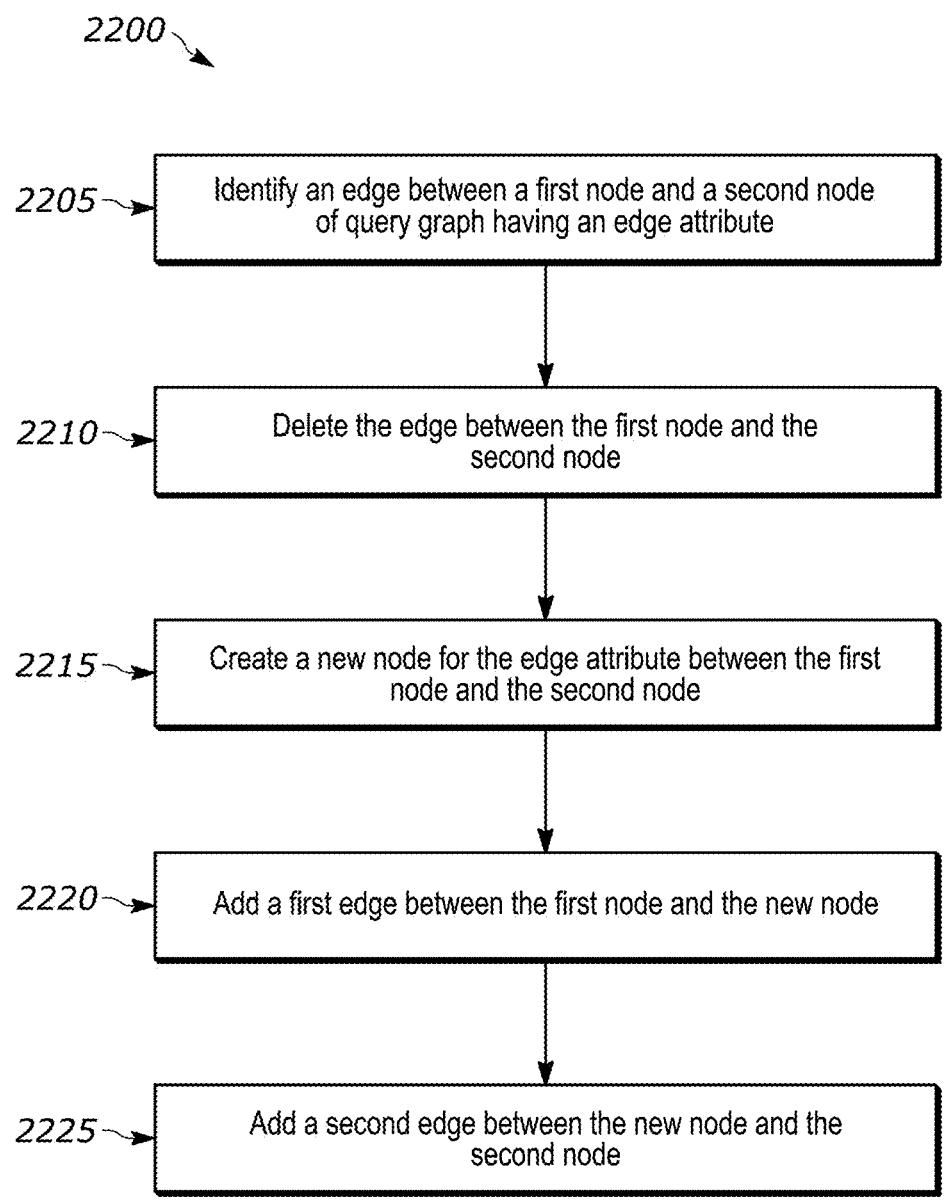
FIG. 22 illustrates a flowchart showing an example process for converting edge attributes into node attributes used during the processes of FIGS. 18 and 19, according to embodiments of the present technology.
Figure 23A:
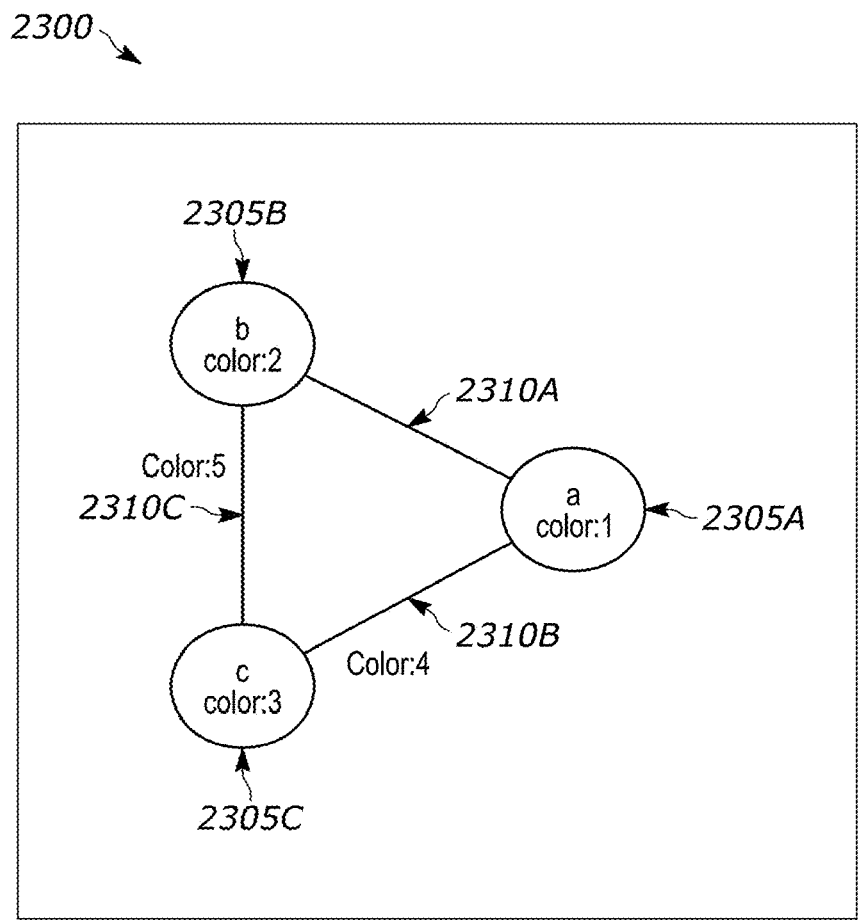
FIGS. 23A and 23B illustrate example query graphs in which edge attributes have been converted into node attributes using the process of FIG. 22, according to embodiments of the present technology.
Figure 23B:
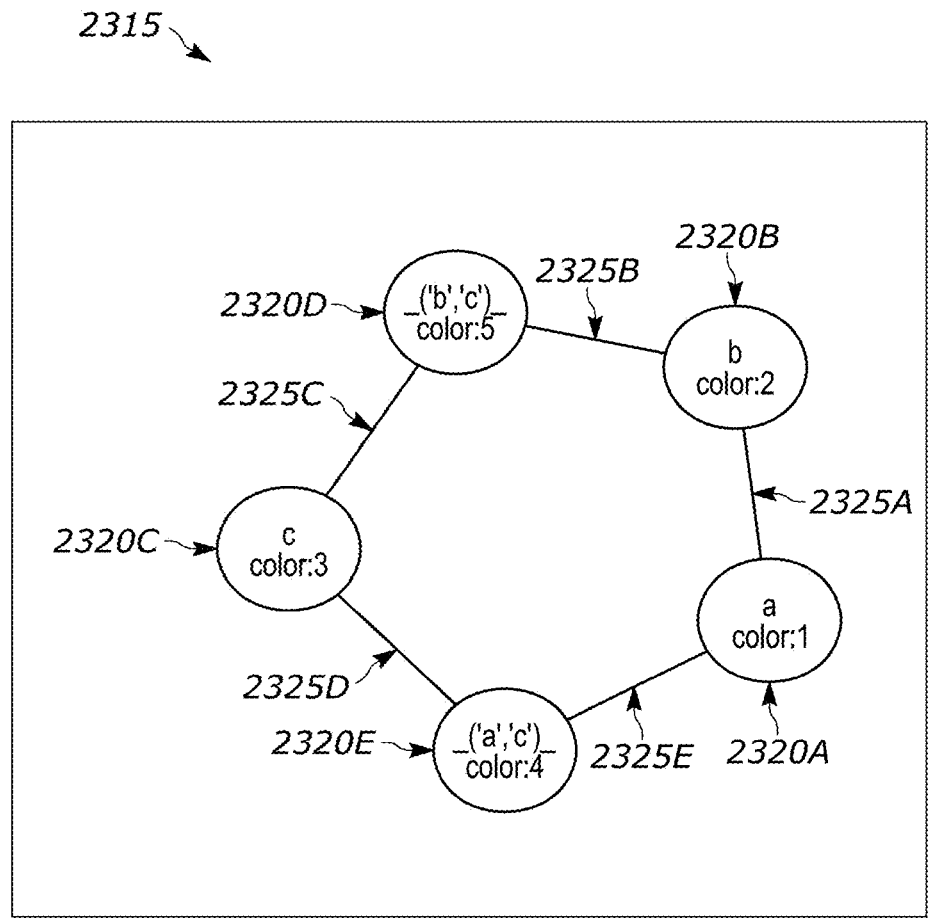

Turning to FIG. 22, an example flowchart outlining operations of a process 2200 is shown, in accordance with some embodiments of the present disclosure. The process 2200 describes the operation 1810 in greater detail. The process 2200 may be used to eliminate edge attributes (e.g., convert the edge attributes into node attributes by subdivision). The process 2200 may be executed by one or more processors (e.g., the processor 1430) associated with the pattern matching application 1435. Thus, the process 2200 may be executed responsive to the processor determining that the query graph 1615 (or the first transformed query graph of the operation 1805) includes one or more edge attributes. The process 2200 may include other or additional operations depending upon the particular embodiment. The process 2200 may be executed for each edge that has an edge attribute. FIG. 22 is discussed in conjunction with FIGS. 23A and 23B. FIGS. 23A and 23B show an example of how edge attributes in a query graph may be converted into node attributes.

At operation 2205, the processor identifies an edge in the query graph having an edge attribute. For example, the processor may determine that the query graph 2130 has edge attributes (e.g., the output attributes). As another example, FIG. 23A shows a query graph 2300 that has nodes 2305A-2305C and edges 2310A-2310C. The query graph 2300 is the result of the process 2000 after the edge and node attributes have been converted into the single output attribute. Thus, the nodes 2305A-2305C have output attribute values color:1, color:2, and color:3, respectively, while the edges 2310B and 2310C have output attribute values color:4 and color:5, respectively. Thus, at the operation 2205, the processor may determine that the query graph 2300 has edge attributes (e.g., color:4 and color:5).

At operation 2210, the processor deletes the edge between the first node and the second node. For example, responsive to determining that the edge 2310B and the edge 2310C of the query graph 2300 have edge attributes, the processor may delete those edges in a query graph 2315 of FIG. 23B. The query graph 2315 of FIG. 23B may be the second transformed query graph of the operation 1810. The query graph 2315 includes nodes 2320A-2320E. The node 2320A may correspond to the node 2305A, the node 2320B may correspond to the node 2305B, and the node 2320C may correspond to the node 2305C. The query graph 2315 may also include edges 2325A-2325E. The edge 2325A may correspond to the edge 2310A. The query graph 2315 may retain the edge 2310A from the query graph 2300 (as the edge 2325A) because the edge 2310A does not have an edge attribute. However, because the edges 2310B and 2310C both have an edge attribute, both those edges may be deleted from the query graph 2315.

At operation 2215, the processor creates a new node between the first node and second node. The new node may have a node attribute that corresponds to the edge attribute of the edge that was deleted at the operation 2210. For example, the processor may create the nodes 2320D and 2320E in the query graph 2315. The node 2320D may be created for the edge 2310C. Therefore, the node 2320D may be created between the same nodes that were connected by the edge 2310C. Accordingly, the node 2320D may be created between the nodes 2320B and 2320C (which correspond to the nodes 2305B and 2305C, respectively). The node 2320E may be created for the edge 2310B. Therefore, the node 2320E may be created between the same nodes that were connected by the edge 2310B. Accordingly, the node 2320E may be created between the nodes 2320A and 2320C (which correspond to the nodes 2305A and 2305C, respectively). The newly created nodes may be assigned node attributes corresponding to the edge attributes of the edges for which they were created. Thus, the node 2320D may have a node attribute color:5 (same as the edge attribute of the edge 2310C) and the node 2320E may have a node attribute color:4 (same as the edge attribute of the edge 2310B). In some embodiments, the newly added nodes may be assigned labels that are reflective of the nodes between which those nodes are created. For example, in some embodiments, the node 2320D which is created between the node 2320B having a node label b and the node 2320C having a node label c, the node 2320D may have a node label (b, c). In other embodiments, other labels may be used. Similarly, the node 2320E may be assigned a label (a, c) for being between the node 2320A having a node label a and the node 2320C having a node label c.

At operation 2220, the processor adds a first edge between the first node and the new node. For example, at the operation 2220, the processor may add one of the edges 2325B or 2325C connecting the node 2320D with one of the nodes 2320B or 2320C and one of the edges 2325D or 2325E connecting the node 2320E with one of the nodes 2320C or 2320A. For explanation purposes, at the operation 2220, the processor adds the edge 2325B connecting the node 2320D with the node 2320B and the edge 2325D connecting the node 2320E with the node 2320C.

At operation 2225, the processor adds a second edge between the new node and the second node. For example, at the operation 2225, the processor may add the other one of the edges 2325B or 2325C connecting the node 2320D with the nodes 2320B or 2320C and the other one of the edges 2325D or 2325E connecting the node 2320E with the nodes 2320C or 2320A. Thus, at the operation 2225, the processor adds the edge 2325C connecting the node 2320D with the node 2320C and the edge 2325E connecting the node 2320E with the node 2320A.

Thus, the process 2200 eliminates edge attributes and converts those edge attributes into node attributes by subdivision. In particular, edges having edge attributes are replaced by new nodes having node attributes corresponding to the respective edge attributes. An example pseudocode for the process 2200 may be given as:

Input: Property Graph G, List of edges to subdivide Elist
    Output: Property Graph G' with attributes only on nodes
    Let G' be a copy of G
    for each edge e=(u,v) in Elist
        Remove e from G'
        Create a node n in G' with the attributes of e
        Add the edges (u,n) and (n, v) to G'
    Output G'

In the pseudocode above, G is the query graph 2125, G' is the query graph (of FIG. 23), e is an edge in G between nodes u and v. Initially, G' is a copy of G. Then, the edge e (having an edge attribute) in G' is removed, a new node n is added to G' having the edge attribute of e, and a new edge between nodes u and n and a new edge between n and v are added to G'.

Figure 24:
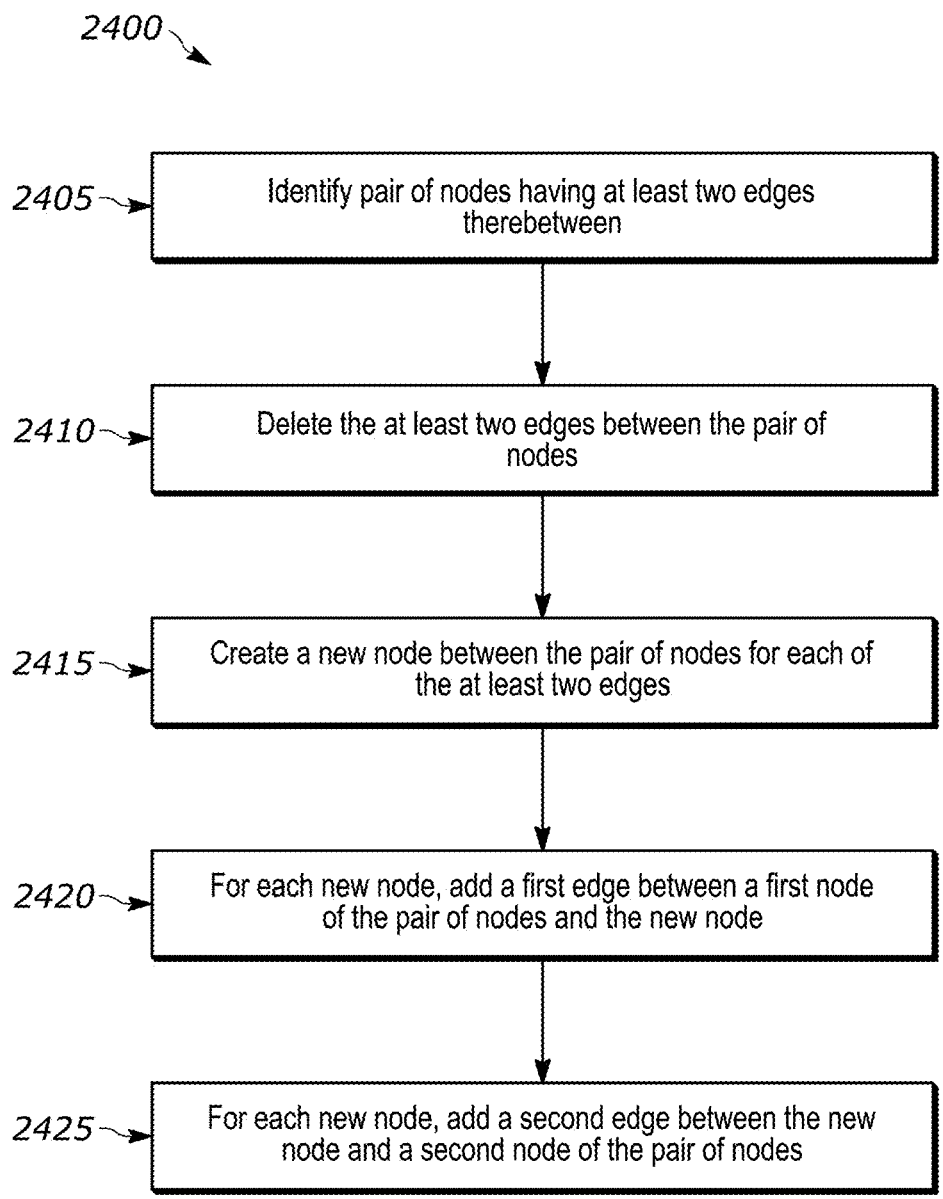
FIG. 24 illustrates a flowchart showing an example process for converting multiple edges between two nodes into node attributes used during the processes of FIGS. 18 and 19, according to embodiments of the present technology.
Figure 25A:
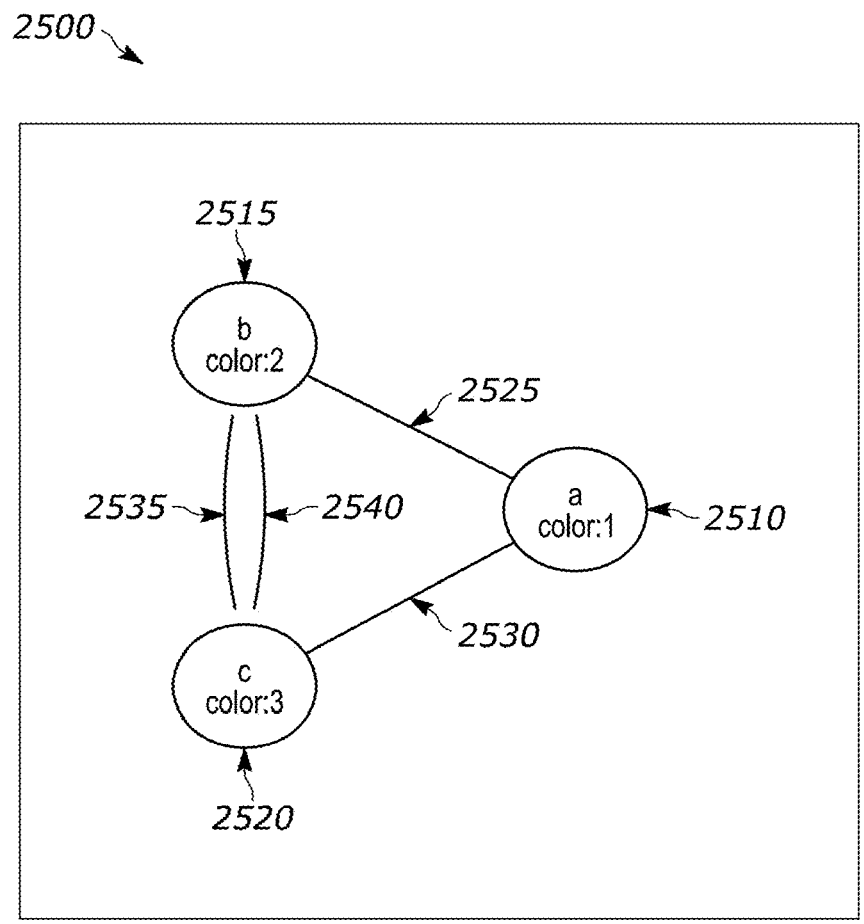
FIGS. 25A and 25B illustrate example query graphs in which multiple edges have been converted into node attributes using the process of FIG. 24, according to embodiments of the present technology.
Figure 25B:
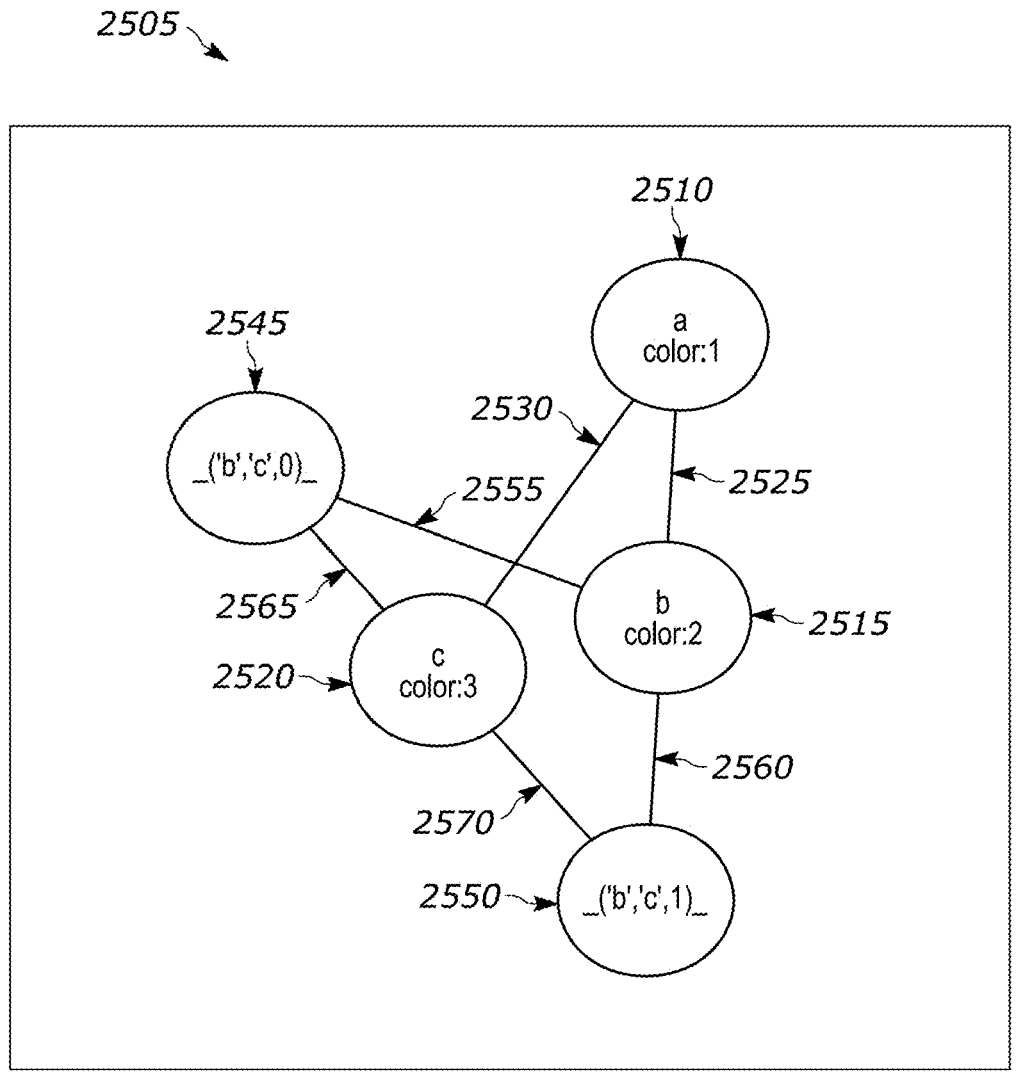

Referring to FIG. 24, an example flowchart outlining operations of a process 2400 is shown, in accordance with some embodiments of the present disclosure. The process 2400 describes the operation 1815 in greater detail. The process 2400 may be used to eliminate multiple edges (e.g., convert the multiple edges into node attributes by subdivision). The process 2400 may be executed by one or more processors (e.g., the processor 1430) associated with the pattern matching application 1435. Thus, the process 2400 may be executed responsive to the processor determining that the query graph 1615 (or the second transformed query graph of the operation 1810 if the operation 1810 is performed) includes multiple edges between any pair of nodes. The process 2400 may include other or additional operations depending upon the particular embodiment. The process 2400 may be executed for each pair of nodes that has multiple edges therebetween. The process 2400 is explained in conjunction with FIGS. 25A and 25B. FIG. 25A shows an example of a query graph 2500 that has multiple edges and FIG. 25B shows how the query graph 2500 is converted into a query graph 2505 using the process 2400. The query graph 2500 shown is an example of the result of the process 2000 (and particularly the result of executing the operation 2010).

The query graph 2500 includes nodes 2510-2520. The node 2510 is connected to the node 2515 by edge 2525, the node 2510 is connected to the node 2520 by edge 2530, and the node 2515 is connected to the node 2520 by edges 2535 and 2540. At operation 2405, the processor identifies a pair of nodes that has at least two edges therebetween. For example, the processor may identify that the node 2515 and the node 2520 have two edges therebetween—the edge 2535 and the edge 2540 in the query graph 2500.

At operation 2410, to generate the query graph 2505, the processor may first create a copy of the query graph 2500. Then, the processor deletes each of the at least two edges 2535 and 2540 between the pair of nodes 2515 and 2520 from the query graph 2505. Thus, the query graph includes the nodes 2510-2520, the edge 2525 between the nodes 2510 and 2515, the edge 2530 between the nodes 2510 and 2520, but does not include the edges 2535 and 2540. At operation 2415, the processor creates a new node between the pair of nodes for each of the at least two edges. Thus, the processor may create a new node 2545 for the edge 2535 and a new node 2550 for the edge 2540 in the query graph 2505. Both the new nodes 2545 and 2550 may be created between the nodes 2515 and 2520 between which the edges 2535 and 2540 existed. Each of the new nodes 2545 and 2550 may have a node attribute. For example, in some embodiments, the node attribute may identify the nodes between which that node is created as well as an edge number. For example, in some embodiments, one of the edges 2535 or 2540 may be considered Edge 0 and the other one may be considered Edge 1. Thus, one the new nodes 2545 or 2550 may have a node attribute ("b", "c", 0) to indicate that the node is between nodes b (e.g., the node 2515) and c (e.g., the node 2520) and represents Edge 0 while the other one of the new nodes may have a node attribute ("b", "c", 1) indicate that the node is between nodes b (e.g., the node 2515) and c (e.g., the node 2520) and represents Edge 1.

At operation 2420, for each new node, the processor adds a first edge between one of the pair of nodes (e.g., a first node) and the new node. For explanation purposes, in the pair of nodes, the node 2515 may be considered the first node and the node 2520 may be considered the second node. Thus, at the operation 2420, the processor may add an edge 2555 between the first node (e.g., the node 2515) and the new node 2545 and an edge 2560 between the first node (e.g., the node 2515) and the new node 2550. At operation 2425, for each new node, the processor adds a second edge between the new node and the other of the pair of nodes (e.g., the second node). For example, the processor may add an edge 2565 between the new node 2545 and the second node (e.g., the node 2520) and an edge 2570 between the new node 2550 and the second node (e.g., the node 2520).

Thus, the process 2400 eliminates multiple edges and converts those edges into node attributes by subdivision. In particular, each of the multiple edges is replaced by a new node having node attributes. An example pseudocode for the process 2400 may be given as:

Input: Property Graph G, List of edges to subdivide Elist
    Output: Property Graph G' with attributes only on nodes
    Let G' be a copy of G
    for each edge e=(u,v) in Elist
        Remove e from G'
        Create a node n in G' with the attributes of e
        Add the edges (u,n) and (n, v) to G'
    Output G'

The above pseudocode is same as the pseudocode for the process 2200. In the pseudocode above, G is the query graph 2500, G' is the query graph 2505, e is an edge (e.g., the edges 25335, 2540) of multiple edges in G between nodes u (e.g., the node 2515) and v (e.g., the node 2520). Initially, G' is a copy of G. Then, the edge e (one edge of the multiple edges between nodes u and v) in G' is removed, a new node n (e.g., the nodes 2545, 2550) is added to G' having the edge attribute of e, and a new edge between nodes u and n and a new edge between n and v are added to G'.

Figure 26:
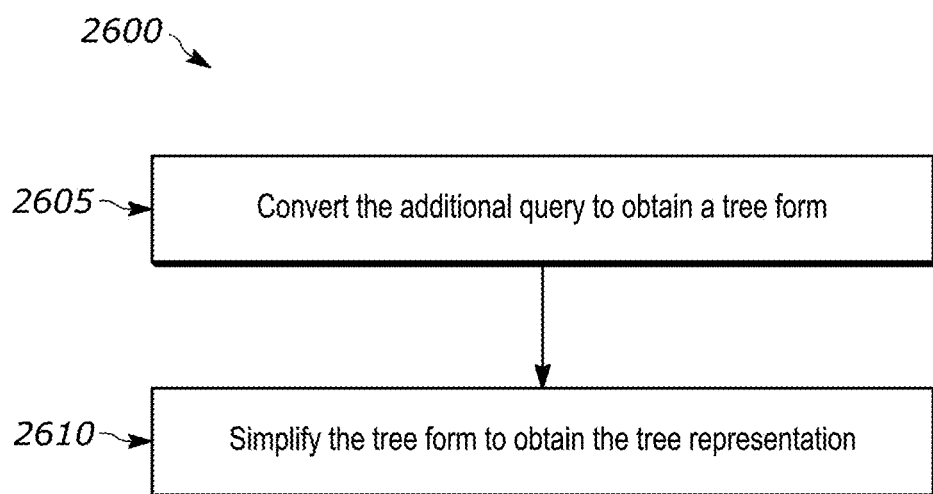
FIG. 26 illustrates a flowchart showing an example process used during the processes of FIGS. 18 and 19 for converting additional filter logic associated with a query graph into a tree representation, according to embodiments of the present technology.

Referring to FIG. 26, an example flowchart outlining operations of a process 2600 is shown, in accordance with some embodiments of the present disclosure. The process 2600 describes the operation 1820 in greater detail. The process 2400 may be used to convert each additional query (e.g., Equation 1) associated with the query graph 1615 into a tree representation. The tree representation represents or converts the additional query into a standardized form. The process 2600 may be executed by one or more processors (e.g., the processor 1430) associated with the pattern matching application 1435. Thus, the process 2600 may be executed responsive to the processor determining that the query graph 1615 includes one or more additional queries. The process 2600 may include other or additional operations depending upon the particular embodiment. The process 2600 may be repeated for each additional query associated with the query graph 1615.

To convert an additional query into a tree representation, at operation 2605, the processor converts the additional query into a tree form. In particular, the processor may convert the algebraic filter logical expressions in the additional query into a tree having one or more nodes and one or more edges connecting the nodes. In some embodiments, the tree form may be a directed acyclic graph (DAG). A DAG includes a plurality of nodes or vertices representing variables and connected by edges representing relationships between the connected nodes. The edges of a DAG are directed (e.g., have direction). The operation 2605 is described in greater detail in FIGS. 27 and 28. At operation 2610, the processor simplifies the tree form of the operation 2605 to obtain the tree representation of the operations 1820 and 1950. In some embodiments, the processor may simplify the tree form by deleting one or more nodes and/or one of more edges from the tree form while preserving any symmetry in the additional query. In some embodiments, the processor may simplify the tree form by adding one or more edges to the tree form. The operation 2610 is described in greater detail in FIGS. 29-30C.

The process 2600 may be executed whether the additional query has symmetry or not. Specifically, the additional query may be an algebraic expression. Symmetry in algebraic expressions may be defined by the ability to permute (e.g., change) the names of symbols to obtain an equivalent expression. For example, an algebraic expression a+b=0 has two way symmetry because all instances of variable a may be turned into variable b and all instances of variable b may be turned into variable a to obtain an equivalent expression of b+a=0. As another example, the algebraic expression a+b=b*b is not symmetric because remapping the variables (e.g., variable a into variable b and variable b into variable a) will result in b+a=a*a which is not equivalent to a+b=b*b. In some embodiments, the presence of symmetry in the additional query may be determined by inspecting the additional query. In some embodiments, computations tools may be used that detect symmetry in mathematical expressions. However, identification or determination of symmetry in the additional query is not needed. The process 2600 may be executed regardless of whether the additional query has symmetry or not.

Figure 27:
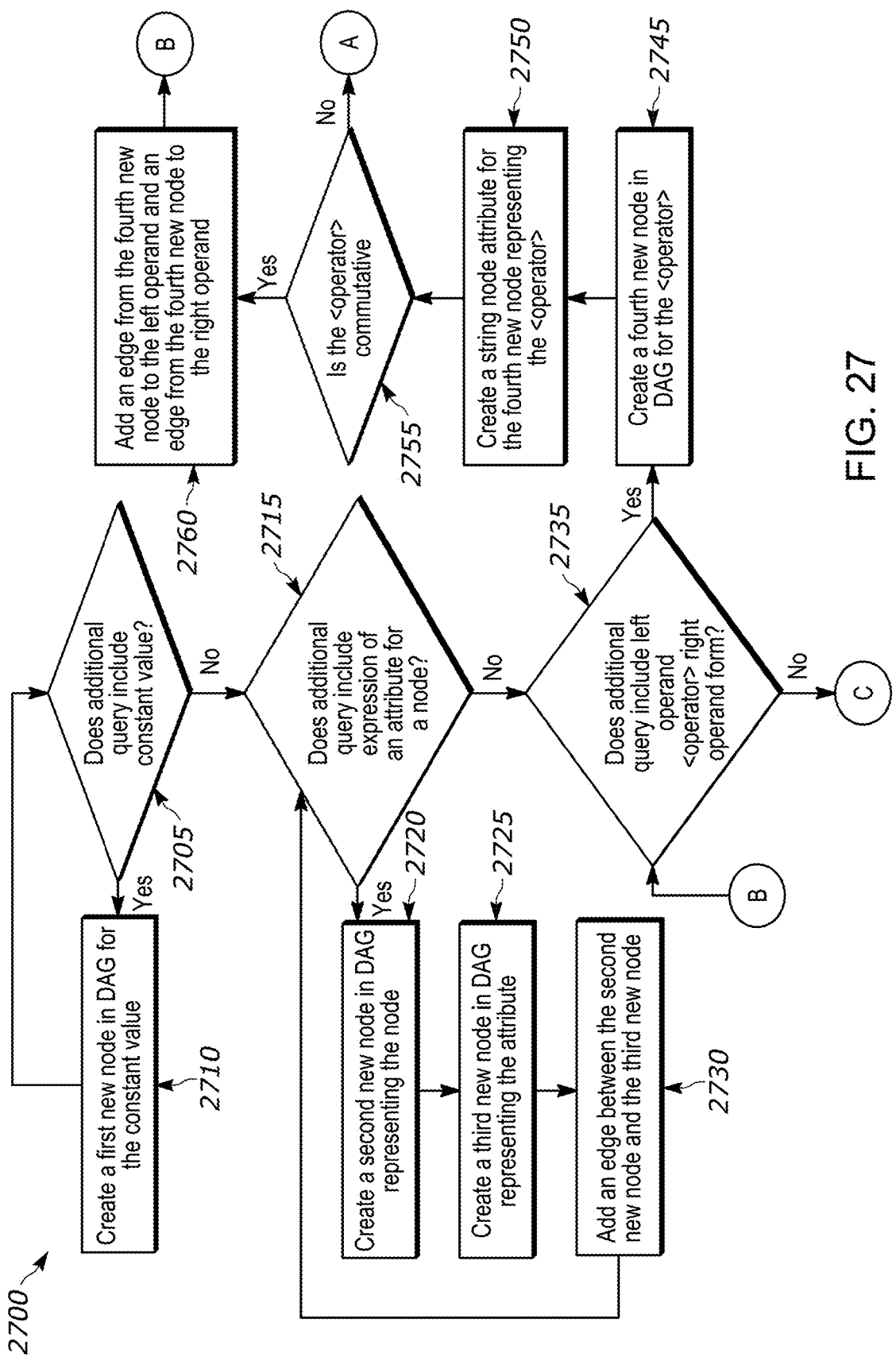
FIG. 27 illustrates a flowchart showing an example process used during the process of FIG. 26 for converting the additional filter logic into a tree form, according to embodiments of the present technology.
Figure 27:
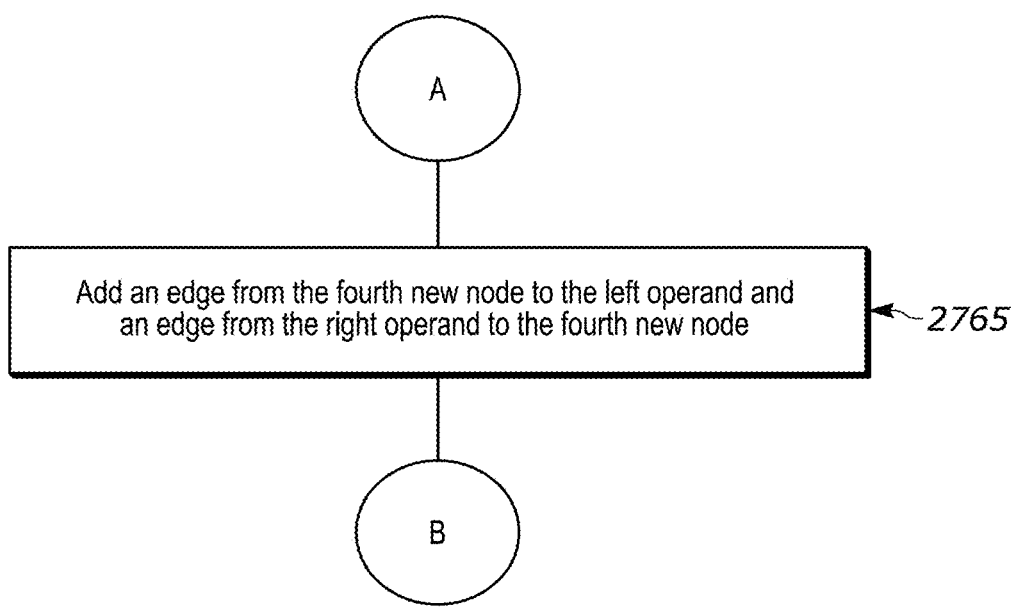
Figure 27:
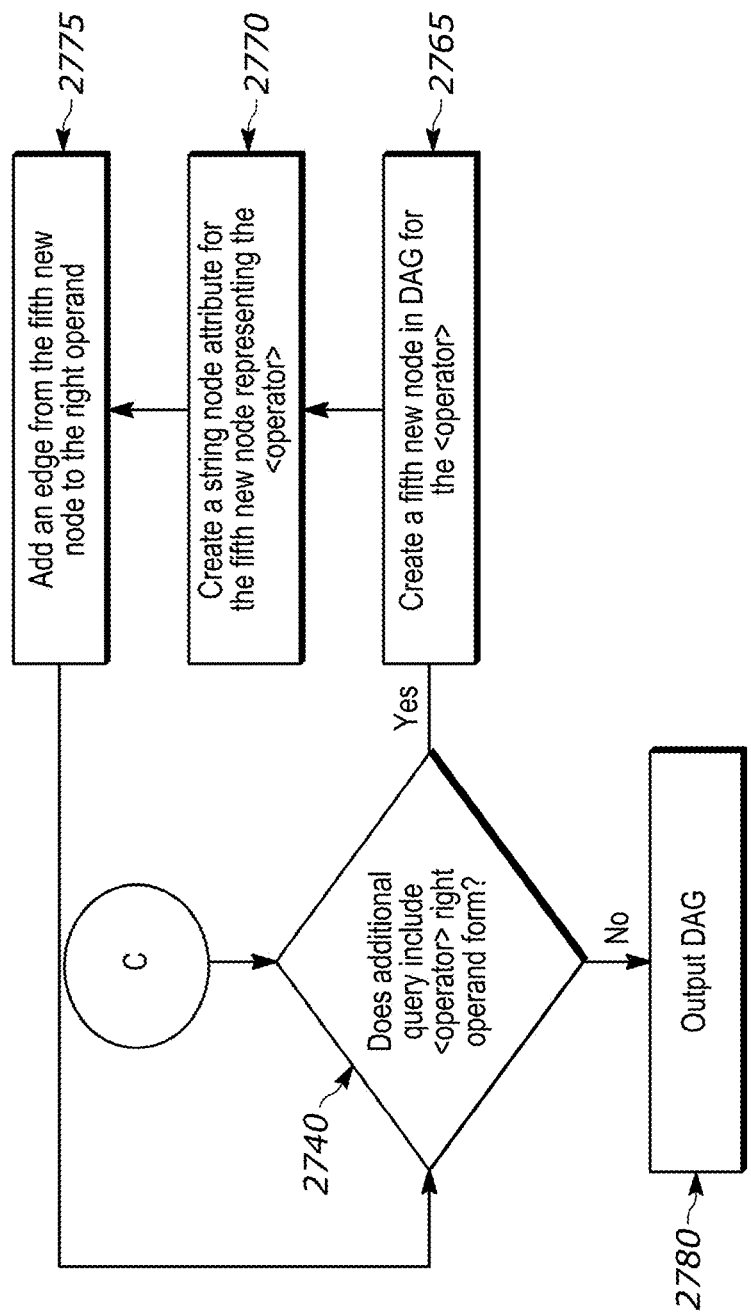

Turning to FIG. 27, an example flowchart outlining operations of a process 2700 is shown, in accordance with some embodiments of the present disclosure. The process 2700 describes the operation 2605 in greater detail. The process 2700 may, thus, be used to convert an additional query associated with a query graph (e.g., the query graph 1615) into a tree form, and particularly, into a DAG form. The process 2700 may be executed by one or more processors (e.g., the processor 1430) associated with the pattern matching application 1435. The process 2700 may include other or additional operations depending upon the particular embodiment.

Figure 28:
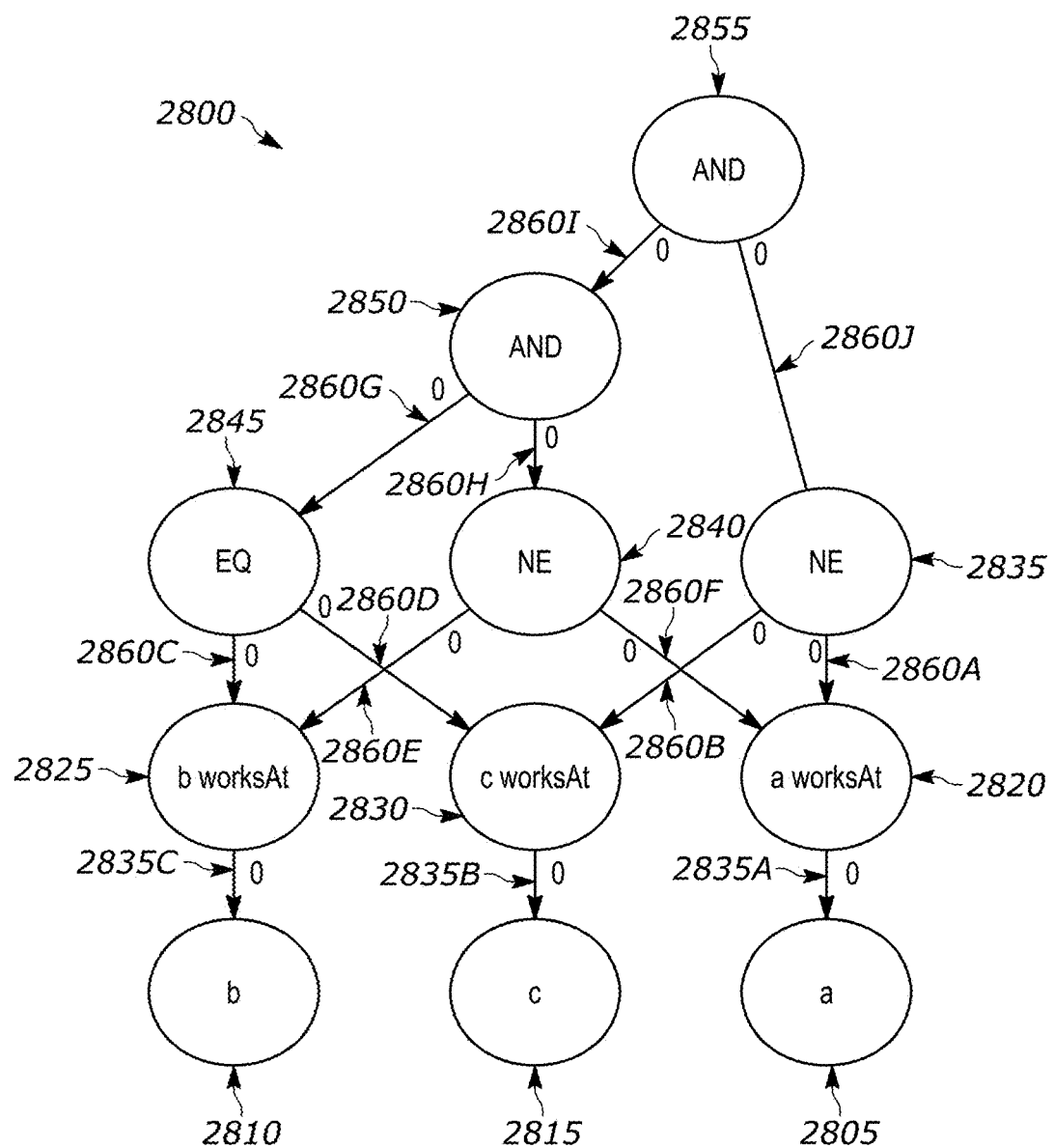
FIG. 28 illustrates an example showing conversion of an example additional filter logic converted into a tree form using the process of FIG. 27, according to embodiments of the present technology.

The process 2700 is explained in conjunction with FIG. 28 that shows a DAG 2800 for the additional query of Equation 1:a.worksAt!=c.worksAt AND b.worksAt== c.worksAt AND a.worksAt!=b.worksAt for the query graph 1615.

The process 2700 may begin with an empty DAG (e.g., DAG with no nodes and no edges). Thus, at the beginning of the process, the DAG 2800 may be empty. Depending on the additional query, nodes and edges may be added to the DAG. Thus, at operation 2705, the processor determines if the additional query includes a constant value. A constant value may be any numerical value in the additional query that is fixed or does not change. The additional query of Equation 1 does not have a constant value. If Equation 1 had a constant value, at operation 2710, the processor would create a first new node in the DAG for each constant value. Since the additional query of Equation 1 has no constant values, the processor does not create any new nodes in the DAG and proceeds to operation 2715.

At the operation 2715, the processor determines if the additional query includes a node expression of an attribute. The additional query of Equation 1 includes the following expressions of attributes for nodes a, b, and c, respectively: a.worksAt, b.worksAt, and c.worksAt. Responsive to determining that the additional query includes a node expression of an attribute, at operations 2720 and 2725, the processor creates a second new node and a third new node in the DAG, the second new node representing the node associated with the node expression and the third new node representing the attribute of the node expression. Thus, the processor may create a new node for each node that includes an expression of an attribute in the additional query and a new node for each expression of the attribute. For example, and referring to FIG. 28, the processor may create nodes 2805-2830. The nodes 2805-2815 represent the nodes a, b, and c in the additional query and constitute the second new node of the operation 2720. The nodes 2820-2830 represent the expression of the attribute associated with the nodes a, b, and c and constitute the third new node of the operation 2725.

At operation 2730, the processor creates an edge between the second new node and the third new node. In particular, the processor creates an edge from the third node (e.g., the expression of the attribute) to the second node (e.g., the node). For example, the processor creates an edge 2835A between the nodes 2805 and 2820, an edge 2835B between the nodes 2815 and 2830, and an edge 2835C between the nodes 2810 and 2825. Each of the edges 2835A-2835C are directed from the nodes 2820-2830 towards the nodes 2805-2810. Further, each of the edges 2835A-2835C may have an edge attribute that is represented in the example of FIG. 28 as a number 0. In other embodiments, another number or another edge attribute may be used. All edges that are in the same direction have the same edge attribute.

If, at the operation 2715, the processor determines that the additional query includes no node expression of attributes (or upon creating the second node, third node, and edge for all node expressions of attributes), the process 2700 proceeds to operation 2735. At the operation 2735, the processor determines if the additional query includes a left operand <operator> right operand form. The operand may be any numerical or variable operand. The operator may be any associative, transitive, commutative, or logical comparison operator. An associative operator may be defined as any operator for which other operators of the same precedence may be concatenated without parenthesis. Examples of associative operator may include addition, subtraction (e.g. inverted addition), multiplication, division (e.g. inverted multiplication), logical AND, and logical OR. A transitive operator may be defined as any operator <OP> such that a <OP> b AND b <OP> c implies a <OP> c. Examples of a transitive operator may include equals, less than, and greater than. A commutative operator may be defined as any operator for which swapping the operands does not change the meaning of the expression. Examples of a commutative operator include addition and multiplication. A logical comparison operator pair may be defined as a pair of operators OP1, OP2, such that a OP1 b AND b OP2 c implies a OP1 c. Examples of a logical comparison operator pair include (greater than, equals), (less than, equals), (greater than or equal to, equals), (less than or equal to, equals), (not equals, equals), (equals, equals).

Thus, the processor may determine that the additional query of Equation 1 includes the following expressions having the left operand <operator> right operand form:

a.worksAt!=c.worksAt
b.worksAt==c.worksAt
a.worksAt!=b.worksAt
a.worksAt!=c.worksAt AND b.worksAt==c.worksAt
b.worksAt==c.worksAt AND a.worksAt!=b.worksAt The operators in the above expressions include one instance of equal (==), two instances of not equal (!=), and two instances of logical AND. Responsive to determining that the additional query comprises a left operand <operator> right operand form, the processor creates a fourth new node in the DAG 2800 for each <operator> at operation 2745. For example, the processor may create nodes 2840-2855 for each operator in the DAG 2800. In particular, the processor creates the node 2835 for one instance of the not equal operator and the node 2840 for the other instance of the not equal operator. The processor also creates the node 2845 for the equal operator. The nodes 2850 and 2855 representing the two instances of the AND operator are higher up in the DAG (e.g., closer to the root) because they connect the expressions connected by the equal and not equal operators. Each of the nodes 2840-2855 may be a fourth new node that is created at the operation 2745.

At operation 2750, the processor creates a string node attribute for the fourth new node representing the <operator> of the operation 2745. In particular, when the fourth new node is created, that node may be represented by the mathematical operator (e.g., ==, !=). At the operation 2750, the mathematical operator may be assigned a string node attribute that defines the mathematical operator. Thus, the ==mathematical operator may be converted into a string operator EQ. The !=mathematical operator may be converted into a string operator NE. The logical AND operator is already in string form, so no conversion is needed. At operation 2755, the processor determines if an operator in the DAG 2800 is commutative. For example, for each of the nodes 2840-2855, the processor may determine if the operator represented by those nodes is a commutative operator. If an operator is commutative, at operation 2760, the processor adds an edge from the fourth new node of the operation 2745 to the left operand and an edge from the fourth nee node of the operation 2745 to the right operand.

Thus, the processor may determine that each of the operators represented by the nodes 2835-2855 is commutative. Thus, the processor may add an edge from the operator node to the left and right operands represented by the nodes 2350-2830. For example, to represent the expression a.worksAt!=c.worksAt, the processor may add an edge 2860A from the node 2835 to the node 2820 and an edge 2860B from the node 2835 to the node 2830. To represent the expression b.worksAt==c.worksAt, the processor may add an edge 2860C from the node 2845 to the node 2825 and an edge 2860D from the node 2845 to the node 2830. To represent the expression a.worksAt!=b.worksAt, the processor may add an edge 2860E from the node 2840 to the node 2825 and an edge 2860F from the node 2840 to the node 2820. To represent the expression a.worksAt!=c.worksAt AND b.worksAt==c.worksAt, the processor may add an edge 2860G from the node 2850 to the node 2845 and an edge 2860H from the node 2850 to the node 2840, while to represent the expression b.worksAt==c.worksAt AND a.worksAt!=b.worksAt, the processor may add an edge 2860I from the node 2855 to the node 2850 and an edge 2860J from the node 2855 to the node 2835. Responsive to adding these edges, the process 2700 loops back to the operation 2735 and proceeds to operation 2740.

On the other hand, if at the operation 2755 the processor determines that an operator is not commutative, then at operation 2765, the processor adds an edge from the fourth new node of the operation 2745 to the left operand and an edge from the right operand to the fourth nee node of the operation 2745. The additional query of Equation 1 has no non-commutative operators. However, if there was, the direction of an edge would be reversed (and a different edge attribute would be assigned to that edge). The process 2700 then returns to the operation 2735.

At the operation 2740, the processor determines if the additional query includes an <operator> right operand form. For example, the operation 2740 may be executed for a logical NOT operator. The right operand may be any numerical or variable operand. Responsive to determining that the additional query includes an <operator> right operand form, at operation 2765, the processor creates a fifth new node in the DAG for the <operator> of the operation 2740. The operation 2765 is similar to the operation 2745. At operation 2770, which is similar to the operation 2750, the processor creates string node attribute for the fifth new node representing the <operator> of the operation 2740. At operation 2775, the processor adds an edge from the fifth new node created at the operation 2765 to the right operand. The operations 2765-2775 are repeated for each <operator> right operand form. When no <operator> right operand form is remaining, the final DAG is output at operation 2780.

An example pseudocode for the process 2700 may be as follows:

Input: Algebraic filter expression Expr
Output: Directed Acyclic Graph (DAG) D
Define a recursive subroutine f(E) {
  if E is a constant expression:
    output DAG with a single node representing the constant value
  else if E is an expression of an attribute Attr for some node N:
    Let D' be an empty DAG
    Add node N to D'
    Add node A to D' that represents Attr of node N
    Add edge (A, N) to D'
    output D'
  else if E is of the form <OP> right
    Let R be the right-hand side of E
    Let DAG D'=f(R)
    Create a unique node Op in D' to represent the operator of E
    Create an attribute on Op whose value is a string representation of the operator
    Add the edge (Op, root (D'))
  else://E is of the form left <OP> right
    Let L and R be the left- and right-hand side of E, respectively
    Let DAG D_1=f(L), DAG D_r=f(R)
    Let D'=union (D_1, D_r)
    Create a unique node Op in D' to represent the operator of E
    Create an attribute on Op whose value is a string representation of the operator
    Add the edge (Op, root(D_1))
    if Op represents a commutative operator:
      Add the edge (Op, root(D_r)) to D'
    else:
      Add the edge (root(D_r), Op) to D'
        output D'
}
Output f(Expr)

Figure 29:
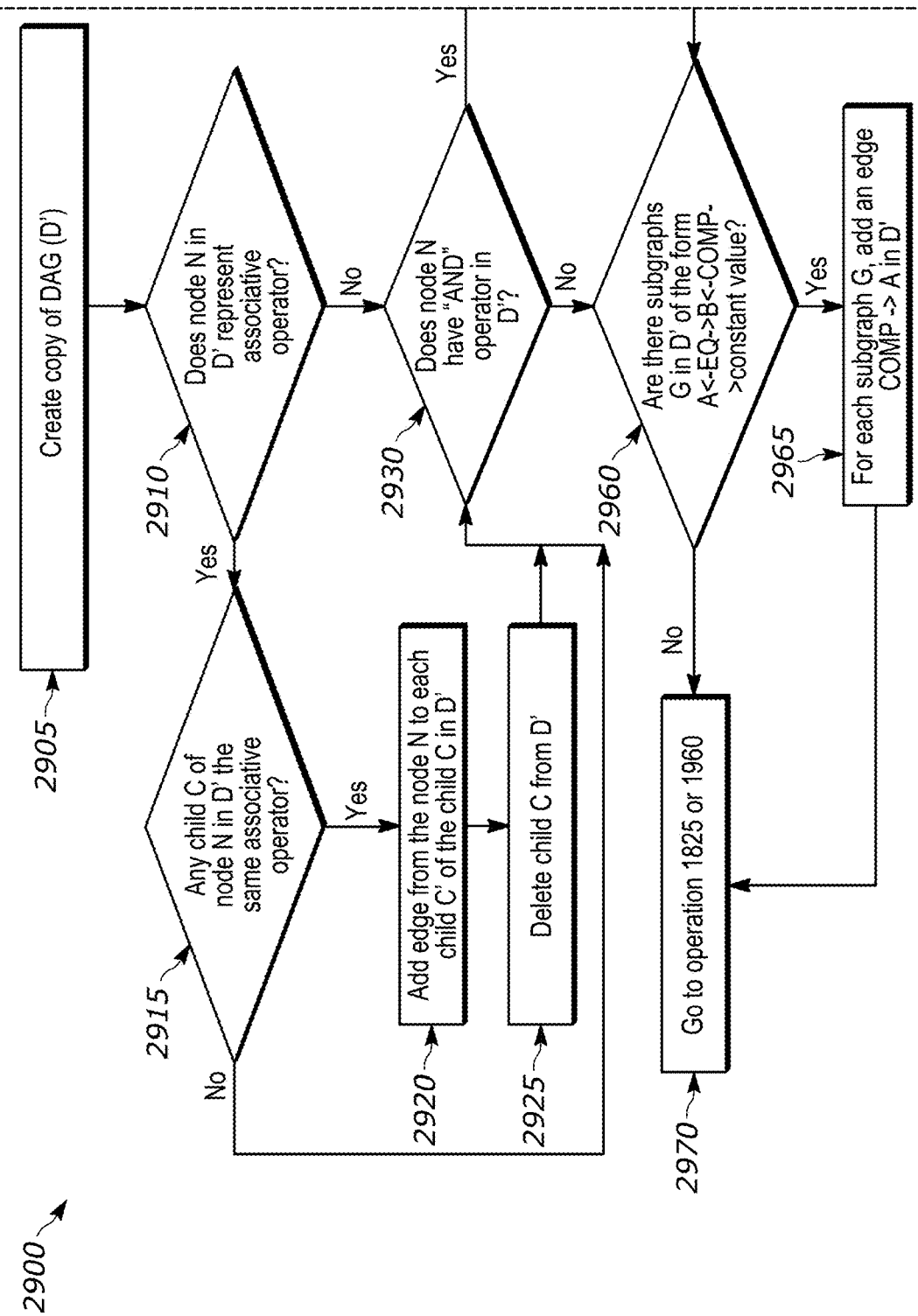
FIG. 29 illustrates a flowchart showing an example process for converting the tree form of FIG. 27 into a tree representation, according to embodiments of the present technology.
Figure 29:
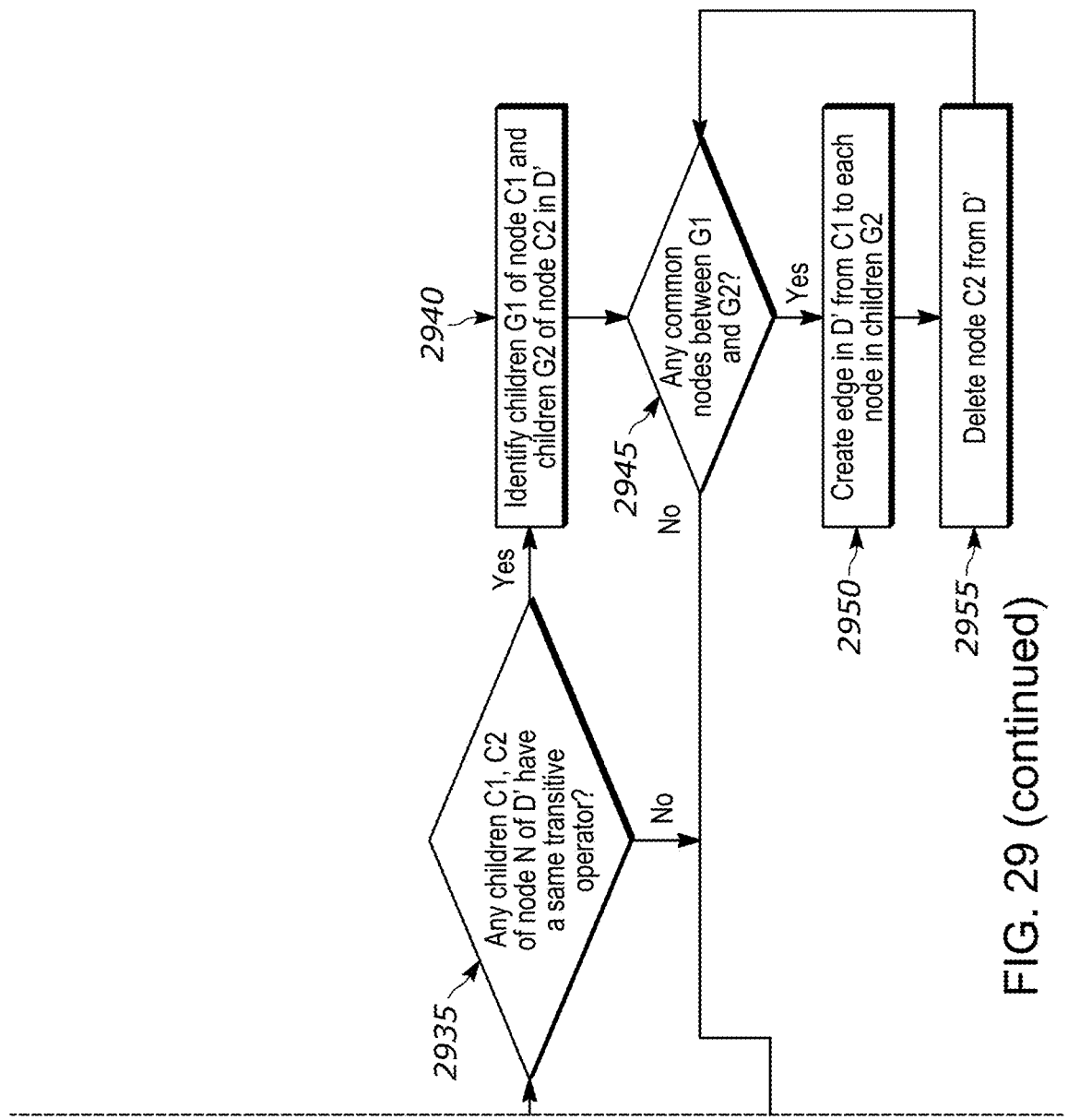

Turning to FIG. 29, an example flowchart outlining operations of a process 2900 is shown, in accordance with some embodiments of the present disclosure. The process 2900 describes the operation 2610 in greater detail. The process 2900 may, thus, be used to simplify the DAG form of the process 2700 to obtain a tree representation. Simplifying the DAG form means converting the DAG form into a standard form. The process 2900 may be executed by one or more processors (e.g., the processor 1430) associated with the pattern matching application 1435. The process 2900 may include other or additional operations depending upon the particular embodiment. The process 2900 is discussed in conjunction with FIGS. 30A-30C.

The process 2900 begins at operation 2905 by creating a copy of the DAG of the operation 2740. The DAG of the operation 2740 is referred to herein as D and the copy of D created at the operation 2905 is referred to herein as D'. For example, the processor may create a copy of the DAG 2800 at the operation 2905. At operation 2910, the processor determines if any node N in D' represents an associative operator. Thus, in the copy of the DAG 2800, the processor may determine that the nodes 2850 and 2855 represent an associative operator. For each associative operator in D', the processor executes operations 2915-2925. At the operation 2915, the processor determines if any child node C of the node N has the same associative operator as the node N. For example, the processor may determine that the child nodes of the node 2855 are the nodes 2850 and 2835, while the child nodes of the node 2850 are the nodes 2845 and 2840. At the operation 2915, the processor may determine if any of the nodes 2850 and 2835 have the same associative operator as the node 2855 and if any of the nodes 2845 and 2840 have the same associative operator as the node 2850. The processor may determine that the node 2850 has the same associative operator AND as the node 2855.

Figure 30A:
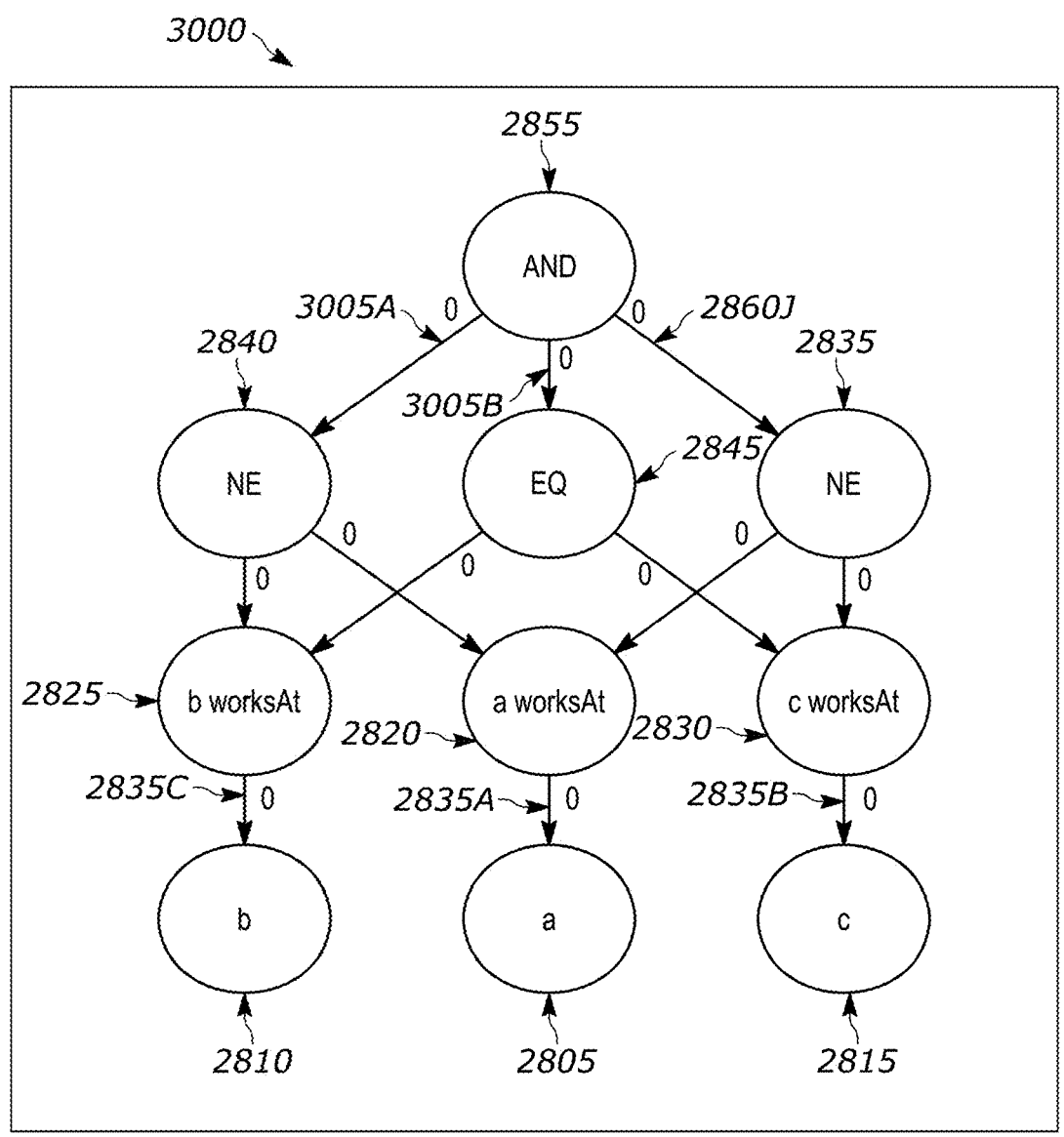
FIGS. 30A-30C illustrate examples showing conversion of an example tree form to a tree representation using the process of FIG. 29, according to embodiments of the present technology.

Responsive to determining that a child node C of the node N has the same associative operator as the node N, at the operation 2920, the processor adds an edge from the node N to each child C' of the child C in D' and deletes the child node C at the operation 2925 from D'. For example, the processor may determine that the nodes 2845 and 2840 are child nodes C' of the node 2850 (e.g., the child node C). Thus, the processor may add an edge directly from the node 2855 to each of the nodes 2845 and 2840 and deletes the node 2850 from D'. FIG. 30A shows the result of the operations 2705-2730. For example, FIG. 30A shows a final D' 3000 after the process 2900 has been executed. In the final D' 3000, the node 2850 and edges 2860G and 2860H are deleted and new edges 3005A and 3005B are added between the node 2855 and the nodes 2845 and 2840.

If the processor determines that D' does not include an associative operator or after each associative operator has executed the operations 2915-2925, at operation 2930 the processor determines if any node N in D' represents an AND operator. For example, in the final D' 3000, after execution of the operations 2915-2925, the processor may determine that the final D' includes the node 2855 which represents an AND operator. Thus, the processor may execute operations 2935-2955. At the operation 2940, responsive to determining that D' includes a node N with an AND operator, the processor identifies the children C1 and C2 of the node N in D' have the same transitive operator. Thus, the processor may identify the children of the node 2855 as the nodes 2835-2845. Of the nodes 2835-2845, only one node (e.g., the node 2845) has a transitive operator. Thus, there are no children nodes C1 and C2 with the same transitive operator. However, to demonstrate how the operation would execute if the two nodes had the same transitive operator, the explanation below assumes that the nodes 2840 (e.g., C1) and 2845 (e.g., C2) both represent the equal operator. Thus, the processor may determine that there are children of the node N (e.g., the node 2855) that have the same transitive operator (e.g., equal).

Responsive to determining that the node N has children C1 (e.g., the node 2840) and C2 (e.g., the node 2845) having the same transitive operator (e.g., equal), at the operation 2940, the processor identifies the children G1 of C1 and the children G2 of C2 in D'. For example, the processor may determine that the nodes 2825 and 2820 are the children G1 of the node 2840 (e.g., C1) and the nodes 2825 and 2830 are the children G2 of the node 2845 (e.g., C2). At the operation 2945, the processor then determines if there are any common nodes between G1 and G2. For example, the processor may determine that the node 2825 appears in both G1 and G2. Thus, if the node 2840 represented an equal operator, at the operation 2950, the processor would create an edge in D' from the node C1 (e.g., the node 2840) to each node that is in G2 (e.g., the nodes 2825 and 2830). At the operation 2955, the processor deletes the node C2 from D'. Thus, the processor may delete the node 2845 in the example above. The operations 2945-2955 repeat for each node that is common between G1 and G2. When there are no common nodes between G1 and G2, the process 2900 proceeds to operation 2960.

Figure 30B:
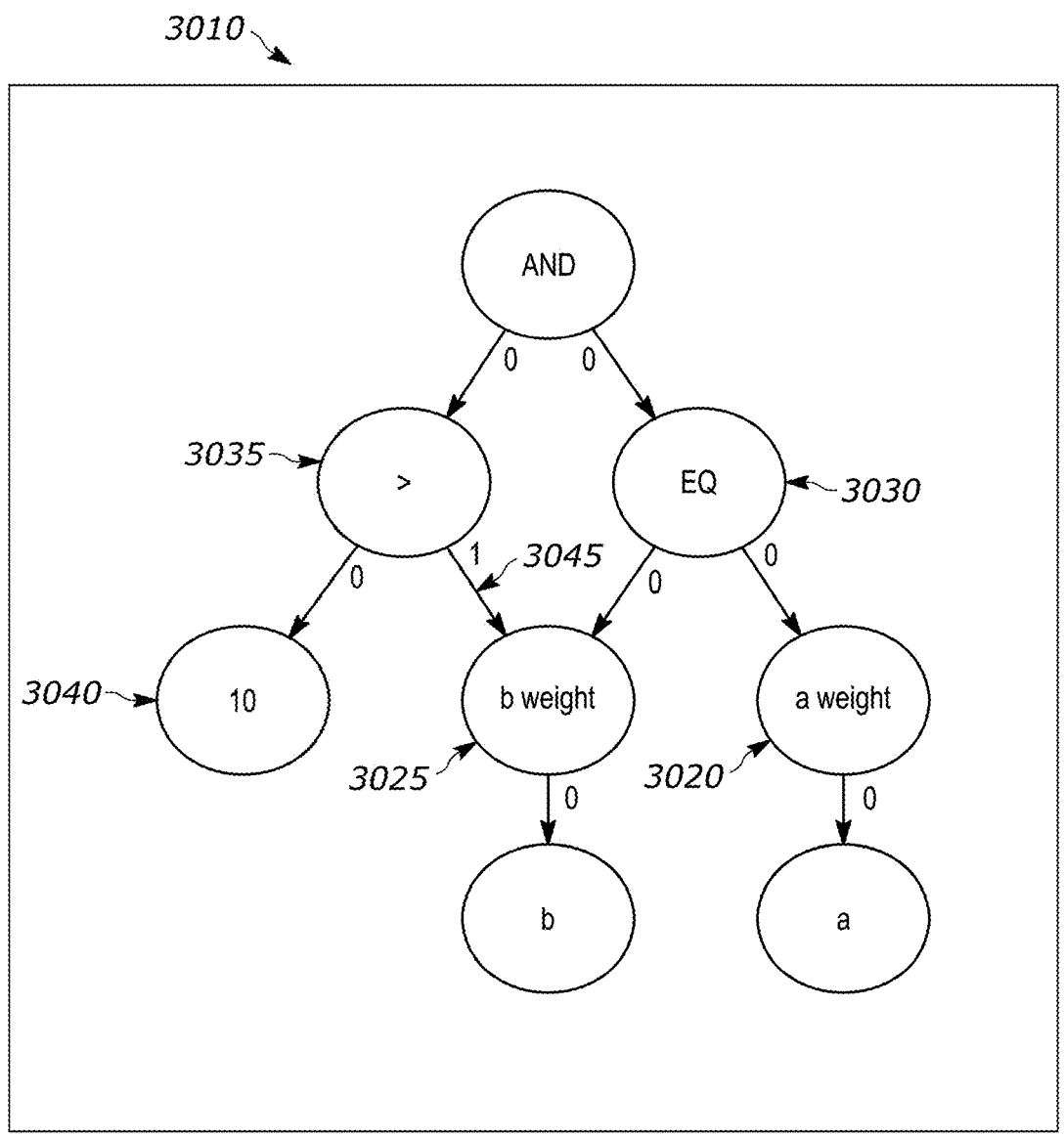
Figure 30C:
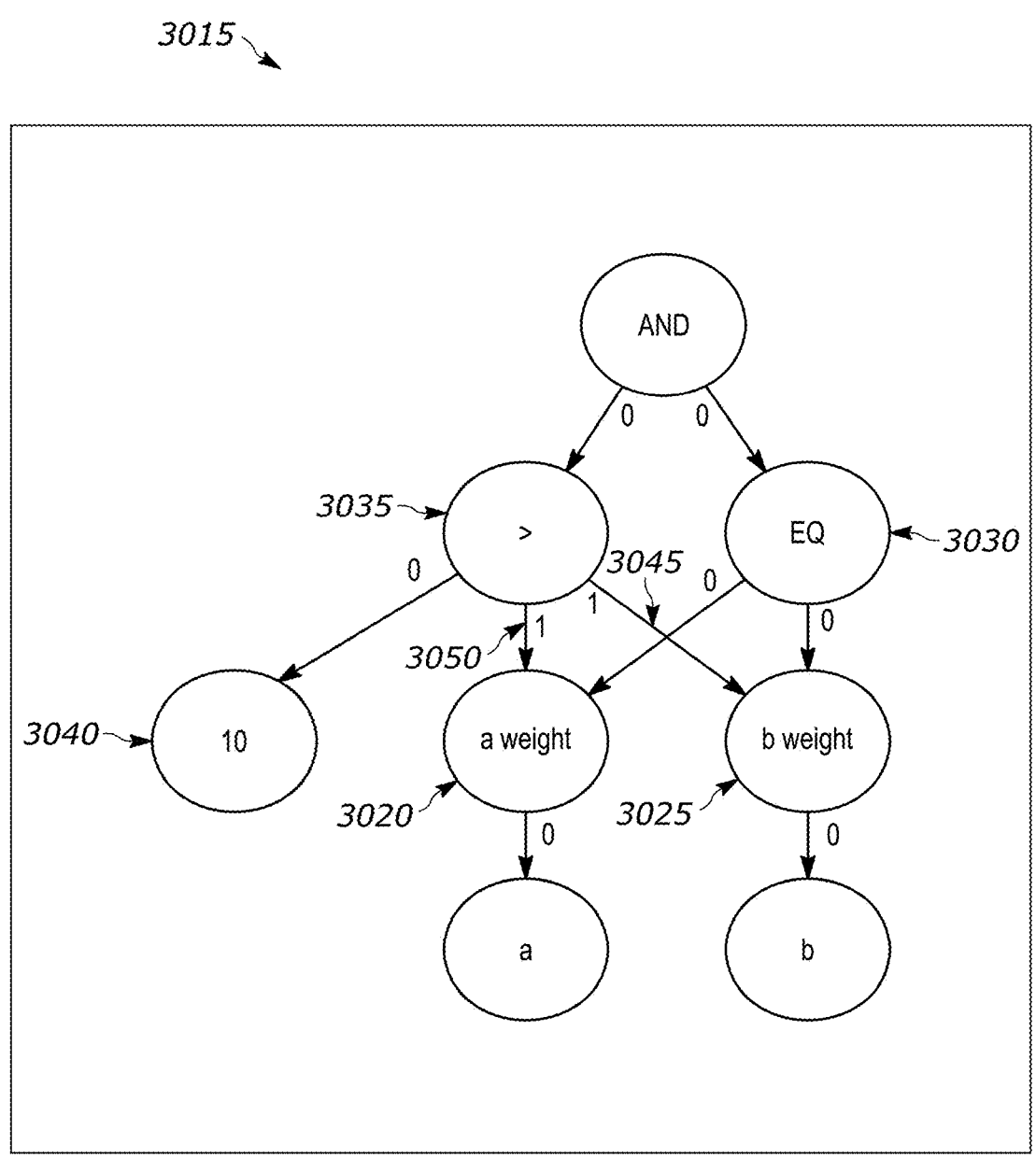

The operation 2960 is reached from the operation 2945 or the operation 2935 when no children of the node N have the same transitive operator or from the operation 2930 when there are no nodes in D' that have an AND operator. At the operation 2960, the processor determines if the additional query includes a logical comparison operator. For example, the processor may determine if there are any subgraphs in D' of the form Node A <EQ> Node B <COMP> constant value. Node A and Node B are nodes in D', COMP is any logical comparison operator such as greater than or less than, and EQ is transitive operator. If so, at operation 2965, the processor adds an edge between COMP and Node A. For example, referring to FIGS. 30B and 30C, FIG. 30B shows an example DAG 3010 (D) and FIG. 30C shows a simplified DAG 3015 (D'). At the operation 2960 the processor may identify that the DAG 3010 includes a subgraph including Node A 3020, Node B 3025, EQ node 3030, a COMP node 3035, and a constant value node 304 that satisfies the form of the operation 2960. Thus, at the operation 3965, the processor may add an edge 3045 from the COMP node 3035 to the A node 3020. The number 1 on the edge 3045 and edge 3050 indicate the reverse direction of those edges. Responsive to adding the edge at the operation 2965, the process 2900 proceeds to the operations 1825 or 1960 (depending on which process is being executed). An example pseudocode for the process 2900 may be as follows:

Input: Directed Acyclic Graph (DAG) D that represents of an algebraic expression
Output: A simplified DAG D'
Let D' be a copy of D
for each node N in D':
  if N represents an associative operator:
    for each child C of N that represents the same operator:
      Add the edge (C', N) for each child C' of C
      Remove node C from D'
  if N represents the 'AND' or 'OR' operator:
    for each pair of nodes C1, C2 in children (N) that represent the same transitive operator:
      Let G1, G2 be the children of C1 and C2, respectively

```
if intersection (G1, G2) is not empty:
    Create an edge from C1 to each node in G2
    Remove node C2 from D'
Let P be the subgraphs in D' of the form: A<-EQ->B<-
    COMP->O where COMP is any logical comparison
    operator
For each g in P:
    Add the edge (COMP->A) in D'
output D'
```

Figure 31A:
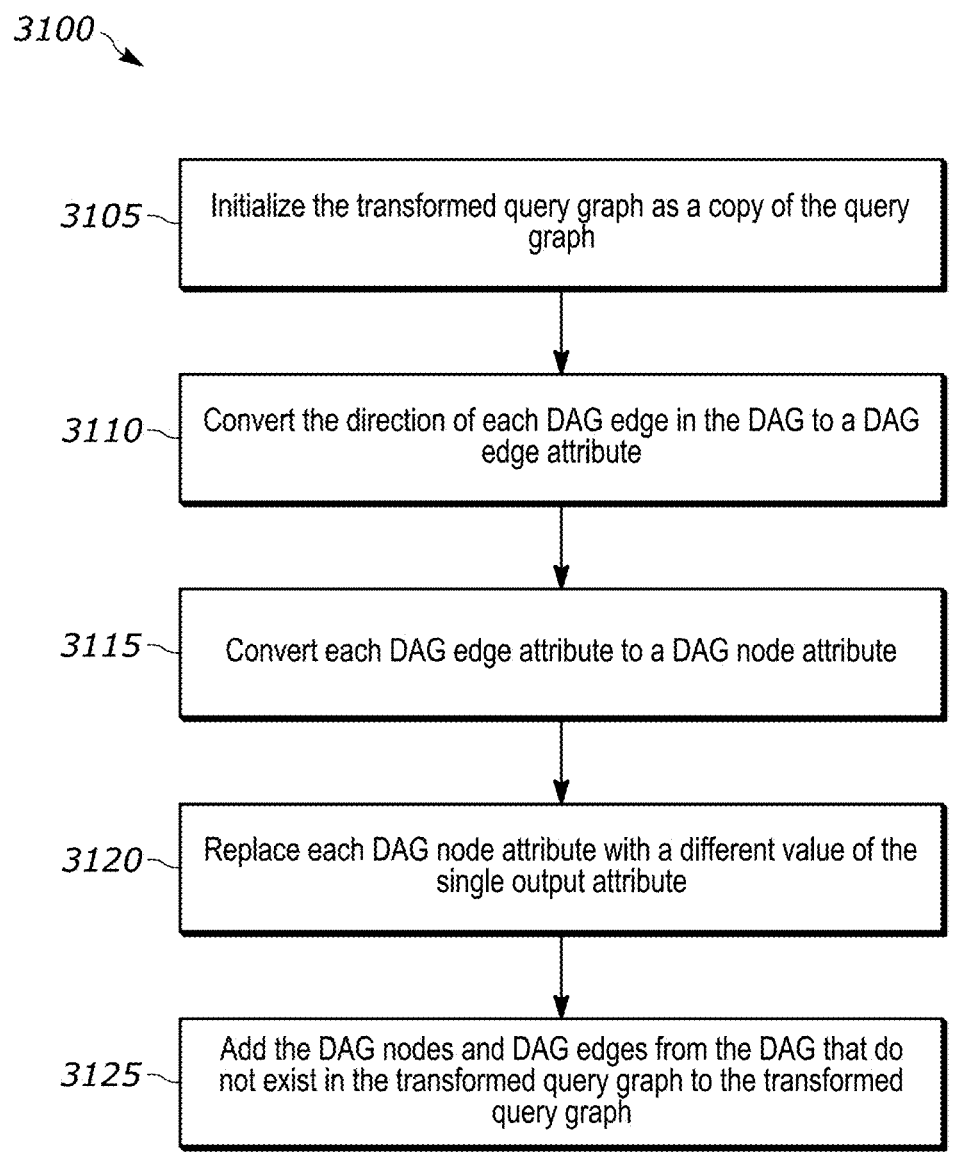
FIG. 31A illustrates a flowchart showing an example process used during the processes of FIGS. 18 and 19 for combining the tree representation of FIG. 29 with a query graph to obtain a transformed query graph, according to embodiments of the present technology

Turning now to FIG. 31A, an example flowchart outlining operations of a process 3100 is shown, in accordance with some embodiments of the present disclosure. The process 3100 describes the operation 1825 in greater detail. The process 3100 may, thus, be used to combine the simplified DAG of the operation 2900 with the third transformed query graph of the operation 1820. The process 3100 may be executed by one or more processors (e.g., the processor 1430) associated with the pattern matching application 1435. The process 3100 may include other or additional operations depending upon the particular embodiment. The process 3100 is discussed in conjunction with FIG. 31B.

At operation 3105, the processor initializes the transformed query graph as a copy of the query graph (e.g., the third transformed query graph). In other words, the processor may create a copy of the query graph (e.g., the third transformed query graph) as the transformed query graph. At operation 3110, the processor converts the direction of each DAG edge in the DAG of the process 2900 (e.g., the DAG 3015) to a DAG edge attribute. In some embodiments, the DAG edge attribute may be different from the output attribute. At operation 3115, the processor converts each DAG edge attribute into a DAG node attribute (e.g., using the process 2200). At operation 3120, the processor replaces each different DAG node attribute with a different value of the single output attribute (e.g., similar to the operation 2010). At operation 3125, the processor adds the DAG nodes and DAG edges from the DAG that are not in the initialized transformed query graph of the operation 3105 to the transformed query graph.

Figure 31B:
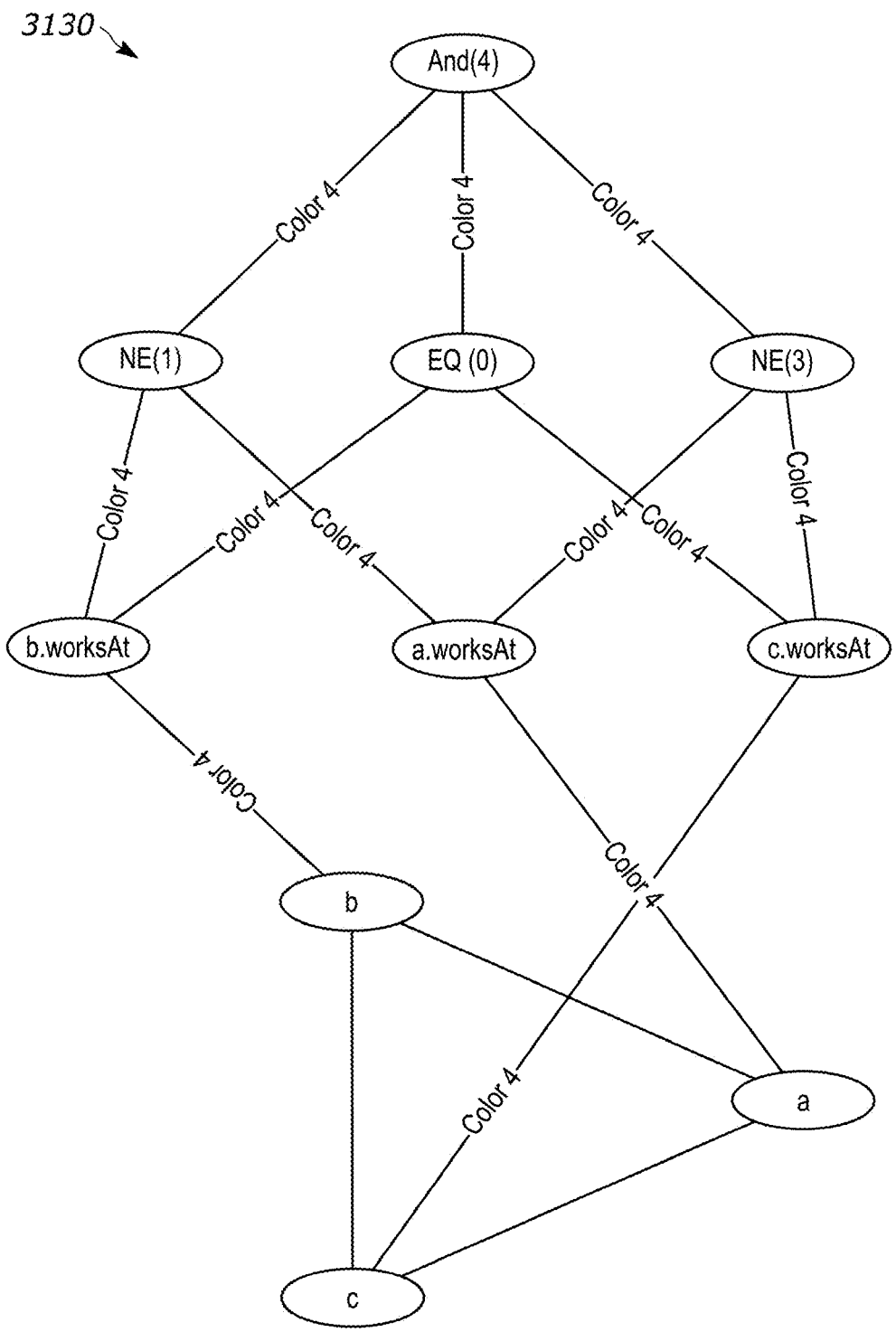
FIG. 31B illustrates an example showing a transformed query graph, according to embodiments of the present technology.

FIG. 31B shows an example of a transformed query graph 3130. The transformed query graph 3130 is obtained by combining the DAG 3000 with a query graph (e.g., the third transformed query graph) having nodes a, b, and c. Each edge attribute (e.g., the number 0) of the DAG 3000 is converted into a value of the single output attribute (e.g., color) and the nodes are added to the query graph.

Figure 32:
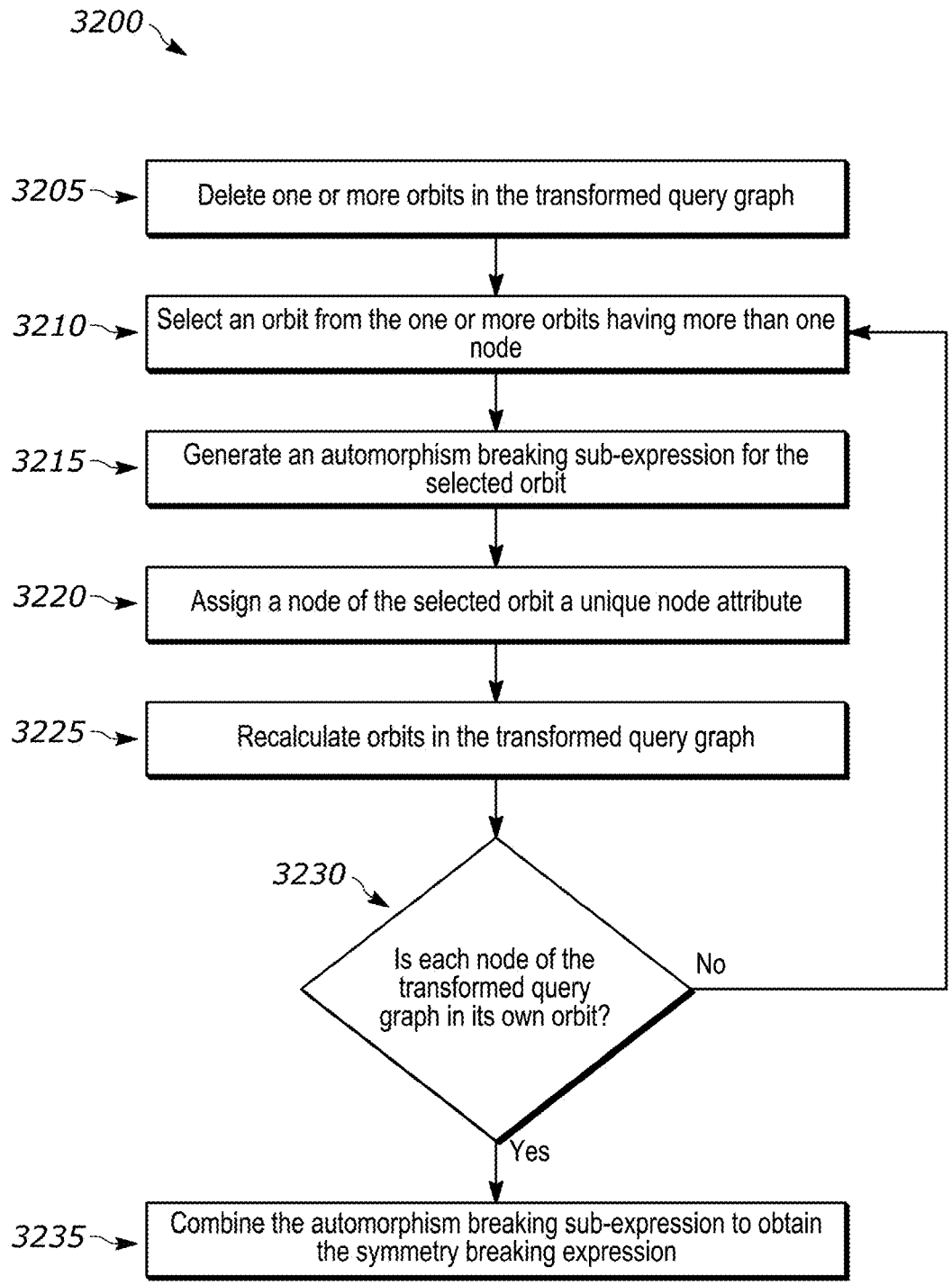
FIG. 32 illustrates a flowchart showing an example process used during the process of FIG. 17 for generating a symmetry breaking expression for a query graph, according to embodiments of the present technology.

Referring to FIG. 32, an example flowchart outlining operations of a process 3200 is shown, in accordance with some embodiments of the present disclosure. The process 3200 describes the operation 1710 in greater detail. The process 3200 may, thus, be used to generate a symmetry breaking expression from the transformed query graph of the operation 1705. In some embodiments, if the query graph 1615 only has topology (e.g., no node or edge attributes, no multiple edges, and no additional queries), then the process 3200 may be applied to directly to the query graph 1615. In other embodiments, if the query graph 1615 has any attribute (e.g., node attribute, edge attribute, multiple edges, additional query), then the query graph 1615 may be transformed using the process 1705 to obtain the transformed query graph and the transformed query graph may be used to generate the symmetry breaking expression using the process 3200. For explanation purposes only, the process 3200 is described using the transformed query graph. However, the same explanation applies to the query graph 1615 when the operation 1705 is not executed.

The process 3200 may be used to iteratively build the symmetry breaking expression by finding orbits and introducing unique node attributes in the transformed query graph of the operation 1705. The symmetry breaking expression that is generated may be used to break symmetry in the query break 1615 with significant precision (e.g., 100% or close precision) and having no false positives or false negatives. The process 3200 may be executed by one or more processors (e.g., the processor 1430) associated with the pattern matching application 1435. The process 3200 may include other or additional operations depending upon the particular embodiment.

To iteratively build the symmetry breaking expression, at operation 3205, the processor detects one or more orbits in the transformed query graph. An orbit may be indicative of automorphism in the transformed query graph. Automorphism in a graph is a form of symmetry in which the graph may be mapped onto itself while preserving the edge-vertex connectivity. Automorphism preserves the structure of a graph. By detecting automorphisms in the transformed query graph, the symmetry breaking expression may be generated. In some embodiments, the processor may detect automorphisms in the transformed query graph using an automorphism detector tool such as Nauty. In other embodiments, the processor may use other automorphism detectors or detect automorphism in other ways.

In some embodiments, one or more nodes of the transformed query may fall under an automorphism group or orbit. In particular, an orbit may refer to one or more nodes in a graph that behave similarly under symmetrical transformations. In other words, orbits may be considered symmetric groupings of one or more nodes in a graph. Two nodes are in the same orbit if and only if some relabeling of the graph permutes the two node labels yet yields an identical graph. For example, nodes that may be swapped, rotated, reflected, or undergo other transformations about an axis while keeping the graph's structure unchanged may be part of the same orbit. A graph may have one or more orbits depending upon the symmetry in that graph. Each orbit may have one or more nodes of the graph. By identifying the orbits, the symmetry within the transformed query graph may be understood and broken by generating the symmetry breaking expression. Thus, at the operation 3205, the processor identifies the orbits in the transformed query graph with each orbit having one or more nodes that exhibit the same automorphism.

Starting at operation 3210, the processor iteratively generates automorphism breaking sub-expression for each orbit. Thus, at the operation 3210, the processor selects an orbit from the one or more orbits identified at the operation 3210. In some embodiments, the processor may select an orbit that has more than one node therein. In some embodiments, the processor may select an orbit that has a predefined characteristic. For example, if there are multiple orbits having more than one node, the processor may use the predefined characteristic to select one orbit from the multiple orbits. In some embodiments, the predefined characteristic may be an orbit having a lowest node label. For example, in some embodiments, each node in the transformed query graph may have a unique label (which may be different from the node attribute). The orbit that has the node with the lowest label value may be selected first in some embodiments. In other embodiments, the predefined characteristic may be an orbit having a highest node label (e.g., the orbit having the node with the highest label value). In some embodiments, the predefined characteristic may be an orbit having a node with a lowest value of output attribute. In other embodiments, other predefined characteristics may be used to select an orbit.

Responsive to selecting one orbit, at operation 3215, the processor generates an automorphism breaking sub-expression for the selected orbit of the operation 3210. The generation of the automorphism breaking sub-expression is discussed in more detail in FIG. 33 below. At operation 3220, the processor assigns a node of the selected orbit of the operation 3210 a unique node attribute. In some embodiments, the node of the selected orbit that exhibits the predefined characteristic at the operation 3210 may be the node that is assigned a unique node attribute (e.g., a unique color attribute that is different from the other nodes). For example, in some embodiments, the node in the selected orbit having the smallest label value may be selected to be assigned the unique node attribute. In other embodiments, other nodes may be selected. Further, in other embodiments, unique node attributes other than color may be used. The node attribute that is selected at the operation 3210 may be different than the output attribute that was selected at the operation 1705.

Upon generating the automorphism breaking sub-expression for the selected orbit at the operation 3215 and the assigning the node a unique node attribute at the operation 3220, the processor recalculates the orbits in the transformed query graph at operation 3225. In some embodiments, the processor may use an automorphism detector or another mechanism to determine the orbits. In some embodiments, the node which was assigned the unique node attribute at the operation 2330 falls into its own orbit. For a node to be in the same orbit as another node, both nodes need to have the same node attributes (and topological structure). By assigning a unique node attribute (e.g., a node attribute that does not exist in any node of the query graph) to a node, that node may be forced into a different orbit. Thus, because at the operation 3210 an orbit is selected that has more than one node, the orbit of the node to which the unique node attribute is assigned is not selected. Thus, once a node is assigned a unique attribute at the operation 3220, that node becomes its own orbit and is excluded from further orbit selection.

At operation 3230, the processor determines if each node of the transformed query graph is in its own orbit. If no, the process 3200 loops back to the operation 3210 to select another orbit, compute an automorphism breaking sub-expression, and assign a node of the selected orbit a unique attribute. The process of recalculating orbits, selecting an orbit, computing automorphism breaking sub-expression for the selected orbit, assigning the node exhibiting the predefined characteristic of the selected orbit a unique attribute continues until each node of the transformed query graph is in its own orbit. If, at the operation 3230, the processor determines that each node is in its own orbit (e.g., no orbit has more than one node), the process 3200 proceeds to operation 3235 where the processor combines each of the automorphism breaking sub-expressions generated at the operation 3215 in each iteration to obtain the symmetry breaking expression. In some embodiments, the processor may combine the automorphism breaking sub-expressions using conjunction (e.g., using the Boolean operator AND). For example, the processor may concatenate or append the automorphism breaking sub-expression of each cycle and separate each automorphism breaking sub-expression by AND. In other embodiments, the processor may combine the automorphism breaking sub-expressions using other mechanisms.

Figure 33:
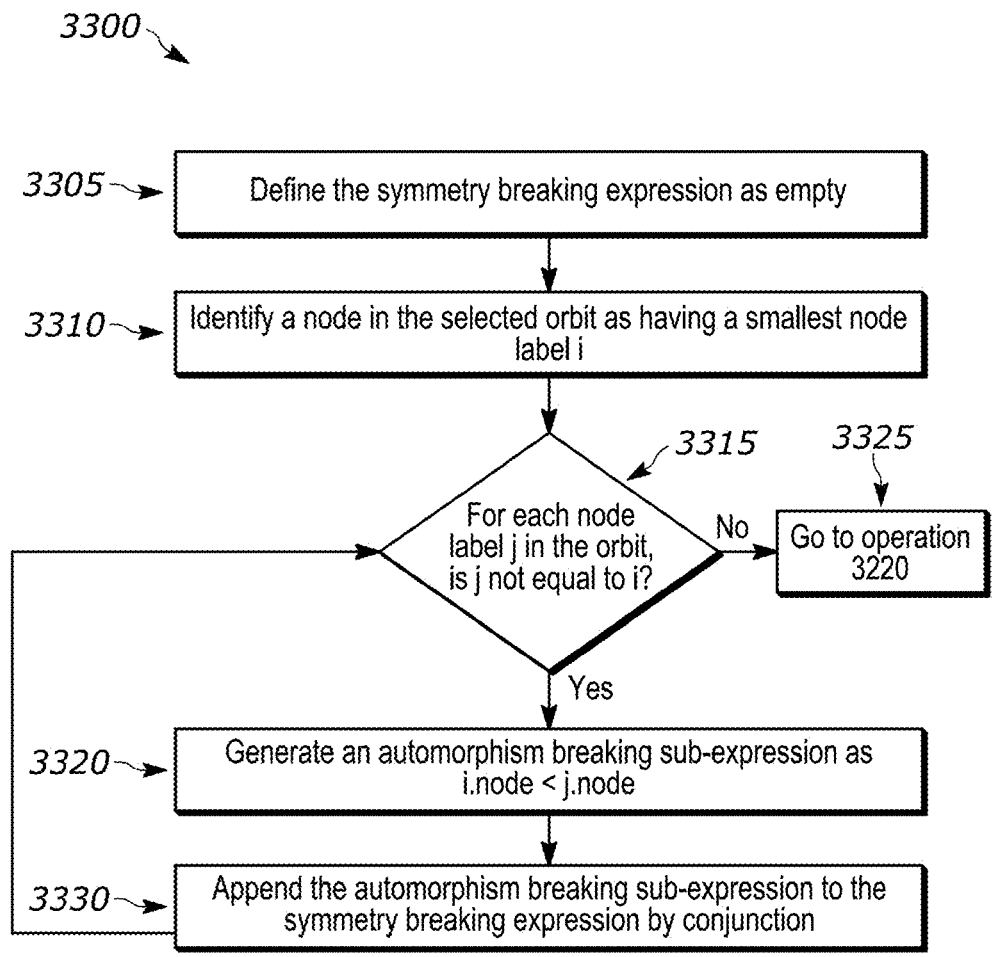
FIG. 33 illustrates a flowchart showing an example process used during the process of FIG. 32 for generating an automorphism breaking sub-expression, according to embodiments of the present technology.

Referring to FIG. 33, an example flowchart outlining operations of a process 3300 is shown, in accordance with some embodiments of the present disclosure. The process 3300 describes the operation 3215 in greater detail. The process 3300 may, thus, be used to generate an automorphism breaking sub-expression for a selected orbit. The process 3300 may be used to iteratively build the automorphism breaking sub-expression for the selected orbit. The process 3300 may be executed by one or more processors (e.g., the processor 1430) associated with the pattern matching application 1435. The process 3300 may include other or additional operations depending upon the particular embodiment.

At operation 3305, the processor defines a symmetry breaking expression for the transformed query graph as empty. In some embodiments, the symmetry breaking expression is empty at the start of the process 3200 (e.g., the first cycle of computing the symmetry breaking expression). As automorphism breaking sub-expressions are generated, as discussed below, those automorphism breaking sub-expressions are combined with (e.g., appended to) the symmetry breaking expression. At operation 3310, the process identifies a node in the selected orbit as having a smallest node label i. The node that is selected at the operation 3310 is the same node that is assigned the unique node attribute at the operation 3220. The operation 3310 describes selecting the node as the node having the smallest label value among the label values of all nodes (e.g., nodes in the selected orbit or out of the selected orbit). In some embodiments, the smallest label value may be the predefined characteristic that is used to select the orbit at the operation 3210.

At operation 3315, the processor determines for each node label j in the orbit, if j is not equal to i. As discussed above, each node may have a node label. The node label i corresponds to the smallest (or lowest) value node label. The processor compares the node label j of each node in the selected orbit with the node label i. If the processor determines that j is not equal to i, the process 3300 proceeds to operation 3320 otherwise, the process 3300 proceeds to operation 3325. Since i corresponds to the smallest node label, if j is not equal to i, it means that there is a high value node label in the selected orbit. Thus, at the operation 3320, the processor generates an automorphism breaking sub-expression for the node whose label j was compared with i. In some embodiments, the processor generates the automorphism breaking sub-expression as i.node<j.node. The term i.node in the automorphism breaking sub-expression i.node<j.node maps the node with the label i in the transformed query graph to a main graph node having a smallest label (e.g., smallest value of the node labels). The term j.node in the automorphism breaking sub-expression i.node<j.node maps the node with the label j in the transformed query graph to the main graph node having a label other than the smallest label.

Figure 34A:
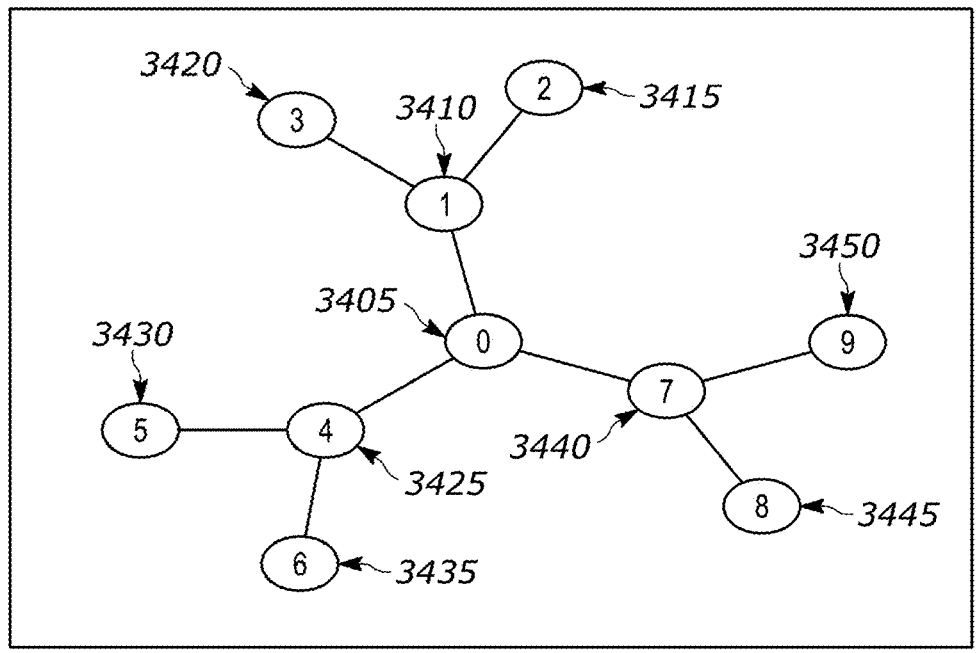
FIGS. 34A-34G illustrate examples of generating a symmetry breaking expression using the processes of FIGS. 32 and 33, according to embodiments of the present technology.

At operation 3330, the processor then appends the automorphism breaking sub-expression generated at the operation 3320 to the symmetry breaking expression. In some embodiments, the processor may append the automorphism breaking sub-expression to the symmetry breaking expression by conjunction (e.g., using the Boolean operator AND). In other embodiments, the processor may combine the automorphism breaking sub-expression with the symmetry breaking expression in other ways. The process 3300 then loops back to the operation 3315 where the next node label j in the selected orbit is compared with the node label i. The operations 3315-3330 are repeated until the next node label j is same as the node label i. At that point, at the operation 335, the process 3300 returns to the operation 3220 where the node identified at the operation 3310 is assigned the unique node attribute and the process 3200 continues. An example pseudocode for the processes 3200 and 3300 may be given as follows:

Find orbits O based on the modified query graph q' from Step 1.
    Let expr be an empty expression
    Let o be the first orbit containing with more than one node, or NULL, if no such orbit exists
    While o is not NULL:
        Let i be the smallest node id among the nodes in o
        for each node id j among the nodes of o:
            if j is not equal to i:
                Let t be the expression i.node<j.node
                (optionally perform step 3 here)
                append t to expr by conjunction
        Modify q' by giving the node i a unique node color
        Let o be the first orbit containing with more than one node, or NULL, if no such orbit exists
    Output expr Turning now to FIGS. 34A-34G, an example shows the application of the processes 3200 and 3300, in accordance with some embodiments of the present disclosure. FIG. 34A shows an example of a query graph 3400. The query graph 3400 may be an original query graph (e.g., the query graph 1615) or a transformed query graph (e.g., the query graph resulting from the operation 1705). The query graph 3400 includes 10 nodes having node labels 0-9. For example, the query graph 3400 includes a node 3405 (Node 0), node 3410 (Node 1), node 3415 (Node 2), node 3420 (Node 3), node 3425 (Node 4), node 3430 (Node 5), node 3435 (Node 6), node 3440 (Node 7), node 3445 (Node 8), and node 3450 (Node 9). The symmetry breaking expression is generated from the query graph 3400.

Figure 34B:
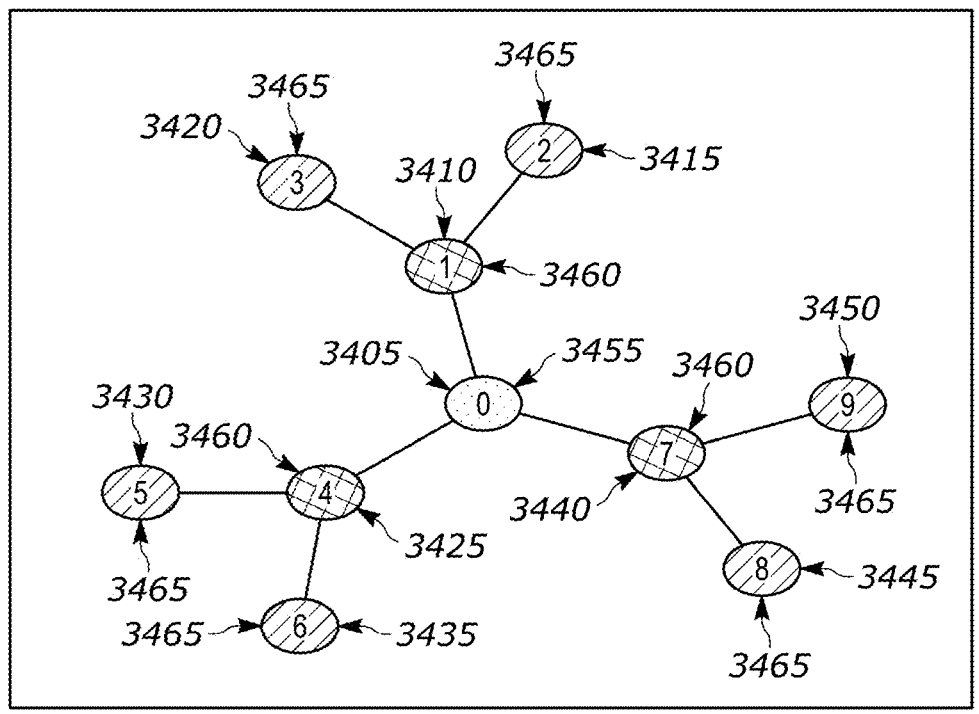

To generate the symmetry breaking expression, the orbits in the query graph 3400 are first identified (e.g., at the operation 3205). As shown in FIG. 34B, the node 3405 falls into an orbit 3455, the nodes 3410, 3425, and 3440 fall into an orbit 3460, and the nodes 3415, 3420, 3430, 3435, 3450, and 3445 fall into an orbit 3465. Responsive to identifying the orbits, one of the orbits 3455, 3460, and 3465 is selected (e.g., at the operation 3210). Because the orbit 3455 has a single node therein, that orbit is not selected. From the orbits 3460 and 3465, one of the orbit is selected based on the predefined characteristic. For example, if the predefined characteristic is the smallest node label, the node labels of the nodes in the orbits 3460 and 3465 are analyzed to identify which orbit has the node with the smallest node label. Because Node 1 is the smallest node label among the nodes of the orbits 3460 and 3465, the orbit (e.g., the orbit 3460) having Node 1 is selected.

Responsive to selecting the orbit 3460, one or more automorphism breaking sub-expressions are generated for the nodes in the orbit 3460 (e.g., at the operation 3215). To begin breaking symmetry, logic is added to force the node with the smallest node label (e.g., Node 1) to map to the smallest main graph node id within that orbit, as described above in the process 3300. Thus, to generate the automorphism breaking sub-expression, the node labels of each node in the orbit 3460 are compared with the node label of Node 1. If the node label of a node in the orbit 3460 is greater than the node label of Node 1, an automorphism breaking sub-expression is generated for that node as i.node<j.node. Thus, for example, the node 3425 in the orbit 3460 has a node label 4, which is greater than the node label of Node 1. Thus, a first automorphism breaking sub-expression is generated for Node 4 as 1.node<4.node. Similarly, a second automorphism breaking sub-expression is generated for the node 3440 (Node 7) of the orbit 3460 because the Node 7 has a label that is greater than Node 1. The second automorphism breaking sub-expression may be generated as 1.node<7.node. The first and second automorphism breaking sub-expressions are combined by conjunction to obtain a third automorphism breaking sub-expression 1.node<4.node AND 1.node<7.node. The third automorphism breaking sub-expression corresponds to the automorphism breaking sub-expression for the orbit 3460.

Figure 34C:
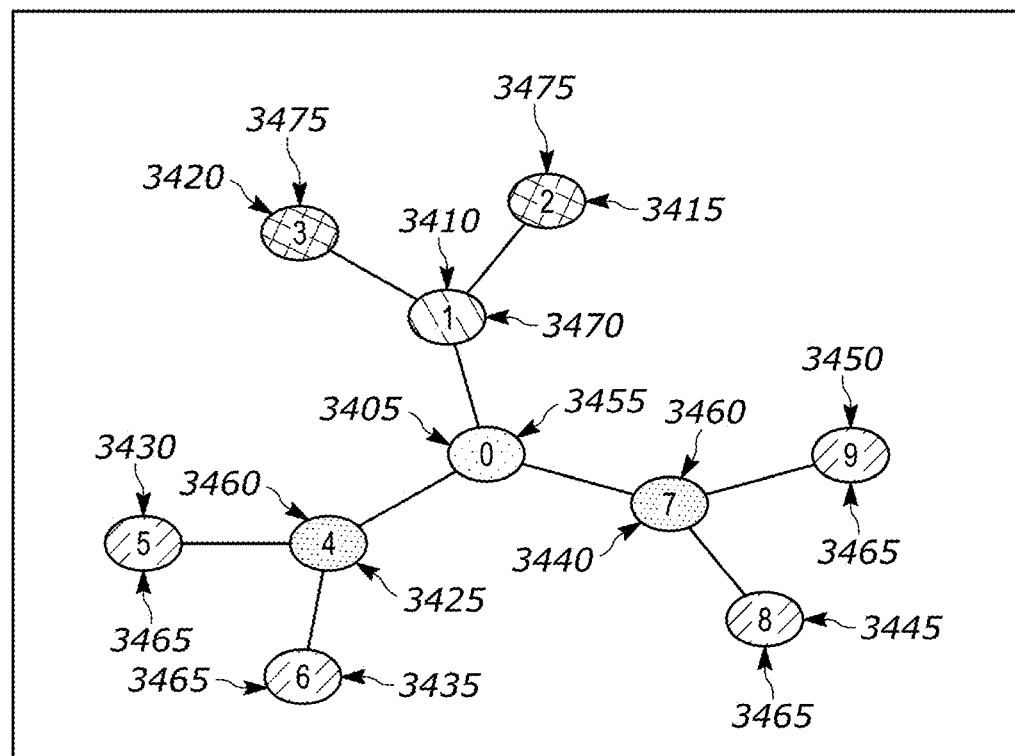

Further, as shown in FIG. 34C, the node 3410 (Node 1) is assigned a unique node attribute (e.g., at the operation 3220) and the orbits are recalculated (e.g., at the operation 3225). On recalculating the orbits, the node 3405 remains in its own orbit (e.g., the orbit 3455). The node 3410, which was assigned a unique node attribute is now also in its own orbit 3470. The nodes 3425 and 2440 remain in the orbit 3460, and the nodes 3430, 3435, 3445, and 3450 remain in the orbit 3465. The nodes 3420 and 3415 are now in their own orbit 3475. Thus, the orbits 3405 and 3470 have a single node and are not selected. However, the orbits 3460, 3465, and 3475 each have more than one node therein and one of them is selected for the next iteration. Again, the orbit having the node with the smallest node label is selected. Thus, since Node 2 (e.g., the node 3415) has the smallest node label, the orbit 3475 is selected.

Figure 34D:
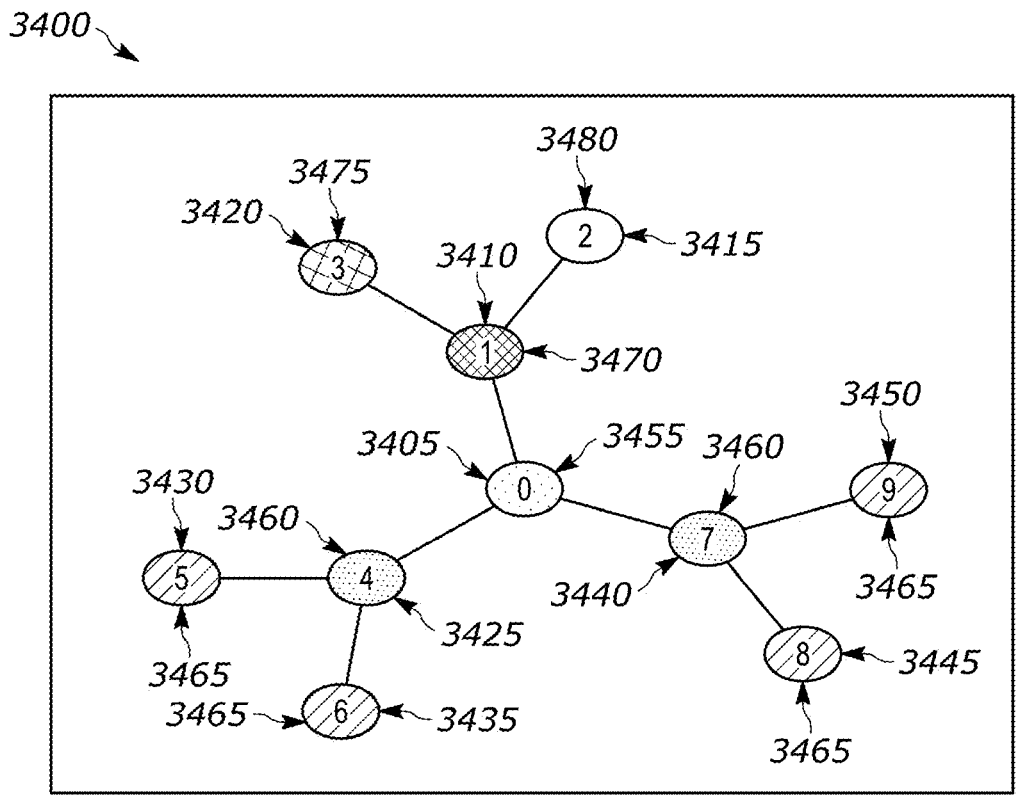

Responsive to selecting the orbit 3475, an automorphism breaking sub-expression is generated for the nodes in that orbit. Since the orbit 3475 only has two nodes, a single fourth automorphism breaking sub-expression is generated as 2.node<3.node. Node 2 is then assigned a unique node attribute and the orbits are recalculated, as shown in FIG. 34D. Specifically, as shown in FIG. 34D, after recalculating the orbits, Node 0 is in its own orbit (e.g., the orbit 3455), Node 1 is in its own orbit (e.g., the orbit 3470), Node 2 is in its own orbit (e.g., orbit 3480), Node 3 is in its own orbit (e.g., the orbit 3475), Nodes 4 and 7 fall into an orbit (e.g., the orbit 3460), and Nodes 5, 6, 8, and 9 fall into an orbit (e.g., the orbit 3465). Thus, the orbits 3460 and 3465 have more than one node therein and one of those orbits is selected in the next iteration. Comparing the node labels of the nodes in the orbits 3460 and 3465, the orbit 3460 has the node (e.g., Node 4) with the smallest node label.

Thus, a fifth automorphism breaking sub-expression is computed for the orbit 3460 as 4.node<7.node. Node 4 is assigned a unique node attribute, and the orbits are recalculated, as shown in FIG. 34E.

Figure 34E:
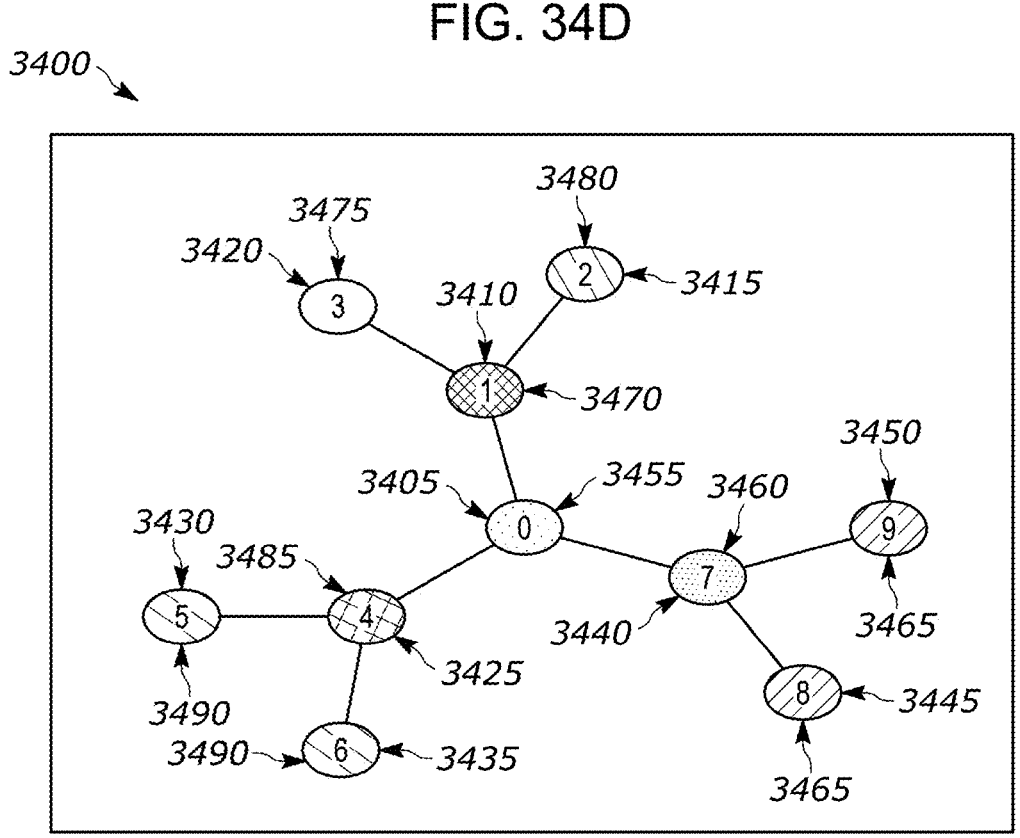

Specifically, as shown in FIG. 34E, after recalculating the orbits, Node 0 is in its own orbit (e.g., the orbit 3455), Node 1 is in its own orbit (e.g., the orbit 3470), Node 2 is in its own orbit (e.g., the orbit 3480), Node 3 is in its own orbit (e.g., the orbit 3475), Node 4 is in its own orbit (e.g., orbit 3485), Node 7 is in its own orbit (e.g., the orbit 3460), Nodes 5 and 6 fall into an orbit (e.g., orbit 3490), and Nodes 8 and 9 fall into an orbit (e.g., the orbit 3465). Since the orbits 3490 and 3465 are the only orbits with more than one node therein, one of those orbits is selected for the next iteration. Because Node 5 has the smallest node label among all nodes in the orbits 3490 and 3465, the orbit 3490 is selected and a sixth automorphism breaking sub-expression is computed for the orbit 3460 as 5.node<6.node. Node 5 is assigned a unique node attribute, and the orbits are recalculated, as shown in FIG. 34F.

Figure 34F:
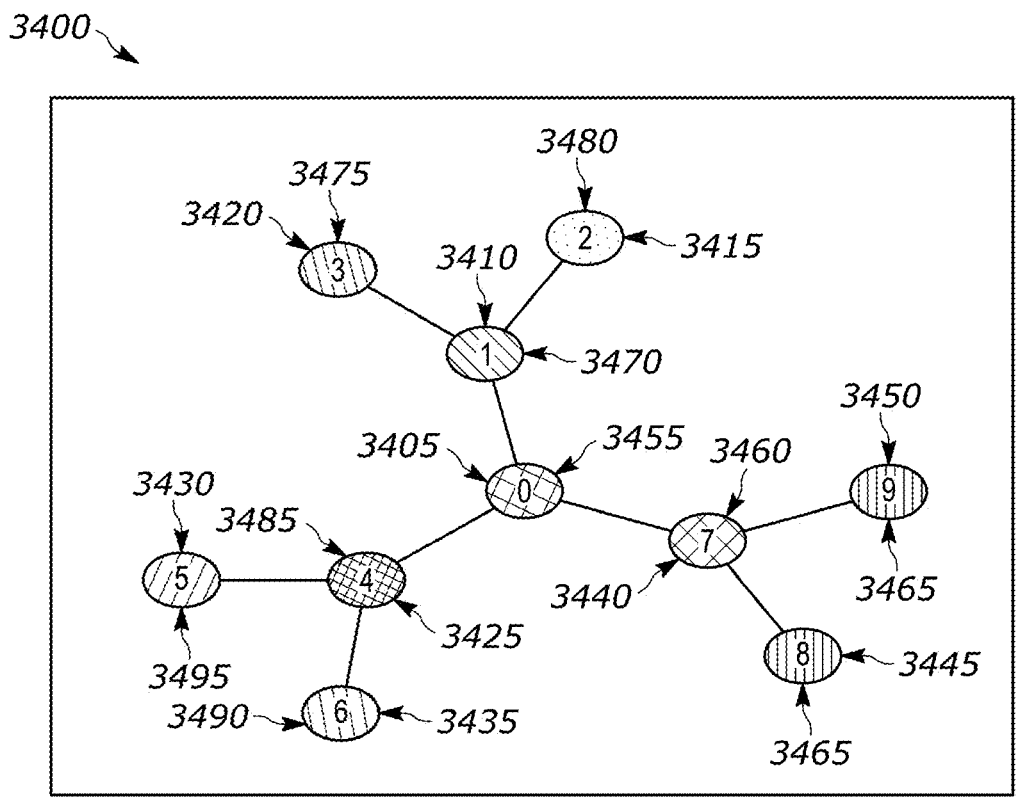
Figure 34G:
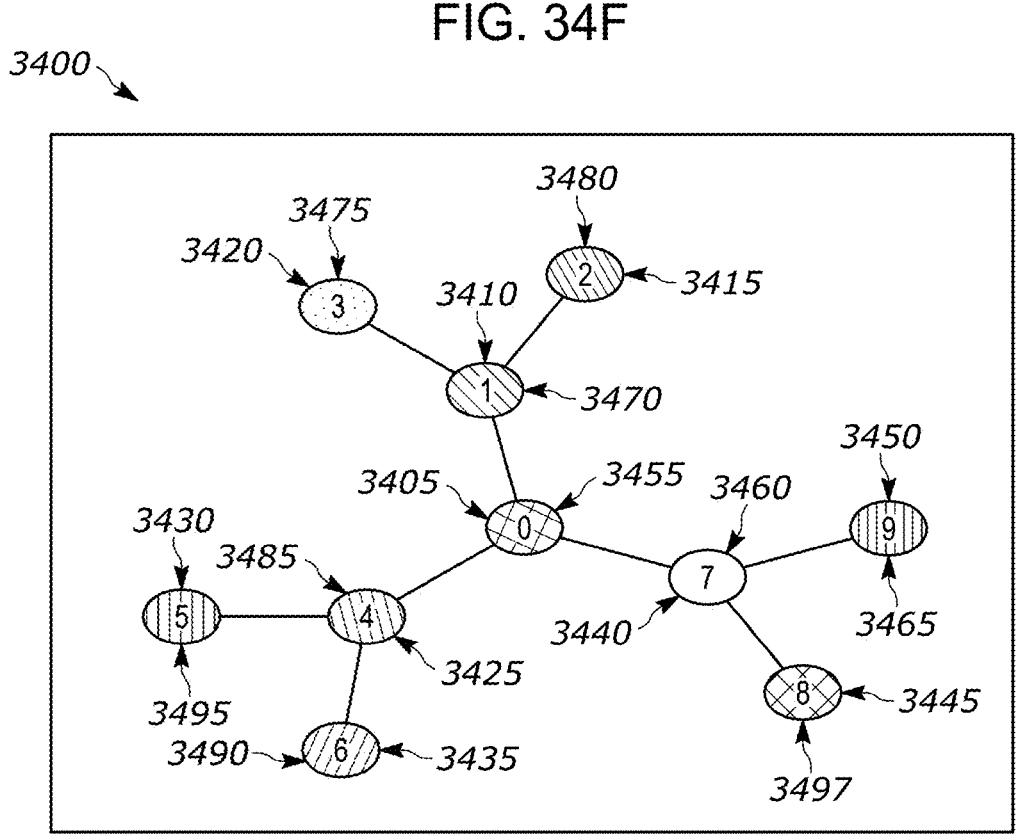

Specifically, as shown in FIG. 34F, after recalculating the orbits, Node 0 is in its own orbit (e.g., the orbit 3455), Node 1 is in its own orbit (e.g., the orbit 3470), Node 2 is in its own orbit (e.g., the orbit 3480), Node 3 is in its own orbit (e.g., the orbit 3475), Node 4 is in its own orbit (e.g., the orbit 3485), Node 5 is in its own orbit (e.g., orbit 3495), Node 6 is in its own orbit (e.g., the orbit 3490), Node 7 is in its own orbit (e.g., the orbit 3460), and Nodes 8 and 9 fall into an orbit (e.g., the orbit 3465). Thus, the orbit 3465 is the only orbit remaining with more than one node. Of the nodes in the orbit 3465, Node 8 has a smaller node label. Thus, a seventh automorphism breaking sub-expression is computed for the orbit 3465 as 8.node<9.node. Node 8 is assigned a unique node attribute and the orbits are recalculated. As shown in FIG. 34G, each node is now in its own orbit. For example, Node 0 is in its own orbit (e.g., the orbit 3455), Node 1 is in its own orbit (e.g., the orbit 3470), Node 2 is in its own orbit (e.g., the orbit 3480), Node 3 is in its own orbit (e.g., the orbit 3475), Node 4 is in its own orbit (e.g., the orbit 3485), Node 5 is in its own orbit (e.g., the orbit 3495), Node 6 is in its own orbit (e.g., the orbit 3490), Node 7 is in its own orbit (e.g., the orbit 3460), Node 8 is in its own orbit (e.g., orbit 3497), and Node 9 is in its own orbit (e.g., the orbit 3465).

Responsive to determining that each orbit is in its own orbit, the symmetry breaking expression is computed by combining the automorphism breaking sub-expression from each iteration. Thus, the third, fourth, fifth, sixth, and seventh automorphism breaking sub-expressions are combined to obtain the symmetry breaking expression as follows: 1.node<4.node AND 1.node<7.node AND 2.node<3.node AND 4.node<7.node AND 5.node<6.node AND 8.node<9.node.

Figure 35:
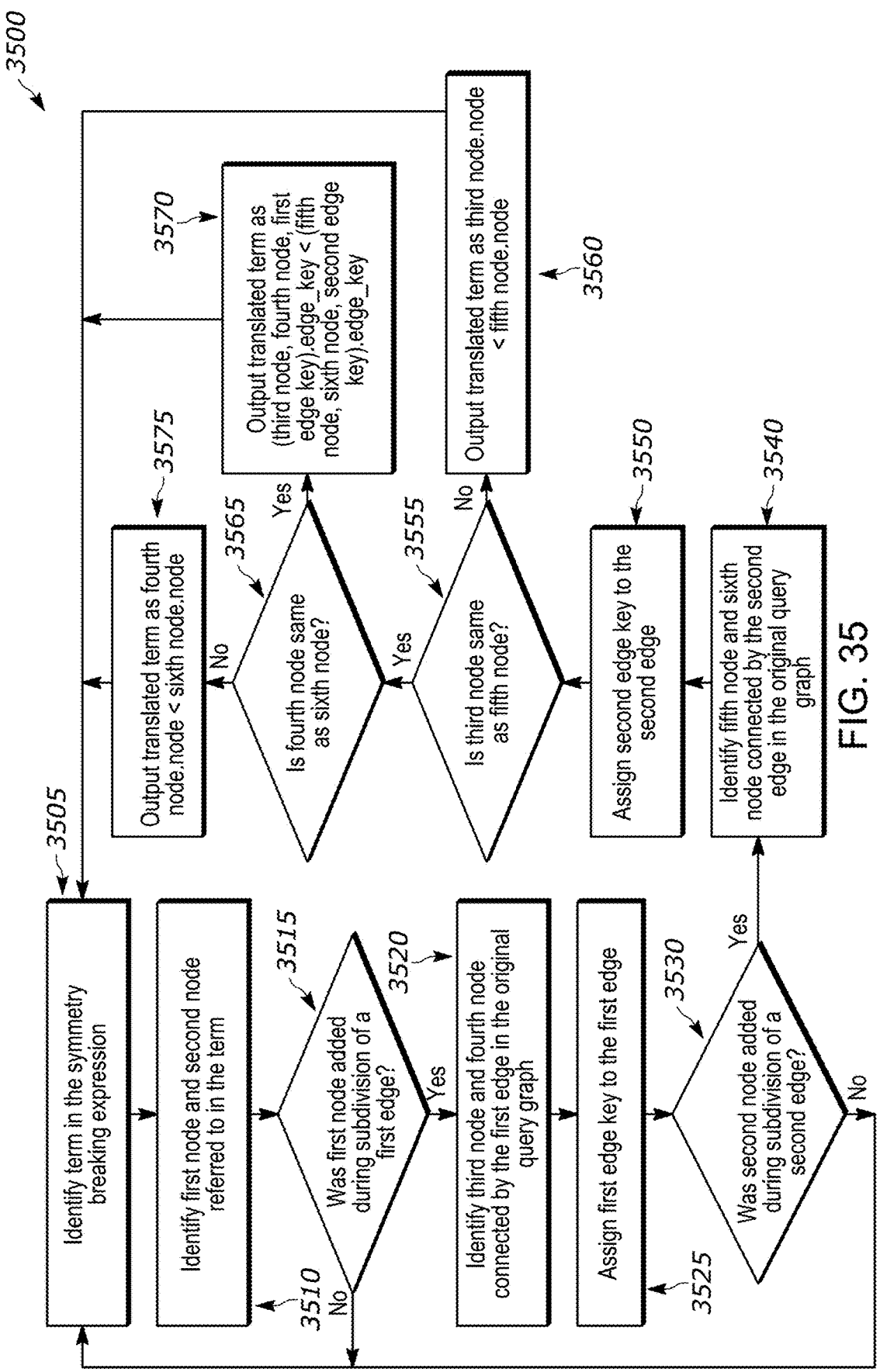
FIG. 35 illustrates a flowchart showing an example process used during the process of FIG. 17 for translating the symmetry breaking expression of FIGS. 32 and 33 to an original query graph, according to embodiments of the present technology.

Referring now to FIG. 35, an example flowchart outlining operations of a process 3500 is shown, in accordance with some embodiments of the present disclosure. The process 3500 describes the operation 1715 in greater detail. The process 3500 may, thus, be used to translate the symmetry breaking expression to refer back to nodes and edges in the original query graph (e.g., the query graph 1615). The process 3500 may be executed by one or more processors (e.g., the processor 1430) associated with the pattern matching application 1435. The process 3500 may include other or additional operations depending upon the particular embodiment.

Figure 36A:
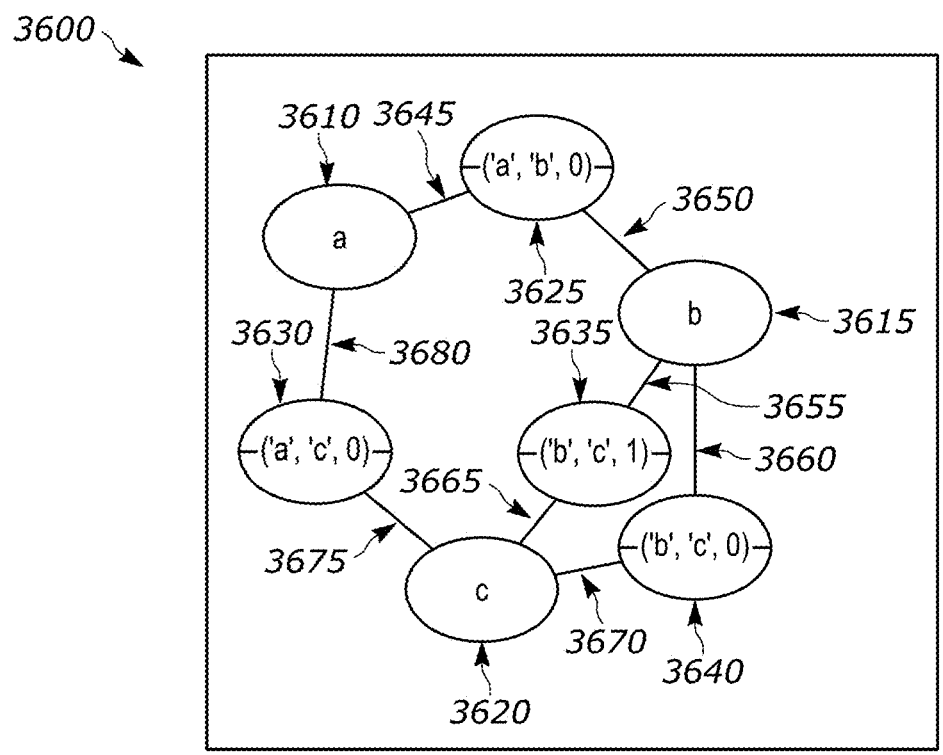
FIGS. 36A and 36B illustrate examples of the process of FIG. 35, according to embodiments of the present technology.
Figure 36B:
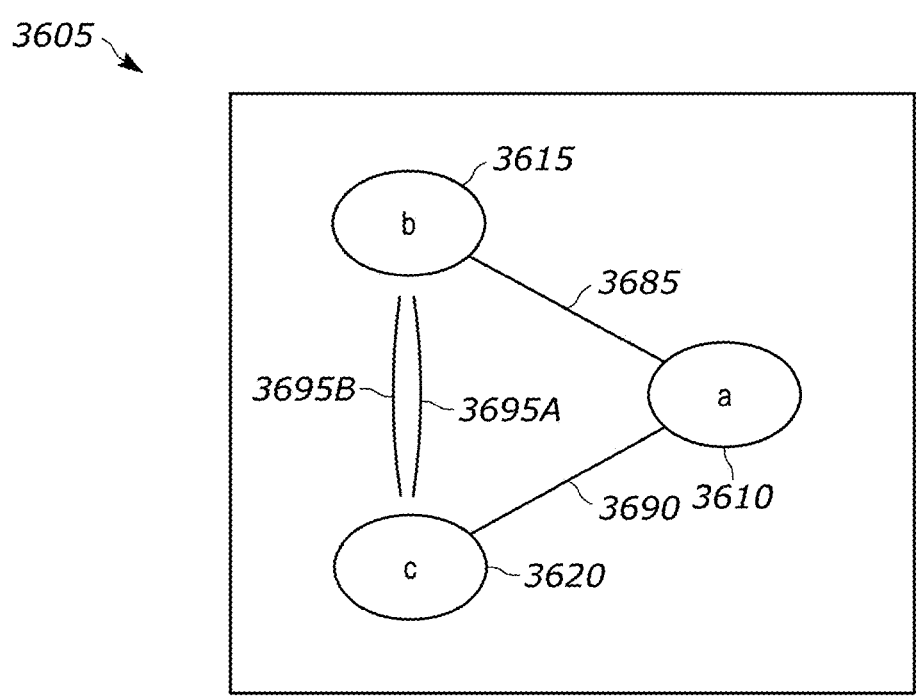

As discussed above, new nodes and edges may be added to the query graph 1615 at the operation 1705. Thus, the transformed query graph may be incompatible with the original query graph. Because these new nodes and edges do not exist in the original query graph, if the transformed query graph having these new nodes and edges is used for finding subgraphs from the main graph, inaccurate subgraphs may be found. Thus, the process 3500 is used to translate the new nodes and new edges back to the nodes and edges found in the original query graph. The process 3500 is explained in conjunction with FIGS. 36A and 36B. In particular, FIG. 36A shows an example of a transformed query graph 3600 and FIG. 36B shows an example of an original query graph 3605. As seen from FIG. 36A, the transformed query graph 3600 includes nodes 3610-3640. Of these nodes, the original query graph 3605 only includes the nodes 3610-3620. Thus, the nodes 3625-3640 are new nodes that were added to the original query graph 3605 during creation of the transformed query graph 3600. Thus, the nodes 3625-3640 need to be translated back to refer to the nodes of the original query graph 3605.

In terms of edges, the transformed query graph includes an edge 3645 between the nodes 3610 and 3625, an edge 3650 between the nodes 3625 and 3615, an edge 3655 between the nodes 3615 and 3635, an edge 3660 between the nodes 3615 and 3640, an edge 3665 between the nodes 3635 and 3620, an edge 3670 between the nodes 3620 and 3640, an edge 3675 between the nodes 3620 and 3630, and an edge 3680 between the nodes 3630 and 3610. None of these edges exist in the original query graph 3605. The original query graph includes an edge 3685 between the nodes 3615 and 3610, an edge 3690 between the nodes 3610 and 3620, and edges 3695A and 3695B between the nodes 3615 and 3620. Thus, the edges 3645-3680 need to be translated back to refer to the edges 3685-3695B.

Further, as an example, the symmetry breaking expression generated from the transformed query graph 3600 may be as follows:

$$('a', 'b', 0).\text{node} < ('a', 'c', 0).\text{node AND } ('b', 'c', 0).\text{node} < ('b', 'c', 1).\text{node} \qquad \text{Equation 2}$$

In the symmetry breaking expression above, the nodes ('a', 'b', 0), ('a', 'c', 0), ('b', 'c', 0), and ('b', 'c', 1) do not exist in the original query graph 3605. Thus, the symmetry breaking expression of the transformed query graph 3600 is incompatible with the original query graph 3605. By executing the process 3500, the symmetry breaking expression of the transformed query graph 3600 may be made compatible with the original query graph 3605. Thus, at operation 3505, the processor identifies a term in the symmetry breaking expression. For example, Equation 2 above may include 2 terms that are separated by "AND." Thus, the first term may include ('a', 'b', 0).node<('a', 'c', 0).node and the second term may include ('b', 'c', 0).node<('b', 'c', 1). The process 3500 may determine for each term whether that term needs to be translated to refer to the nodes and edges of the original query graph 3605.

At operation 3510, the processor identifies a first node and a second node referred to in a term identified at the operation 3505. For example, in the first term ('a', 'b', 0).node<('a', 'c', 0), the processor may determine that the first node is ('a', 'b', 0) (e.g., the node 3625) and the second node is ('a', 'c', 0) (e.g., the node 3630). At operation 3515, the processor determines if the first node identified at the operation 3510 was added during subdivision. For example, the processor may determine if the first node was added during the operations 1810 or 1815 (or the operations 1930 or 1940). In some embodiments, the processor may determine that the first node was newly added by attempting to find that node in the original query graph 3605. If that node does not exist in the original query graph 3605, the processor may determine that the first node was newly added. In other embodiments, the processor may determine whether the first node was newly added in other ways. The processor may also determine the edge (e.g., the first edge) that was subdivided to create the first node. For example, the processor may determine that the first node ('a', 'b', 0) was created for an edge attribute of the edge 3685 of the original query graph 3605.

If the processor determines that the first node was not newly added, then the processor may conclude that the first node exists in the original query graph 3605 and that no translation is needed. Thus, the process 3500 may loop back to the operation 3505 to analyze the next term (e.g., the second term) in the symmetry breaking expression. On the other hand, if at the operation 3515 the processor determines that the first node was newly added in the transformed query graph 3600, then the processor determines that the first node needs to be translated to refer to a node in the original query graph 3605 and the process 3500 proceeds to operation 3520. At the operation 3520, the processor identifies a third node and a fourth node that are connected by the first edge identified at the operation 3515 in the original query graph 3605. Thus, the processor may identify the nodes of the original query graph 3605 between which the edge 3685 is found. Since the edge 3685 exists between the nodes 3615 and 3610 in the original query graph 3605, the processor may identify the node 3615 as the third node and the node 3610 as the fourth node at the operation 3620.

At operation 3525, the processor assigns the first edge identified at the operation 3515 a first edge key. The first edge key may be any numeric, alphabetical, or alphanumerical code that may be used to uniquely identify the first edge in the original query graph 3605. At operation 3530, the processor determines if the second node ('a', 'c', 0) (e.g., the node 3630) was added during subdivision of a second edge of the original query graph 3605. For example, the processor may first determine, similar to the operation 3515, if the second node is newly added to the transformed query graph 3600. If the processor determines that the second node is newly added, the processor may then determine which edge of the original query graph 3605 was subdivided to obtain the second node. For example, for the second node ('a', 'c', 0) (e.g., the node 3630), the processor may determine that the edge 3690 was subdivided.

If the processor determines that the second node is not a newly added node, then that node does not need to be translated to refer back to the nodes of the original query graph and the process 3500 loops back to the operation 3505 to analyze the second term. To note, the first node and the second node are nodes in the same orbit. All nodes in the same orbit would be nodes that are either newly added or all nodes would be existing nodes. Thus, a situation in which the first node is a newly added node, and the second node is not a newly added node, or vice-versa, may not arise. If the processor determines that the second node is indeed a newly added node, then at operation 3540, the processor identifies a fifth node and a sixth node that are connected by the second edge identified at the operation 3530 of the original query graph 3605. In particular, the processor may determine the nodes that are linked by the second edge (e.g., the edge 3690). Thus, the processor may identify the node 3620 as the fifth node and the node 3610 as the sixth node.

At operation 3550, the processor assigns a second edge key to the second edge identified at the operation 3530. The second edge key may be any numeric, alphabetical, or alphanumerical code that may be used to uniquely identify the second edge in the original query graph 3605. At operation 3555, the processor determines if the third node is the same as the fifth node. For example, the processor identified the third node at the operation 3520 as the node 3615 and identified the fifth node at the operation 3540 as the node 3620. Since the nodes 3615 and 3620 are different nodes, the processor may determine that the third node is not the same as the fifth node. In this case, the process 3500 proceeds to operation 3560 where the processor outputs a translated term as third node.node<fifth node.node. Thus, for the nodes 3615 and 3620, the processor may output a translated term for the first term of the symmetry breaking expression as label of the node 3615.node<the label of the node 3620. Node or b.node<c.node (since the node 3615 has a node label b and the node 3620 has a node label c). Upon creating the translated term, the process 3500 loops back to the operation 3505 to analyze the second term of the symmetry breaking expression.

If at the operation 3555, the processor determines that the third node is same as the fifth node, then at operation 3565, the processor determines if the fourth node is same as the sixth node. For example, the fourth node is the node 3610 and the sixth node is also the node 3610. Thus, the processor may determine at the operation 3565 that the fourth node is same as the sixth node and the process 3500 proceeds to operation 3570. At the operation 3570, the processor outputs a translated term as the (node label for the third node, node label for the fourth node, first edge key).edge_key<(node label for the fifth node, node label for the sixth node, second edge key).edge_key. As an example, the second term of the symmetry breaking expression is ('b', 'c', 0).node<('b', 'c', 1). In this second term, the operation 3510 may determine that the first node is ('b', 'c', 0) and the second node is ('b', 'c', 1). At the operations 3515 and 3530, the processor may determine that the node ('b', 'c', 0) is newly added for the edge 3695A and the node ('b', 'c', 1) is newly added for the edge 3695B. Thus, at the operation 3520, the processor may determine that the third node is the node 3615 and the fourth node is the node 3620. Likewise, at the operation 3540, the processor may determine that the fifth node is the node 3615 and the sixth node is the node 3620. The processor may also determine, at the operation 3555 that the third node (e.g., the node 3615) is same as the fifth node (e.g., the node 3615), and further determine at the operation 3565 that the fourth node (e.g., the node 3620) is same as the sixth node (e.g., the node 3620). Thus, at the operation 3570, the processor may generate a translated term for the second term as follows: (b, c, 0).edge_key<(b, c, 1).edge_key where 0 is the first edge key and 1 is the second edge key. From the operation 3570, the process 3500 loops back to the operation 2505 to evaluate the next term in the symmetry breaking expression.

On the other hand, if at the operation 2565, the processor determines that the fourth node is not the same as the sixth node, at operation 3575 the processor outputs a translated term as node label for the fourth node.node<node label for sixth node.node and the process 3500 loops back to the operation 3505.

Figure 37:
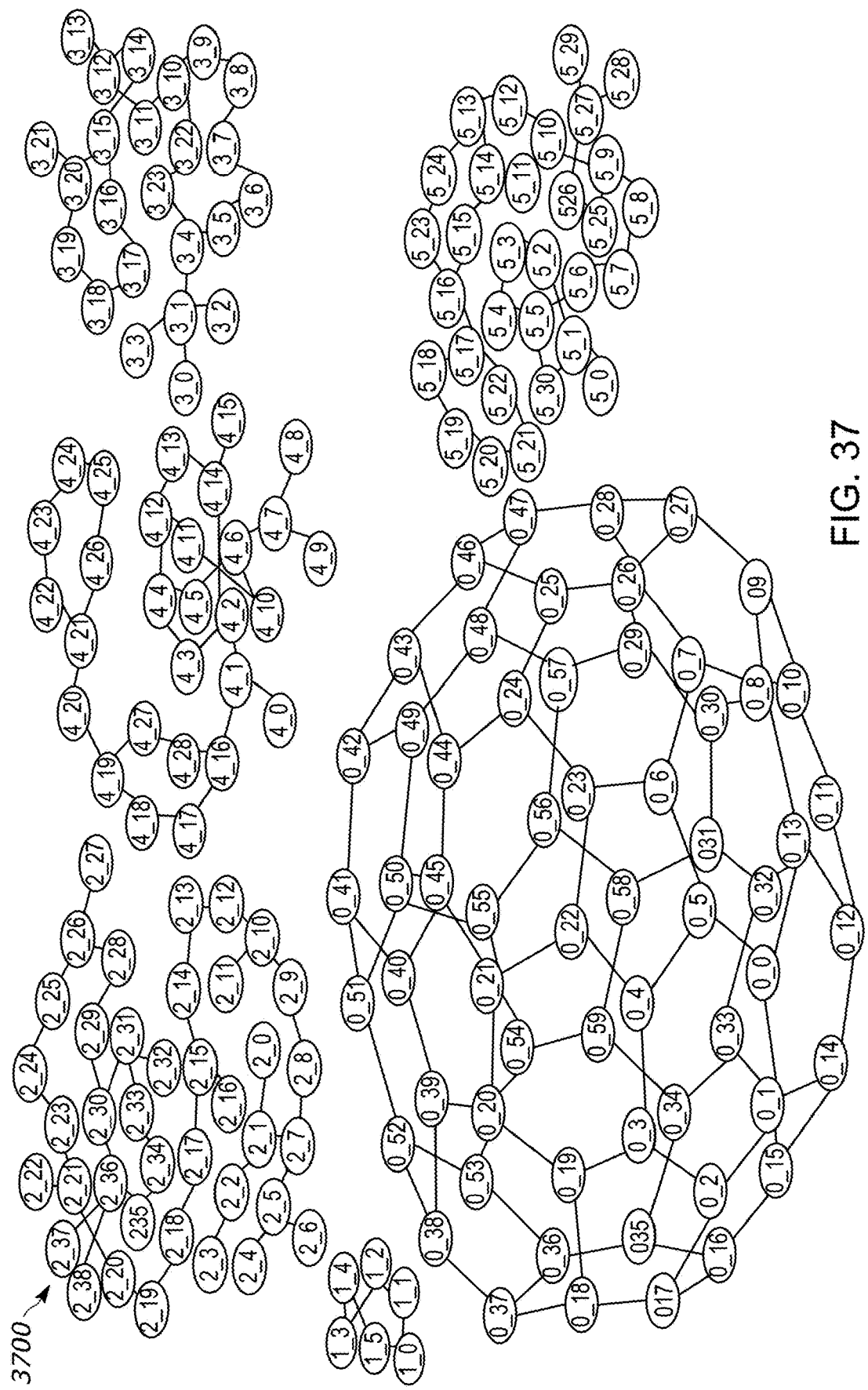
FIG. 37 illustrates an example of a simple main graph having a cluster of molecules, according to embodiments of the present technology.
Figure 38:
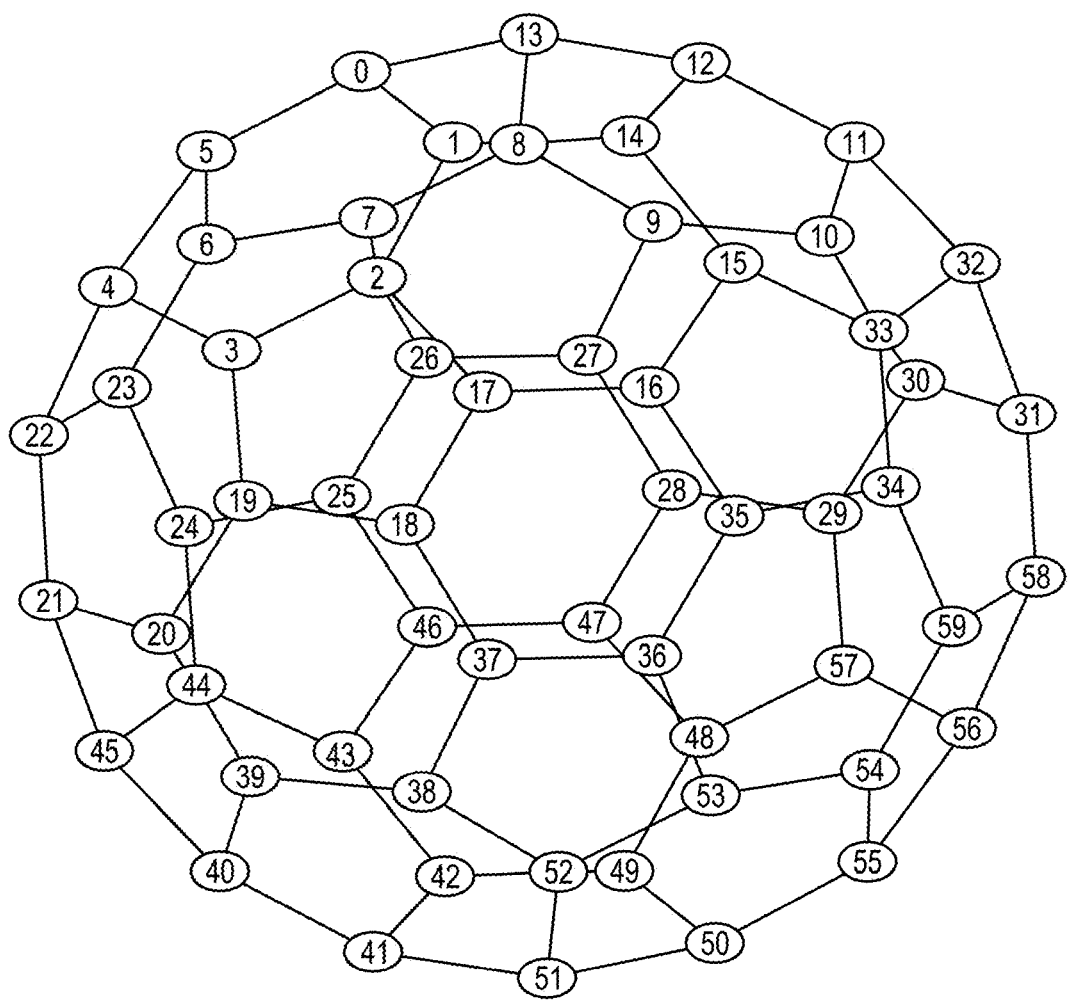
FIG. 38 illustrates an example of a simple query graph for the main graph of FIG. 37, according to embodiments of the present technology.

Turning to FIGS. 37 and 38, a first example of a simple main graph and a simple query graph is shown, in accordance with some embodiments of the present disclosure. Main graph 3700 of FIG. 37 shows a very small cluster of molecules. Each circle in the main graph 3700 represents a molecule. In general, the number of molecules in an element depends on Avogadro's number, which is approximately $6.02214076 \times 10^{23}$ or 602,214,076,000,000,000,000,000. This value represents the number of particles in one mole of a substance. A chemical compound, which is a combination of several molecules may include an astronomical number of molecules. Thus, the main graph 3700, which clearly does not include anywhere near 602,214,076,000,000,000,000,000 molecules, may be considered merely a miniscule portion of the molecular structure of an element (not even a compound).

FIG. 38 shows an example query graph 3800. The query graph 3800 is a C60 molecule (e.g., a carbon molecule made up of 60 carbon atoms). A C60 molecule is a fundamental molecule of many compounds. The problem thus is to find subgraphs in the main graph 3700 that match the query graph 3800. The query graph 3800 has no edge attributes, no node attributes (the numbers inside each circle may be considered a node label), no multiple edges, and no additional queries. Thus, the query graph 3800 only has topology. Each circle in the main graph 3700 and the query graph 3800 is a node of a graph. Each line between two circles in the main graph 3700 and the query graph 3800 is an edge of the graph.

Because the query graph 3800 has no attributes, the operation 1705 does not need to be performed. The query graph 3800 has symmetry because the nodes of the query graph 3800 may be transformed (e.g., by rotation, reflection, etc.) along a specified rotation axis and result in the same graph. Further, the query graph 3800 may be said to have three different types of rotation axes: 2-fold, 3-fold, and 5-fold (resulting in 2-fold symmetry, 3-fold symmetry, and 5-fold symmetry, respectively). Both rotations and reflections may be used to map the nodes into an isomorphism. In particular, each node in the graph 3800 belongs to one 5-cycle and two 6-cycles (in 3D, each node is at the intersection of one pentagonal face and two hexagonal faces). In all, there are 12 5-cycles and 20 6-cycles. To define a mapping, first any 5-cycle is selected to contain the node 0. There are 12 choices to select. Then the position in the 5-cycle to map to node 0 is selected: there are 5 such choices of starting node. Then an adjacent node in the five cycle is chosen to map to node 1. There are 2 such ways to select the second node. Once those selections are made, all other node mappings are determined by relation to nodes 0 and 1. In all, there are 120 (12\*5\*2) distinct ways to map the nodes of the graph 3800. Accordingly, the graph 3800 contains symmetry. The operation 1710 breaks symmetry in the query graph 3800.

Without breaking symmetry in the query graph 3800, using conventional approaches the following 120 possible matches of the query graph are found in the main graph 3700:

{0:0, 1:13, 2:8, 3:7, 4:6, 5:5, 6:4, 7:3, 8:2, 9:17, 10:16, 11:15, 12:14, 13:1, 14:12, 15:11, 16:10, 17:9, 18:27, 19:26, 20:25, 21:24, 22:23, 23:22, 24:21, 25:20, 26:19, 27:18, 28:37, 29:36, 30:35, 31:34, 32:33, 33:32, 34:31, 35:30, 36:29, 37:28, 38:47, 39:46, 40:43, 41:42, 42:41, 43:40, 44:45, 45:44, 46:39, 47:38, 48:52, 49:51, 50:50, 51:49, 52:48, 53:57, 54:56, 55:55, 56:54, 57:53, 58:59, 59:58}

{0:0, 1:1, 2:2, 3:3, 4:4, 5:5, 6:6, 7:7, 8:8, 9:9, 10:10, 11:11, 12:12, 13:13, 14:14, 15:15, 16:16, 17:17, 18:18, 19:19, 20:20, 21:21, 22:22, 23:23, 24:24, 25:25, 26:26, 27:27, 28:28, 29:29, 30:30, 31:31, 32:32, 33:33, 34:34, 35:35, 36:36, 37:37, 38:38, 39:39, 40:40, 41:41, 42:42, 43:43, 44:44, 45:45, 46:46, 47:47, 48:48, 49:49, 50:50, 51:51, 52:52, 53:53, 54:54, 55:55, 56:56, 57:57, 58:58, 59:59}

{0:1, 1:14, 2:15, 3:16, 4:17, 5:2, 6:3, 7:4, 8:5, 9:6, 10:7, 11:8, 12:13, 13:0, 14:12, 15:11, 16:32, 17:33, 18:34, 19:35, 20:36, 21:37, 22:18, 23:19, 24:20, 25:21, 26:22, 27:23, 28:24, 29:25, 30:26, 31:27, 32:9, 33:10, 34:30, 35:31, 36:58, 37:59, 38:54, 39:53, 40:52, 41:51, 42:41, 43:40, 44:39, 45:38, 46:45, 47:44, 48:43, 49:42, 50:49, 51:50, 52:55, 53:56, 54:57, 55:48, 56:47, 57:46, 58:28, 59:29}

0:1, 1:0, 2:5, 3:4, 4:3, 5:2, 6:17, 7:16, 8:15, 9:33, 10:32, 11:11, 12:12, 13:14, 14:13, 15:8, 16:7, 17:6, 18:23, 19:22, 20:21, 21:20, 22:19, 23:18, 24:37, 25:36, 26:35, 27:34, 28:59, 29:58, 30:31, 31:30, 32:10, 33:9, 34:27, 35:26, 36:25, 37:24, 38:44, 39:45, 40:40, 41:41, 42:51, 43:52, 44:38, 45:39, 46:53, 47:54, 48:55, 49:50, 50:49, 51:42, 52:43, 53:46, 54:47, 55:48, 56:57, 57:56, 58:29, 59:28}

{0:2, 1:17, 2:16, 3:15, 4:14, 5:1, 6:0, 7:5, 8:4, 9:22, 10:21, 11:20, 12:19, 13:3, 14:18, 15:37, 16:36, 17:35, 18:34, 19:33, 20:32, 21:11, 22:12, 23:13, 24:8, 25:7, 26:6, 27:23, 28:24, 29:44, 30:45, 31:40, 32:39, 33:38, 34:52, 35:53, 36:54, 37:59, 38:58, 39:31, 40:30, 41:29, 42:28, 43:27, 44:9, 45:10, 46:26, 47:25, 48:46, 49:47, 50:48, 51:57, 52:56, 53:55, 54:50, 55:49, 56:42, 57:43, 58:41, 59:51}

{0:2, 1:3, 2:4, 3:5, 4:0, 5:1, 6:14, 7:15, 8:16, 9:35, 10:36, 11:37, 12:18, 13:17, 14:19, 15:20, 16:21, 17:22, 18:23, 19:6, 20:7, 21:8, 22:13, 23:12, 24:11, 25:32, 26:33, 27:34, 28:59, 29:54, 30:53, 31:52, 32:38, 33:39, 34:40, 35:45, 36:44, 37:24, 38:25, 39:26, 40:27, 41:28, 42:29, 43:30, 44:10, 45:9, 46:31, 47:58, 48:56, 49:57, 50:48, 51:47, 52:46, 53:43, 54:42, 55:49, 56:50, 57:55, 58:51, 59:41}

{0:3, 1:19, 2:20, 3:21, 4:22, 5:4, 6:5, 7:0, 8:1, 9:14, 10:15, 11:16, 12:17, 13:2, 14:18, 15:37, 16:38, 17:39, 18:40, 19:45, 20:44, 21:24, 22:23, 23:6, 24:7, 25:8, 26:13, 27:12, 28:11, 29:32, 30:33, 31:34, 32:35, 33:36, 34:53, 35:52, 36:51, 37:41, 38:42, 39:43, 40:46, 41:47, 42:28, 43:27, 44:26, 45:25, 46:9, 47:10, 48:30, 49:29, 50:57, 51:48, 52:49, 53:50, 54:55, 55:56, 56:58, 57:31, 58:59, 59:54}

{0:3, 1:2, 2:1, 3:0, 4:5, 5:4, 6:22, 7:21, 8:20, 9:39, 10:38, 11:37, 12:18, 13:19, 14:17, 15:16, 16:15, 17:14, 18:12, 19:13, 20:8, 21:7, 22:6, 23:23, 24:24, 25:44, 26:45, 27:40, 28:41, 29:51, 30:52, 31:53, 32:36, 33:35, 34:34, 35:33, 36:32, 37:11, 38:10, 39:9, 40:27, 41:28, 42:47, 43:46, 44:25, 45:26, 46:43, 47:42, 48:49, 49:48, 50:57, 51:29, 52:30, 53:31, 54:58, 55:56, 56:55, 57:50, 58:54, 59:59}

{0:4, 1:22, 2:21, 3:20, 4:19, 5:3, 6:2, 7:1, 8:0, 9:13, 10:8, 11:7, 12:6, 13:5, 14:23, 15:24, 16:44, 17:45, 18:40, 19:39, 20:38, 21:37, 22:18, 23:17, 24:16, 25:15, 26:14, 27:12, 28:11, 29:10, 30:9, 31:27, 32:26, 33:25, 34:46, 35:43, 36:42, 37:41, 38:51, 39:52, 40:53, 41:54, 42:59, 43:34, 44:35, 45:36, 46:33, 47:32, 48:31, 49:58, 50:56, 51:55, 52:50, 53:49, 54:48, 55:57, 56:29, 57:30, 58:28, 59:47}

{0:4, 1:5, 2:0, 3:1, 4:2, 5:3, 6:19, 7:20, 8:21, 9:45, 10:44, 11:24, 12:23, 13:22, 14:6, 15:7, 16:8, 17:13, 18:12, 19:14, 20:15, 21:16, 22:17, 23:18, 24:37, 25:38, 26:39, 27:40, 28:41, 29:42, 30:43, 31:46, 32:25, 33:26, 34:27, 35:9, 36:10, 37:11, 38:32, 39:33, 40:34, 41:59, 42:54, 43:53, 44:36, 45:35, 46:52, 47:51, 48:50, 49:55, 50:56, 51:58, 52:31, 53:30, 54:29, 55:57, 56:48, 57:49, 58:47, 59:28}

{0:5, 1:6, 2:7, 3:8, 4:13, 5:0, 6:1, 7:2, 8:3, 9:19, 10:20, 11:21, 12:22, 13:4, 14:23, 15:24, 16:25, 17:26, 18:27, 19:9, 20:10, 21:11, 22:12, 23:14, 24:15, 25:16, 26:17, 27:18, 28:37, 29:38, 30:39, 31:40, 32:45, 33:44, 34:43, 35:46, 36:47, 37:28, 38:29, 39:30, 40:31, 41:58, 42:59, 43:34, 44:33, 45:32, 46:35, 47:36, 48:53, 49:54, 50:55, 51:56, 52:57, 53:48, 54:49, 55:50, 56:51, 57:52, 58:41, 59:42}

{0:5, 1:4, 2:3, 3:2, 4:1, 5:0, 6:13, 7:8, 8:7, 9:26, 10:25, 11:24, 12:23, 13:6, 14:22, 15:21, 16:20, 17:19, 18:18, 19:17, 20:16, 21:15, 22:14, 23:12, 24:11, 25:10, 26:9, 27:27, 28:28, 29:47, 30:46, 31:43, 32:44, 33:45, 34:40, 35:39, 36:38, 37:37, 38:36, 39:35, 40:34, 41:59, 42:58, 43:31, 44:32, 45:33, 46:30, 47:29, 48:57, 49:56, 50:55, 51:54, 52:53, 53:52, 54:51, 55:50, 56:49, 57:48, 58:42, 59:41}

{0:6, 1:23, 2:24, 3:25, 4:26, 5:7, 6:8, 7:13, 8:0, 9:1, 10:2, 11:3, 12:4, 13:5, 14:22, 15:21, 16:45, 17:44, 18:43, 19:46, 20:47, 21:28, 22:27, 23:9, 24:10, 25:11, 26:12, 27:14, 28:15, 29:16, 30:17, 31:18, 32:19, 33:20, 34:39, 35:40, 36:41, 37:42, 38:49, 39:48, 40:57, 41:56, 42:58, 43:31, 44:30, 45:29, 46:32, 47:33, 48:34, 49:59, 50:54, 51:55, 52:50, 53:51, 54:52, 55:53, 56:36, 57:35, 58:37, 59:38}

{0:6, 1:5, 2:0, 3:13, 4:8, 5:7, 6:26, 7:25, 8:24, 9:44, 10:45, 11:21, 12:22, 13:23, 14:4, 15:3, 16:2, 17:1, 18:14, 19:12, 20:11, 21:10, 22:9, 23:27, 24:28, 25:47, 26:46,

27:43, 28:42, 29:41, 30:40, 31:39, 32:20, 33:19, 34:18, 35:17, 36:16, 37:15, 38:33, 39:32, 40:31, 41:58, 42:56, 43:57, 44:29, 45:30, 46:48, 47:49, 48:50, 49:55, 50:54, 51:59, 52:34, 53:35, 54:36, 55:53, 56:52, 57:51, 58:38, 59:37}

{0:7, 1:26, 2:25, 3:24, 4:23, 5:6, 6:5, 7:0, 8:13, 9:12, 10:11, 11:10, 12:9, 13:8, 14:27, 15:28, 16:47, 17:46, 18:43, 19:44, 20:45, 21:21, 22:22, 23:4, 24:3, 25:2, 26:1, 27:14, 28:15, 29:33, 30:32, 31:31, 32:30, 33:29, 34:57, 35:48, 36:49, 37:42, 38:41, 39:40, 40:39, 41:38, 42:37, 43:18, 44:19, 45:20, 46:17, 47:16, 48:35, 49:36, 50:53, 51:52, 52:51, 53:50, 54:55, 55:54, 56:59, 57:34, 58:58, 59:56}

{0:7, 1:8, 2:13, 3:0, 4:5, 5:6, 6:23, 7:24, 8:25, 9:46, 10:47, 11:28, 12:27, 13:26, 14:9, 15:10, 16:11, 17:12, 18:14, 19:1, 20:2, 21:3, 22:4, 23:22, 24:21, 25:45, 26:44, 27:43, 28:42, 29:49, 30:48, 31:57, 32:29, 33:30, 34:31, 35:32, 36:33, 37:15, 38:16, 39:17, 40:18, 41:37, 42:38, 43:39, 44:20, 45:19, 46:40, 47:41, 48:51, 49:52, 50:53, 51:36, 52:35, 53:34, 54:59, 55:54, 56:55, 57:50, 58:56, 59:58}

{0:8, 1:9, 2:10, 3:11, 4:12, 5:13, 6:0, 7:5, 8:6, 9:23, 10:24, 11:25, 12:26, 13:7, 14:27, 15:28, 16:29, 17:30, 18:31, 19:32, 20:33, 21:15, 22:14, 23:1, 24:2, 25:3, 26:4, 27:22, 28:21, 29:45, 30:44, 31:43, 32:46, 33:47, 34:48, 35:57, 36:56, 37:58, 38:59, 39:34, 40:35, 41:36, 42:37, 43:18, 44:17, 45:16, 46:19, 47:20, 48:39, 49:38, 50:52, 51:53, 52:54, 53:55, 54:50, 55:51, 56:41, 57:40, 58:42, 59:49}

{0:8, 1:7, 2:6, 3:5, 4:0, 5:13, 6:12, 7:11, 8:10, 9:30, 10:29, 11:28, 12:27, 13:9, 14:26, 15:25, 16:24, 17:23, 18:22, 19:4, 20:3, 21:2, 22:1, 23:14, 24:15, 25:33, 26:32, 27:31, 28:58, 29:56, 30:57, 31:48, 32:47, 33:46, 34:43, 35:44, 36:45, 37:21, 38:20, 39:19, 40:18, 41:37, 42:36, 43:35, 44:16, 45:17, 46:34, 47:59, 48:54, 49:53, 50:52, 51:38, 52:39, 53:40, 54:41, 55:51, 56:50, 57:55, 58:49, 59:42}

{0:9, 1:27, 2:28, 3:29, 4:30, 5:10, 6:11, 7:12, 8:13, 9:0, 10:5, 11:6, 12:7, 13:8, 14:26, 15:25, 16:46, 17:47, 18:48, 19:57, 20:56, 21:58, 22:31, 23:32, 24:33, 25:15, 26:14, 27:1, 28:2, 29:3, 30:4, 31:22, 32:23, 33:24, 34:44, 35:43, 36:42, 37:49, 38:50, 39:55, 40:54, 41:53, 42:36, 43:35, 44:34, 45:59, 46:16, 47:17, 48:18, 49:37, 50:38, 51:52, 52:51, 53:41, 54:40, 55:39, 56:20, 57:19, 58:21, 59:45}

{0:9, 1:8, 2:13, 3:12, 4:11, 5:10, 6:30, 7:29, 8:28, 9:47, 10:46, 11:25, 12:26, 13:27, 14:7, 15:6, 16:5, 17:0, 18:1, 19:14, 20:15, 21:33, 22:32, 23:31, 24:58, 25:56, 26:57, 27:48, 28:49, 29:42, 30:43, 31:44, 32:24, 33:23, 34:22, 35:4, 36:3, 37:2, 38:17, 39:16, 40:35, 41:36, 42:53, 43:54, 44:59, 45:34, 46:55, 47:50, 48:51, 49:52, 50:38, 51:37, 52:18, 53:19, 54:20, 55:39, 56:40, 57:41, 58:45, 59:21}

{0:10, 1:30, 2:29, 3:28, 4:27, 5:9, 6:8, 7:13, 8:12, 9:14, 10:15, 11:33, 12:32, 13:11, 14:31, 15:58, 16:56, 17:57, 18:48, 19:47, 20:46, 21:25, 22:26, 23:7, 24:6, 25:5, 26:0, 27:1, 28:2, 29:17, 30:16, 31:35, 32:34, 33:59, 34:54, 35:55, 36:50, 37:49, 38:42, 39:43, 40:44, 41:45, 42:21, 43:22, 44:23, 45:24, 46:4, 47:3, 48:19, 49:20, 50:39, 51:40, 52:41, 53:51, 54:52, 55:38, 56:37, 57:18, 58:36, 59:53}

{0:10, 1:11, 2:12, 3:13, 4:8, 5:9, 6:27, 7:28, 8:29, 9:57, 10:56, 11:58, 12:31, 13:30, 14:32, 15:33, 16:15, 17:14, 18:1, 19:0, 20:5, 21:6, 22:7, 23:26, 24:25, 25:46, 26:47, 27:48, 28:49, 29:50, 30:55, 31:54, 32:59, 33:34, 34:35, 35:16, 36:17, 37:2, 38:3, 39:4, 40:22, 41:21, 42:45, 43:44, 44:24, 45:23, 46:43, 47:42, 48:41, 49:40, 50:39, 51:20, 52:19, 53:18, 54:37, 55:38, 56:52, 57:51, 58:53, 59:36}

{0:11, 1:32, 2:33, 3:15, 4:14, 5:12, 6:13, 7:8, 8:9, 9:27, 10:28, 11:29, 12:30, 13:10, 14:31, 15:58, 16:59, 17:34, 18:35, 19:16, 20:17, 21:2, 22:1, 23:0, 24:5, 25:6, 26:7, 27:26, 28:25, 29:46, 30:47, 31:48, 32:57, 33:56, 34:55, 35:54, 36:53, 37:36, 38:37, 39:18, 40:19, 41:20, 42:21, 43:22, 44:4, 45:3, 46:23, 47:24, 48:44, 49:45, 50:40, 51:39, 52:38, 53:52, 54:51, 55:41, 56:42, 57:43, 58:49, 59:50}

{0:11, 1:10, 2:9, 3:8, 4:13, 5:12, 6:14, 7:15, 8:33, 9:34, 10:59, 11:58, 12:31, 13:32, 14:30, 15:29, 16:28, 17:27, 18:26, 19:7, 20:6, 21:5, 22:0, 23:1, 24:2, 25:17, 26:16, 27:35, 28:36, 29:53, 30:54, 31:55, 32:56, 33:57, 34:48, 35:47, 36:46, 37:25, 38:24, 39:23, 40:22, 41:21, 42:20, 43:19, 44:3, 45:4, 46:18, 47:37, 48:38, 49:39, 50:40, 51:45, 52:44, 53:43, 54:42, 55:41, 56:51, 57:52, 58:50, 59:49}

{0:12, 1:14, 2:15, 3:33, 4:32, 5:11, 6:10, 7:9, 8:8, 9:7, 10:6, 11:5, 12:0, 13:13, 14:1, 15:2, 16:17, 17:16, 18:35, 19:34, 20:59, 21:58, 22:31, 23:30, 24:29, 25:28, 26:27, 27:26, 28:25, 29:24, 30:23, 31:22, 32:4, 33:3, 34:19, 35:18, 36:37, 37:36, 38:53, 39:54, 40:55, 41:50, 42:49, 43:48, 44:57, 45:56, 46:47, 47:46, 48:43, 49:42, 50:41, 51:51, 52:52, 53:38, 54:39, 55:40, 56:45, 57:44, 58:21, 59:20}

{0:12, 1:13, 2:8, 3:9, 4:10, 5:11, 6:32, 7:33, 8:15, 9:16, 10:17, 11:2, 12:1, 13:14, 14:0, 15:5, 16:6, 17:7, 18:26, 19:27, 20:28, 21:29, 22:30, 23:31, 24:58, 25:59, 26:34, 27:35, 28:36, 29:37, 30:18, 31:19, 32:3, 33:4, 34:22, 35:23, 36:24, 37:25, 38:46, 39:47, 40:48, 41:49, 42:50, 43:55, 44:56, 45:57, 46:54, 47:53, 48:52, 49:51, 50:41, 51:42, 52:43, 53:44, 54:45, 55:40, 56:39, 57:38, 58:20, 59:21}

{0:13, 1:12, 2:11, 3:10, 4:9, 5:8, 6:7, 7:6, 8:5, 9:4, 10:3, 11:2, 12:1, 13:0, 14:14, 15:15, 16:33, 17:32, 18:31, 19:30, 20:29, 21:28, 22:27, 23:26, 24:25, 25:24, 26:23, 27:22, 28:21, 29:20, 30:19, 31:18, 32:17, 33:16, 34:35, 35:34, 36:59, 37:58, 38:56, 39:57, 40:48, 41:49, 42:42, 43:43, 44:46, 45:47, 46:44, 47:45, 48:40, 49:41, 50:51, 51:50, 52:55, 53:54, 54:53, 55:52, 56:38, 57:39, 58:37, 59:36}

{0:13, 1:0, 2:5, 3:6, 4:7, 5:8, 6:9, 7:10, 8:11, 9:32, 10:33, 11:15, 12:14, 13:12, 14:1, 15:2, 16:3, 17:4, 18:22, 19:23, 20:24, 21:25, 22:26, 23:27, 24:28, 25:29, 26:30, 27:31, 28:58, 29:59, 30:34, 31:35, 32:16, 33:17, 34:18, 35:19, 36:20, 37:21, 38:45, 39:44, 40:43, 41:42, 42:49, 43:48, 44:47, 45:46, 46:57, 47:56, 48:55, 49:50, 50:51, 51:41, 52:40, 53:39, 54:38, 55:52, 56:53, 57:54, 58:36, 59:37}

{0:14, 1:12, 2:11, 3:32, 4:33, 5:15, 6:16, 7:17, 8:2, 9:3, 10:4, 11:5, 12:0, 13:1, 14:13, 15:8, 16:9, 17:10, 18:30, 19:31, 20:58, 21:59, 22:34, 23:35, 24:36, 25:37, 26:18, 27:19, 28:20, 29:21, 30:22, 31:23, 32:6, 33:7, 34:26, 35:27, 36:28, 37:29, 38:57, 39:56, 40:55, 41:50, 42:51, 43:52, 44:53, 45:54, 46:38, 47:39, 48:40, 49:41, 50:42, 51:49, 52:48, 53:47, 54:46, 55:43, 56:44, 57:45, 58:24, 59:25}

{0:14, 1:1, 2:2, 3:17, 4:16, 5:15, 6:33, 7:32, 8:11, 9:10, 10:9, 11:8, 12:13, 13:12, 14:0, 15:5, 16:4, 17:3, 18:19, 19:18, 20:37, 21:36, 22:35, 23:34, 24:59, 25:58, 26:31, 27:30, 28:29, 29:28, 30:27, 31:26, 32:7, 33:6, 34:23, 35:22, 36:21, 37:20, 38:39, 39:38, 40:52, 41:51, 42:50, 43:55, 44:54, 45:53, 46:56, 47:57, 48:48, 49:49, 50:42, 51:41, 52:40, 53:45, 54:44, 55:43, 56:46, 57:47, 58:25, 59:24}

{0:15, 1:33, 2:32, 3:11, 4:12, 5:14, 6:1, 7:2, 8:17, 9:18, 10:37, 11:36, 12:35, 13:16, 14:34, 15:59, 16:58, 17:31, 18:30, 19:10, 20:9, 21:8, 22:13, 23:0, 24:5, 25:4, 26:3, 27:19, 28:20, 29:39, 30:38, 31:52, 32:53, 33:54, 34:55, 35:56, 36:57, 37:29, 38:28, 39:27, 40:26, 41:25, 42:24, 43:23, 44:6, 45:7, 46:22, 47:21, 48:45, 49:44, 50:43, 51:46, 52:47, 53:48, 54:49, 55:42, 56:41, 57:40, 58:51, 59:50}

{0:15, 1:16, 2:17, 3:2, 4:1, 5:14, 6:12, 7:11, 8:32, 9:31, 10:58, 11:59, 12:34, 13:33, 14:35, 15:36, 16:37, 17:18, 18:19, 19:3, 20:4, 21:5, 22:0, 23:13, 24:8, 25:9, 26:10, 27:30, 28:29, 29:57, 30:56, 31:55, 32:54, 33:53, 34:52, 35:38, 36:39, 37:20, 38:21, 39:22, 40:23, 41:24, 42:25, 43:26, 44:7, 45:6, 46:27, 47:28, 48:47, 49:46, 50:43, 51:44, 52:45, 53:40, 54:41, 55:42, 56:49, 57:48, 58:50, 59:51}

{0:16, 1:35, 2:36, 3:37, 4:18, 5:17, 6:2, 7:1, 8:14, 9:12, 10:11, 11:32, 12:33, 13:15, 14:34, 15:59, 16:54, 17:53, 18:52, 19:38, 20:39, 21:20, 22:19, 23:3, 24:4, 25:5, 26:0, 27:13, 28:8, 29:9, 30:10, 31:30, 32:31, 33:58, 34:56, 35:55, 36:50, 37:51, 38:41, 39:40, 40:45, 41:44, 42:24, 43:23, 44:22, 45:21, 46:6, 47:7, 48:26, 49:25, 50:46, 51:43, 52:42, 53:49, 54:48, 55:47, 56:28, 57:27, 58:29, 59:57}

{0:16, 1:15, 2:14, 3:1, 4:2, 5:17, 6:18, 7:37, 8:36, 9:53, 10:54, 11:59, 12:34, 13:35, 14:33, 15:32, 16:11, 17:12, 18:13, 19:0, 20:5, 21:4, 22:3, 23:19, 24:20, 25:39, 26:38, 27:52, 28:51, 29:50, 30:55, 31:56, 32:58, 33:31, 34:30, 35:10, 36:9, 37:8, 38:7, 39:6, 40:23, 41:24, 42:44, 43:45, 44:21, 45:22, 46:40, 47:41, 48:42, 49:43, 50:46, 51:25, 52:26, 53:27, 54:28, 55:47, 56:48, 57:49, 58:57, 59:29}

{0:17, 1:18, 2:37, 3:36, 4:35, 5:16, 6:15, 7:14, 8:1, 9:0, 10:5, 11:4, 12:3, 13:2, 14:19, 15:20, 16:39, 17:38, 18:52, 19:53, 20:54, 21:59, 22:34, 23:33, 24:32, 25:11, 26:12, 27:13, 28:8, 29:7, 30:6, 31:23, 32:22, 33:21, 34:45, 35:40, 36:41, 37:51, 38:50, 39:55, 40:56, 41:57, 42:29, 43:30, 44:31, 45:58, 46:10, 47:9, 48:27, 49:28, 50:47, 51:48, 52:49, 53:42, 54:43, 55:46, 56:25, 57:26, 58:24, 59:44}

{0:17, 1:2, 2:1, 3:14, 4:15, 5:16, 6:35, 7:36, 8:37, 9:38, 10:39, 11:20, 12:19, 13:18, 14:3, 15:4, 16:5, 17:0, 18:13, 19:12, 20:11, 21:32, 22:33, 23:34, 24:59, 25:54, 26:53, 27:52, 28:51, 29:41, 30:40, 31:45, 32:21, 33:22, 34:23, 35:6, 36:7, 37:8, 38:9, 39:10, 40:30, 41:29, 42:57, 43:56, 44:58, 45:31, 46:55, 47:50, 48:49, 49:48, 50:47, 51:28, 52:27, 53:26, 54:25, 55:46, 56:43, 57:42, 58:44, 59:24}

{0:18, 1:19, 2:20, 3:39, 4:38, 5:37, 6:36, 7:35, 8:16, 9:15, 10:14, 11:1, 12:2, 13:17, 14:3, 15:4, 16:22, 17:21, 18:45, 19:40, 20:41, 21:51, 22:52, 23:53, 24:54, 25:59, 26:34, 27:33, 28:32, 29:11, 30:12, 31:13, 32:0, 33:5, 34:6, 35:23, 36:24, 37:44, 38:43, 39:42, 40:49, 41:48, 42:57, 43:56, 44:55, 45:50, 46:58, 47:31, 48:30, 49:29, 50:28, 51:47, 52:46, 53:25, 54:26, 55:27, 56:9, 57:10, 58:8, 59:7}

{0:18, 1:17, 2:16, 3:35, 4:36, 5:37, 6:38, 7:39, 8:20, 9:21, 10:22, 11:4, 12:3, 13:19, 14:2, 15:1, 16:14, 17:15, 18:33, 19:34, 20:59, 21:54, 22:53, 23:52, 24:51, 25:41, 26:40, 27:45, 28:44, 29:24, 30:23, 31:6, 32:5, 33:0, 34:13, 35:12, 36:11, 37:32, 38:31, 39:58, 40:56, 41:57, 42:48, 43:49, 44:50, 45:55, 46:42, 47:43, 48:46, 49:47, 50:28, 51:29, 52:30, 53:10, 54:9, 55:27, 56:26, 57:25, 58:7, 59:8}

{0:19, 1:18, 2:37, 3:38, 4:39, 5:20, 6:21, 7:22, 8:4, 9:5, 10:0, 11:1, 12:2, 13:3, 14:17, 15:16, 16:35, 17:36, 18:53, 19:52, 20:51, 21:41, 22:40, 23:45, 24:44, 25:24, 26:23, 27:6, 28:7, 29:8, 30:13, 31:12, 32:14, 33:15, 34:33, 35:34, 36:59, 37:54, 38:55, 39:50, 40:49, 41:48, 42:47, 43:46, 44:43, 45:42, 46:25, 47:26, 48:27, 49:28, 50:29, 51:57, 52:56, 53:58, 54:31, 55:30, 56:10, 57:9, 58:11, 59:32}

{0:19, 1:3, 2:4, 3:22, 4:21, 5:20, 6:39, 7:38, 8:37, 9:36, 10:35, 11:16, 12:17, 13:18, 14:2, 15:1, 16:0, 17:5, 18:6, 19:23, 20:24, 21:44, 22:45, 23:40, 24:41, 25:51, 26:52, 27:53, 28:54, 29:59, 30:34, 31:33, 32:15, 33:14, 34:12, 35:13, 36:8, 37:7, 38:26, 39:25, 40:46, 41:47, 42:48, 43:49, 44:42, 45:43, 46:50, 47:55, 48:56, 49:57, 50:29, 51:28, 52:27, 53:9, 54:10, 55:30, 56:31, 57:58, 58:32, 59:11}

{0:20, 1:39, 2:38, 3:37, 4:18, 5:19, 6:3, 7:4, 8:22, 9:23, 10:24, 11:44, 12:45, 13:21, 14:40, 15:41, 16:51, 17:52, 18:53, 19:36, 20:35, 21:16, 22:17, 23:2, 24:1, 25:0, 26:5, 27:6, 28:7, 29:26, 30:25, 31:46, 32:43, 33:42, 34:49, 35:50, 36:55, 37:54, 38:59, 39:34, 40:33, 41:32, 42:11, 43:12, 44:14, 45:15, 46:13, 47:8, 48:9, 49:10, 50:30, 51:31, 52:58, 53:56, 54:57, 55:29, 56:28, 57:27, 58:47, 59:48}

{0:20, 1:21, 2:22, 3:4, 4:3, 5:19, 6:18, 7:37, 8:38, 9:52, 10:51, 11:41, 12:40, 13:39, 14:45, 15:44, 16:24, 17:23, 18:6, 19:5, 20:0, 21:1, 22:2, 23:17, 24:16, 25:35, 26:36, 27:53, 28:54, 29:55, 30:50, 31:49, 32:42, 33:43, 34:46, 35:25, 36:26, 37:7, 38:8, 39:13, 40:12, 41:11, 42:32, 43:33, 44:15, 45:14, 46:34, 47:59, 48:58, 49:31, 50:30, 51:10, 52:9, 53:27, 54:28, 55:29, 56:57, 57:56, 58:48, 59:47}

{0:21, 1:45, 2:44, 3:24, 4:23, 5:22, 6:4, 7:3, 8:19, 9:18, 10:37, 11:38, 12:39, 13:20, 14:40, 15:41, 16:42, 17:43, 18:46, 19:25, 20:26, 21:7, 22:6, 23:5, 24:0, 25:1, 26:2, 27:17, 28:16, 29:35, 30:36, 31:53, 32:52, 33:51, 34:50, 35:49, 36:48, 37:47, 38:28, 39:27, 40:9, 41:10, 42:11, 43:12, 44:13, 45:8, 46:14, 47:15, 48:33, 49:32, 50:31, 51:30, 52:29, 53:57, 54:56, 55:58, 56:59, 57:34, 58:54, 59:55}

{0:21, 1:20, 2:19, 3:3, 4:4, 5:22, 6:23, 7:24, 8:44, 9:43, 10:42, 11:41, 12:40, 13:45, 14:39, 15:38, 16:37, 17:18, 18:17, 19:2, 20:1, 21:0, 22:5, 23:6, 24:7, 25:26, 26:25, 27:46, 28:47, 29:48, 30:49, 31:50, 32:51, 33:52, 34:53, 35:36, 36:35, 37:16, 38:15, 39:14, 40:12, 41:11, 42:10, 43:9, 44:8, 45:13, 46:27, 47:28, 48:29, 49:30, 50:31, 51:32, 52:33, 53:34, 54:59, 55:58, 56:56, 57:57, 58:55, 59:54}

{0:22, 1:23, 2:24, 3:44, 4:45, 5:21, 6:20, 7:19, 8:3, 9:2, 10:1, 11:0, 12:5, 13:4, 14:6, 15:7, 16:26, 17:25, 18:46, 19:43, 20:42, 21:41, 22:40, 23:39, 24:38, 25:37, 26:18, 27:17, 28:16, 29:15, 30:14, 31:12, 32:13, 33:8, 34:9, 35:27, 36:28, 37:47, 38:48, 39:49, 40:50, 41:55, 42:54, 43:53, 44:52, 45:51, 46:36, 47:35, 48:34, 49:59, 50:58, 51:56, 52:57, 53:29, 54:30, 55:31, 56:32, 57:33, 58:11, 59:10}

{0:22, 1:4, 2:3, 3:19, 4:20, 5:21, 6:45, 7:44, 8:24, 9:25, 10:26, 11:7, 12:6, 13:23, 14:5, 15:0, 16:1, 17:2, 18:17, 19:18, 20:37, 21:38, 22:39, 23:40, 24:41, 25:42, 26:43, 27:46, 28:47, 29:28, 30:27, 31:9, 32:8, 33:13, 34:12, 35:14, 36:15, 37:16, 38:35, 39:36, 40:53, 41:54, 42:55, 43:50, 44:51, 45:52, 46:49, 47:48, 48:57, 49:56, 50:58, 51:59, 52:34, 53:33, 54:32, 55:31, 56:30, 57:29, 58:10, 59:11}

{0:23, 1:22, 2:21, 3:45, 4:44, 5:24, 6:25, 7:26, 8:7, 9:8, 10:13, 11:0, 12:5, 13:6, 14:4, 15:3, 16:19, 17:20, 18:39, 19:40, 20:41, 21:42, 22:43, 23:46, 24:47, 25:28, 26:27, 27:9, 28:10, 29:11, 30:12, 31:14, 32:1, 33:2, 34:17, 35:18, 36:37, 37:38, 38:52, 39:51, 40:50, 41:55, 42:56,

43:57, 44:48, 45:49, 46:29, 47:30, 48:31, 49:58, 50:59, 51:54, 52:53, 53:36, 54:35, 55:34, 56:33, 57:32, 58:15, 59:16}

{0:23, 1:6, 2:7, 3:26, 4:25, 5:24, 6:44, 7:45, 8:21, 9:20, 10:19, 11:3, 12:4, 13:22, 14:5, 15:0, 16:13, 17:8, 18:9, 19:27, 20:28, 21:47, 22:46, 23:43, 24:42, 25:41, 26:40, 27:39, 28:38, 29:37, 30:18, 31:17, 32:2, 33:1, 34:14, 35:12, 36:11, 37:10, 38:30, 39:29, 40:57, 41:56, 42:55, 43:50, 44:49, 45:48, 46:51, 47:52, 48:53, 49:54, 50:59, 51:58, 52:31, 53:32, 54:33, 55:34, 56:35, 57:36, 58:16, 59:15}

{0:24, 1:44, 2:45, 3:21, 4:22, 5:23, 6:6, 7:7, 8:26, 9:27, 10:28, 11:47, 12:46, 13:25, 14:43, 15:42, 16:41, 17:40, 18:39, 19:20, 20:19, 21:3, 22:4, 23:5, 24:0, 25:13, 26:8, 27:9, 28:10, 29:30, 30:29, 31:57, 32:48, 33:49, 34:50, 35:51, 36:52, 37:38, 38:37, 39:18, 40:17, 41:16, 42:15, 43:14, 44:1, 45:2, 46:12, 47:11, 48:32, 49:33, 50:34, 51:35, 52:36, 53:53, 54:54, 55:59, 56:58, 57:31, 58:56, 59:55}

{0:24, 1:25, 2:26, 3:7, 4:6, 5:23, 6:22, 7:21, 8:45, 9:40, 10:41, 11:42, 12:43, 13:44, 14:46, 15:47, 16:28, 17:27, 18:9, 19:8, 20:13, 21:0, 22:5, 23:4, 24:3, 25:19, 26:20, 27:39, 28:38, 29:52, 30:51, 31:50, 32:49, 33:48, 34:57, 35:29, 36:30, 37:10, 38:11, 39:12, 40:14, 41:15, 42:16, 43:17, 44:2, 45:1, 46:18, 47:37, 48:36, 49:35, 50:34, 51:33, 52:32, 53:31, 54:58, 55:59, 56:54, 57:53, 58:55, 59:56}

{0:25, 1:46, 2:47, 3:28, 4:27, 5:26, 6:7, 7:6, 8:23, 9:22, 10:21, 11:45, 12:44, 13:24, 14:43, 15:42, 16:49, 17:48, 18:57, 19:29, 20:30, 21:10, 22:9, 23:8, 24:13, 25:0, 26:5, 27:4, 28:3, 29:19, 30:20, 31:39, 32:40, 33:41, 34:51, 35:50, 36:55, 37:56, 38:58, 39:31, 40:32, 41:33, 42:15, 43:14, 44:12, 45:11, 46:1, 47:2, 48:17, 49:16, 50:35, 51:34, 52:59, 53:54, 54:53, 55:36, 56:37, 57:18, 58:38, 59:52}

{0:25, 1:24, 2:23, 3:6, 4:7, 5:26, 6:27, 7:28, 8:47, 9:48, 10:49, 11:42, 12:43, 13:46, 14:44, 15:45, 16:21, 17:22, 18:4, 19:5, 20:0, 21:13, 22:8, 23:9, 24:10, 25:30, 26:29, 27:57, 28:56, 29:55, 30:50, 31:51, 32:41, 33:40, 34:39, 35:20, 36:19, 37:3, 38:2, 39:1, 40:14, 41:15, 42:33, 43:32, 44:11, 45:12, 46:31, 47:58, 48:59, 49:34, 50:35, 51:16, 52:17, 53:18, 54:37, 55:36, 56:53, 57:54, 58:52, 59:38}

{0:26, 1:27, 2:28, 3:47, 4:46, 5:25, 6:24, 7:23, 8:6, 9:5, 10:0, 11:13, 12:8, 13:7, 14:9, 15:10, 16:30, 17:29, 18:57, 19:48, 20:49, 21:42, 22:43, 23:44, 24:45, 25:21, 26:22, 27:4, 28:3, 29:2, 30:1, 31:14, 32:12, 33:11, 34:32, 35:31, 36:58, 37:56, 38:55, 39:50, 40:51, 41:52, 42:38, 43:39, 44:40, 45:41, 46:20, 47:19, 48:18, 49:37, 50:36, 51:53, 52:54, 53:59, 54:34, 55:35, 56:16, 57:17, 58:15, 59:33}

{0:26, 1:7, 2:6, 3:23, 4:24, 5:25, 6:46, 7:47, 8:28, 9:29, 10:30, 11:10, 12:9, 13:27, 14:8, 15:13, 16:0, 17:5, 18:4, 19:22, 20:21, 21:45, 22:44, 23:43, 24:42, 25:49, 26:48, 27:57, 28:56, 29:58, 30:31, 31:32, 32:11, 33:12, 34:14, 35:1, 36:2, 37:3, 38:19, 39:20, 40:39, 41:38, 42:52, 43:51, 44:41, 45:40, 46:50, 47:55, 48:54, 49:53, 50:36, 51:37, 52:18, 53:17, 54:16, 55:35, 56:34, 57:59, 58:33, 59:15}

{0:27, 1:26, 2:25, 3:46, 4:47, 5:28, 6:29, 7:30, 8:10, 9:11, 10:12, 11:13, 12:8, 13:9, 14:7, 15:6, 16:23, 17:24, 18:44, 19:43, 20:42, 21:49, 22:48, 23:57, 24:56, 25:58, 26:31, 27:32, 28:33, 29:15, 30:14, 31:1, 32:0, 33:5, 34:4, 35:22, 36:21, 37:45, 38:40, 39:41, 40:51, 41:52, 42:53, 43:54, 44:55, 45:50, 46:59, 47:34, 48:35, 49:36, 50:37, 51:38, 52:39, 53:20, 54:19, 55:18, 56:17, 57:16, 58:2, 59:3}

{0:27, 1:9, 2:10, 3:30, 4:29, 5:28, 6:47, 7:46, 8:25, 9:24, 10:23, 11:6, 12:7, 13:26, 14:8, 15:13, 16:12, 17:11, 18:32, 19:31, 20:58, 21:56, 22:57, 23:48, 24:49, 25:42, 26:43, 27:44, 28:45, 29:21, 30:22, 31:4, 32:5, 33:0, 34:1, 35:14, 36:15, 37:33, 38:34, 39:59, 40:54, 41:53, 42:52, 43:51, 44:50, 45:55, 46:41, 47:40, 48:39, 49:38, 50:37, 51:36, 52:35, 53:16, 54:17, 55:18, 56:19, 57:20, 58:3, 59:2}

{0:28, 1:47, 2:46, 3:25, 4:26, 5:27, 6:9, 7:10, 8:30, 9:31, 10:58, 11:56, 12:57, 13:29, 14:48, 15:49, 16:42, 17:43, 18:44, 19:24, 20:23, 21:6, 22:7, 23:8, 24:13, 25:12, 26:11, 27:32, 28:33, 29:34, 30:59, 31:54, 32:55, 33:50, 34:51, 35:41, 36:40, 37:45, 38:21, 39:22, 40:4, 41:3, 42:2, 43:1, 44:0, 45:5, 46:14, 47:15, 48:16, 49:17, 50:18, 51:19, 52:20, 53:39, 54:38, 55:37, 56:36, 57:35, 58:53, 59:52}

{0:28, 1:29, 2:30, 3:10, 4:9, 5:27, 6:26, 7:25, 8:46, 9:43, 10:42, 11:49, 12:48, 13:47, 14:57, 15:56, 16:58, 17:31, 18:32, 19:11, 20:12, 21:13, 22:8, 23:7, 24:6, 25:23, 26:24, 27:44, 28:45, 29:40, 30:41, 31:51, 32:50, 33:55, 34:54, 35:59, 36:34, 37:33, 38:15, 39:14, 40:1, 41:2, 42:3, 43:4, 44:5, 45:0, 46:22, 47:21, 48:20, 49:19, 50:18, 51:17, 52:16, 53:35, 54:36, 55:37, 56:38, 57:39, 58:52, 59:53}

{0:29, 1:57, 2:56, 3:58, 4:31, 5:30, 6:10, 7:9, 8:27, 9:26, 10:25, 11:46, 12:47, 13:28, 14:48, 15:49, 16:50, 17:55, 18:54, 19:59, 20:34, 21:33, 22:32, 23:11, 24:12, 25:13, 26:8, 27:7, 28:6, 29:23, 30:24, 31:44, 32:43, 33:42, 34:41, 35:51, 36:52, 37:53, 38:36, 39:35, 40:16, 41:17, 42:2, 43:1, 44:14, 45:15, 46:0, 47:5, 48:4, 49:3, 50:19, 51:18, 52:37, 53:38, 54:39, 55:20, 56:21, 57:22, 58:45, 59:40}

{0:29, 1:28, 2:27, 3:9, 4:10, 5:30, 6:31, 7:58, 8:56, 9:55, 10:50, 11:49, 12:48, 13:57, 14:47, 15:46, 16:25, 17:26, 18:7, 19:8, 20:13, 21:12, 22:11, 23:32, 24:33, 25:34, 26:59, 27:54, 28:53, 29:52, 30:51, 31:41, 32:42, 33:43, 34:44, 35:24, 36:23, 37:6, 38:5, 39:0, 40:1, 41:2, 42:17, 43:16, 44:15, 45:14, 46:35, 47:36, 48:37, 49:18, 50:19, 51:3, 52:4, 53:22, 54:21, 55:20, 56:39, 57:38, 58:40, 59:45}

{0:30, 1:31, 2:58, 3:56, 4:57, 5:29, 6:28, 7:27, 8:9, 9:8, 10:13, 11:12, 12:11, 13:10, 14:32, 15:33, 16:34, 17:59, 18:54, 19:55, 20:50, 21:49, 22:48, 23:47, 24:46, 25:25, 26:26, 27:7, 28:6, 29:5, 30:0, 31:1, 32:14, 33:15, 34:16, 35:35, 36:36, 37:53, 38:52, 39:51, 40:41, 41:40, 42:45, 43:44, 44:43, 45:42, 46:24, 47:23, 48:22, 49:21, 50:20, 51:39, 52:38, 53:37, 54:18, 55:19, 56:3, 57:4, 58:2, 59:17}

{0:30, 1:10, 2:9, 3:27, 4:28, 5:29, 6:57, 7:56, 8:58, 9:59, 10:34, 11:33, 12:32, 13:31, 14:11, 15:12, 16:13, 17:8, 18:7, 19:26, 20:25, 21:46, 22:47, 23:48, 24:49, 25:50, 26:55, 27:54, 28:53, 29:36, 30:35, 31:16, 32:15, 33:14, 34:1, 35:0, 36:5, 37:6, 38:23, 39:24, 40:44, 41:45, 42:40, 43:41, 44:42, 45:43, 46:51, 47:52, 48:38, 49:39, 50:20, 51:21, 52:22, 53:4, 54:3, 55:19, 56:18, 57:37, 58:17, 59:2}

{0:31, 1:32, 2:33, 3:34, 4:59, 5:58, 6:56, 7:57, 8:29, 9:28, 10:27, 11:9, 12:10, 13:30, 14:11, 15:12, 16:14, 17:15, 18:16, 19:35, 20:36, 21:53, 22:54, 23:55, 24:50, 25:49, 26:48, 27:47, 28:46, 29:25, 30:26, 31:7, 32:8, 33:13, 34:0, 35:1, 36:2, 37:17, 38:18, 39:37, 40:38, 41:39, 42:40, 43:41, 44:51, 45:52, 46:42, 47:43, 48:44, 49:45, 50:21, 51:20, 52:19, 53:3, 54:4, 55:22, 56:23, 57:24, 58:6, 59:5}

{0:31, 1:30, 2:29, 3:57, 4:56, 5:58, 6:59, 7:34, 8:33, 9:15, 10:14, 11:12, 12:11, 13:32, 14:10, 15:9, 16:27, 17:28, 18:47, 19:48, 20:49, 21:50, 22:55, 23:54, 24:53, 25:36,

26:35, 27:16, 28:17, 29:2, 30:1, 31:0, 32:13, 33:8, 34:7, 35:26, 36:25, 37:46, 38:43, 39:42, 40:41, 41:40, 42:39, 43:38, 44:52, 45:51, 46:37, 47:18, 48:19, 49:20, 50:21, 51:45, 52:44, 53:24, 54:23, 55:22, 56:4, 57:3, 58:5, 59:6}

{0:32, 1:31, 2:58, 3:59, 4:34, 5:33, 6:15, 7:14, 8:12, 9:13, 10:8, 11:9, 12:10, 13:11, 14:30, 15:29, 16:57, 17:56, 18:55, 19:54, 20:53, 21:36, 22:35, 23:16, 24:17, 25:2, 26:1, 27:0, 28:5, 29:6, 30:7, 31:26, 32:27, 33:28, 34:47, 35:48, 36:49, 37:50, 38:51, 39:52, 40:38, 41:39, 42:20, 43:19, 44:18, 45:37, 46:3, 47:4, 48:22, 49:21, 50:45, 51:40, 52:41, 53:42, 54:43, 55:44, 56:24, 57:23, 58:25, 59:46}

{0:32, 1:11, 2:12, 3:14, 4:15, 5:33, 6:34, 7:59, 8:58, 9:56, 10:57, 11:29, 12:30, 13:31, 14:10, 15:9, 16:8, 17:13, 18:0, 19:1, 20:2, 21:17, 22:16, 23:35, 24:36, 25:53, 26:54, 27:55, 28:50, 29:49, 30:48, 31:47, 32:28, 33:27, 34:26, 35:7, 36:6, 37:5, 38:4, 39:3, 40:19, 41:20, 42:39, 43:38, 44:37, 45:18, 46:52, 47:51, 48:41, 49:40, 50:45, 51:21, 52:22, 53:23, 54:24, 55:44, 56:43, 57:42, 58:46, 59:25}

{0:33, 1:34, 2:59, 3:58, 4:31, 5:32, 6:11, 7:12, 8:14, 9:1, 10:2, 11:17, 12:16, 13:15, 14:35, 15:36, 16:53, 17:54, 18:55, 19:56, 20:57, 21:29, 22:30, 23:10, 24:9, 25:8, 26:13, 27:0, 28:5, 29:4, 30:3, 31:19, 32:18, 33:37, 34:38, 35:52, 36:51, 37:50, 38:49, 39:48, 40:47, 41:46, 42:25, 43:26, 44:27, 45:28, 46:7, 47:6, 48:23, 49:24, 50:44, 51:43, 52:42, 53:41, 54:40, 55:45, 56:21, 57:22, 58:20, 59:39}

{0:33, 1:15, 2:14, 3:12, 4:11, 5:32, 6:31, 7:58, 8:59, 9:54, 10:53, 11:36, 12:35, 13:34, 14:16, 15:17, 16:2, 17:1, 18:0, 19:13, 20:8, 21:9, 22:10, 23:30, 24:29, 25:57, 26:56, 27:55, 28:50, 29:51, 30:52, 31:38, 32:37, 33:18, 34:19, 35:3, 36:4, 37:5, 38:6, 39:7, 40:26, 41:25, 42:46, 43:47, 44:28, 45:27, 46:48, 47:49, 48:42, 49:43, 50:44, 51:24, 52:23, 53:22, 54:21, 55:45, 56:40, 57:41, 58:39, 59:20}

{0:34, 1:35, 2:36, 3:53, 4:54, 5:59, 6:58, 7:31, 8:32, 9:11, 10:12, 11:14, 12:15, 13:33, 14:16, 15:17, 16:18, 17:37, 18:38, 19:52, 20:51, 21:50, 22:55, 23:56, 24:57, 25:29, 26:30, 27:10, 28:9, 29:8, 30:13, 31:0, 32:1, 33:2, 34:3, 35:19, 36:20, 37:39, 38:40, 39:41, 40:42, 41:43, 42:46, 43:47, 44:48, 45:49, 46:28, 47:27, 48:26, 49:25, 50:24, 51:44, 52:45, 53:21, 54:22, 55:23, 56:6, 57:7, 58:5, 59:4}

{0:34, 1:33, 2:32, 3:31, 4:58, 5:59, 6:54, 7:53, 8:36, 9:37, 10:18, 11:17, 12:16, 13:35, 14:15, 15:14, 16:12, 17:11, 18:10, 19:30, 20:29, 21:57, 22:56, 23:55, 24:50, 25:51, 26:52, 27:38, 28:39, 29:20, 30:19, 31:3, 32:2, 33:1, 34:0, 35:13, 36:8, 37:9, 38:27, 39:28, 40:47, 41:46, 42:43, 43:42, 44:49, 45:48, 46:41, 47:40, 48:45, 49:44, 50:24, 51:25, 52:26, 53:7, 54:6, 55:23, 56:22, 57:21, 58:4, 59:5} {0:35, 1:34, 2:59, 3:54, 4:53, 5:36, 6:37, 7:18, 8:17, 9:2, 10:1, 11:14, 12:15, 13:16, 14:33, 15:32, 16:31, 17:58, 18:56, 19:55, 20:50, 21:51, 22:52, 23:38, 24:39, 25:20, 26:19, 27:3, 28:4, 29:5, 30:0, 31:13, 32:12, 33:11, 34:10, 35:30, 36:29, 37:57, 38:48, 39:49, 40:42, 41:43, 42:44, 43:45, 44:40, 45:41, 46:21, 47:22, 48:23, 49:24, 50:25, 51:46, 52:47, 53:28, 54:27, 55:26, 56:7, 57:6, 58:8, 59:9}

{0:35, 1:16, 2:17, 3:18, 4:37, 5:36, 6:53, 7:54, 8:59, 9:58, 10:31, 11:32, 12:33, 13:34, 14:15, 15:14, 16:1, 17:2, 18:3, 19:19, 20:20, 21:39, 22:38, 23:52, 24:51, 25:50, 26:55, 27:56, 28:57, 29:29, 30:30, 31:10, 32:11, 33:12, 34:13, 35:0, 36:5, 37:4, 38:22, 39:21, 40:45, 41:44, 42:43, 43:42, 44:41, 45:40, 46:49, 47:48, 48:47, 49:46, 50:25, 51:24, 52:23, 53:6, 54:7, 55:26, 56:27, 57:28, 58:9, 59:8}

{0:36, 1:53, 2:54, 3:59, 4:34, 5:35, 6:16, 7:17, 8:18, 9:19, 10:20, 11:39, 12:38, 13:37, 14:52, 15:51, 16:50, 17:55, 18:56, 19:58, 20:31, 21:32, 22:33, 23:15, 24:14, 25:1, 26:2, 27:3, 28:4, 29:22, 30:21, 31:45, 32:40, 33:41, 34:42, 35:49, 36:48, 37:57, 38:29, 39:30, 40:10, 41:9, 42:8, 43:13, 44:12, 45:11, 46:0, 47:5, 48:6, 49:7, 50:26, 51:27, 52:28, 53:47, 54:46, 55:25, 56:24, 57:23, 58:44, 59:43}

{0:36, 1:37, 2:18, 3:17, 4:16, 5:35, 6:34, 7:59, 8:54, 9:55, 10:50, 11:51, 12:52, 13:53, 14:38, 15:39, 16:20, 17:19, 18:3, 19:2, 20:1, 21:14, 22:15, 23:33, 24:32, 25:31, 26:58, 27:56, 28:57, 29:48, 30:49, 31:42, 32:41, 33:40, 34:45, 35:21, 36:22, 37:4, 38:5, 39:0, 40:13, 41:8, 42:9, 43:10, 44:11, 45:12, 46:30, 47:29, 48:28, 49:27, 50:26, 51:7, 52:6, 53:23, 54:24, 55:25, 56:46, 57:47, 58:43, 59:44}

{0:37, 1:38, 2:39, 3:20, 4:19, 5:18, 6:17, 7:16, 8:35, 9:34, 10:59, 11:54, 12:53, 13:36, 14:52, 15:51, 16:41, 17:40, 18:45, 19:21, 20:22, 21:4, 22:3, 23:2, 24:1, 25:14, 26:15, 27:33, 28:32, 29:31, 30:58, 31:56, 32:55, 33:50, 34:49, 35:42, 36:43, 37:44, 38:24, 39:23, 40:6, 41:7, 42:8, 43:13, 44:0, 45:5, 46:12, 47:11, 48:10, 49:9, 50:27, 51:26, 52:25, 53:46, 54:47, 55:28, 56:29, 57:30, 58:57, 59:48}

{0:37, 1:36, 2:35, 3:16, 4:17, 5:18, 6:19, 7:20, 8:39, 9:40, 10:41, 11:51, 12:52, 13:38, 14:53, 15:54, 16:59, 17:34, 18:33, 19:15, 20:14, 21:1, 22:2, 23:3, 24:4, 25:22, 26:21, 27:45, 28:44, 29:43, 30:42, 31:49, 32:50, 33:55, 34:56, 35:58, 36:31, 37:32, 38:11, 39:12, 40:13, 41:8, 42:7, 43:6, 44:5, 45:0, 46:23, 47:24, 48:25, 49:26, 50:27, 51:9, 52:10, 53:30, 54:29, 55:28, 56:47, 57:46, 58:48, 59:57}

{0:38, 1:52, 2:51, 3:41, 4:40, 5:39, 6:20, 7:19, 8:18, 9:17, 10:16, 11:35, 12:36, 13:37, 14:53, 15:54, 16:55, 17:50, 18:49, 19:42, 20:43, 21:44, 22:45, 23:21, 24:22, 25:4, 26:3, 27:2, 28:1, 29:14, 30:15, 31:33, 32:34, 33:59, 34:58, 35:56, 36:57, 37:48, 38:47, 39:46, 40:25, 41:26, 42:7, 43:6, 44:23, 45:24, 46:5, 47:0, 48:13, 49:8, 50:9, 51:27, 52:28, 53:29, 54:30, 55:10, 56:11, 57:12, 58:32, 59:31}

{0:38, 1:37, 2:18, 3:19, 4:20, 5:39, 6:40, 7:41, 8:51, 9:50, 10:55, 11:54, 12:53, 13:52, 14:36, 15:35, 16:16, 17:17, 18:2, 19:3, 20:4, 21:22, 22:21, 23:45, 24:44, 25:43, 26:42, 27:49, 28:48, 29:57, 30:56, 31:58, 32:59, 33:34, 34:33, 35:15, 36:14, 37:1, 38:0, 39:5, 40:6, 41:7, 42:26, 43:25, 44:24, 45:23, 46:46, 47:47, 48:28, 49:27, 50:9, 51:8, 52:13, 53:12, 54:11, 55:10, 56:30, 57:29, 58:31, 59:32}

{0:39, 1:40, 2:41, 3:51, 4:52, 5:38, 6:37, 7:18, 8:19, 9:3, 10:4, 11:22, 12:21, 13:20, 14:45, 15:44, 16:43, 17:42, 18:49, 19:50, 20:55, 21:54, 22:53, 23:36, 24:35, 25:16, 26:17, 27:2, 28:1, 29:0, 30:5, 31:6, 32:23, 33:24, 34:25, 35:46, 36:47, 37:48, 38:57, 39:56, 40:58, 41:31, 42:32, 43:33, 44:34, 45:59, 46:15, 47:14, 48:12, 49:11, 50:10, 51:30, 52:29, 53:28, 54:27, 55:9, 56:8, 57:13, 58:7, 59:26}

{0:39, 1:20, 2:19, 3:18, 4:37, 5:38, 6:52, 7:51, 8:41, 9:42, 10:43, 11:44, 12:45, 13:40, 14:21, 15:22, 16:4, 17:3, 18:2, 19:17, 20:16, 21:35, 22:36, 23:53, 24:54, 25:55, 26:50, 27:49, 28:48, 29:47, 30:46, 31:25, 32:24, 33:23, 34:6, 35:5, 36:0, 37:1, 38:14, 39:15, 40:33, 41:32, 42:31, 43:58, 44:59, 45:34, 46:56, 47:57, 48:29, 49:30, 50:10, 51:11, 52:12, 53:13, 54:8, 55:9, 56:27, 57:28, 58:26, 59:7}

{0:40, 1:45, 2:44, 3:43, 4:42, 5:41, 6:51, 7:52, 8:38, 9:37, 10:18, 11:19, 12:20, 13:39, 14:21, 15:22, 16:23, 17:24, 18:25, 19:46, 20:47, 21:48, 22:49, 23:50, 24:55, 25:54, 26:53, 27:36, 28:35, 29:16, 30:17, 31:2, 32:3, 33:4, 34:5, 35:6, 36:7, 37:26, 38:27, 39:28, 40:29, 41:30, 42:31, 43:58, 44:56, 45:57, 46:59, 47:34, 48:33, 49:32, 50:11, 51:10, 52:9, 53:8, 54:13, 55:12, 56:14, 57:15, 58:1, 59:0}

{0:40, 1:39, 2:38, 3:52, 4:51, 5:41, 6:42, 7:43, 8:44, 9:24, 10:23, 11:22, 12:21, 13:45, 14:20, 15:19, 16:18, 17:37, 18:36, 19:53, 20:54, 21:55, 22:50, 23:49, 24:48, 25:47, 26:46, 27:25, 28:26, 29:7, 30:6, 31:5, 32:4, 33:3, 34:2, 35:17, 36:16, 37:35, 38:34, 39:59, 40:58, 41:31, 42:30, 43:29, 44:57, 45:56, 46:28, 47:27, 48:9, 49:10, 50:11, 51:32, 52:33, 53:15, 54:14, 55:12, 56:13, 57:8, 58:0, 59:1}

{0:41, 1:51, 2:52, 3:38, 4:39, 5:40, 6:45, 7:44, 8:43, 9:46, 10:47, 11:48, 12:49, 13:42, 14:50, 15:55, 16:54, 17:53, 18:36, 19:37, 20:18, 21:19, 22:20, 23:21, 24:22, 25:23, 26:24, 27:25, 28:26, 29:27, 30:28, 31:29, 32:57, 33:56, 34:58, 35:59, 36:34, 37:35, 38:16, 39:17, 40:2, 41:1, 42:0, 43:5, 44:4, 45:3, 46:6, 47:7, 48:8, 49:13, 50:12, 51:14, 52:15, 53:33, 54:32, 55:11, 56:10, 57:9, 58:30, 59:31}

{0:41, 1:42, 2:43, 3:44, 4:45, 5:40, 6:39, 7:38, 8:52, 9:53, 10:54, 11:55, 12:50, 13:51, 14:49, 15:48, 16:47, 17:46, 18:25, 19:24, 20:23, 21:22, 22:21, 23:20, 24:19, 25:18, 26:37, 27:36, 28:35, 29:34, 30:59, 31:58, 32:56, 33:57, 34:29, 35:28, 36:27, 37:26, 38:7, 39:6, 40:5, 41:0, 42:1, 43:2, 44:3, 45:4, 46:17, 47:16, 48:15, 49:14, 50:12, 51:13, 52:8, 53:9, 54:10, 55:11, 56:32, 57:33, 58:31, 59:30}

{0:42, 1:49, 2:48, 3:47, 4:46, 5:43, 6:44, 7:45, 8:40, 9:39, 10:38, 11:52, 12:51, 13:41, 14:50, 15:55, 16:56, 17:57, 18:29, 19:28, 20:27, 21:26, 22:25, 23:24, 24:23, 25:22, 26:21, 27:20, 28:19, 29:18, 30:37, 31:36, 32:53, 33:54, 34:59, 35:58, 36:31, 37:30, 38:10, 39:9, 40:8, 41:13, 42:0, 43:5, 44:6, 45:7, 46:4, 47:3, 48:2, 49:1, 50:14, 51:12, 52:11, 53:32, 54:33, 55:15, 56:16, 57:17, 58:35, 59:34}

{0:42, 1:41, 2:40, 3:45, 4:44, 5:43, 6:46, 7:47, 8:48, 9:57, 10:56, 11:55, 12:50, 13:49, 14:51, 15:52, 16:38, 17:39, 18:20, 19:21, 20:22, 21:23, 22:24, 23:25, 24:26, 25:27, 26:28, 27:29, 28:30, 29:31, 30:58, 31:59, 32:54, 33:53, 34:36, 35:37, 36:18, 37:19, 38:3, 39:4, 40:5, 41:0, 42:13, 43:8, 44:7, 45:6, 46:9, 47:10, 48:11, 49:12, 50:14, 51:1, 52:2, 53:17, 54:16, 55:15, 56:33, 57:32, 58:34, 59:35}

{0:43, 1:46, 2:47, 3:48, 4:49, 5:42, 6:41, 7:40, 8:45, 9:21, 10:22, 11:23, 12:24, 13:44, 14:25, 15:26, 16:27, 17:28, 18:29, 19:57, 20:56, 21:55, 22:50, 23:51, 24:52, 25:38, 26:39, 27:20, 28:19, 29:3, 30:4, 31:5, 32:6, 33:7, 34:8, 35:9, 36:10, 37:30, 38:31, 39:58, 40:59, 41:34, 42:35, 43:36, 44:53, 45:54, 46:37, 47:18, 48:17, 49:16, 50:15, 51:33, 52:32, 53:11, 54:12, 55:14, 56:1, 57:2, 58:0, 59:13}

{0:43, 1:44, 2:45, 3:40, 4:41, 5:42, 6:49, 7:48, 8:47, 9:28, 10:27, 11:26, 12:25, 13:46, 14:24, 15:23, 16:22, 17:21, 18:20, 19:39, 20:38, 21:52, 22:51, 23:50, 24:55, 25:56, 26:57, 27:29, 28:30, 29:10, 30:9, 31:8, 32:7, 33:6, 34:5, 35:4, 36:3, 37:19, 38:18, 39:37, 40:36, 41:35, 42:34, 43:59, 44:54, 45:53, 46:58, 47:31, 48:32, 49:33, 50:15, 51:16, 52:17, 53:2, 54:1, 55:14, 56:12, 57:11, 58:13, 59:0}

{0:44, 1:43, 2:42, 3:41, 4:40, 5:45, 6:21, 7:22, 8:23, 9:6, 10:7, 11:26, 12:25, 13:24, 14:46, 15:47, 16:48, 17:49, 18:50, 19:51, 20:52, 21:38, 22:39, 23:20, 24:19, 25:3, 26:4, 27:5, 28:0, 29:13, 30:8, 31:9, 32:27, 33:28, 34:29, 35:57, 36:56, 37:55, 38:54, 39:53, 40:36, 41:35, 42:16, 43:17, 44:18, 45:37, 46:2, 47:1, 48:14, 49:15, 50:33, 51:34, 52:59, 53:58, 54:31, 55:32, 56:11, 57:12, 58:10, 59:30}

{0:44, 1:24, 2:23, 3:22, 4:21, 5:45, 6:40, 7:41, 8:42, 9:49, 10:48, 11:47, 12:46, 13:43, 14:25, 15:26, 16:7, 17:6, 18:5, 19:4, 20:3, 21:19, 22:20, 23:39, 24:38, 25:52, 26:51, 27:50, 28:55, 29:56, 30:57, 31:29, 32:28, 33:27, 34:9, 35:8, 36:13, 37:0, 38:1, 39:2, 40:17, 41:16, 42:35, 43:36, 44:37, 45:18, 46:53, 47:54, 48:59, 49:34, 50:33, 51:15, 52:14, 53:12, 54:11, 55:32, 56:31, 57:58, 58:30, 59:10}

{0:45, 1:40, 2:41, 3:42, 4:43, 5:44, 6:24, 7:23, 8:22, 9:4, 10:3, 11:19, 12:20, 13:21, 14:39, 15:38, 16:52, 17:51, 18:50, 19:49, 20:48, 21:47, 22:46, 23:25, 24:26, 25:7, 26:6, 27:5, 28:0, 29:1, 30:2, 31:17, 32:18, 33:37, 34:36, 35:53, 36:54, 37:55, 38:56, 39:57, 40:29, 41:30, 42:10, 43:9, 44:27, 45:28, 46:8, 47:13, 48:12, 49:11, 50:32, 51:31, 52:58, 53:59, 54:34, 55:33, 56:15, 57:14, 58:16, 59:35}

{0:45, 1:21, 2:22, 3:23, 4:24, 5:44, 6:43, 7:42, 8:41, 9:51, 10:52, 11:38, 12:39, 13:40, 14:20, 15:19, 16:3, 17:4, 18:5, 19:6, 20:7, 21:26, 22:25, 23:46, 24:47, 25:48, 26:49, 27:50, 28:55, 29:54, 30:53, 31:36, 32:37, 33:18, 34:17, 35:2, 36:1, 37:0, 38:13, 39:8, 40:9, 41:10, 42:30, 43:29, 44:28, 45:27, 46:57, 47:56, 48:58, 49:31, 50:32, 51:11, 52:12, 53:14, 54:15, 55:33, 56:34, 57:59, 58:35, 59:16}

{0:46, 1:43, 2:42, 3:49, 4:48, 5:47, 6:28, 7:27, 8:26, 9:7, 10:6, 11:23, 12:24, 13:25, 14:44, 15:45, 16:40, 17:41, 18:51, 19:50, 20:55, 21:56, 22:57, 23:29, 24:30, 25:10, 26:9, 27:8, 28:13, 29:0, 30:5, 31:4, 32:22, 33:21, 34:20, 35:39, 36:38, 37:52, 38:53, 39:54, 40:59, 41:34, 42:33, 43:32, 44:31, 45:58, 46:11, 47:12, 48:14, 49:15, 50:16, 51:35, 52:36, 53:37, 54:18, 55:17, 56:2, 57:1, 58:3, 59:19}

{0:46, 1:25, 2:26, 3:27, 4:28, 5:47, 6:48, 7:49, 8:42, 9:41, 10:40, 11:45, 12:44, 13:43, 14:24, 15:23, 16:6, 17:7, 18:8, 19:9, 20:10, 21:30, 22:29, 23:57, 24:56, 25:55, 26:50, 27:51, 28:52, 29:38, 30:39, 31:20, 32:21, 33:22, 34:4, 35:5, 36:0, 37:13, 38:12, 39:11, 40:32, 41:33, 42:34, 43:59, 44:58, 45:31, 46:54, 47:53, 48:36, 49:35, 50:16, 51:15, 52:14, 53:1, 54:2, 55:17, 56:18, 57:37, 58:19, 59:3}

{0:47, 1:48, 2:49, 3:42, 4:43, 5:46, 6:25, 7:26, 8:27, 9:9, 10:10, 11:30, 12:29, 13:28, 14:57, 15:56, 16:55, 17:50, 18:51, 19:41, 20:40, 21:45, 22:44, 23:24, 24:23, 25:6, 26:7, 27:8, 28:13, 29:12, 30:11, 31:32, 32:31, 33:58, 34:59, 35:54, 36:53, 37:52, 38:38, 39:39, 40:20, 41:19, 42:3, 43:4, 44:22, 45:21, 46:5, 47:0, 48:1, 49:2, 50:17, 51:18, 52:37, 53:36, 54:35, 55:16, 56:15, 57:14, 58:33, 59:34}

{0:47, 1:28, 2:27, 3:26, 4:25, 5:46, 6:43, 7:42, 8:49, 9:50, 10:55, 11:56, 12:57, 13:48, 14:29, 15:30, 16:10, 17:9, 18:8, 19:7, 20:6, 21:23, 22:24, 23:44, 24:45, 25:40, 26:41, 27:51, 28:52, 29:53, 30:54, 31:59, 32:58, 33:31, 34:32, 35:11, 36:12, 37:13, 38:0, 39:5, 40:4, 41:3, 42:19, 43:20, 44:21, 45:22, 46:39, 47:38, 48:37, 49:18, 50:17, 51:2, 52:1, 53:14, 54:15, 55:16, 56:35, 57:36, 58:34, 59:33}

{0:48, 1:57, 2:56, 3:55, 4:50, 5:49, 6:42, 7:43, 8:46, 9:25, 10:26, 11:27, 12:28, 13:47, 14:29, 15:30, 16:31, 17:58, 18:59, 19:54, 20:53, 21:52, 22:51, 23:41, 24:40, 25:45, 26:44, 27:24, 28:23, 29:6, 30:7, 31:8, 32:9, 33:10, 34:11, 35:32, 36:33, 37:34, 38:35, 39:36, 40:37, 41:18,

42:19, 43:20, 44:39, 45:38, 46:21, 47:22, 48:4, 49:3, 50:2, 51:17, 52:16, 53:15, 54:14, 55:1, 56:0, 57:5, 58:13, 59:12}

{0:48, 1:47, 2:46, 3:43, 4:42, 5:49, 6:50, 7:55, 8:56, 9:58, 10:31, 11:30, 12:29, 13:57, 14:28, 15:27, 16:26, 17:25, 18:24, 19:44, 20:45, 21:40, 22:41, 23:51, 24:52, 25:53, 26:54, 27:59, 28:34, 29:33, 30:32, 31:11, 32:10, 33:9, 34:8, 35:7, 36:6, 37:23, 38:22, 39:21, 40:20, 41:19, 42:18, 43:37, 44:38, 45:39, 46:36, 47:35, 48:16, 49:17, 50:2, 51:3, 52:4, 53:5, 54:0, 55:1, 56:14, 57:15, 58:12, 59:13}

{0:49, 1:50, 2:55, 3:56, 4:57, 5:48, 6:47, 7:46, 8:43, 9:44, 10:45, 11:40, 12:41, 13:42, 14:51, 15:52, 16:53, 17:54, 18:59, 19:58, 20:31, 21:30, 22:29, 23:28, 24:27, 25:26, 26:25, 27:24, 28:23, 29:22, 30:21, 31:20, 32:39, 33:38, 34:37, 35:36, 36:35, 37:34, 38:33, 39:32, 40:11, 41:12, 42:13, 43:8, 44:9, 45:10, 46:7, 47:6, 48:5, 49:0, 50:1, 51:14, 52:15, 53:16, 54:17, 55:2, 56:3, 57:4, 58:19, 59:18}

{0:49, 1:42, 2:43, 3:46, 4:47, 5:48, 6:57, 7:56, 8:55, 9:54, 10:53, 11:52, 12:51, 13:50, 14:41, 15:40, 16:45, 17:44, 18:24, 19:25, 20:26, 21:27, 22:28, 23:29, 24:30, 25:31, 26:58, 27:59, 28:34, 29:35, 30:36, 31:37, 32:38, 33:39, 34:20, 35:21, 36:22, 37:23, 38:6, 39:7, 40:8, 41:13, 42:12, 43:11, 44:10, 45:9, 46:32, 47:33, 48:15, 49:14, 50:1, 51:0, 52:5, 53:4, 54:3, 55:2, 56:17, 57:16, 58:18, 59:19}

{0:50, 1:51, 2:52, 3:53, 4:54, 5:55, 6:56, 7:57, 8:48, 9:47, 10:46, 11:43, 12:42, 13:49, 14:41, 15:40, 16:39, 17:38, 18:37, 19:36, 20:35, 21:34, 22:59, 23:58, 24:31, 25:30, 26:29, 27:28, 28:27, 29:26, 30:25, 31:24, 32:44, 33:45, 34:21, 35:20, 36:19, 37:18, 38:17, 39:16, 40:15, 41:14, 42:12, 43:11, 44:32, 45:33, 46:10, 47:9, 48:8, 49:13, 50:0, 51:1, 52:2, 53:3, 54:4, 55:5, 56:6, 57:7, 58:23, 59:22}

{0:50, 1:49, 2:48, 3:57, 4:56, 5:55, 6:54, 7:53, 8:52, 9:38, 10:39, 11:40, 12:41, 13:51, 14:42, 15:43, 16:46, 17:47, 18:28, 19:29, 20:30, 21:31, 22:58, 23:59, 24:34, 25:35, 26:36, 27:37, 28:18, 29:19, 30:20, 31:21, 32:45, 33:44, 34:24, 35:25, 36:26, 37:27, 38:9, 39:10, 40:11, 41:12, 42:14, 43:15, 44:33, 45:32, 46:16, 47:17, 48:2, 49:1, 50:0, 51:13, 52:8, 53:7, 54:6, 55:5, 56:4, 57:3, 58:22, 59:23}

{0:51, 1:50, 2:55, 3:54, 4:53, 5:52, 6:38, 7:39, 8:40, 9:45, 10:44, 11:43, 12:42, 13:41, 14:49, 15:48, 16:57, 17:56, 18:58, 19:59, 20:34, 21:35, 22:36, 23:37, 24:18, 25:19, 26:20, 27:21, 28:22, 29:23, 30:24, 31:25, 32:46, 33:47, 34:28, 35:29, 36:30, 37:31, 38:32, 39:33, 40:15, 41:14, 42:1, 43:2, 44:17, 45:16, 46:3, 47:4, 48:5, 49:0, 50:13, 51:12, 52:11, 53:10, 54:9, 55:8, 56:7, 57:6, 58:26, 59:27}

{0:51, 1:41, 2:40, 3:39, 4:38, 5:52, 6:53, 7:54, 8:55, 9:56, 10:57, 11:48, 12:49, 13:50, 14:42, 15:43, 16:44, 17:45, 18:21, 19:20, 20:19, 21:18, 22:37, 23:36, 24:35, 25:34, 26:59, 27:58, 28:31, 29:30, 30:29, 31:28, 32:47, 33:46, 34:25, 35:24, 36:23, 37:22, 38:4, 39:3, 40:2, 41:1, 42:14, 43:15, 44:16, 45:17, 46:33, 47:32, 48:11, 49:12, 50:13, 51:0, 52:5, 53:6, 54:7, 55:8, 56:9, 57:10, 58:27, 59:26}

{0:52, 1:53, 2:54, 3:55, 4:50, 5:51, 6:41, 7:40, 8:39, 9:20, 10:19, 11:18, 12:37, 13:38, 14:36, 15:35, 16:34, 17:59, 18:58, 19:56, 20:57, 21:48, 22:49, 23:42, 24:43, 25:44, 26:45, 27:21, 28:22, 29:4, 30:3, 31:2, 32:17, 33:16, 34:15, 35:33, 36:32, 37:31, 38:30, 39:29, 40:28, 41:27, 42:26, 43:25, 44:46, 45:47, 46:24, 47:23, 48:6, 49:7, 50:8, 51:9, 52:10, 53:11, 54:12, 55:13, 56:0, 57:5, 58:1, 59:14}

{0:52, 1:38, 2:39, 3:40, 4:41, 5:51, 6:50, 7:55, 8:54, 9:59, 10:34, 11:35, 12:36, 13:53, 14:37, 15:18, 16:19, 17:20, 18:21, 19:45, 20:44, 21:43, 22:42, 23:49, 24:48, 25:57, 26:56, 27:58, 28:31, 29:32, 30:33, 31:15, 32:16, 33:17, 34:2, 35:3, 36:4, 37:22, 38:23, 39:24, 40:25, 41:26, 42:27, 43:28, 44:47, 45:46, 46:29, 47:30, 48:10, 49:9, 50:8, 51:7, 52:6, 53:5, 54:0, 55:13, 56:12, 57:11, 58:14, 59:1}

{0:53, 1:52, 2:51, 3:50, 4:55, 5:54, 6:59, 7:34, 8:35, 9:16, 10:17, 11:18, 12:37, 13:36, 14:38, 15:39, 16:40, 17:41, 18:42, 19:49, 20:48, 21:57, 22:56, 23:58, 24:31, 25:32, 26:33, 27:15, 28:14, 29:1, 30:2, 31:3, 32:19, 33:20, 34:21, 35:45, 36:44, 37:43, 38:46, 39:47, 40:28, 41:27, 42:9, 43:10, 44:30, 45:29, 46:11, 47:12, 48:13, 49:8, 50:7, 51:26, 52:25, 53:24, 54:23, 55:6, 56:5, 57:0, 58:4, 59:22}

{0:53, 1:36, 2:35, 3:34, 4:59, 5:54, 6:55, 7:50, 8:51, 9:41, 10:40, 11:39, 12:38, 13:52, 14:37, 15:18, 16:17, 17:16, 18:15, 19:33, 20:32, 21:31, 22:58, 23:56, 24:57, 25:48, 26:49, 27:42, 28:43, 29:44, 30:45, 31:21, 32:20, 33:19, 34:3, 35:2, 36:1, 37:14, 38:12, 39:11, 40:10, 41:9, 42:27, 43:28, 44:29, 45:30, 46:47, 47:46, 48:25, 49:26, 50:7, 51:8, 52:13, 53:0, 54:5, 55:6, 56:23, 57:24, 58:22, 59:4}

{0:54, 1:59, 2:34, 3:35, 4:36, 5:53, 6:52, 7:51, 8:50, 9:49, 10:48, 11:57, 12:56, 13:55, 14:58, 15:31, 16:32, 17:33, 18:15, 19:16, 20:17, 21:18, 22:37, 23:38, 24:39, 25:40, 26:41, 27:42, 28:43, 29:46, 30:47, 31:28, 32:29, 33:30, 34:10, 35:11, 36:12, 37:14, 38:1, 39:2, 40:3, 41:4, 42:22, 43:21, 44:20, 45:19, 46:45, 47:44, 48:24, 49:23, 50:6, 51:5, 52:0, 53:13, 54:8, 55:7, 56:26, 57:25, 58:27, 59:9}

{0:54, 1:55, 2:50, 3:51, 4:52, 5:53, 6:36, 7:35, 8:34, 9:33, 10:32, 11:31, 12:58, 13:59, 14:56, 15:57, 16:48, 17:49, 18:42, 19:41, 20:40, 21:39, 22:38, 23:37, 24:18, 25:17, 26:16, 27:15, 28:14, 29:12, 30:11, 31:10, 32:30, 33:29, 34:28, 35:47, 36:46, 37:43, 38:44, 39:45, 40:21, 41:22, 42:4, 43:3, 44:19, 45:20, 46:2, 47:1, 48:0, 49:5, 50:6, 51:23, 52:24, 53:25, 54:26, 55:7, 56:8, 57:13, 58:9, 59:27}

{0:55, 1:56, 2:57, 3:48, 4:49, 5:50, 6:51, 7:52, 8:53, 9:36, 10:35, 11:34, 12:59, 13:54, 14:58, 15:31, 16:30, 17:29, 18:28, 19:47, 20:46, 21:43, 22:42, 23:41, 24:40, 25:39, 26:38, 27:37, 28:18, 29:17, 30:16, 31:15, 32:33, 33:32, 34:11, 35:10, 36:9, 37:27, 38:26, 39:25, 40:24, 41:23, 42:22, 43:21, 44:45, 45:44, 46:20, 47:19, 48:3, 49:4, 50:5, 51:6, 52:7, 53:8, 54:13, 55:0, 56:1, 57:2, 58:14, 59:12}

{0:55, 1:54, 2:53, 3:52, 4:51, 5:50, 6:49, 7:48, 8:57, 9:29, 10:30, 11:31, 12:58, 13:56, 14:59, 15:34, 16:35, 17:36, 18:37, 19:38, 20:39, 21:40, 22:41, 23:42, 24:43, 25:46, 26:47, 27:28, 28:27, 29:9, 30:10, 31:11, 32:32, 33:33, 34:15, 35:16, 36:17, 37:18, 38:19, 39:20, 40:21, 41:22, 42:23, 43:24, 44:44, 45:45, 46:25, 47:26, 48:7, 49:6, 50:5, 51:4, 52:3, 53:2, 54:1, 55:0, 56:13, 57:8, 58:12, 59:14}

{0:56, 1:58, 2:31, 3:30, 4:29, 5:57, 6:48, 7:49, 8:50, 9:51, 10:52, 11:53, 12:54, 13:55, 14:59, 15:34, 16:33, 17:32, 18:11, 19:10, 20:9, 21:27, 22:28, 23:47, 24:46, 25:43, 26:42, 27:41, 28:40, 29:39, 30:38, 31:37, 32:36, 33:35, 34:16, 35:15, 36:14, 37:12, 38:13, 39:8, 40:7, 41:6, 42:23, 43:24, 44:25, 45:26, 46:44, 47:45, 48:21, 49:22, 50:4, 51:5, 52:0, 53:1, 54:2, 55:3, 56:19, 57:20, 58:18, 59:17}

{0:56, 1:55, 2:50, 3:49, 4:48, 5:57, 6:29, 7:30, 8:31, 9:32, 10:33, 11:34, 12:59, 13:58, 14:54, 15:53, 16:52, 17:51, 18:41, 19:42, 20:43, 21:46, 22:47, 23:28, 24:27, 25:9,

26:10, 27:11, 28:12, 29:14, 30:15, 31:16, 32:35, 33:36, 34:37, 35:38, 36:39, 37:40, 38:45, 39:44, 40:24, 41:23, 42:6, 43:7, 44:26, 45:25, 46:8, 47:13, 48:0, 49:5, 50:4, 51:22, 52:21, 53:20, 54:19, 55:3, 56:2, 57:1, 58:17, 59:18}

{0:57, 1:48, 2:49, 3:50, 4:55, 5:56, 6:58, 7:31, 8:30, 9:10, 10:9, 11:27, 12:28, 13:29, 14:47, 15:46, 16:43, 17:42, 18:41, 19:51, 20:52, 21:53, 22:54, 23:59, 24:34, 25:33, 26:32, 27:11, 28:12, 29:13, 30:8, 31:7, 32:26, 33:25, 34:24, 35:44, 36:45, 37:40, 38:39, 39:38, 40:37, 41:18, 42:17, 43:16, 44:35, 45:36, 46:15, 47:14, 48:1, 49:2, 50:3, 51:19, 52:20, 53:21, 54:22, 55:4, 56:5, 57:0, 58:6, 59:23}

{0:57, 1:29, 2:30, 3:31, 4:58, 5:56, 6:55, 7:50, 8:49, 9:42, 10:43, 11:46, 12:47, 13:48, 14:28, 15:27, 16:9, 17:10, 18:11, 19:32, 20:33, 21:34, 22:59, 23:54, 24:53, 25:52, 26:51, 27:41, 28:40, 29:45, 30:44, 31:24, 32:25, 33:26, 34:7, 35:8, 36:13, 37:12, 38:14, 39:15, 40:16, 41:17, 42:18, 43:37, 44:36, 45:35, 46:38, 47:39, 48:20, 49:19, 50:3, 51:2, 52:1, 53:0, 54:5, 55:4, 56:22, 57:21, 58:23, 59:6}

{0:58, 1:59, 2:34, 3:33, 4:32, 5:31, 6:30, 7:29, 8:57, 9:48, 10:49, 11:50, 12:55, 13:56, 14:54, 15:53, 16:36, 17:35, 18:16, 19:15, 20:14, 21:12, 22:11, 23:10, 24:9, 25:27, 26:28, 27:47, 28:46, 29:43, 30:42, 31:41, 32:51, 33:52, 34:38, 35:37, 36:18, 37:17, 38:2, 39:1, 40:0, 41:5, 42:6, 43:7, 44:8, 45:13, 46:26, 47:25, 48:24, 49:23, 50:22, 51:4, 52:3, 53:19, 54:20, 55:21, 56:45, 57:44, 58:40, 59:39}

{0:58, 1:56, 2:57, 3:29, 4:30, 5:31, 6:32, 7:33, 8:34, 9:35, 10:36, 11:53, 12:54, 13:59, 14:55, 15:50, 16:49, 17:48, 18:47, 19:28, 20:27, 21:9, 22:10, 23:11, 24:12, 25:14, 26:15, 27:16, 28:17, 29:18, 30:37, 31:38, 32:52, 33:51, 34:41, 35:42, 36:43, 37:46, 38:25, 39:26, 40:7, 41:6, 42:5, 43:0, 44:13, 45:8, 46:1, 47:2, 48:3, 49:4, 50:22, 51:23, 52:24, 53:44, 54:45, 55:21, 56:20, 57:19, 58:39, 59:40}

{0:59, 1:58, 2:31, 3:32, 4:33, 5:34, 6:35, 7:36, 8:53, 9:52, 10:51, 11:50, 12:55, 13:54, 14:56, 15:57, 16:29, 17:30, 18:10, 19:11, 20:12, 21:14, 22:15, 23:16, 24:17, 25:18, 26:37, 27:38, 28:39, 29:40, 30:41, 31:42, 32:49, 33:48, 34:47, 35:28, 36:27, 37:9, 38:8, 39:13, 40:0, 41:5, 42:4, 43:3, 44:2, 45:1, 46:19, 47:20, 48:21, 49:22, 50:23, 51:6, 52:7, 53:26, 54:25, 55:24, 56:44, 57:45, 58:43, 59:46}

{0:59, 1:54, 2:53, 3:36, 4:35, 5:34, 6:33, 7:32, 8:31, 9:30, 10:29, 11:57, 12:56, 13:58, 14:55, 15:50, 16:51, 17:52, 18:38, 19:37, 20:18, 21:17, 22:16, 23:15, 24:14, 25:12, 26:11, 27:10, 28:9, 29:27, 30:28, 31:47, 32:48, 33:49, 34:42, 35:41, 36:40, 37:39, 38:20, 39:19, 40:3, 41:4, 42:5, 43:0, 44:1, 45:2, 46:13, 47:8, 48:7, 49:6, 50:23, 51:22, 52:21, 53:45, 54:44, 55:24, 56:25, 57:26, 58:46, 59:43}

Thus, a simple query graph such as the query graph 3800 which does not include any attributes, only topology, and a simple main graph such as the main graph 3700 that does not even represent the full molecular structure of an element let alone a compound may produce hundreds of results without breaking symmetry. The majority of the 120 results above are unnecessary duplicates. To filter out the duplicates, as discussed above, two main methodologies are conventionally used.

The first conventional methodology is to post process the results. In the example above, this would mean a highly trained graph-theory expert would need to go through each and every one of the 120 results manually to identify the duplicate results and discard them. Even for a highly trained graph-theory expert, this may take days (and a real-world example having multiples of 602,214,076,000,000,000,000,000 molecules could take months if not years). Plus, the manual analysis technique is error prone and highly dependent on the skill of the graph theory expert. For example, the actual result may end up being discarded or a duplicate may end up being produced as the final result. Because the majority of the results are duplicates, there is no need to even generate those duplicate results. The first methodology requires unnecessarily wasting significant computing resources to compute the 120 results only for most of those results to be discarded. Thus, the first methodology is inefficient, inadequate, inaccurate, very slow, and requires significant computing resources.

The second conventional methodology is to write logic to break symmetry in the query graph 3800. This may entail a highly trained graph theory expert to study the symmetry in the query graph 3800 and then manually write the logic to break symmetry. Even with tools to assist with detecting automorphisms in the query graph 3800, the logic to break symmetry would need to be manually written. Manually writing the logic even for a simple query graph as the query graph 3800 may take hours if not days. Manually writing code to break symmetry is a time intensive and error prone task that requires multiple iterations or repetitive work. For example, first an expert determines if a query graph has symmetry. Then the expert determines the nature of the symmetry (e.g., 2-fold, 3-fold, . . . , n-fold, etc.) and identifies which nodes are involved in that symmetry. Responsive to determining which nodes are involved in the symmetry, the expert writes a "best guess" logic that purports to break symmetry. The expert verifies that logic against the query graph with all the identified nodes to determine if the symmetry is broken. If not, the expert tweaks the logic, remaps the nodes, reverifies, and repeats the process until symmetry is broken. Writing logic to break symmetry is thus a combinatorial process. The expert needs to determine if a node could map to another node, and for each of those mappings, whether node could map to something else and so on. This combinatorial process is factorial (e.g., dependent) on the number of nodes in the query graph, so even just a 10-node graph may have millions of considerations.

Manually writing logic for a graph that also includes any attributes complicates the task even more. Even then the logic may be faulty. If the logic is faulty, the results may be faulty too. In real-world applications, often variations of a query are desired to be run in quick succession to fully evaluate and analyze all aspects of a problem. Each time a query is tweaked, the resulting query graph may change too. Each time the query graph changes, the logic needs to be written again, which could again take a long time to write. Thus, relying on this approach in real-world applications is impractical, inadequate, error prone, undesirable, as well as very slow.

Both conventional techniques discussed above are currently considered state of the art. In stark contrast to these conventional approaches, the present approach provides significant improvement.

First, the present approach is highly accurate (e.g., 100% accurate or close). In the example above, using the proposed approach, a single correct result is found:

{0:0, 1:1, 2:2, 3:3, 4:4, 5:5, 6:6, 7:7, 8:8, 9:9, 10:10, 11:11, 12:12, 13:13, 14:14, 15:15, 16:16, 17:17, 18:18, 19:19, 20:20, 21:21, 22:22, 23:23, 24:24, 25:25, 26:26, 27:27, 28:28, 29:29, 30:30, 31:31, 32:32, 33:33, 34:34, 35:35, 36:36, 37:37, 38:38, 39:39, 40:40, 41:41, 42:42, 43:43,

44:44, 45:45, 46:46, 47:47, 48:48, 49:49, 50:50, 51:51, 52:52, 53:53, 54:54, 55:55, 56:56, 57:57, 58:58, 59:59}

Second, symmetry in the query graph 3800 is automatically broken by automatically generating the symmetry breaking expression in real-time (or substantial real-time). No manual logic needs to be written. No post processing needs to be done. If the query graph 3800 is tweaked, another query may be instantaneously run upon generating the tweaked query graph.

Third, the proposed approach produces results in a matter of seconds. For example, to break symmetry in the query graph 3800 and obtain the single result took the inventors approximately 1.8 seconds. A human mind is incapable of producing results that quickly even for a simple query graph such as the query graph 3800.

Fourth, because the proposed approach only produces the final result, no computing resources are wasted. While the conventional techniques may require large servers or supercomputers, the proposed approach may be performed on commodity hardware (e.g., personal laptops and desktops).

Fifth, because only the final results are generated, less memory is needed. In particular, the first conventional technique would require significant amounts of memory to store the results. There is no such requirement with the proposed approach. Thus, considerable memory savings may be achieved.

Sixth: no highly trained graph theory expert is needed. Because the symmetry is broken automatically by the pattern matching application 1435, a technician trained to operate the computer on which the pattern matching application 1435 is installed can execute the proposed approach.

Figure 39:
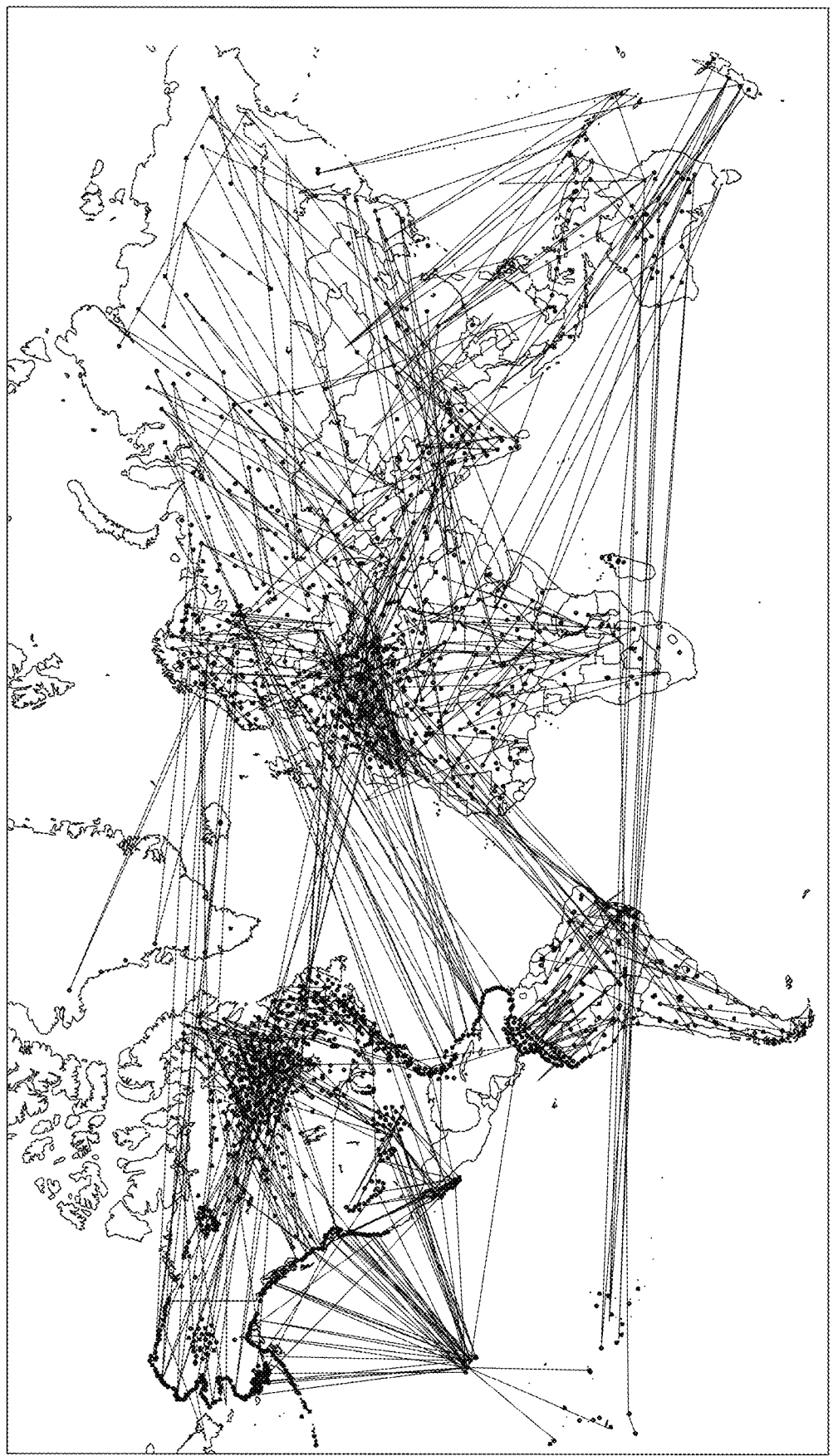
FIG. 39 illustrates an example of a main graph for a real-world application, according to embodiments of the present technology.
Figure 40:
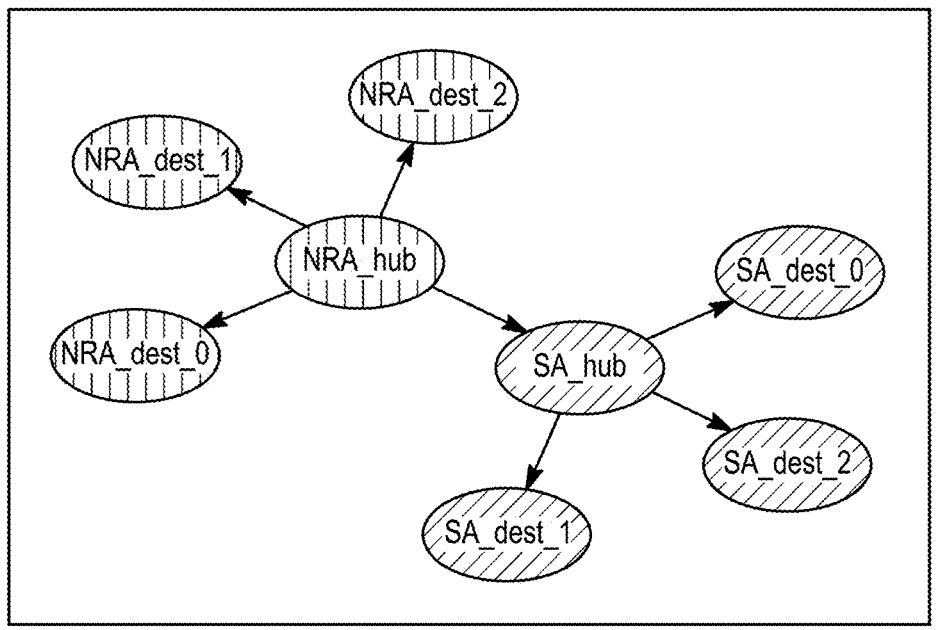
FIG. 40 illustrates an example of a simple query graph for the main graph of FIG. 39, according to embodiments of the present technology.

Referring now to FIGS. 39 and 40, an example of a real-world application is shown, in accordance with some embodiments of the present disclosure. FIG. 39 shows an example of a main graph 3900 in the aviation industry. FIG. 40 shows an example of a query graph 4000. The main graph 3900 represents airline routes. In particular, the main graph 3900 shows various airports around the world that are serviced by a flight. Each airport around the world is a node of a graph and each flight between two airports is an edge of the graph. A rough estimate by the inventors indicates that there are around 6085 airports around the world. Thus, assuming the 6085 airports, the main graph 3900 has 6085 nodes. Inventors found approximately 36,354 different routes between the 6085 airports. Each flight route between two airports is an edge.

The problem or query may be to find two "hub" airports that are connected by a route, such that the first "hub" airport is in Nigeria and connected to at least 3 other Nigerian airports and the second "hub" is in South Africa and connected to at least 3 other South African airports. This query, which is a rather simple query, when converted into a graph form, is shown in the query graph 4000. Inventors found that there are 24 airports in Nigeria and 59 airports in South Africa. The query graph 4000 has 36-way symmetry (e.g., because there are 36 different combinations of node remappings that produce an equivalent graph). Further, each node of the query graph 4000 has a single node attribute: country (e.g., Nigeria or South Africa). Thus, the query above may be solved using the main graph 3900 and the query graph 4000 by finding subgraphs from the main graph that match the query graph.

Without breaking symmetry, inventors estimate over 3 million (e.g., 3,326,400) matches based on the 36-way symmetry (e.g., 36*92,400 (92,400 is the number of results without symmetry as explained below)). Inventors attempted to employ the first conventional technique discussed above to generate the over 3 million results on commodity hardware (e.g., personal desktop having an Intel(R) Core(TM) i7-7700 CPU@3.60 GHZ quad-core processor and 32 GB RAM). After running for several minutes, the inventors' computers crashed, and no results were produced. The inventors lacked sufficient memory and computing power to run a query of this scale. Thus, the first conventional technique is incapable of producing results on commodity hardware without access to large scale servers or supercomputers. The inventors, who are both graph-theory experts, then attempted to break symmetry using the second conventional approach described above. First, the inventors identified the symmetry in the query graph 4000 using Nauty. Then, the inventors attempted to manually write logic to break symmetry in the query graph 4000. Writing one logic for the simply query graph 400 took the inventors about a half hour of time. Each time the query graph 4000 was tweaked (e.g., to run a similar but slightly different query), the inventors had to repeat the process and write a new logic, expending another half an hour or so of time. Thus, the second conventional technique is too slow and running multiple queries may require either a team of experts, each working on writing logic for one query and multiple computers to run the query or running each query sequentially slowly.

The inventors also executed the query graph 4000 using the proposed approach. After breaking symmetry by automatically generating the symmetry breaking expression and using the symmetry breaking expression to find subgraphs from the main graph 3900 using the proposed approach, 92,400 results were produced. Thus, instead of producing over 3 million results, the majority of which are duplicates, the proposed approach produces only the correct results. Inventors were able to execute the query using commodity hardware (e.g., personal desktop having an Intel(R) Core (TM) i7-7700 CPU@3.60 GHz quad-core processor and 32 GB RAM). Running the query took about 16.3 seconds, which is a significant improvement from both conventional techniques. Running additional queries similarly took a mere seconds.

EXAMPLE 1

1. A non-transitory computer-readable medium comprising computer-readable instructions stored thereon that when executed by a processor cause the processor to: receive a main graph and a query graph, wherein the query graph contains symmetry; generate a symmetry breaking expression from the query graph by: (A) detecting one or more orbits in the query graph, wherein each orbit comprises one or more nodes of the query graph; (B) selecting an orbit from the one or more orbits having more than one node; (C) generating an automorphism breaking sub-expression for the selected orbit; (D) assigning a node of the selected orbit a unique node attribute; (E) recalculating the one or more orbits in the query graph; (F) repeating (B)-(E) until each orbit in the query graph has a single node; and (G) combining each of the automorphism breaking sub-expressions generated in (C) to obtain the symmetry breaking expression; translate the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

2. The non-transitory computer-readable medium of claim 1, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction.

3. The non-transitory computer-readable medium of claim 2, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

4. The non-transitory computer-readable medium of claim 1, wherein combining each of the automorphism breaking sub-expressions in (G) comprises appending each of the automorphism breaking sub-expressions by conjunction.

5. The non-transitory computer-readable medium of claim 1, wherein to translate the symmetry breaking expression to refer to the one or more nodes and the one or more edges in the query graph, the computer-readable instructions further cause the processor to: identify a term in the symmetry breaking expression; identify a first node and a second node in the term; responsive to determining that the first node was created during subdivision of a first edge of the query graph, identify a third node and a fourth node in the query graph connected by the first edge; assign a first edge key to the first edge; responsive to determining that the second node was created during subdivision of a second edge of the query graph, identify a fifth node and a sixth node in the query graph connected by the second edge; assign a second edge key to the second edge; and responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

6. The non-transitory computer-readable medium of claim 1, wherein the computer-readable instructions further cause the processor to: determine that the query graph comprises an edge attribute between a first node and a second node of the query graph; and create a new node for the edge attribute between the first node and the second node to obtain a transformed query graph, the new node having a node attribute corresponding to the edge attribute, wherein the symmetry breaking expression is generated from the transformed query graph instead of the query graph.

7. The non-transitory computer-readable medium of claim 1, wherein the computer-readable instructions further cause the processor to: determine that the query graph comprises multiple edges between a first node and a second node of the query graph; and create a new node between the first node and the second node for each of the multiple edges to obtain a transformed query graph, wherein the symmetry breaking expression is generated from the transformed query graph instead of the query graph.

8. The non-transitory computer-readable medium of claim 1, wherein the computer-readable instructions further cause the processor to: determine that the query graph comprises at least one of (a) at least two node attributes, (b) at least two edge attributes, or (c) at least one node attribute and at least one edge attribute; and convert each of the node attributes and each of the edge attributes into a single output attribute to obtain a transformed query graph, wherein the symmetry breaking expression is generated from the transformed query graph instead of the query graph.

9. The non-transitory computer-readable medium of claim 8, wherein the output attribute is different from each of the node attributes and each of the edge attributes in the query graph.

10. The non-transitory computer-readable medium of claim 1, wherein the computer-readable instructions further cause the processor to: determine that the query graph comprises an additional query; convert the additional query into a tree representation; and combine the tree representation with the query graph to obtain a transformed query graph, wherein the symmetry breaking expression is generated from the transformed query graph instead of the query graph.

11. The non-transitory computer-readable medium of claim 10, wherein to convert the additional query into the tree representation, the computer-readable instructions further cause the processor to: convert the additional query into a tree form by: responsive to determining that the additional query comprises a constant value, creating a first new node in a directed acyclic graph (DAG) for the constant value; responsive to determining that the additional query comprises a node expression of an attribute, creating a second new node and a third new node in the DAG, the second new node representing the node associated with the node expression and the third new node representing the attribute of the node expression; creating a first edge between the second new node and the third new node; responsive to determining that the additional query comprises a left operand <operator> right operand form, creating a fourth new node in the DAG for the <operator>; creating a string node attribute for the fourth new node representing the <operator>; and responsive to determining that the <operator> is commutative, adding a second edge from the fourth new node to the left operand and a third edge from the fourth new node to the right operand or responsive to determining that the <operator> is not commutative, adding the second edge from the fourth new node to the left operand and a fourth edge from the right operand to the fourth new node; and simplify the tree form to obtain the tree representation by: creating a copy of the DAG; responsive to determining that a node N in the copy of the DAG represents an associative operator: identifying a child node C of the node N that has the same associative operator; adding a fifth edge from the node N to each child node C' of the child node C; and deleting the child node C; responsive to determining that the node N is an AND operator: identifying child node C1 and child node C2 of the node N that have a same transitive operator; identifying children nodes G1 of the child node C1 and children nodes G2 of the child node C2; responsive to determining that there is at least one common node between the children nodes G1 and the children nodes G2, adding a sixth edge from the child node C1 to each of the children nodes G2; and deleting the child node C2 from the copy of the DAG; and responsive to determining that the copy of the DAG comprises subgraphs of the form A <EQ> B <COMP> constant value, adding a seventh edge from node COMP to Node A for each of the subgraphs.

12. The non-transitory computer-readable medium of claim 11, wherein to combine the tree representation with the query graph, the computer-readable instructions further cause the processor to: initialize the first transformed query graph as a copy of the transformed query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the query graph to the transformed query graph.

13. A system comprising: a memory having computer-readable instructions stored thereon; and a processor that executes the computer-readable instructions to: receive a main graph and a query graph, wherein the query graph contains symmetry; generate a symmetry breaking expression from the query graph by: (A) detecting one or more orbits in the query graph, wherein each orbit comprises one or more nodes of the query graph; (B) selecting an orbit from the one or more orbits having more than one node; (C) generating an automorphism breaking sub-expression for the selected orbit; (D) assigning a node of the selected orbit a unique node attribute; (E) recalculating the one or more orbits in the query graph; (F) repeating (B)-(E) until each orbit in the query graph has a single node; and (G) combining each of the automorphism breaking sub-expressions generated in (C) to obtain the symmetry breaking expression; translate the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

14. The system of claim 13, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction.

15. The system of claim 14, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

16. The system of claim 13, wherein combining each of the automorphism breaking sub-expressions in (G) comprises appending each of the automorphism breaking sub-expressions by conjunction.

17. The system of claim 13, wherein to translate the symmetry breaking expression to refer to the one or more nodes and the one or more edges in the query graph, the computer-readable instructions further cause the processor to: identify a term in the symmetry breaking expression; identify a first node and a second node in the term; responsive to determining that the first node was created during subdivision of a first edge of the query graph, identify a third node and a fourth node in the query graph connected by the first edge; assign a first edge key to the first edge; responsive to determining that the second node was created during subdivision of a second edge of the query graph, identify a fifth node and a sixth node in the query graph connected by the second edge; assign a second edge key to the second edge; and responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key <(fifth node, sixth node, second edge key).edge_key.

18. The system of claim 13, wherein the computer-readable instructions further cause the processor to: determine that the query graph comprises an edge attribute between a first node and a second node of the query graph; and create a new node for the edge attribute between the first node and the second node to obtain a transformed query graph, the new node having a node attribute corresponding to the edge attribute, wherein the symmetry breaking expression is generated from the transformed query graph instead of the query graph.

19. The system of claim 13, wherein the computer-readable instructions further cause the processor to: determine that the query graph comprises multiple edges between a first node and a second node of the query graph; and create a new node between the first node and the second node for each of the multiple edges to obtain a transformed query graph, wherein the symmetry breaking expression is generated from the transformed query graph instead of the query graph.

20. The system of claim 13, wherein the computer-readable instructions further cause the processor to: determine that the query graph comprises at least one of (a) at least two node attributes, (b) at least two edge attributes, or (c) at least one node attribute and at least one edge attribute; and convert each of the node attributes and each of the edge attributes into a single output attribute to obtain a transformed query graph, wherein the symmetry breaking expression is generated from the transformed query graph instead of the query graph.

21. The system of claim 20, wherein the output attribute is different from each of the node attributes and each of the edge attributes in the query graph.

22. The system of claim 13, wherein the computer-readable instructions further cause the processor to: determine that the query graph comprises an additional query; convert the additional query into a tree representation; and combine the tree representation with the query graph to obtain a transformed query graph, wherein the symmetry breaking expression is generated from the transformed query graph instead of the query graph.

23. The system of claim 22, wherein to convert the additional query into the tree representation, the computer-readable instructions further cause the processor to: convert the additional query into a tree form by: responsive to determining that the additional query comprises a constant value, creating a first new node in a directed acyclic graph (DAG) for the constant value; responsive to determining that the additional query comprises a node expression of an attribute, creating a second new node and a third new node in the DAG, the second new node representing the node associated with the node expression and the third new node representing the attribute of the node expression; creating a first edge between the second new node and the third new node; responsive to determining that the additional query comprises a left operand <operator> right operand form, creating a fourth new node in the DAG for the <operator>; creating a string node attribute for the fourth new node representing the <operator>; and responsive to determining that the <operator> is commutative, adding a second edge from the fourth new node to the left operand and a third edge from the fourth new node to the right operand or responsive to determining that the <operator> is not commutative, adding the second edge from the fourth new node to the left operand and a fourth edge from the right operand to the fourth new node; and simplify the tree form to obtain the tree representation by: creating a copy of the DAG; responsive to determining that a node N in the copy of the DAG represents an associative operator: identifying a child node C of the node N that has the same associative operator; adding a fifth edge from the node N to each child node C' of the child node C; and deleting the child node C; responsive to determining that the node N is an AND operator: identifying child node C1 and child node C2 of the node N that have a same transitive operator; identifying children nodes G1 of the child node C1 and children nodes G2 of the child node C2; responsive to determining that there is at least one common node between the children nodes G1 and the children nodes G2, adding a sixth edge from the child node C1 to each of the children nodes G2; and deleting the child node C2 from the copy of the DAG; and responsive to determining that the copy of the DAG comprises subgraphs of the form A <EQ> B <COMP> constant value, adding a seventh edge from node COMP to Node A for each of the subgraphs.

24. The system of claim 23, wherein to combine the tree representation with the query graph, the computer-readable instructions further cause the processor to: initialize the first transformed query graph as a copy of the transformed query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the query graph to the transformed query graph.

25. A method comprising: receiving, by a processor executing computer-readable instructions stored on a memory, a main graph and a query graph, wherein the query graph contains symmetry; generating, by the processor, a symmetry breaking expression from the query graph by: (A) detecting, by the processor, one or more orbits in the query graph, wherein each orbit comprises one or more nodes of the query graph; (B) selecting, by the processor, an orbit from the one or more orbits having more than one node; (C) generating, by the processor, an automorphism breaking sub-expression for the selected orbit; (D) assigning, by the processor, a node of the selected orbit a unique node attribute; (E) recalculating, by the processor, the one or more orbits in the query graph; (F) repeating, by the processor, (B)-(E) until each orbit in the query graph has a single node; and (G) combining, by the processor, each of the automorphism breaking sub-expressions generated in (C) to obtain the symmetry breaking expression; translating, by the processor, the symmetry breaking expression to refer to one or more nodes and one or more edges in the query graph to obtain a translated symmetry breaking expression of the query graph; and finding, by the processor, one or more subgraphs of the main graph that match the translated symmetry breaking expression of the query graph, wherein the one or more subgraphs do not contain symmetry.

26. The method of claim 25, wherein to generate the automorphism breaking sub-expression, the method further comprises: defining, by the processor, the symmetry breaking expression as empty; identifying, by the processor, the node in the selected orbit as having a smallest node label i; and for each node label j in the set, if j is not equal to i: generating, by the processor, the automorphism breaking sub-expression as i.node<j.node; and appending, by the processor, the automorphism breaking sub-expression to the symmetry breaking expression by conjunction, wherein term i.node in the automorphism breaking sub-expression as i.node<j.node maps the node with the label i in the query graph to a main graph node having a smallest label; and wherein the term j.node in the automorphism breaking sub-expression as i.node<j.node maps the node with the label j in the query graph to the main graph node having a label other than the smallest label.

27. The method of claim 25, wherein combining each of the automorphism breaking sub-expressions in (G) comprises appending each of the automorphism breaking sub-expressions by conjunction.

28. The method of claim 25, wherein to translate the symmetry breaking expression to refer to the one or more nodes and the one or more edges in the query graph, the method further comprises: identifying, by the processor, a term in the symmetry breaking expression; identifying, by the processor, a first node and a second node in the term; responsive to determining that the first node was created during subdivision of a first edge of the query graph, identifying, by the processor, a third node and a fourth node in the query graph connected by the first edge; assigning, by the processor, a first edge key to the first edge; responsive to determining that the second node was created during subdivision of a second edge of the query graph, identifying, by the processor, a fifth node and a sixth node in the query graph connected by the second edge; assigning, by the processor, a second edge key to the second edge; and responsive to determining that the third node is not same as the fifth node, outputting, by the processor, a translated term as a third node.node<fifth node.node or responsive to determining that the third node is the same as the fifth node and the fourth node is not the same as the sixth node, outputting, by the processor, the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

29. The method of claim 25, further comprising: determining, by the processor, that the query graph comprises an edge attribute between a first node and a second node of the query graph; and creating, by the processor, a new node for the edge attribute between the first node and the second node to obtain a transformed query graph, the new node having a node attribute corresponding to the edge attribute, wherein the symmetry breaking expression is generated from the transformed query graph instead of the query graph.

30. The method of claim 25, further comprising: determining, by the processor, that the query graph comprises multiple edges between a first node and a second node of the query graph; and creating, by the processor, a new node between the first node and the second node for each of the multiple edges to obtain a transformed query graph, wherein the symmetry breaking expression is generated from the transformed query graph instead of the query graph.

EXAMPLE 2

1. A non-transitory computer-readable medium comprising computer-readable instructions stored thereon that when executed by a processor cause the processor to: receive a main graph and a query graph, wherein the query graph contains symmetry; break symmetry in the query graph by: converting the query graph into a transformed query graph by: determining that the query graph comprises an edge having one or more edge attributes, wherein the edge is between a first node and a second node of the query graph; creating a first new node between the first node and the second node for each of the one or more edge attributes, each of the first new node having a node attribute corresponding to one of the one or more edge attributes; creating a first new edge between each of the first new node and the first node; and creating a second new edge between each of the first new node and the second node; generating a symmetry breaking expression from the transformed query graph by: (A) detecting one or more orbits in the transformed query graph, wherein each orbit comprises one or more nodes of the transformed query graph; (B) selecting an orbit from the one or more orbits having more than one node; (C) generating an automorphism breaking sub-expression for the selected orbit; (D) assigning a node of the selected orbit a unique node attribute; (E) recalculating the one or more orbits in the transformed query graph; (F) repeating (B)-(E) until each orbit in the transformed query graph has a single node; and (G) combining each of the automorphism breaking sub-expressions generated in (C) to obtain the symmetry breaking expression; and translating the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

2. The non-transitory computer-readable medium of claim 1, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction.

3. The non-transitory computer-readable medium of claim 2, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

4. The non-transitory computer-readable medium of claim 1, wherein combining each of the automorphism breaking sub-expressions in (G) comprises appending each of the automorphism breaking sub-expressions by conjunction.

5. The non-transitory computer-readable medium of claim 1, wherein to translate the symmetry breaking expression to refer to the one or more nodes and the one or more edges in the query graph, the computer-readable instructions further cause the processor to: identify a term in the symmetry breaking expression; identify a first term node and a second term node in the term; responsive to determining that the first term node was created during subdivision of a first edge of the query graph, identify a third node and a fourth node in the query graph connected by the first edge; assign a first edge key to the first edge; responsive to determining that the second term node was created during subdivision of a second edge of the query graph, identify a fifth node and a sixth node in the query graph connected by the second edge; assign a second edge key to the second edge; and responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

6. The non-transitory computer-readable medium of claim 1, wherein the transformed query graph is a first transformed query graph, and wherein the computer-readable instructions further cause the processor to: determine that the first transformed query graph comprises multiple edges between a third node and a fourth node of the first transformed query graph; create a second new node between the third node and the fourth node for each of the multiple edges to obtain a second transformed query graph; wherein the symmetry breaking expression is generated from the second transformed query graph.

7. The non-transitory computer-readable medium of claim 1, wherein the computer-readable instructions further cause the processor to: determine that the query graph comprises at least one of (a) at least two node attributes, (b) at least two edge attributes, or (c) at least one node attribute and at least one edge attribute; and convert each of the node attributes and each of the edge attributes into a single output attribute to obtain a first transformed query graph, wherein the first transformed query graph instead of the query graph is converted into the transformed query graph.

8. The non-transitory computer-readable medium of claim 7, wherein the output attribute is different from each of the node attributes and each of the edge attributes in the query graph.

9. The non-transitory computer-readable medium of claim 1, wherein the computer-readable instructions further cause the processor to: determine that the query graph comprises an additional query; convert the additional query into a tree representation; and combine the tree representation with the transformed query graph to obtain a first transformed query graph, wherein the symmetry breaking expression is generated from the first transformed query graph.

10. The non-transitory computer-readable medium of claim 9, wherein to convert the additional query into the tree representation, the computer-readable instructions further cause the processor to: convert the additional query into a tree form by: responsive to determining that the additional query comprises a constant value, creating a second new node in a directed acyclic graph (DAG) for the constant value; responsive to determining that the additional query comprises a node expression of an attribute, creating a third new node and a fourth new node in the DAG, the third new node representing the node associated with the node expression and the fourth new node representing the attribute of the node expression; creating a third new edge between the third new node and the fourth new node; responsive to determining that the additional query comprises a left operand <operator> right operand form, creating a fifth new node in the DAG for the <operator>; creating a string node attribute for the fifth new node representing the <operator>; and responsive to determining that the <operator> is commutative, adding a fourth new edge from the fifth new node to the left operand and a fifth new edge from the fifth new node to the right operand or responsive to determining that the <operator> is not commutative, adding the fourth new edge from the fifth new node to the left operand and a sixth new edge from the right operand to the fifth new node; and simplify the tree form to obtain the tree representation by: creating a copy of the DAG; responsive to determining that a node N in the copy of the DAG represents an associative operator: identifying a child node C of the node N that has the same associative operator; adding a seventh new edge from the node N to each child node C' of the child node C; and deleting the child node C; responsive to determining that the node N is an AND operator: identifying child node C1 and child node C2 of the node N that have a same transitive operator; identifying children nodes G1 of the child node C1 and children nodes G2 of the child node C2; responsive to determining that there is at least one common node between the children nodes G1 and the children nodes G2, adding a eighth new edge from the child node C1 to each of the children nodes G2; and deleting the child node C2 from the copy of the DAG; and responsive to determining that the copy of the DAG comprises subgraphs of the form A <EQ> B <COMP> constant value, adding a ninth new edge from node COMP to Node A for each of the subgraphs.

11. The non-transitory computer-readable medium of claim 10, wherein to combine the tree representation with the transformed query graph, the computer-readable instructions further cause the processor to: initialize the first transformed query graph as a copy of the transformed query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the transformed query graph to the first transformed query graph.

12. A system comprising: a memory having computer-readable instructions stored thereon; and a processor that executes the computer-readable instructions to: receive a main graph and a query graph, wherein the query graph contains symmetry; break symmetry in the query graph by: converting the query graph into a transformed query graph by: determining that the query graph comprises an edge having one or more edge attributes, wherein the edge is between a first node and a second node of the query graph; creating a first new node between the first node and the second node for each of the one or more edge attributes, each of the first new node having a node attribute corresponding to one of the one or more edge attributes; creating a first new edge between each of the first new node and the first node; and creating a second new edge between each of the first new node and the second node; generating a symmetry breaking expression from the transformed query graph by: (A) detecting one or more orbits in the transformed query graph, wherein each orbit comprises one or more nodes of the transformed query graph; (B) selecting an orbit from the one or more orbits having more than one node; (C) generating an automorphism breaking sub-expression for the selected orbit; (D) assigning a node of the selected orbit a unique node attribute; (E) recalculating the one or more orbits in the transformed query graph; (F) repeating (B)-(E) until each orbit in the transformed query graph has a single node; and (G) combining each of the automorphism breaking sub-expressions generated in (C) to obtain the symmetry breaking expression; and translating the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

13. The system of claim 12, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction.

14. The system of claim 13, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

15. The system of claim 12, wherein combining each of the automorphism breaking sub-expressions in (G) comprises appending each of the automorphism breaking sub-expressions by conjunction.

16. The system of claim 12, wherein to translate the symmetry breaking expression to refer to the one or more nodes and the one or more edges in the query graph, the computer-readable instructions further cause the processor to: identify a term in the symmetry breaking expression; identify a first term node and a second term node in the term; responsive to determining that the first term node was created during subdivision of a first edge of the query graph, identify a third node and a fourth node in the query graph connected by the first edge; assign a first edge key to the first edge; responsive to determining that the second term node was created during subdivision of a second edge of the query graph, identify a fifth node and a sixth node in the query graph connected by the second edge; assign a second edge key to the second edge; and responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

17. The system of claim 12, wherein the transformed query graph is a first transformed query graph, and wherein the computer-readable instructions further cause the processor to: determine that the first transformed query graph comprises multiple edges between a third node and a fourth node of the first transformed query graph; create a second new node between the third node and the fourth node for each of the multiple edges to obtain a second transformed query graph; wherein the symmetry breaking expression is generated from the second transformed query graph.

18. The system of claim 12, wherein the computer-readable instructions further cause the processor to: determine that the query graph comprises at least one of (a) at least two node attributes, (b) at least two edge attributes, or (c) at least one node attribute and at least one edge attribute; and convert each of the node attributes and each of the edge attributes into a single output attribute to obtain a first transformed query graph, wherein the first transformed query graph instead of the query graph is converted into the transformed query graph.

19. The system of claim 18, wherein the output attribute is different from each of the node attributes and each of the edge attributes in the query graph.

20. The system of claim 12, wherein the computer-readable instructions further cause the processor to: determine that the query graph comprises an additional query; convert the additional query into a tree representation; and combine the tree representation with the transformed query graph to obtain a first transformed query graph, wherein the symmetry breaking expression is generated from the first transformed query graph.

21. The system of claim 20, wherein to convert the additional query into the tree representation, the computer-readable instructions further cause the processor to: convert the additional query into a tree form by: responsive to determining that the additional query comprises a constant value, creating a second new node in a directed acyclic graph (DAG) for the constant value; responsive to determining that the additional query comprises a node expression of an attribute, creating a third new node and a fourth new node in the DAG, the third new node representing the node associated with the node expression and the fourth new node representing the attribute of the node expression; creating a third new edge between the third new node and the fourth new node; responsive to determining that the additional query comprises a left operand <operator> right operand form, creating a fifth new node in the DAG for the <operator>; creating a string node attribute for the fifth new node representing the <operator>; and responsive to determining that the <operator> is commutative, adding a fourth new edge from the fifth new node to the left operand and a fifth new edge from the fifth new node to the right operand or responsive to determining that the <operator> is not commutative, adding the fourth new edge from the fifth new node to the left operand and a sixth new edge from the right operand to the fifth new node; and simplify the tree form to obtain the tree representation by: creating a copy of the DAG; responsive to determining that a node N in the copy of the DAG represents an associative operator: identifying a child node C of the node N that has the same associative operator; adding a seventh new edge from the node N to each child node C' of the child node C; and deleting the child node C; responsive to determining that the node N is an AND operator: identifying child node C1 and child node C2 of the node N that have a same transitive operator; identifying children nodes G1 of the child node C1 and children nodes G2 of the child node C2; responsive to determining that there is at least one common node between the children nodes G1 and the children nodes G2, adding an eighth new edge from the child node C1 to each of the children nodes G2; and deleting the child node C2 from the copy of the DAG; and responsive to determining that the copy of the DAG comprises subgraphs of the form A <EQ> B <COMP> constant value, adding a ninth new edge from node COMP to Node A for each of the subgraphs.

22. The system of claim 21, wherein to combine the tree representation with the transformed query graph, the computer-readable instructions further cause the processor to: initialize the first transformed query graph as a copy of the transformed query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the transformed query graph to the first transformed query graph.

23. A method comprising: receiving, by a processor executing computer-readable instructions stored on a memory, a main graph and a query graph, wherein the query graph contains symmetry; breaking symmetry in the query graph, by the processor, by: converting, by the processor, the query graph into a transformed query graph by: determining, by the processor, that the query graph comprises an edge having one or more edge attributes, wherein the edge is between a first node and a second node of the query graph; creating, by the processor, a first new node between the first node and the second node for each of the one or more edge attributes, each of the first new node having a node attribute corresponding to one of the one or more edge attributes; creating, by the processor, a first new edge between each of the first new node and the first node; and creating, by the processor, a second new edge between each of the first new node and the second node; generating, by the processor, a symmetry breaking expression from the transformed query graph by: (A) detecting, by the processor, one or more orbits in the transformed query graph, wherein each orbit comprises one or more nodes of the transformed query graph; (B) selecting, by the processor, an orbit from the one or more orbits having more than one node; (C) generating, by the processor, an automorphism breaking sub-expression for the selected orbit; (D) assigning, by the processor, a node of the selected orbit a unique node attribute; (E) recalculating, by the processor, the one or more orbits in the transformed query graph; (F) repeating, by the processor, (B)-(E) until each orbit in the transformed query graph has a single node; and (G) combining, by the processor, each of the automorphism breaking sub-expressions generated in (C) to obtain the symmetry breaking expression; and translating, by the processor, the symmetry breaking expression to refer to one or more nodes and one or more edges in the query graph to obtain a translated symmetry breaking expression of the query graph; and finding, by the processor, one or more subgraphs of the main graph that match the translated symmetry breaking expression of the query graph, wherein the one or more subgraphs do not contain symmetry.

24. The method of claim 23, wherein to generate the automorphism breaking sub-expression, the method further comprises: defining, by the processor, the symmetry breaking expression as empty; identifying, by the processor, the node in the selected orbit as having a smallest node label i; and for each node label j in the set, if j is not equal to i: generating, by the processor, the automorphism breaking sub-expression as i.node<j.node; and appending, by the processor, the automorphism breaking sub-expression to the symmetry breaking expression by conjunction, wherein term i.node in the automorphism breaking sub-expression as i.node<j.node maps the node with the label i in the query graph to a main graph node having a smallest label; and wherein the term j.node in the automorphism breaking sub-expression as i.node<j.node maps the node with the label j in the query graph to the main graph node having a label other than the smallest label.

25. The method of claim 23, wherein combining each of the automorphism breaking sub-expressions in (G) comprises appending each of the automorphism breaking sub-expressions by conjunction.

26. The method of claim 23, wherein to translate the symmetry breaking expression to refer to the one or more nodes and the one or more edges in the query graph, the method further comprises: identifying, by the processor, a term in the symmetry breaking expression; identifying, by the processor, a first term node and a second term node in the term; responsive to determining that the first term node was created during subdivision of a first edge of the query graph, identifying, by the processor, a third node and a fourth node in the query graph connected by the first edge; assigning, by the processor, a first edge key to the first edge; responsive to determining that the second term node was created during subdivision of a second edge of the query graph, identifying, by the processor, a fifth node and a sixth node in the query graph connected by the second edge; assigning, by the processor, a second edge key to the second edge; and responsive to determining that the third node is not same as the fifth node, outputting, by the processor, a translated term as a third node.node<fifth node.node or responsive to determining that the third node is the same as the fifth node and the fourth node is not the same as the sixth node, outputting, by the processor, the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

27. The method of claim 23, wherein the transformed query graph is a first transformed query graph, and wherein the method further comprises: determining, by the processor, that the first transformed query graph comprises multiple edges between a third node and a fourth node of the first transformed query graph; and creating, by the processor, a second new node between the third node and the fourth node for each of the multiple edges to obtain a second transformed query graph; wherein the symmetry breaking expression is generated from the second transformed query graph.

28. The method of claim 23, further comprising: determining, by the processor, that the query graph comprises at least one of (a) at least two node attributes, (b) at least two edge attributes, or (c) at least one node attribute and at least one edge attribute; and converting, by the processor, each of the node attributes and each of the edge attributes into a single output attribute to obtain a first transformed query graph, wherein the first transformed query graph instead of the query graph is converted into the transformed query graph.

29. The method of claim 23, further comprising: determining, by the processor, that the query graph comprises an additional query; converting, by the processor, the additional query into a tree representation by: converting, by the processor, the additional query into a tree form by: responsive to determining that the additional query comprises a constant value, creating, by the processor, a second new node in a directed acyclic graph (DAG) for the constant value; responsive to determining that the additional query comprises a node expression of an attribute, creating, by the processor, a third new node and a fourth new node in the DAG, the third new node representing the node associated with the node expression and the fourth new node representing the attribute of the node expression; creating, by the processor, a third new edge between the third new node and the fourth new node; responsive to determining that the additional query comprises a left operand <operator> right operand form, creating, by the processor, a fifth new node in the DAG for the <operator>; creating, by the processor, a string node attribute for the fifth new node representing the <operator>; and responsive to determining that the <operator> is commutative, adding, by the processor, a fourth new edge from the fifth new node to the left operand and a fifth new edge from the fifth new node to the right operand or responsive to determining that the <operator> is not commutative, adding, by the processor, the fourth new edge from the fifth new node to the left operand and a sixth new edge from the right operand to the fifth new node; and simplifying, by the processor, the tree form to obtain the tree representation by: creating, by the processor, a copy of the DAG; responsive to determining that a node N in the copy of the DAG represents an associative operator: identifying, by the processor, a child node C of the node N that has the same associative operator; adding, by the processor, a seventh new edge from the node N to each child node C' of the child node C; and deleting, by the processor, the child node C; responsive to determining that the node N is an AND operator: identifying, by the processor, child node C1 and child node C2 of the node N that have a same transitive operator; identifying, by the processor, children nodes G1 of the child node C1 and children nodes G2 of the child node C2; responsive to determining that there is at least one common node between the children nodes G1 and the children nodes G2, adding, by the processor, an eighth new edge from the child node C1 to each of the children nodes G2; and deleting, by the processor, the child node C2 from the copy of the DAG; and responsive to determining that the copy of the DAG comprises subgraphs of the form A <EQ> B <COMP> constant value, adding, by the processor, a ninth new edge from node COMP to Node A for each of the subgraphs; and combining, by the processor, the tree representation with the transformed query graph to obtain a first transformed query graph, wherein the symmetry breaking expression is generated from the first transformed query graph.

30. The method of claim 29, wherein to combine the tree representation with the transformed query graph, the method further comprises: initializing, by the processor, the first transformed query graph as a copy of the transformed query graph; converting, by the processor, a direction of each DAG edge in the copy of the DAG into a DAG edge attribute; converting, by the processor, each of the DAG edge attribute to a DAG node attribute; replacing, by the processor, each of the DAG node attribute with a different value of a single output attribute; and adding, by the processor, each DAG node from the copy of the DAG and each of the DAG edge that does not exist in the transformed query graph to the first transformed query graph.

EXAMPLE 3

1. A non-transitory computer-readable medium comprising computer-readable instructions stored thereon that when executed by a processor cause the processor to: receive a main graph and a query graph, wherein the query graph contains symmetry; break symmetry in the query graph by: converting the query graph into a transformed query graph by: identifying each pair of nodes in the query graph having at least two edges therebetween; and for each of the pair of nodes: deleting each of the at least two edges between the pair of nodes; creating an instance of a first new node between the pair of nodes for each of the at least two edges; for each instance of the first new node, adding a first new edge between a first node of the pair of nodes and the first new node; and for each instance of the first new node, adding a second new edge between the first new node and a second node of the pair of nodes; generating a symmetry breaking expression from the transformed query graph by: (A) detecting one or more orbits in the transformed query graph, wherein each orbit comprises one or more nodes of the transformed query graph; (B) selecting an orbit from the one or more orbits having more than one node; (C) generating an automorphism breaking sub-expression for the selected orbit; (D) assigning a node of the selected orbit a unique node attribute; (E) recalculating the one or more orbits in the transformed query graph; (F) repeating (B)-(E) until each orbit in the transformed query graph has a single node; and (G) combining each of the automorphism breaking sub-expressions generated in (C) to obtain the symmetry breaking expression; and translating the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

2. The non-transitory computer-readable medium of claim 1, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction.

3. The non-transitory computer-readable medium of claim 2, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

4. The non-transitory computer-readable medium of claim 1, wherein combining each of the automorphism breaking sub-expressions in (G) comprises appending each of the automorphism breaking sub-expressions by conjunction.

5. The non-transitory computer-readable medium of claim 1, wherein to translate the symmetry breaking expression to refer to the one or more nodes and the one or more edges in the query graph, the computer-readable instructions further cause the processor to: identify a term in the symmetry breaking expression; identify a first term node and a second term node in the term; responsive to determining that the first term node was created during subdivision of a first edge of the query graph, identify a third node and a fourth node in the query graph connected by the first edge; assign a first edge key to the first edge; responsive to determining that the second term node was created during subdivision of a second edge of the query graph, identify a fifth node and a sixth node in the query graph connected by the second edge; assign a second edge key to the second edge; and responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

6. The non-transitory computer-readable medium of claim 1, wherein the transformed query graph is a first transformed query graph, and wherein the computer-readable instructions further cause the processor to: determine that the first transformed query graph comprises an edge having one or more edge attributes, wherein the edge is between a third node and a fourth node of the first transformed query graph; create a second new node between the third node and the fourth node for each of the one or more edge attributes, each of the second new node having a node attribute corresponding to one of the one or more edge attributes; create a third new edge between each of the second new node and the third node; and create a fourth new edge between each of the second new node and the fourth node to obtain a second transformed query graph, wherein the symmetry breaking expression is generated from the second transformed query graph.

7. The non-transitory computer-readable medium of claim 1, wherein the transformed query graph is a first transformed query graph, and wherein the computer-readable instructions further cause the processor to: determine that the first transformed query graph comprises at least one of (a) at least two node attributes, (b) at least two edge attributes, or (c) at least one node attribute and at least one edge attribute; and convert each of the node attributes and each of the edge attributes into a single output attribute to obtain a second transformed query graph, wherein the symmetry breaking expression is generated from the second transformed query graph.

8. The non-transitory computer-readable medium of claim 7, wherein the output attribute is different from each of the node attributes and each of the edge attributes in the query graph.

9. The non-transitory computer-readable medium of claim 1, wherein the computer-readable instructions further cause the processor to: determine that the query graph comprises an additional query; convert the additional query into a tree representation; and combine the tree representation with the transformed query graph to obtain a first transformed query graph, wherein the symmetry breaking expression is generated from the first transformed query graph.

10. The non-transitory computer-readable medium of claim 9, wherein to convert the additional query into the tree representation, the computer-readable instructions further cause the processor to: convert the additional query into a tree form by: responsive to determining that the additional query comprises a constant value, creating a second new node in a directed acyclic graph (DAG) for the constant value; responsive to determining that the additional query comprises a node expression of an attribute, creating a third new node and a fourth new node in the DAG, the third new node representing the node associated with the node expression and the fourth new node representing the attribute of the node expression; creating a third new edge between the third new node and the fourth new node; responsive to determining that the additional query comprises a left operand <operator> right operand form, creating a fifth new node in the DAG for the <operator>; creating a string node attribute for the fifth new node representing the <operator>; and responsive to determining that the <operator> is commutative, adding a fourth new edge from the fifth new node to the left operand and a fifth new edge from the fifth new node to the right operand or responsive to determining that the <operator> is not commutative, adding the fourth new edge from the fifth new node to the left operand and a sixth new edge from the right operand to the fifth new node; and simplify the tree form to obtain the tree representation by: creating a copy of the DAG; responsive to determining that a node N in the copy of the DAG represents an associative operator: identifying a child node C of the node N that has the same associative operator; adding a seventh new edge from the node N to each child node C' of the child node C;

and deleting the child node C; responsive to determining that the node N is an AND operator: identifying child node C1 and child node C2 of the node N that have a same transitive operator; identifying children nodes G1 of the child node C1 and children nodes G2 of the child node C2; responsive to determining that there is at least one common node between the children nodes G1 and the children nodes G2, adding a eighth new edge from the child node C1 to each of the children nodes G2; and deleting the child node C2 from the copy of the DAG; and responsive to determining that the copy of the DAG comprises subgraphs of the form A <EQ> B <COMP> constant value, adding a ninth new edge from node COMP to Node A for each of the subgraphs.

11. The non-transitory computer-readable medium of claim 10, wherein to combine the tree representation with the transformed query graph, the computer-readable instructions further cause the processor to initialize the first transformed query graph as a copy of the transformed query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the transformed query graph to the first transformed query graph.

12. A system comprising: a memory having computer-readable instructions stored thereon; and a processor that executes the computer-readable instructions to: receive a main graph and a query graph, wherein the query graph contains symmetry; break symmetry in the query graph by: converting the query graph into a transformed query graph by: identifying each pair of nodes in the query graph having at least two edges therebetween; and for each of the pair of nodes: deleting each of the at least two edges between the pair of nodes; creating an instance of a first new node between the pair of nodes for each of the at least two edges; for each instance of the first new node, adding a first new edge between a first node of the pair of nodes and the first new node; and for each instance of the first new node, adding a second new edge between the first new node and a second node of the pair of nodes; generating a symmetry breaking expression from the transformed query graph by: (A) detecting one or more orbits in the transformed query graph, wherein each orbit comprises one or more nodes of the transformed query graph; (B) selecting an orbit from the one or more orbits having more than one node; (C) generating an automorphism breaking sub-expression for the selected orbit; (D) assigning a node of the selected orbit a unique node attribute; (E) recalculating the one or more orbits in the transformed query graph; (F) repeating (B)-(E) until each orbit in the transformed query graph has a single node; and (G) combining each of the automorphism breaking sub-expressions generated in (C) to obtain the symmetry breaking expression; and translating the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

13. The system of claim 12, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction.

14. The system of claim 13, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

15. The system of claim 12, wherein combining each of the automorphism breaking sub-expressions in (G) comprises appending each of the automorphism breaking sub-expressions by conjunction.

16. The system of claim 12, wherein to translate the symmetry breaking expression to refer to the one or more nodes and the one or more edges in the query graph, the computer-readable instructions further cause the processor to: identify a term in the symmetry breaking expression; identify a first term node and a second term node in the term; responsive to determining that the first term node was created during subdivision of a first edge of the query graph, identify a third node and a fourth node in the query graph connected by the first edge; assign a first edge key to the first edge; responsive to determining that the second term node was created during subdivision of a second edge of the query graph, identify a fifth node and a sixth node in the query graph connected by the second edge; assign a second edge key to the second edge; and responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

17. The system of claim 12, wherein the transformed query graph is a first transformed query graph, and wherein the computer-readable instructions further cause the processor to: determine that the first transformed query graph comprises an edge having one or more edge attributes, wherein the edge is between a third node and a fourth node of the first transformed query graph; create a second new node between the third node and the fourth node for each of the one or more edge attributes, each of the second new node having a node attribute corresponding to one of the one or more edge attributes; create a third new edge between each of the second new node and the third node; and create a fourth new edge between each of the second new node and the fourth node to obtain a second transformed query graph, wherein the symmetry breaking expression is generated from the second transformed query graph.

18. The system of claim 12, wherein the transformed query graph is a first transformed query graph, and wherein the computer-readable instructions further cause the processor to: determine that the first transformed query graph comprises at least one of (a) at least two node attributes, (b) at least two edge attributes, or (c) at least one node attribute and at least one edge attribute; and convert each of the node attributes and each of the edge attributes into a single output attribute to obtain a second transformed query graph, wherein the symmetry breaking expression is generated from the second transformed query graph.

19. The system of claim 18, wherein the output attribute is different from each of the node attributes and each of the edge attributes in the query graph.

20. The system of claim 12, wherein the computer-readable instructions further cause the processor to: determine that the query graph comprises an additional query; convert the additional query into a tree representation; and combine the tree representation with the transformed query graph to obtain a first transformed query graph, wherein the symmetry breaking expression is generated from the first transformed query graph.

21. The system of claim 20, wherein to convert the additional query into the tree representation, the computer-readable instructions further cause the processor to: convert the additional query into a tree form by: responsive to determining that the additional query comprises a constant value, creating a second new node in a directed acyclic graph (DAG) for the constant value; responsive to determining that the additional query comprises a node expression of an attribute, creating a third new node and a fourth new node in the DAG, the third new node representing the node associated with the node expression and the fourth new node representing the attribute of the node expression; creating a third new edge between the third new node and the fourth new node; responsive to determining that the additional query comprises a left operand <operator> right operand form, creating a fifth new node in the DAG for the <operator>; creating a string node attribute for the fifth new node representing the <operator>; and responsive to determining that the <operator> is commutative, adding a fourth new edge from the fifth new node to the left operand and a fifth new edge from the fifth new node to the right operand or responsive to determining that the <operator> is not commutative, adding the fourth new edge from the fifth new node to the left operand and a sixth new edge from the right operand to the fifth new node; and simplify the tree form to obtain the tree representation by: creating a copy of the DAG; responsive to determining that a node N in the copy of the DAG represents an associative operator: identifying a child node C of the node N that has the same associative operator; adding a seventh new edge from the node N to each child node C' of the child node C; and deleting the child node C; responsive to determining that the node N is an AND operator: identifying child node C1 and child node C2 of the node N that have a same transitive operator; identifying children nodes G1 of the child node C1 and children nodes G2 of the child node C2; responsive to determining that there is at least one common node between the children nodes G1 and the children nodes G2, adding a eighth new edge from the child node C1 to each of the children nodes G2; and deleting the child node C2 from the copy of the DAG; and responsive to determining that the copy of the DAG comprises subgraphs of the form A <EQ> B <COMP> constant value, adding a ninth new edge from node COMP to Node A for each of the subgraphs.

22. The system of claim 21, wherein to combine the tree representation with the transformed query graph, the computer-readable instructions further cause the processor to: initialize the first transformed query graph as a copy of the transformed query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the transformed query graph to the first transformed query graph.

23. A method comprising: receiving, by a processor executing computer-readable instructions stored on a memory, a main graph and a query graph, wherein the query graph contains symmetry; breaking, by the processor, symmetry in the query graph by: converting, by the processor, the query graph into a transformed query graph by: identifying, by the processor, each pair of nodes in the query graph having at least two edges therebetween; and for each of the pair of nodes: deleting, by the processor, each of the at least two edges between the pair of nodes; creating, by the processor, an instance of a first new node between the pair of nodes for each of the at least two edges; for each instance of the first new node, adding, by the processor, a first new edge between a first node of the pair of nodes and the first new node; and for each instance of the first new node, adding, by the processor, a second new edge between the first new node and a second node of the pair of nodes; generating, by the processor, a symmetry breaking expression from the transformed query graph by: (A) detecting, by the processor, one or more orbits in the transformed query graph, wherein each orbit comprises one or more nodes of the transformed query graph; (B) selecting, by the processor, an orbit from the one or more orbits having more than one node; (C) generating, by the processor, an automorphism breaking sub-expression for the selected orbit; (D) assigning, by the processor, a node of the selected orbit a unique node attribute; (E) recalculating, by the processor, the one or more orbits in the transformed query graph; (F) repeating (B)-(E) until each orbit in the transformed query graph has a single node; and (G) combining, by the processor, each of the automorphism breaking sub-expressions generated in (C) to obtain the symmetry breaking expression; and translating, by the processor, the symmetry breaking expression to refer to one or more nodes and one or more edges in the query graph to obtain a translated symmetry breaking expression of the query graph; and finding, by the processor, one or more subgraphs of the main graph that match the translated symmetry breaking expression of the query graph, wherein the one or more subgraphs do not contain symmetry.

24. The method of claim 23, wherein to generate the automorphism breaking sub-expression, the method further comprises: defining, by the processor, the symmetry breaking expression as empty; identifying, by the processor, the node in the selected orbit as having a smallest node label i; and for each node label j in the set, if j is not equal to i: generating, by the processor, the automorphism breaking sub-expression as i.node<j.node; and appending, by the processor, the automorphism breaking sub-expression to the symmetry breaking expression by conjunction, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

25. The method of claim 23, wherein combining each of the automorphism breaking sub-expressions in (G) comprises appending each of the automorphism breaking sub-expressions by conjunction.

26. The method of claim 23, wherein to translate the symmetry breaking expression to refer to the one or more nodes and the one or more edges in the query graph, the method further comprises: identifying, by the processor, a term in the symmetry breaking expression; identifying, by the processor, a first term node and a second term node in the term; responsive to determining that the first term node was created during subdivision of a first edge of the query graph, identifying, by the processor, a third node and a fourth node in the query graph connected by the first edge; assigning, by the processor, a first edge key to the first edge; responsive to determining that the second term node was created during subdivision of a second edge of the query graph, identifying, by the processor, a fifth node and a sixth node in the query graph connected by the second edge; assigning, by the processor, a second edge key to the second edge; and responsive to determining that the third node is not same as the fifth node, outputting, by the processor, a translated term as a third node.node<fifth node.node or responsive to determining that the third node is the same as the fifth node and the fourth node is not the same as the sixth node, outputting, by the processor, the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

27. The method of claim 23, wherein the transformed query graph is a first transformed query graph, and wherein the method further comprises: determining, by the processor, that the first transformed query graph comprises an edge having one or more edge attributes, wherein the edge is between a third node and a fourth node of the first transformed query graph; creating, by the processor, a second new node between the third node and the fourth node for each of the one or more edge attributes, each of the second new node having a node attribute corresponding to one of the one or more edge attributes; creating, by the processor, a third new edge between each of the second new node and the third node; and creating, by the processor, a fourth new edge between each of the second new node and the fourth node to obtain a second transformed query graph, wherein the symmetry breaking expression is generated from the second transformed query graph.

28. The method of claim 23, wherein the transformed query graph is a first transformed query graph, and wherein the method further comprises: determining, by the processor, that the first transformed query graph comprises at least one of (a) at least two node attributes, (b) at least two edge attributes, or (c) at least one node attribute and at least one edge attribute; and converting, by the processor, each of the node attributes and each of the edge attributes into a single output attribute to obtain a second transformed query graph, wherein the symmetry breaking expression is generated from the second transformed query graph.

29. The method of claim 23, further comprising: determining, by the processor, that the query graph comprises an additional query; converting, by the processor, the additional query into a tree representation; and combining, by the processor, the tree representation with the transformed query graph to obtain a first transformed query graph, wherein the symmetry breaking expression is generated from the first transformed query graph.

30. The method of claim 29, wherein to convert the additional query into the tree representation, the method further comprises: converting the additional query into a tree form by: responsive to determining that the additional query comprises a constant value, creating, by the processor, a second new node in a directed acyclic graph (DAG) for the constant value; responsive to determining that the additional query comprises a node expression of an attribute, creating, by the processor, a third new node and a fourth new node in the DAG, the third new node representing the node associ-ated with the node expression and the fourth new node representing the attribute of the node expression; creating, by the processor, a third new edge between the third new node and the fourth new node; responsive to determining that the additional query comprises a left operand <operator> right operand form, creating, by the processor, a fifth new node in the DAG for the <operator>; creating, by the processor, a string node attribute for the fifth new node representing the <operator>; and responsive to determining that the <operator> is commutative, adding, by the processor, a fourth new edge from the fifth new node to the left operand and a fifth new edge from the fifth new node to the right operand or responsive to determining that the <operator> is not commutative, adding, by the processor, the fourth new edge from the fifth new node to the left operand and a sixth new edge from the right operand to the fifth new node; and simplifying, by the processor, the tree form to obtain the tree representation by: creating, by the processor, a copy of the DAG; responsive to determining that a node N in the copy of the DAG represents an associative operator: identifying, by the processor, a child node C of the node N that has the same associative operator; adding, by the processor, a seventh new edge from the node N to each child node C' of the child node C; and deleting, by the processor, the child node C; responsive to determining that the node N is an AND operator: identifying, by the processor, child node C1 and child node C2 of the node N that have a same transitive operator; identifying, by the processor, children nodes G1 of the child node C1 and children nodes G2 of the child node C2; responsive to determining that there is at least one common node between the children nodes G1 and the children nodes G2, adding, by the processor, a eighth new edge from the child node C1 to each of the children nodes G2; and deleting, by the processor, the child node C2 from the copy of the DAG; and responsive to determining that the copy of the DAG comprises subgraphs of the form A <EQ> B <COMP> constant value, adding, by the processor, a ninth new edge from node COMP to Node A for each of the subgraphs.

EXAMPLE 4

1. A non-transitory computer-readable medium comprising computer-readable instructions stored thereon that when executed by a processor cause the processor to: receive a main graph and a query graph, wherein the query graph contains symmetry, and wherein the query graph comprises an additional query; break symmetry in the query graph by: converting the query graph into a transformed query graph by: converting the additional query into a tree representation by: responsive to determining that the additional query comprises a constant value, creating a first new node in a directed acyclic graph (DAG) for the constant value; responsive to determining that the additional query comprises a node expression of an attribute, creating a second new node and a third new node in the DAG, the second new node representing the node associated with the node expression and the third new node representing the attribute of the node expression; creating a first edge between the second new node and the third new node; responsive to determining that the additional query comprises a left operand <operator> right operand form, creating a fourth new node in the DAG for the <operator>; creating a string node attribute for the fourth new node representing the <operator>; responsive to determining that the <operator> is commutative, adding a second edge from the fourth new node to the left operand and a third edge from the fourth new node to the right operand or responsive to determining that the <operator> is not commutative, adding the second edge from the fourth new node to the left operand and a fourth edge from the right operand to the fourth new node to create a tree form; simplifying the tree form to obtain the tree representation; and combining the tree representation with the query graph to obtain the transformed query graph; generating a symmetry breaking expression from the transformed query graph; and translating the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

2. The non-transitory computer-readable medium of claim 1, wherein to generate the symmetry breaking expression from the transformed query graph, the computer-readable instructions further cause the processor to: (A) detect one or more orbits in the transformed query graph, wherein each orbit comprises one or more nodes of the transformed query graph; (B) select an orbit from the one or more orbits having more than one node; (C) generate an automorphism breaking sub-expression for the selected orbit; (D) assign a node of the selected orbit a unique node attribute; (E) recalculate the one or more orbits in the transformed query graph; (F) repeat (B)-(E) until each orbit in the transformed query graph has a single node; and (G) combine each of the automorphism breaking sub-expressions generated in (C) to obtain the symmetry breaking expression.

3. The non-transitory computer-readable medium of claim 2, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

4. The non-transitory computer-readable medium of claim 2, wherein combining each of the automorphism breaking sub-expressions in (G) comprises appending each of the automorphism breaking sub-expressions by conjunction.

5. The non-transitory computer-readable medium of claim 1, wherein to translate the symmetry breaking expression to refer to the one or more nodes and the one or more edges in the query graph, the computer-readable instructions further cause the processor to: identify a term in the symmetry breaking expression; identify a first term node and a second term node in the term; responsive to determining that the first term node was created during subdivision of a fifth edge of the query graph, identify a first node and a second node in the query graph connected by the fifth edge; assign a first edge key to the fifth edge; responsive to determining that the second term node was created during subdivision of a sixth edge of the query graph, identify a third node and a fourth node in the query graph connected by the sixth edge; assign a second edge key to the sixth edge; and responsive to determining that the first node is not same as the third node, output a translated term as a first node.node<third node.node or responsive to determining that the first node is the same as the third node and the second node is not the same as the fourth node, output the translated term as second node.node<fourth node.node or responsive to determining that the first node is the same as the third node and the second node is also the same as the fourth node, output the translated term as (first node, second node, first edge key). edge_key<(third node, fourth node, second edge key). edge_key.

6. The non-transitory computer-readable medium of claim 1, wherein to simplify the tree form, the computer-readable instructions further cause the processor to: create a copy of the DAG; responsive to determining that a node N in the copy of the DAG represents an associative operator: identify a child node C of the node N that has the same associative operator; add a fifth edge from the node N to each child node C' of the child node C; and delete the child node C; responsive to determining that the node N is an AND operator: identify child node C1 and child node C2 of the node N that have a same transitive operator; identify children nodes G1 of the child node C1 and children nodes G2 of the child node C2; responsive to determining that there is at least one common node between the children nodes G1 and the children nodes G2, add a sixth edge from the child node C1 to each of the children nodes G2; and delete the child node C2 from the copy of the DAG; and responsive to determining that the copy of the DAG comprises subgraphs of the form A <EQ> B <COMP> constant value, add a seventh edge from node COMP to Node A for each of the subgraphs.

7. The non-transitory computer-readable medium of claim 6, wherein to combine the tree representation with the query graph, the computer-readable instructions further cause the processor to: initialize the transformed query graph as a copy of the query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the query graph to the transformed query graph.

8. The non-transitory computer-readable medium of claim 1, wherein the computer-readable instructions further cause the processor to: determine that the query graph comprises at least one of (a) at least two node attributes, (b) at least two edge attributes, or (c) at least one node attribute and at least one edge attribute; and convert each of the node attributes and each of the edge attributes into a single output attribute to obtain a first transformed query graph, wherein the tree representation is combined with the first transformed query graph instead of the query graph to obtain the transformed query graph.

9. The non-transitory computer-readable medium of claim 8, wherein the output attribute is different from each of the node attributes and each of the edge attributes in the query graph.

10. The non-transitory computer-readable medium of claim 1, wherein the computer-readable instructions further cause the processor to: determine that the query graph comprises an edge having one or more edge attributes, wherein the edge is between a first node and a second node of the query graph; create a fifth new node between the first node and the second node for each of the one or more edge attributes, each of the fifth new node having a node attribute corresponding to one of the one or more edge attributes; create a first new edge between each of the fifth new node and the first node; and create a second new edge between each of the fifth new node and the second node to obtain a first transformed query graph, wherein the tree representation is combined with the first transformed query graph instead of the query graph to obtain the transformed query graph.

11. The non-transitory computer-readable medium of claim 1, wherein the computer-readable instructions further cause the processor to: identify each pair of nodes in the query graph having at least two edges therebetween; and for each of the pair of nodes: delete each of the at least two edges between the pair of nodes; create an instance of a fifth new node between the pair of nodes for each of the at least two edges; for each instance of the fifth new node, adding a first new edge between a first node of the pair of nodes and the first new node; and for each instance of the first new node, adding a second new edge between the first new node and a second node of the pair of nodes to obtain a first transformed query graph, wherein the tree representation is combined with the first transformed query graph instead of the query graph to obtain the transformed query graph.

12. A system comprising: a memory having computer-readable instructions stored thereon; and a processor that executes the computer-readable instructions to: receive a main graph and a query graph, wherein the query graph contains symmetry, and wherein the query graph comprises an additional query; break symmetry in the query graph by: converting the query graph into a transformed query graph by: converting the additional query into a tree representation by: responsive to determining that the additional query comprises a constant value, creating a first new node in a directed acyclic graph (DAG) for the constant value; responsive to determining that the additional query comprises a node expression of an attribute, creating a second new node and a third new node in the DAG, the second new node representing the node associated with the node expression and the third new node representing the attribute of the node expression; creating a first edge between the second new node and the third new node; responsive to determining that the additional query comprises a left operand <operator> right operand form, creating a fourth new node in the DAG for the <operator>; creating a string node attribute for the fourth new node representing the <operator>; responsive to determining that the <operator> is commutative, adding a second edge from the fourth new node to the left operand and a third edge from the fourth new node to the right operand or responsive to determining that the <operator> is not commutative, adding the second edge from the fourth new node to the left operand and a fourth edge from the right operand to the fourth new node to create a tree form; simplifying the tree form to obtain the tree representation; and combining the tree representation with the query graph to obtain the transformed query graph; generating a symmetry breaking expression from the transformed query graph; and translating the symmetry breaking expression to refer to one or more nodes and one or more edges in the query graph to obtain a translated symmetry breaking expression of the query graph; and find one or more subgraphs of the main graph that match the translated symmetry breaking expression of the query graph, wherein the one or more subgraphs do not contain symmetry.

13. The system of claim 12, wherein to generate the symmetry breaking expression from the transformed query graph, the computer-readable instructions further cause the processor to: (A) detect one or more orbits in the transformed query graph, wherein each orbit comprises one or more nodes of the transformed query graph; (B) select an orbit from the one or more orbits having more than one node; (C) generate an automorphism breaking sub-expression for the selected orbit; (D) assign a node of the selected orbit a unique node attribute; (E) recalculate the one or more orbits in the transformed query graph; (F) repeat (B)-(E) until each orbit in the transformed query graph has a single node; and (G) combine each of the automorphism breaking sub-expressions generated in (C) to obtain the symmetry breaking expression.

14. The system of claim 13, wherein to generate the automorphism breaking sub-expression, the computer-readable instructions further cause the processor to: define the symmetry breaking expression as empty; identify the node in the selected orbit as having a smallest node label i; and for each node label j in the set, if j is not equal to i: generate the automorphism breaking sub-expression as i.node<j.node; and append the automorphism breaking sub-expression to the symmetry breaking expression by conjunction, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

15. The system of claim 13, wherein combining each of the automorphism breaking sub-expressions in (G) comprises appending each of the automorphism breaking sub-expressions by conjunction.

16. The system of claim 12, wherein to translate the symmetry breaking expression to refer to the one or more nodes and the one or more edges in the query graph, the computer-readable instructions further cause the processor to: identify a term in the symmetry breaking expression; identify a first term node and a second term node in the term; responsive to determining that the first term node was created during subdivision of a fifth edge of the query graph, identify a first node and a second node in the query graph connected by the fifth edge; assign a first edge key to the fifth edge; responsive to determining that the second term node was created during subdivision of a sixth edge of the query graph, identify a third node and a fourth node in the query graph connected by the sixth edge; assign a second edge key to the sixth edge; and responsive to determining that the first node is not same as the third node, output a translated term as a first node.node<third node.node or responsive to determining that the first node is the same as the third node and the second node is not the same as the fourth node, output the translated term as second node.node<fourth node.node or responsive to determining that the first node is the same as the third node and the second node is also the same as the fourth node, output the translated term as (first node, second node, first edge key).edge_key<(third node, fourth node, second edge ky).edge_key.

17. The system of claim 12, wherein to simplify the tree form, the computer-readable instructions further cause the processor to: create a copy of the DAG; responsive to determining that a node N in the copy of the DAG represents an associative operator: identify a child node C of the node N that has the same associative operator; add a fifth edge from the node N to each child node C' of the child node C; and delete the child node C; responsive to determining that the node N is an AND operator: identify child node C1 and child node C2 of the node N that have a same transitive operator; identify children nodes G1 of the child node C1 and children nodes G2 of the child node C2; responsive to determining that there is at least one common node between the children nodes G1 and the children nodes G2, add a sixth edge from the child node C1 to each of the children nodes G2; and delete the child node C2 from the copy of the DAG; and responsive to determining that the copy of the DAG comprises subgraphs of the form A <EQ> B <COMP> constant value, add a seventh edge from node COMP to Node A for each of the subgraphs.

18. The system of claim 17, wherein to combine the tree representation with the query graph, the computer-readable instructions further cause the processor to: initialize the transformed query graph as a copy of the query graph; convert a direction of each DAG edge in the copy of the DAG into a DAG edge attribute; convert each of the DAG edge attribute to a DAG node attribute; replace each of the DAG node attribute with a different value of a single output attribute; and add each DAG node from the copy of the DAG and each of the DAG edge that does not exist in the query graph to the transformed query graph.

19. The system of claim 12, wherein the computer-readable instructions further cause the processor to: determine that the query graph comprises at least one of (a) at least two node attributes, (b) at least two edge attributes, or (c) at least one node attribute and at least one edge attribute; and convert each of the node attributes and each of the edge attributes into a single output attribute to obtain a first transformed query graph, wherein the tree representation is combined with the first transformed query graph instead of the query graph to obtain the transformed query graph.

20. The system of claim 19, wherein the output attribute is different from each of the node attributes and each of the edge attributes in the query graph.

21. The system of claim 12, wherein the computer-readable instructions further cause the processor to: determine that the query graph comprises an edge having one or more edge attributes, wherein the edge is between a first node and a second node of the query graph; create a fifth new node between the first node and the second node for each of the one or more edge attributes, each of the fifth new node having a node attribute corresponding to one of the one or more edge attributes; create a first new edge between each of the fifth new node and the first node; and create a second new edge between each of the fifth new node and the second node to obtain a first transformed query graph, wherein the tree representation is combined with the first transformed query graph instead of the query graph to obtain the transformed query graph.

22. The system of claim 12, wherein the computer-readable instructions further cause the processor to: identify each pair of nodes in the query graph having at least two edges therebetween; and for each of the pair of nodes: delete each of the at least two edges between the pair of nodes; create an instance of a fifth new node between the pair of nodes for each of the at least two edges; for each instance of the fifth new node, adding a first new edge between a first node of the pair of nodes and the first new node; and for each instance of the first new node, adding a second new edge between the first new node and a second node of the pair of nodes to obtain a first transformed query graph, wherein the tree representation is combined with the first transformed query graph instead of the query graph to obtain the transformed query graph.

23. A method comprising: receiving, by a processor executing computer-readable instructions stored on a memory, a main graph and a query graph, wherein the query graph contains symmetry, and wherein the query graph comprises an additional query; breaking, by the processor, symmetry in the query graph by: converting, by the processor, the query graph into a transformed query graph by: converting, by the processor, the additional query into a tree representation by: responsive to determining that the additional query comprises a constant value, creating, by the processor, a first new node in a directed acyclic graph (DAG) for the constant value; responsive to determining that the additional query comprises a node expression of an attribute, creating, by the processor, a second new node and a third new node in the DAG, the second new node representing the node associated with the node expression and the third new node representing the attribute of the node expression; creating, by the processor, a first edge between the second new node and the third new node; responsive to determining that the additional query comprises a left operand <operator> right operand form, creating, by the processor, a fourth new node in the DAG for the <operator>; creating, by the processor, a string node attribute for the fourth new node representing the <operator>; responsive to determining that the <operator> is commutative, adding, by the processor, a second edge from the fourth new node to the left operand and a third edge from the fourth new node to the right operand or responsive to determining that the <operator> is not commutative, adding, by the processor, the second edge from the fourth new node to the left operand and a fourth edge from the right operand to the fourth new node to create a tree form; simplifying, by the processor, the tree form to obtain the tree representation; and combining, by the processor, the tree representation with the query graph to obtain the transformed query graph; generating, by the processor, a symmetry breaking expression from the transformed query graph; and translating, by the processor, the symmetry breaking expression to refer to one or more nodes and one or more edges in the query graph to obtain a translated symmetry breaking expression of the query graph; and finding, by the processor, one or more subgraphs of the main graph that match the translated symmetry breaking expression of the query graph, wherein the one or more subgraphs do not contain symmetry.

24. The method of claim 23, wherein to generate the symmetry breaking expression from the transformed query graph, the method further comprises: (A) detecting, by the processor, one or more orbits in the transformed query graph, wherein each orbit comprises one or more nodes of the transformed query graph; (B) selecting, by the processor, an orbit from the one or more orbits having more than one node; (C) generating, by the processor, an automorphism breaking sub-expression for the selected orbit; (D) assigning, by the processor, a node of the selected orbit a unique node attribute; (E) recalculating, by the processor, the one or more orbits in the transformed query graph; (F) repeating, by the processor, (B)-(E) until each orbit in the transformed query graph has a single node; and (G) combining, by the processor, each of the automorphism breaking sub-expressions generated in (C) to obtain the symmetry breaking expression.

25. The method of claim 24, wherein to generate the automorphism breaking sub-expression, the method further comprises: defining, by the processor, the symmetry breaking expression as empty; identifying, by the processor, the node in the selected orbit as having a smallest node label i; and for each node label j in the set, if j is not equal to i: generating, by the processor, the automorphism breaking sub-expression as i.node<j.node; and appending, by the processor, the automorphism breaking sub-expression to the symmetry breaking expression by conjunction, wherein term i.node in the automorphism breaking sub-expression as i.node<j.node maps the node with the label i in the query graph to a main graph node having a smallest label; and wherein the term j.node in the automorphism breaking sub-expression as i.node<j.node maps the node with the label j in the query graph to the main graph node having a label other than the smallest label.

26. The method of claim 23, wherein to translate the symmetry breaking expression to refer to the one or more nodes and the one or more edges in the query graph, the method further comprises: identifying, by the processor, a term in the symmetry breaking expression; identifying, by the processor, a first term node and a second term node in the term; responsive to determining that the first term node was created during subdivision of a fifth edge of the query graph, identifying, by the processor, a first node and a second node in the query graph connected by the fifth edge; assigning, by the processor, a first edge key to the fifth edge; responsive to determining that the second term node was created during subdivision of a sixth edge of the query graph, identifying, by the processor, a third node and a fourth node in the query graph connected by the sixth edge; assigning, by the processor, a second edge key to the sixth edge; and responsive to determining that the first node is not same as the third node, outputting, by the processor, a translated term as a first node.node<third node.node or responsive to determining that the first node is the same as the third node and the second node is not the same as the fourth node, outputting, by the processor, the translated term as second node.node<fourth node.node or responsive to determining that the first node is the same as the third node and the second node is also the same as the fourth node, output the translated term as (first node, second node, first edge key).edge_key<(third node, fourth node, second edge key).edge_key.

27. The method of claim 23, wherein to simplify the tree form, the method further comprises: creating, by the processor, a copy of the DAG; responsive to determining that a node N in the copy of the DAG represents an associative operator: identifying, by the processor, a child node C of the node N that has the same associative operator; adding, by the processor, a fifth edge from the node N to each child node C' of the child node C; and deleting, by the processor, the child node C; responsive to determining that the node N is an AND operator: identifying, by the processor, child node C1 and child node C2 of the node N that have a same transitive operator; identifying, by the processor, children nodes G1 of the child node C1 and children nodes G2 of the child node C2; responsive to determining that there is at least one common node between the children nodes G1 and the children nodes G2, adding, by the processor, a sixth edge from the child node C1 to each of the children nodes G2; and deleting, by the processor, the child node C2 from the copy of the DAG; and responsive to determining that the copy of the DAG comprises subgraphs of the form A <EQ> B <COMP> constant value, adding, by the processor, a seventh edge from node COMP to Node A for each of the subgraphs.

28. The method of claim 27, wherein to combine the tree representation with the query graph, the method further comprises: initializing, by the processor, the transformed query graph as a copy of the query graph; converting, by the processor, a direction of each DAG edge in the copy of the DAG into a DAG edge attribute; converting, by the processor, each of the DAG edge attribute to a DAG node attribute; replacing, by the processor, each of the DAG node attribute with a different value of a single output attribute; and adding, by the processor, each DAG node from the copy of the DAG and each of the DAG edge that does not exist in the query graph to the transformed query graph.

29. The method of claim 23, further comprising: determining, by the processor, that the query graph comprises at least one of (a) at least two node attributes, (b) at least two edge attributes, or (c) at least one node attribute and at least one edge attribute; and converting, by the processor, each of the node attributes and each of the edge attributes into a single output attribute to obtain a first transformed query graph, wherein the tree representation is combined with the first transformed query graph instead of the query graph to obtain the transformed query graph.

30. The method of claim 23, further comprising: determining, by the processor, that the query graph comprises an edge having one or more edge attributes, wherein the edge is between a first node and a second node of the query graph; creating, by the processor, a fifth new node between the first node and the second node for each of the one or more edge attributes, each of the fifth new node having a node attribute corresponding to one of the one or more edge attributes; creating, by the processor, a first new edge between each of the fifth new node and the first node; and creating, by the processor, a second new edge between each of the fifth new node and the second node to obtain a first transformed query graph, wherein the tree representation is combined with the first transformed query graph instead of the query graph to obtain the transformed query graph.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions stored thereon that when executed by a processor cause the processor to:
   receive a main graph and a query graph, wherein the query graph contains symmetry;
   generate a symmetry breaking expression from the query graph by:
   (A) detecting one or more orbits in the query graph, wherein each orbit comprises one or more nodes of the query graph;
   (B) selecting an orbit from the one or more orbits having more than one node;
   (C) generating an automorphism breaking sub-expression for the selected orbit;
   (D) assigning a node of the selected orbit a unique node attribute;
   (E) recalculating the one or more orbits in the query graph;
   (F) repeating (B)-(E) until each orbit in the query graph has a single node; and
   (G) combining each of the automorphism breaking sub-expressions generated in (C) to obtain the symmetry breaking expression;
   translate the symmetry breaking expression to refer to one or more nodes and one or more edges in the query graph to obtain a translated symmetry breaking expression of the query graph; and
   find one or more subgraphs of the main graph that match the translated symmetry breaking expression of the query graph, wherein the one or more subgraphs do not contain symmetry.

2. The non-transitory computer-readable medium of claim 1, wherein to generate the automorphism breaking sub-expression, the computer-readable instructions further cause the processor to:
   define the symmetry breaking expression as empty;
   identify the node in the selected orbit as having a smallest node label i; and
   for each node label j in the set, if j is not equal to i:
      generate the automorphism breaking sub-expression as i.node<j.node; and
      append the automorphism breaking sub-expression to the symmetry breaking expression by conjunction.

3. The non-transitory computer-readable medium of claim 2, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

4. The non-transitory computer-readable medium of claim 1, wherein combining each of the automorphism breaking sub-expressions in (G) comprises appending each of the automorphism breaking sub-expressions by conjunction.

5. The non-transitory computer-readable medium of claim 1, wherein to translate the symmetry breaking expression to refer to the one or more nodes and the one or more edges in the query graph, the computer-readable instructions further cause the processor to:
   identify a term in the symmetry breaking expression;
   identify a first node and a second node in the term;
   responsive to determining that the first node was created during subdivision of a first edge of the query graph, identify a third node and a fourth node in the query graph connected by the first edge;
   assign a first edge key to the first edge;
   responsive to determining that the second node was created during subdivision of a second edge of the query graph, identify a fifth node and a sixth node in the query graph connected by the second edge;
   assign a second edge key to the second edge; and
   responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

6. The non-transitory computer-readable medium of claim 1, wherein the computer-readable instructions further cause the processor to:
    determine that the query graph comprises an edge attribute between a first node and a second node of the query graph; and
    create a new node for the edge attribute between the first node and the second node to obtain a transformed query graph, the new node having a node attribute corresponding to the edge attribute,
    wherein the symmetry breaking expression is generated from the transformed query graph instead of the query graph.

7. The non-transitory computer-readable medium of claim 1, wherein the computer-readable instructions further cause the processor to:
    determine that the query graph comprises multiple edges between a first node and a second node of the query graph; and
    create a new node between the first node and the second node for each of the multiple edges to obtain a transformed query graph,
    wherein the symmetry breaking expression is generated from the transformed query graph instead of the query graph.

8. The non-transitory computer-readable medium of claim 1, wherein the computer-readable instructions further cause the processor to:
    determine that the query graph comprises at least one of (a) at least two node attributes, (b) at least two edge attributes, or (c) at least one node attribute and at least one edge attribute; and
    convert each of the node attributes and each of the edge attributes into a single output attribute to obtain a transformed query graph,
    wherein the symmetry breaking expression is generated from the transformed query graph instead of the query graph.

9. The non-transitory computer-readable medium of claim 8, wherein the output attribute is different from each of the node attributes and each of the edge attributes in the query graph.

10. The non-transitory computer-readable medium of claim 1, wherein the computer-readable instructions further cause the processor to:
    determine that the query graph comprises an additional query;
    convert the additional query into a tree representation; and
    combine the tree representation with the query graph to obtain a transformed query graph,
    wherein the symmetry breaking expression is generated from the transformed query graph instead of the query graph.

11. The non-transitory computer-readable medium of claim 10, wherein to convert the additional query into the tree representation, the computer-readable instructions further cause the processor to:
    convert the additional query into a tree form by:
        responsive to determining that the additional query comprises a constant value, creating a first new node in a directed acyclic graph (DAG) for the constant value;
        responsive to determining that the additional query comprises a node expression of an attribute, creating a second new node and a third new node in the DAG, the second new node representing the node associated with the node expression and the third new node representing the attribute of the node expression;
    creating a first edge between the second new node and the third new node;
    responsive to determining that the additional query comprises a left operand <operator> right operand form, creating a fourth new node in the DAG for the <operator>;
    creating a string node attribute for the fourth new node representing the <operator>; and
    responsive to determining that the <operator> is commutative, adding a second edge from the fourth new node to the left operand and a third edge from the fourth new node to the right operand or responsive to determining that the <operator> is not commutative, adding the second edge from the fourth new node to the left operand and a fourth edge from the right operand to the fourth new node; and
    simplify the tree form to obtain the tree representation by:
        creating a copy of the DAG;
        responsive to determining that a node N in the copy of the DAG represents an associative operator:
    identifying a child node C of the node N that has the same associative operator;
    adding a fifth edge from the node N to each child node C' of the child node C; and
    deleting the child node C;
        responsive to determining that the node N is an AND operator:
            identifying child node C1 and child node C2 of the node N that have a same transitive operator;
            identifying children nodes G1 of the child node C1 and children nodes G2 of the child node C2;
            responsive to determining that there is at least one common node between the children nodes G1 and the children nodes G2, adding a sixth edge from the child node C1 to each of the children nodes G2; and
            deleting the child node C2 from the copy of the DAG; and
        responsive to determining that the copy of the DAG comprises subgraphs of the form A <EQ> B <COMP> constant value, adding a seventh edge from node COMP to Node A for each of the subgraphs.

12. The non-transitory computer-readable medium of claim 11, wherein to combine the tree representation with the query graph, the computer-readable instructions further cause the processor to:
    initialize the first transformed query graph as a copy of the transformed query graph;
    convert a direction of each DAG edge in the copy of the DAG into a DAG edge attribute;
    convert each of the DAG edge attribute to a DAG node attribute;
    replace each of the DAG node attribute with a different value of a single output attribute; and add each DAG node from the copy of the DAG and each of the DAG edge that does not exist in the query graph to the transformed query graph.

13. A system comprising:
a memory having computer-readable instructions stored thereon; and
a processor that executes the computer-readable instructions to:
receive a main graph and a query graph, wherein the query graph contains symmetry;
generate a symmetry breaking expression from the query graph by:
(A) detecting one or more orbits in the query graph, wherein each orbit comprises one or more nodes of the query graph;
(B) selecting an orbit from the one or more orbits having more than one node;
(C) generating an automorphism breaking sub-expression for the selected orbit;
(D) assigning a node of the selected orbit a unique node attribute;
(E) recalculating the one or more orbits in the query graph;
(F) repeating (B)-(E) until each orbit in the query graph has a single node; and
(G) combining each of the automorphism breaking sub-expressions generated in (C) to obtain the symmetry breaking expression;
translate the symmetry breaking expression to refer to one or more nodes and one or more edges in the query graph to obtain a translated symmetry breaking expression of the query graph; and
find one or more subgraphs of the main graph that match the translated symmetry breaking expression of the query graph, wherein the one or more subgraphs do not contain symmetry.

14. The system of claim 13, wherein to generate the automorphism breaking sub-expression, the computer-readable instructions further cause the processor to:
define the symmetry breaking expression as empty;
identify the node in the selected orbit as having a smallest node label i; and
for each node label j in the set, if j is not equal to i:
generate the automorphism breaking sub-expression as i.node<j.node; and
append the automorphism breaking sub-expression to the symmetry breaking expression by conjunction.

15. The system of claim 14, wherein term i.node in the automorphism breaking sub-expression as i.node<j.node maps the node with the label i in the query graph to a main graph node having a smallest label, and wherein the term j.node in the automorphism breaking sub-expression as i.node<j.node maps the node with the label j in the query graph to the main graph node having a label other than the smallest label.

16. The system of claim 13, wherein combining each of the automorphism breaking sub-expressions in (G) comprises appending each of the automorphism breaking sub-expressions by conjunction.

17. The system of claim 13, wherein to translate the symmetry breaking expression to refer to the one or more nodes and the one or more edges in the query graph, the computer-readable instructions further cause the processor to:
identify a term in the symmetry breaking expression;
identify a first node and a second node in the term;
responsive to determining that the first node was created during subdivision of a first edge of the query graph, identify a third node and a fourth node in the query graph connected by the first edge;
assign a first edge key to the first edge;
responsive to determining that the second node was created during subdivision of a second edge of the query graph, identify a fifth node and a sixth node in the query graph connected by the second edge;
assign a second edge key to the second edge; and
responsive to determining that the third node is not same as the fifth node, output a translated term as a third node.node<fifth node.node or responsive to determining that the third node is the same as the fifth node and the fourth node is not the same as the sixth node, output the translated term as fourth node.node<sixth node.node or responsive to determining that the third node is the same as the fifth node and the fourth node is also the same as the sixth node, output the translated term as (third node, fourth node, first edge key).edge_key<(fifth node, sixth node, second edge key).edge_key.

18. The system of claim 13, wherein the computer-readable instructions further cause the processor to:
determine that the query graph comprises an edge attribute between a first node and a second node of the query graph; and
create a new node for the edge attribute between the first node and the second node to obtain a transformed query graph, the new node having a node attribute corresponding to the edge attribute,
wherein the symmetry breaking expression is generated from the transformed query graph instead of the query graph.

19. The system of claim 13, wherein the computer-readable instructions further cause the processor to:
determine that the query graph comprises multiple edges between a first node and a second node of the query graph; and
create a new node between the first node and the second node for each of the multiple edges to obtain a transformed query graph,
wherein the symmetry breaking expression is generated from the transformed query graph instead of the query graph.

20. The system of claim 13, wherein the computer-readable instructions further cause the processor to:
determine that the query graph comprises at least one of (a) at least two node attributes, (b) at least two edge attributes, or (c) at least one node attribute and at least one edge attribute; and
convert each of the node attributes and each of the edge attributes into a single output attribute to obtain a transformed query graph,
wherein the symmetry breaking expression is generated from the transformed query graph instead of the query graph.

21. The system of claim 20, wherein the output attribute is different from each of the node attributes and each of the edge attributes in the query graph.

22. The system of claim 13, wherein the computer-readable instructions further cause the processor to:
determine that the query graph comprises an additional query;
convert the additional query into a tree representation; and
combine the tree representation with the query graph to obtain a transformed query graph, wherein the symmetry breaking expression is generated from the transformed query graph instead of the query graph.

23. The system of claim 22, wherein to convert the additional query into the tree representation, the computer-readable instructions further cause the processor to:
  convert the additional query into a tree form by:
    responsive to determining that the additional query comprises a constant value, creating a first new node in a directed acyclic graph (DAG) for the constant value;
    responsive to determining that the additional query comprises a node expression of an attribute, creating a second new node and a third new node in the DAG, the second new node representing the node associated with the node expression and the third new node representing the attribute of the node expression;
  creating a first edge between the second new node and the third new node;
    responsive to determining that the additional query comprises a left operand <operator> right operand form, creating a fourth new node in the DAG for the <operator>;
  creating a string node attribute for the fourth new node representing the <operator>; and
    responsive to determining that the <operator> is commutative, adding a second edge from the fourth new node to the left operand and a third edge from the fourth new node to the right operand or responsive to determining that the <operator> is not commutative, adding the second edge from the fourth new node to the left operand and a fourth edge from the right operand to the fourth new node; and
  simplify the tree form to obtain the tree representation by:
    creating a copy of the DAG;
    responsive to determining that a node N in the copy of the DAG represents an associative operator:
    identifying a child node C of the node N that has the same associative operator;
    adding a fifth edge from the node N to each child node C' of the child node C; and
    deleting the child node C;
      responsive to determining that the node N is an AND operator:
      identifying child node C1 and child node C2 of the node N that have a same transitive operator;
      identifying children nodes G1 of the child node C1 and children nodes G2 of the child node C2;
      responsive to determining that there is at least one common node between the children nodes G1 and the children nodes G2, adding a sixth edge from the child node C1 to each of the children nodes G2; and
      deleting the child node C2 from the copy of the DAG; and
    responsive to determining that the copy of the DAG comprises subgraphs of the form A <EQ> B <COMP> constant value, adding a seventh edge from node COMP to Node A for each of the subgraphs.

24. The system of claim 23, wherein to combine the tree representation with the query graph, the computer-readable instructions further cause the processor to:
  initialize the first transformed query graph as a copy of the transformed query graph;
  convert a direction of each DAG edge in the copy of the DAG into a DAG edge attribute;
  convert each of the DAG edge attribute to a DAG node attribute;
  replace each of the DAG node attribute with a different value of a single output attribute; and
  add each DAG node from the copy of the DAG and each of the DAG edge that does not exist in the query graph to the transformed query graph.

25. A method comprising:
  receiving, by a processor executing computer-readable instructions stored on a memory, a main graph and a query graph, wherein the query graph contains symmetry;
  generating, by the processor, a symmetry breaking expression from the query graph by:
    (A) detecting, by the processor, one or more orbits in the query graph, wherein each orbit comprises one or more nodes of the query graph;
    (B) selecting, by the processor, an orbit from the one or more orbits having more than one node;
    (C) generating, by the processor, an automorphism breaking sub-expression for the selected orbit;
    (D) assigning, by the processor, a node of the selected orbit a unique node attribute;
    (E) recalculating, by the processor, the one or more orbits in the query graph;
    (F) repeating, by the processor, (B)-(E) until each orbit in the query graph has a single node; and
    (G) combining, by the processor, each of the automorphism breaking sub-expressions generated in (C) to obtain the symmetry breaking expression;
  translating, by the processor, the symmetry breaking expression to refer to one or more nodes and one or more edges in the query graph to obtain a translated symmetry breaking expression of the query graph; and
  finding, by the processor, one or more subgraphs of the main graph that match the translated symmetry breaking expression of the query graph, wherein the one or more subgraphs do not contain symmetry.

26. The method of claim 25, wherein to generate the automorphism breaking sub-expression, the method further comprises:
  defining, by the processor, the symmetry breaking expression as empty;
  identifying, by the processor, the node in the selected orbit as having a smallest node label i; and
  for each node label j in the set, if j is not equal to i:
    generating, by the processor, the automorphism breaking sub-expression as i.node<j.node; and
    appending, by the processor, the automorphism breaking sub-expression to the symmetry breaking expression by conjunction,
  wherein term i.node in the automorphism breaking sub-expression as i.node<j.node maps the node with the label i in the query graph to a main graph node having a smallest label; and
  wherein the term j.node in the automorphism breaking sub-expression as i.node<j.node maps the node with the label j in the query graph to the main graph node having a label other than the smallest label.

27. The method of claim 25, wherein combining each of the automorphism breaking sub-expressions in (G) comprises appending each of the automorphism breaking sub-expressions by conjunction.

28. The method of claim 25, wherein to translate the symmetry breaking expression to refer to the one or more nodes and the one or more edges in the query graph, the method further comprises:

identifying, by the processor, a term in the symmetry breaking expression;

identifying, by the processor, a first node and a second node in the term;

responsive to determining that the first node was created during subdivision of a first edge of the query graph, identifying, by the processor, a third node and a fourth node in the query graph connected by the first edge;

assigning, by the processor, a first edge key to the first edge;

responsive to determining that the second node was created during subdivision of a second edge of the query graph, identifying, by the processor, a fifth node and a sixth node in the query graph connected by the second edge;

assigning, by the processor, a second edge key to the second edge; and responsive to determining that the third node is not same as the fifth node, outputting, by the processor, a translated term as a third node.node<fifth node.node or responsive to determining that the third node is the same as the fifth node and the fourth node is not the same as the sixth node, outputting, by the processor, the translated term as fourth node.node<sixth node.node or responsive to determining that the third node is the same as the fifth node and the fourth node is also the same as the sixth node, output the translated term as (third node, fourth node, first edge key).edge_key< (fifth node, sixth node, second edge key).edge_key.

29. The method of claim 25, further comprising:

determining, by the processor, that the query graph comprises an edge attribute between a first node and a second node of the query graph; and creating, by the processor, a new node for the edge attribute between the first node and the second node to obtain a transformed query graph, the new node having a node attribute corresponding to the edge attribute, wherein the symmetry breaking expression is generated from the transformed query graph instead of the query graph.

30. The method of claim 25, further comprising:

determining, by the processor, that the query graph comprises multiple edges between a first node and a second node of the query graph; and creating, by the processor, a new node between the first node and the second node for each of the multiple edges to obtain a transformed query graph, wherein the symmetry breaking expression is generated from the transformed query graph instead of the query graph.

* * * * *